(12) United States Patent
Mitamura et al.

(10) Patent No.: US 8,406,903 B2
(45) Date of Patent: Mar. 26, 2013

(54) NETWORK PLC CONTROL SYSTEM ENGINEERING CONFIGURATION LAYOUT AND CONNECTION PATH DISPLAY

(75) Inventors: Akira Mitamura, Tokyo (JP); Satoru Nakai, Tokyo (JP); Masayuki Ueno, Tokyo (JP); Tomofumi Ishihara, Tokyo (JP); Yuzuru Tone, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 619 days.

(21) Appl. No.: 12/602,437

(22) PCT Filed: May 31, 2007

(86) PCT No.: PCT/JP2007/061060
§ 371 (c)(1),
(2), (4) Date: Jan. 31, 2010

(87) PCT Pub. No.: WO2008/146380
PCT Pub. Date: Dec. 4, 2008

(65) Prior Publication Data
US 2010/0205535 A1 Aug. 12, 2010

(51) Int. Cl.
*G05B 11/01* (2006.01)
*G06F 15/177* (2006.01)
(52) U.S. Cl. .......................................... 700/19; 715/736
(58) Field of Classification Search .................... 700/12, 700/11, 79; 702/58, 59; 324/500–556; 715/735–738, 771
See application file for complete search history.

(56) References Cited

U.S. PATENT DOCUMENTS

| | | | |
|---|---|---|---|
| 5,838,907 A | 11/1998 | Hansen | |
| 6,282,175 B1 | 8/2001 | Steele et al. | |
| 6,449,715 B1 | 9/2002 | Krivoshein | |
| 6,880,127 B1 * | 4/2005 | Arquie | 715/735 |
| 7,010,753 B2 * | 3/2006 | Windl et al. | 715/771 |
| 7,024,419 B1 * | 4/2006 | Klenk et al. | 707/999.102 |
| 7,315,985 B1 * | 1/2008 | Gauvin et al. | 715/734 |
| 7,340,683 B2 | 3/2008 | Ueda | |
| 7,587,675 B2 * | 9/2009 | Cunningham et al. | 715/734 |
| 7,675,862 B2 * | 3/2010 | Pham et al. | 370/241 |
| 7,681,130 B1 * | 3/2010 | Lavallee et al. | 715/735 |

(Continued)

FOREIGN PATENT DOCUMENTS

| | | | |
|---|---|---|---|
| DE | 100 08 430 A1 | 8/2001 | |
| DE | 100 49 049 A1 | 12/2001 | |

(Continued)

OTHER PUBLICATIONS

Office Action issued Sep. 9, 2011 in German Patent Application No. 11 2007 003 526.9.

(Continued)

*Primary Examiner* — Dave Robertson
(74) *Attorney, Agent, or Firm* — Sughrue Mion, PLLC

(57) ABSTRACT

A connection is made to one of a plurality of programmable controllers (hereinafter, "PLCs") included in a control system in which the plurality of PLCs are connected to one another via one or more networks; the one of the PLCs is specified as an originating PLC; network configuration information of the control system and online connection paths to the PLCs included in the control system are collected; layout relationships among the networks as well as connection relationships of the PLCs and coordinates thereof are calculated based on the network configuration information and the online connection paths; and the results are displayed on a display means as objects.

2 Claims, 84 Drawing Sheets

U.S. PATENT DOCUMENTS

| | | | |
|---|---|---|---|
| 7,747,718 B2 * | 6/2010 | Shirane et al. | 709/223 |
| 8,144,622 B2 * | 3/2012 | Shepard et al. | 370/254 |
| 2002/0196271 A1 | 12/2002 | Windl et al. | |
| 2003/0112958 A1 * | 6/2003 | Beaudoin et al. | 379/221.15 |
| 2004/0117166 A1 * | 6/2004 | Cassiolato | 703/13 |
| 2005/0144271 A1 | 6/2005 | Shirane et al. | |
| 2008/0209333 A1 * | 8/2008 | Frei | 715/736 |

FOREIGN PATENT DOCUMENTS

| | | |
|---|---|---|
| DE | 697 17 881 T2 | 4/2003 |
| DE | 101 97 097 T5 | 4/2004 |
| DE | 699 11 681 T2 | 8/2004 |
| DE | 10 2004 051 179 A1 | 6/2005 |
| JP | 06-120968 A | 4/1994 |
| JP | 10-040196 A | 2/1998 |
| JP | 11-007421 A | 1/1999 |
| JP | 3587099 B2 | 8/2004 |
| JP | 2005-327237 A | 11/2005 |
| JP | 2006-277734 A | 10/2006 |

OTHER PUBLICATIONS

Office Action issued Oct. 14, 2010 in Taiwanese Patent Application No. 096121285.
Full Machine Translation of JP 6120968.
Full Machine Translation of JP 10040196.

* cited by examiner

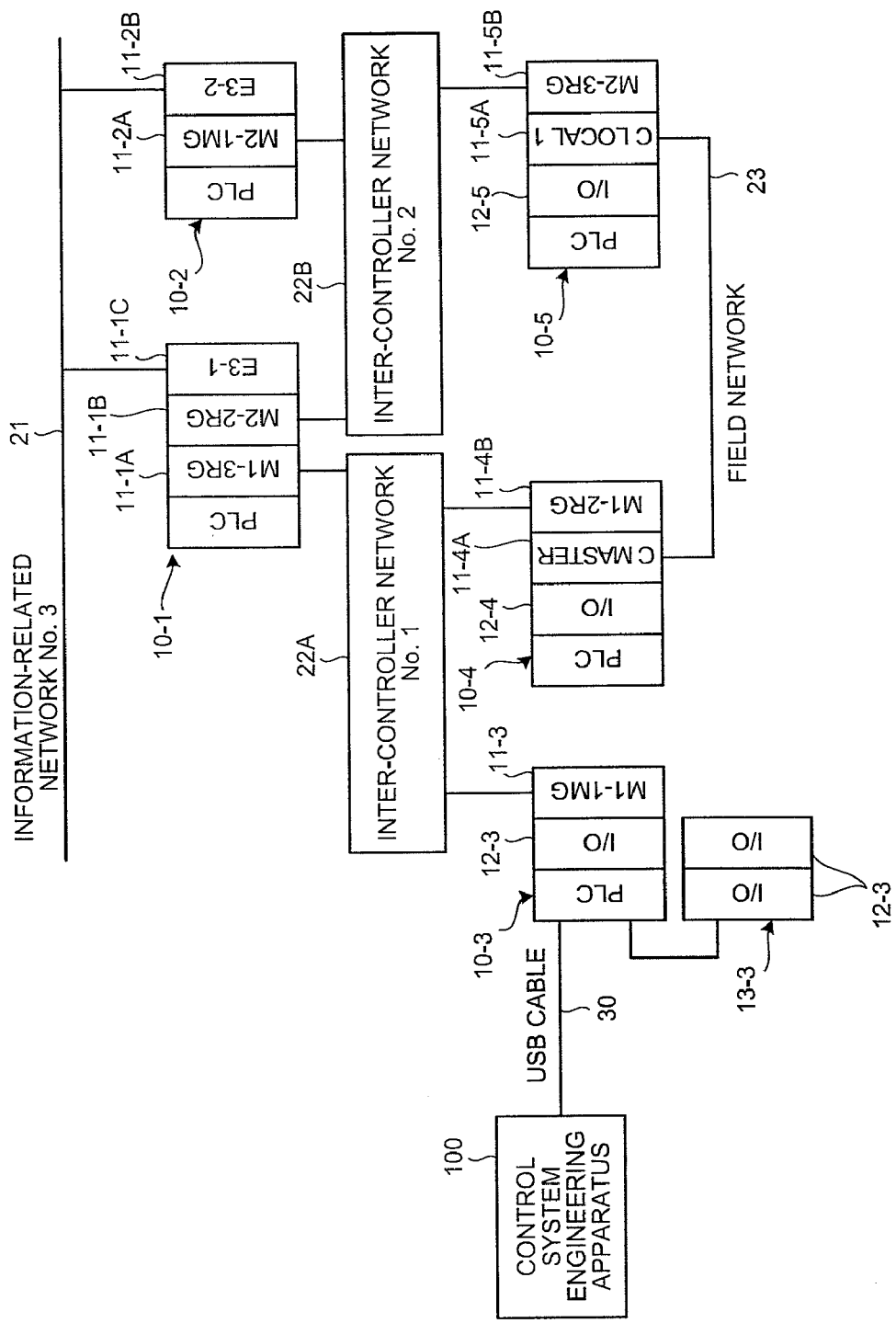

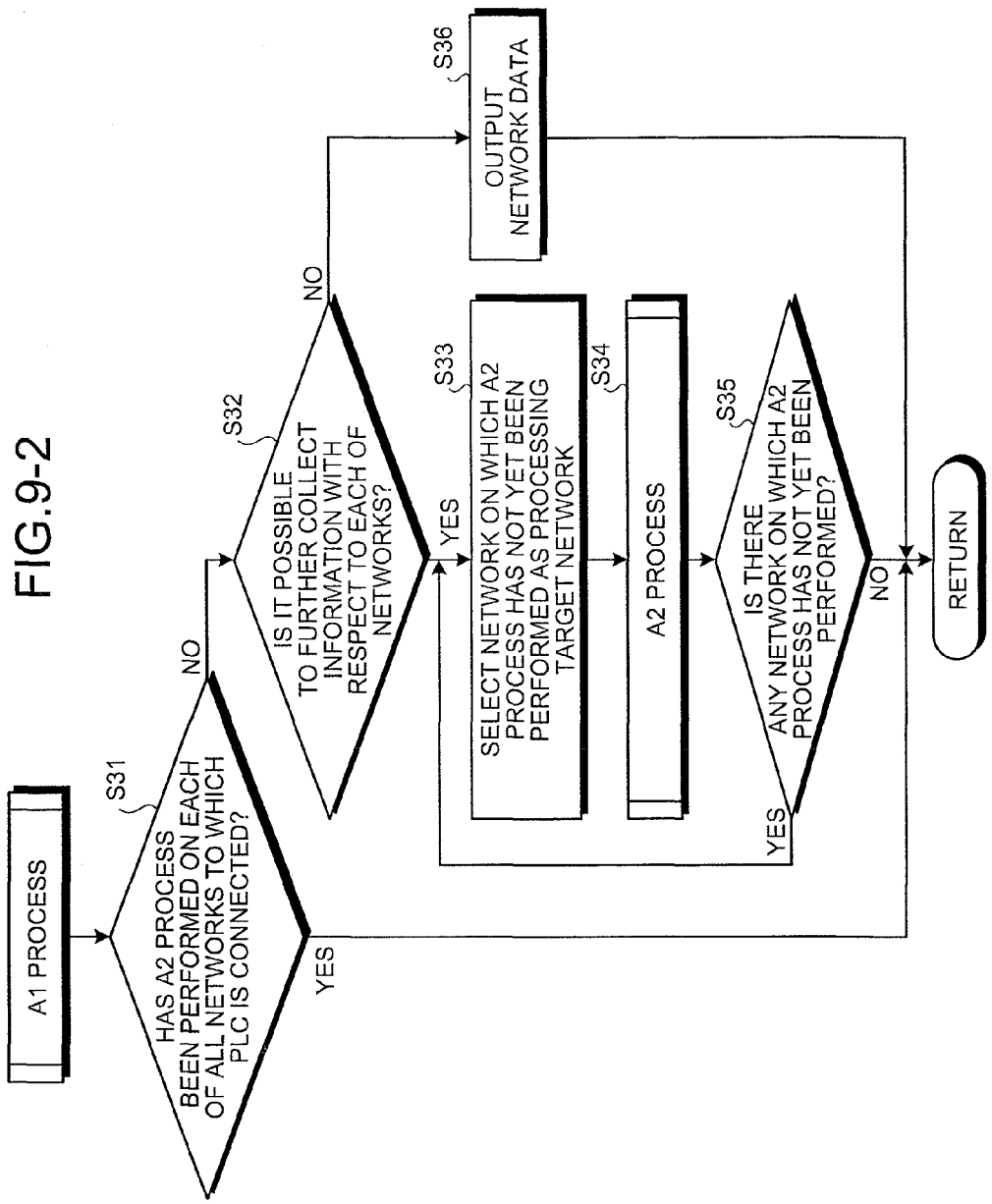

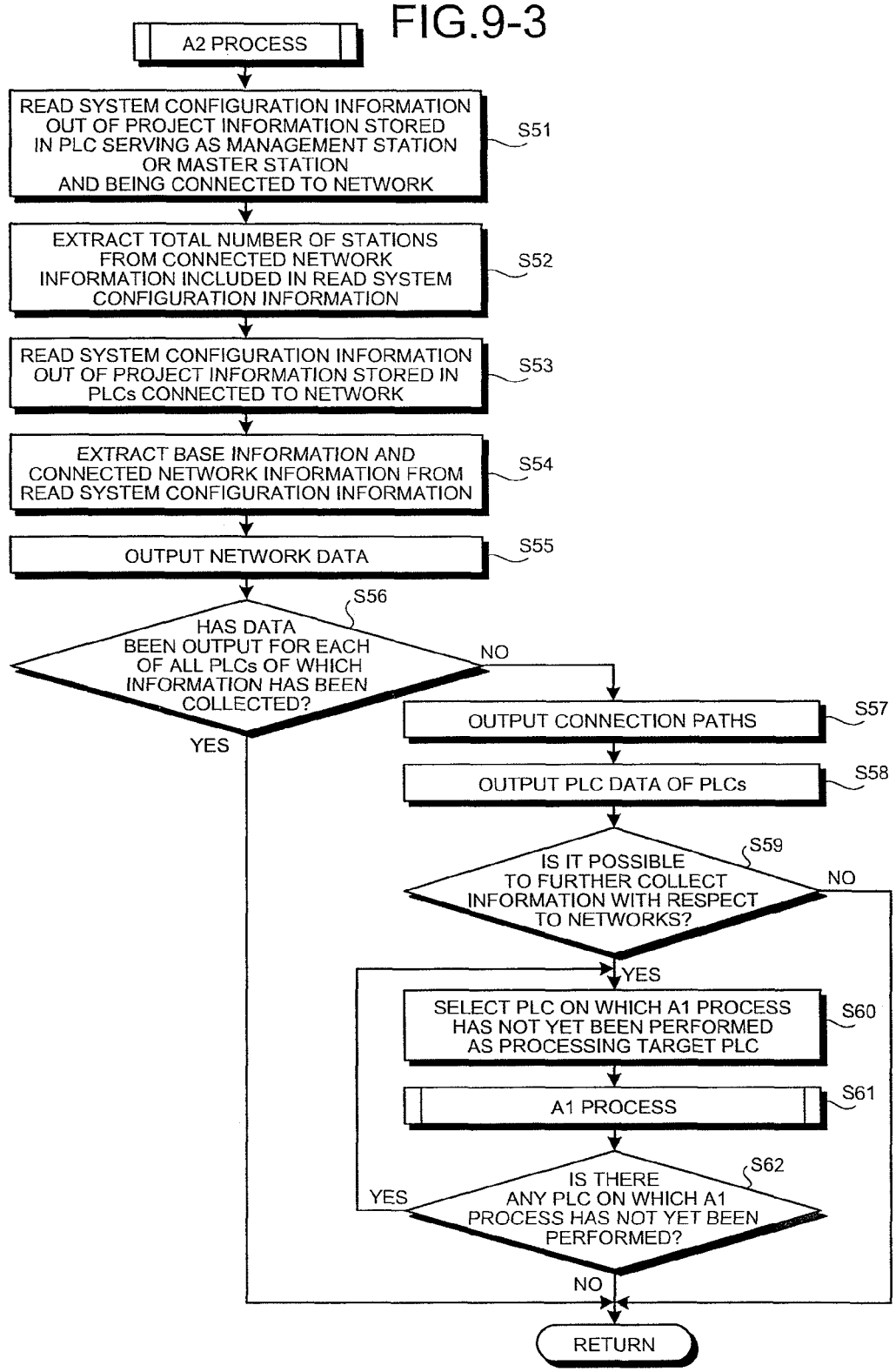

FIG.10

| DATA TYPE | NAME (TERMINAT- ING PLC) | ORIGINAT- ING PLC | DATA 1 | DATA 2 | DATA 3 | |
|---|---|---|---|---|---|---|
| CONNECTION PATH | PLC10-3 | PLC10-3 | | | | P3c |
| CONNECTION PATH | PLC10-4 | PLC10-3 | INTER- CONTROLLER NETWORK No. 1 | | | P4c |
| CONNECTION PATH | PLC10-1 | PLC10-3 | INTER- CONTROLLER NETWORK No. 1 | | | P1c |
| CONNECTION PATH | PLC10-5 | PLC10-3 | INTER- CONTROLLER NETWORK No. 1 | PLC10-4 | FIELD NETWORK | P5c |
| CONNECTION PATH | PLC10-2 | PLC10-3 | INTER- CONTROLLER NETWORK No. 1 | PLC10-1 | INTER- CONTROLLER NETWORK No. 2 | P2c |

FIG.11

| DATA TYPE | NAME | DATA 1 | DATA 2 | DATA 3 | ... | DATA 5 | |
|---|---|---|---|---|---|---|---|
| PLC BASE | PLC10-3 | SLOT 1=CPU UNIT | SLOT 2=I/O UNIT | | ... | ADD-ON SLOT 2= I/O UNIT | P3b |
| PLC NETWORK | PLC10-3 | INTER-CONTROLLER NETWORK No. 1, STATION NUMBER 1, MANAGEMENT STATION, TOTAL NUMBER OF STATIONS: 3 | | | | | P3n |
| NETWORK | INTER-CONTROLLER NETWORK No. 1 | PCL10-3, STATION NUMBER 1, MANAGEMENT STATION, TOTAL NUMBER OF STATIONS: 3 | PLC10-1, STATION NUMBER 2, REGULAR STATION | PLC10-4, STATION NUMBER 3, REGULAR STATION | | | M1 |
| PLC BASE | PLC10-4 | SLOT 1=CPU UNIT | SLOT 2=I/O UNIT | ... | | | P4b |
| PLC NETWORK | PLC10-4 | FIELD NETWORK, MASTER STATION, TOTAL NUMBER OF STATIONS: 2 | INTER-CONTROLLER NETWORK No. 1, STATION NUMBER 3, REGULAR STATION | | | | P4n |
| PLC BASE | PLC10-1 | SLOT 1=CPU UNIT | SLOT 2=INTER-CONTROLLER NETWORK No. 1 UNIT | | | | P1b |
| PLC NETWORK | PLC10-1 | INTER-CONTROLLER NETWORK No. 1, STATION NUMBER 2, REGULAR | INTER-CONTROLLER NETWORK No. 2, STATION NUMBER 3, REGULAR STATION | INFORMATION-RELATED NETWORK No. 3, STATION NUMBER 1, IP ADDRESS | | | P1n |
| NETWORK | FIELD NETWORK | PLC10-4, MASTER STATION, TOTAL NUMBER OF STATIONS: 2 | PLC10-5, LOCAL STATION: 1 | ... | | | C |
| PLC BASE | PLC10-5 | SLOT 1=CPU UNIT | SLOT 2=I/O UNIT | | | | P5b |
| PLC NETWORK | PLC10-5 | FIELD NETWORK, LOCAL STATION: 1 | INTER-CONTROLLER NETWORK No. 2, STATION NUMBER 3, REGULAR STATION | | | | P5n |
| NETWORK | INTER-CONTROLLER NETWORK No. 2 | PLC10-2, STATION NUMBER 1, MANAGEMENT STATION, TOTAL NUMBER OF STATIONS: 3 | PLC10-1, STATION NUMBER 2, REGULAR STATION | PLC10-5, STATION NUMBER 3, REGULAR STATION | | | M2 |
| PLC BASE | PLC10-2 | SLOT 1=CPU UNIT | SLOT 2=INTER-CONTROLLER NETWORK No. 2 UNIT | | | | P2b |
| PLC NETWORK | PLC10-2 | INTER-CONTROLLER NETWORK No. 2, STATION NUMBER 1, MANAGEMENT STATION, TOTAL NUMBER OF STATIONS: 3 | INFORMATION-RELATED NETWORK No. 3, STATION NUMBER 2, IP ADDRESS | | | | P2n |
| NETWORK | INFORMATION-RELATED NETWORK No. 3 | PLC10-2, STATION NUMBER 2, IP ADDRESS | | | | | E3-2 |
| NETWORK | INFORMATION-RELATED NETWORK No. 3 | PLC10-1, STATION NUMBER 1, IP ADDRESS | | | | | E3-1 |
| NETWORK | INFORMATION-RELATED NETWORK No. 3 | PLC10-1, STATION NUMBER 1, IP ADDRESS | PLC10-2, STATION NUMBER 2, IP ADDRESS | | | | E3 |

FIG.12

| (CONSTRAINTS IN NETWORK INFORMATION COLLECTING PROCESS) |
|---|
| A. IT IS POSSIBLE TO ANALYZE UP TO EIGHT INTER-CONTROLLER NETWORKS IN TOTAL |
| B. AS FOR FIELD NETWORKS, IT IS NOT POSSIBLE TO ANALYZE OTHER NETWORKS FROM LOCAL STATIONS |
| C. MANY ELEMENTS OTHER THAN PLCs ARE CONNECTED TO INFORMATION-RELATED NETWORKS. WHILE ONLINE, IT REQUIRES CONSIDERABLE PROCESSING PERIOD TO EXTRACT ONLY PLCs FROM CONNECTED ELEMENTS. INFORMATION-RELATED NETWORKS ARE THEREFORE NOT TARGETS OF NETWORK ANALYSIS. DURING OFFLINE NETWORK ANALYSIS ACCORDING TO FOURTH EMBODIMENT, CONSTRAINT REGARDING INFORMATION-RELATED NETWORKS ALLOWS UP TO EIGHT NETWORKS IN TOTAL INCLUDING INTER-CONTROLLER NETWORKS. |

FIG.13

| (PRIORITY LEVELS USED IN NETWORK INFORMATION OUTPUTTING PROCESS) |
|---|
| A. INTER-CONTROLLER NETWORKS, WHICH HAVE HIGHEST POSSIBILITY OF HAVING PLCs CONNECTED THERETO, ARE PROCESSED WITH HIGHEST PRIORITY. (IF TWO OR MORE OF SAME INTER-CONTROLLER NETWORKS ARE PRESENT, THEY ARE PROCESSED IN ASCENDING ORDER OF NETWORK NUMBERS.) |
| B. FIELD NETWORKS, WHICH HAVE NEXT HIGHEST POSSIBILITY OF HAVING PLCs CONNECTED THERETO, ARE PROCESSED WITH NEXT HIGHEST PRIORITY. (FIELD NETWORKS HAVE HIGH POSSIBILITY OF HAVING NON-CONTROLLER DEVICES OTHER THAN PLCs CONNECTED THERETO. HOWEVER, BECAUSE NUMBER OF NODES IS LIMITED, PROCESSING PERIOD IS SHORT EVEN IF THROUGHPUT IS LOW.) |
| C. LASTLY, INFORMATION-RELATED NETWORKS, WHICH HAVE LOWEST POSSIBILITY OF HAVING PLCs CONNECTED THERETO, ARE PROCESSED. (INFORMATION-RELATED NETWORKS HAVE HIGH POSSIBILITY OF HAVING PERSONAL COMPUTERS OR THE LIKE OTHER THAN PLCs CONNECTED THERETO.) |

FIG.16-3

| INTER-CONTROLLER NETWORK No. 1 | | |
|---|---|---|
| WIRING a | | WIRING c |
| INTER-CONTROLLER NETWORK No. 2 | | |
| WIRING a | WIRING b | WIRING c |
| INFORMATION-RELATED NETWORK No. 3 | | |
| WIRING a | WIRING b | WIRING c |
| | | PLC 10-1 |
| FIELD NETWORK | | |
| WIRING a | WIRING b | |
| PLC 10-4 | PLC 10-5 | |

FIG.16-4

| INTER-CONTROLLER NETWORK No. 1 | | | |
|---|---|---|---|
| WIRING a | | WIRING c | |
| INTER-CONTROLLER NETWORK No. 2 | | | |
| WIRING a | WIRING b | WIRING c | WIRING d |
| INFORMATION-RELATED NETWORK No. 3 | | | |
| WIRING a | WIRING b | WIRING c | WIRING d |
| | | PLC 10-1 | PLC 10-2 |
| FIELD NETWORK | | | |
| WIRING a | WIRING b | | |
| PLC 10-4 | PLC 10-5 | | |

FIG.24

| |
|---|
| INFORMATION-RELATED NETWORK No. 3 |
| INTER-CONTROLLER NETWORK No. 2 |
| INTER-CONTROLLER NETWORK No. 1 |
| FIELD NETWORK |

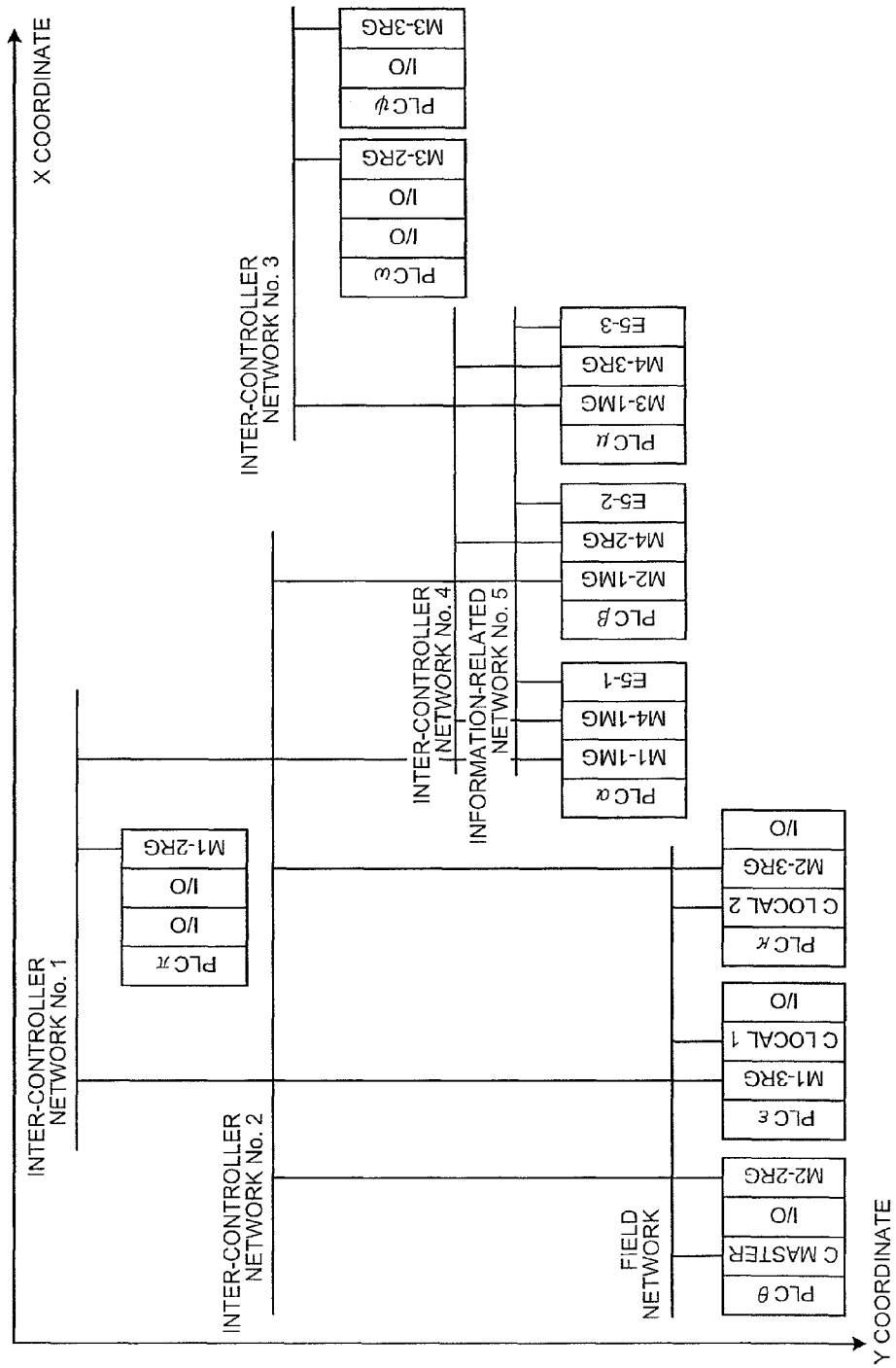

FIG.30

| INFORMATION-RELATED NETWORK No. 5 | | | |
|---|---|---|---|
| WIRING d | WIRING e | WIRING g | |

| INTER-CONTROLLER NETWORK No. 4 | | | |
|---|---|---|---|
| WIRING d | WIRING e | WIRING g | |

| INTER-CONTROLLER NETWORK No. 3 | | | | |
|---|---|---|---|---|
| WIRING d | WIRING e | WIRING g | WIRING h | WIRING i |
| | | | PLC μ | PLC ω | PLC ψ |

| INTER-CONTROLLER NETWORK No. 1 | | | |
|---|---|---|---|
| WIRING d | WIRING e | WIRING b | WIRING f |
| | PLC α | | PLC π |

| INTER-CONTROLLER NETWORK No. 2 | | | |
|---|---|---|---|
| WIRING d | WIRING a | WIRING b | WIRING c |
| PLC β | | | |

| FIELD NETWORK | | |
|---|---|---|
| WIRING a | WIRING b | WIRING c |
| PLC θ | PLC ε | PLC θ |

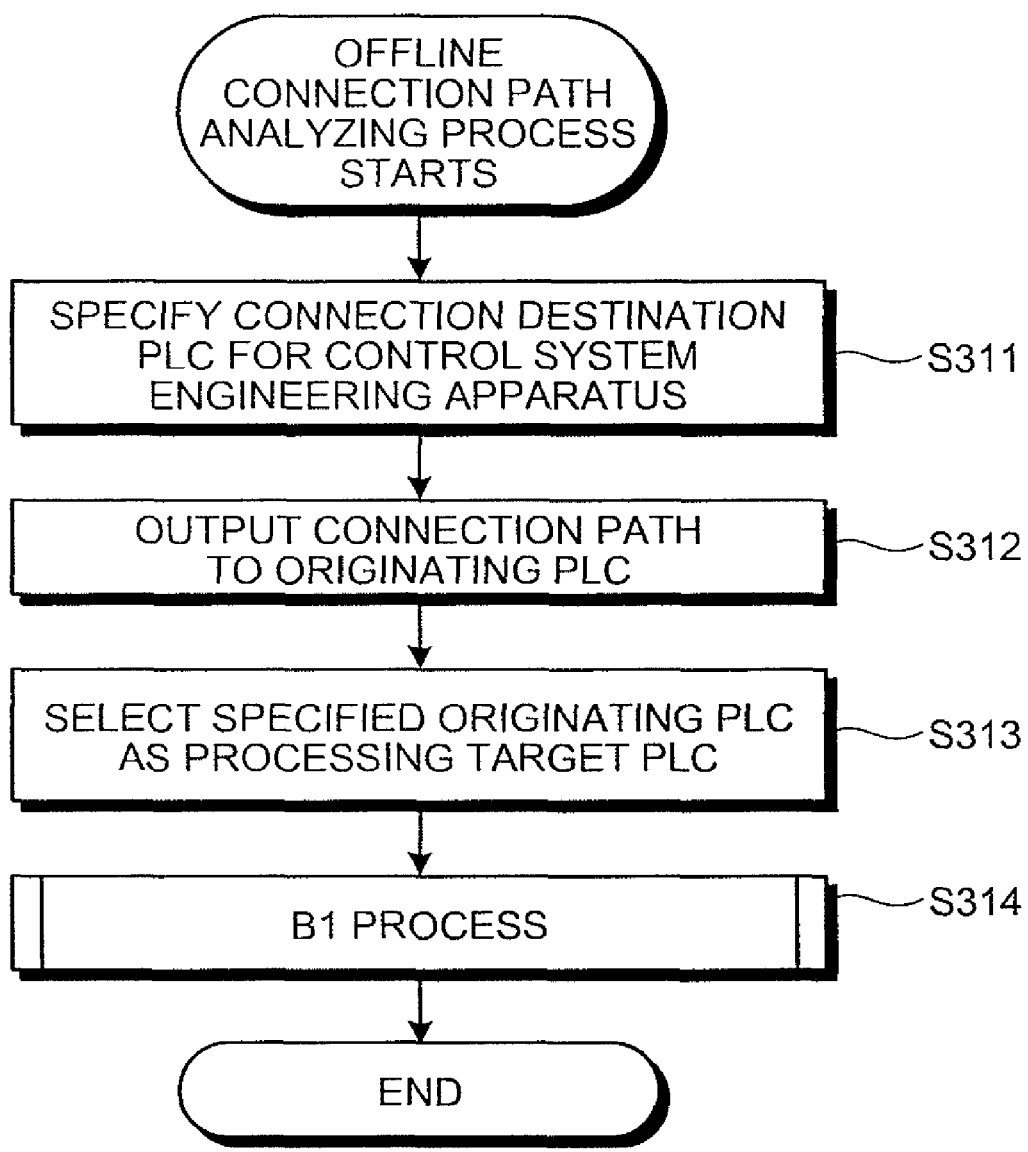

FIG.37-1

| DATA TYPE | NAME | ORIGINAT- ING POINT | THROUGHPUT EVALUATION VALUE | | | |
|---|---|---|---|---|---|---|
| CONNEC- TION PATH | PLC10-3 | PLC10-3 | 0 | | | |

| DATA TYPE | NAME | ORIGINAT- ING POINT | THROUGHPUT EVALUATION VALUE | DATA 1 | DATA 2 | DATA 3 |
|---|---|---|---|---|---|---|
| CONNEC- TION PATH | PLC10-4 | PLC10-3 | 2.1 | INTER-CONTROLLER NETWORK No. 1 | | |

| DATA TYPE | NAME | ORIGINAT- ING POINT | THROUGHPUT EVALUATION VALUE | DATA 1 | DATA 2 | DATA 3 |
|---|---|---|---|---|---|---|
| ~~CONNEC- TION PATH~~ | ~~PLC10-5~~ | ~~PLC10-3~~ | ~~13.1~~ | ~~INTER-CONTROLLER NETWORK No. 1~~ | ~~PLC10-4~~ | ~~FIELD NETWORK~~ |
| CONNEC- TION PATH | PLC10-5 | PLC10-3 | 3.2 | INTER-CONTROLLER NETWORK No. 1 | PLC10-1 | INTER-CONTROLLER NETWORK No. 2 |

| DATA TYPE | NAME | ORIGINAT- ING POINT | THROUGHPUT EVALUATION VALUE | DATA 1 | DATA 2 | DATA 3 |
|---|---|---|---|---|---|---|
| CONNEC- TION PATH | PLC10-1 | PLC10-3 | 2.1 | INTER-CONTROLLER NETWORK No. 1 | | |

| DATA TYPE | NAME | ORIGINAT- ING POINT | THROUGHPUT EVALUATION VALUE | DATA 1 | DATA 2 | DATA 3 |
|---|---|---|---|---|---|---|
| ~~CONNEC- TION PATH~~ | ~~PLC10-2~~ | ~~PLC10-3~~ | ~~3.2~~ | ~~INTER-CONTROLLER NETWORK No. 1~~ | ~~PLC10-1~~ | ~~INTER-CONTROLLER NETWORK No. 2~~ |
| CONNEC- TION PATH | PLC10-2 | PLC10-3 | 3.11 | INTER-CONTROLLER NETWORK No. 1 | PLC10-1 | INFORMATION NETWORK No. 3 |

(THROUGHPUT MODEL)

- PLC=1 Mbps
- FIELD NETWORK=0.1 Mbps
- INTER-CONTROLLER NETWORK=10 Mbps
- INFORMATION-RELATED NETWORK=100 Mbps
- HOW TO CALCULATE THROUGHPUT EVALUATION VALUE FOR ENTIRETY OF CONNECTION PATH: ADD RECIPROCAL NUMBERS OF ABOVE TOGETHER
- SMALLER THROUGHPUT EVALUATION VALUE OF ENTIRETY OF CONNECTION PATH IS, BETTER THROUGHPUT IS.

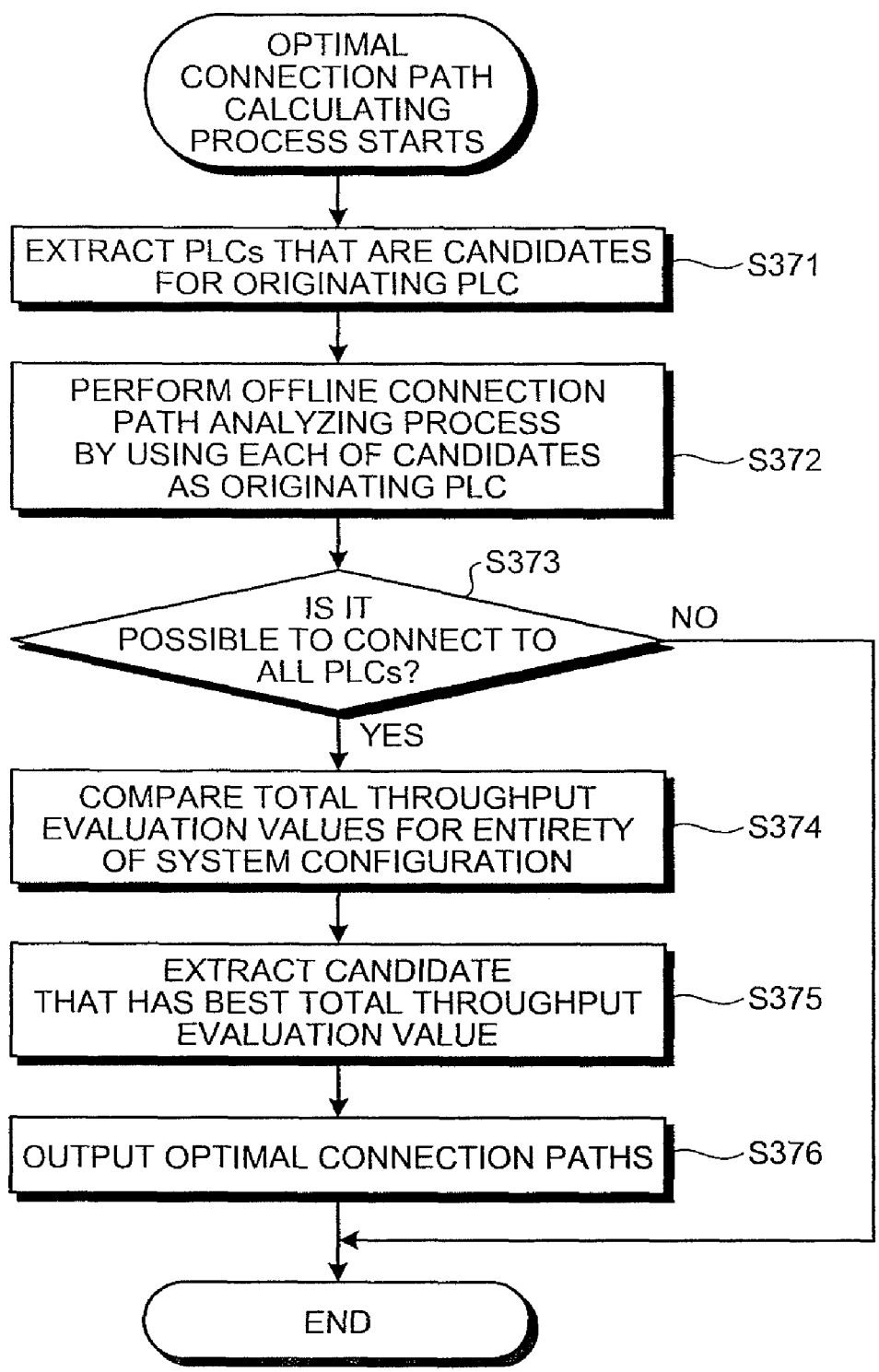

FIG.43-1

| DATA TYPE | NAME | ORIGINAT- ING POINT | THROUGHPUT EVALUATION VALUE | | | |
|---|---|---|---|---|---|---|
| CONNEC- TION PATH | PLC10-1 | PLC10-1 | 0 | | | |

| DATA TYPE | NAME | ORIGINAT- ING POINT | THROUGHPUT EVALUATION VALUE | DATA 1 | | |
|---|---|---|---|---|---|---|
| CONNEC- TION PATH | PLC10-3 | PLC10-1 | 2.1 | INTER-CONTROLLER NETWORK No. 1 | | |

| DATA TYPE | NAME | ORIGINAT- ING POINT | THROUGHPUT EVALUATION VALUE | DATA 1 | | |
|---|---|---|---|---|---|---|
| CONNEC- TION PATH | PLC10-4 | PLC10-1 | 2.1 | INTER-CONTROLLER NETWORK No. 1 | | |

| DATA TYPE | NAME | ORIGINAT- ING POINT | THROUGHPUT EVALUATION VALUE | DATA 1 | DATA 2 | DATA 3 |
|---|---|---|---|---|---|---|
| ~~CONNEC- TION PATH~~ | ~~PLC10-5~~ | ~~PLC10-1~~ | ~~13.1~~ | ~~INTER-CONTROLLER NETWORK No. 1~~ | ~~PLC10-4~~ | ~~FIELD NETWORK~~ |
| CONNEC- TION PATH | PLC10-5 | PLC10-1 | 2.1 | INTER-CONTROLLER NETWORK No. 2 | | |

| DATA TYPE | NAME | ORIGINAT- ING POINT | THROUGHPUT EVALUATION VALUE | DATA 1 | | |
|---|---|---|---|---|---|---|
| ~~CONNEC- TION PATH~~ | ~~PLC10-2~~ | ~~PLC10-1~~ | ~~2.1~~ | ~~INTER-CONTROLLER NETWORK No. 2~~ | | |
| CONNEC- TION PATH | PLC10-2 | PLC10-1 | 2.01 | INFORMATION- RELATED NETWORK No. 3 | | |

P2g1

DUE TO CONSTRAINTS SHOWN IN FIG. 12, NO NETWORK ANALYSIS IS PERFORMED ON PLC 10-1→
INTER-CONTROLLER NETWORK No. 1→PLC 10-4→FIELD NETWORK→PLC 10-5→INTER-CONTROLLER NETWORK No. 2

FIG.44-1

| DATA TYPE | NAME | ORIGINAT- ING POINT | THROUGHPUT EVALUATION VALUE | | | |
|---|---|---|---|---|---|---|
| CONNEC- TION PATH | PLC10-2 | PLC10-2 | 0 | | | |

| DATA TYPE | NAME | ORIGINAT- ING POINT | THROUGHPUT EVALUATION VALUE | DATA 1 | | |
|---|---|---|---|---|---|---|
| ~~CONNEC- TION PATH~~ | ~~PLC10-1~~ | ~~PLC10-2~~ | ~~2.1~~ | ~~INTER-CONTROLLER NETWORK No. 2~~ | | |
| CONNEC- TION PATH | PLC10-1 | PLC10-2 | 2.01 | INFORMATION- RELATED NETWORK No. 3 | | |

| DATA TYPE | NAME | ORIGINAT- ING POINT | THROUGHPUT EVALUATION VALUE | DATA 1 | DATA 2 | DATA 3 |
|---|---|---|---|---|---|---|
| CONNEC- TION PATH | PLC10-3 | PLC10-2 | 3.2 | INTER-CONTROLLER NETWORK No. 2 | PLC10-1 | INTER-CONTROLLER NETWORK No. 1 |

| DATA TYPE | NAME | ORIGINAT- ING POINT | THROUGHPUT EVALUATION VALUE | DATA 1 | DATA 2 | DATA 3 |
|---|---|---|---|---|---|---|
| CONNEC- TION PATH | PLC10-4 | PLC10-2 | 3.2 | INTER-CONTROLLER NETWORK No. 2 | PLC10-1 | INTER-CONTROLLER NETWORK No. 1 |

| DATA TYPE | NAME | ORIGINAT-ING POINT | THROUGHPUT EVALUATION VALUE | DATA 1 | DATA 2 | DATA 3 | DATA 4 | DATA 5 |
|---|---|---|---|---|---|---|---|---|
| ~~CONNECTION PATH~~ | ~~PLC10-5~~ | ~~PLC10-2~~ | ~~14.2~~ | ~~INTER-CONTROLLER NETWORK No. 2~~ | ~~PLC10-1~~ | ~~INTER-CONTROLLER NETWORK No. 1~~ | ~~PLC10-4~~ | ~~FIELD NETWORK~~ |
| CONNECTION PATH | PLC10-5 | PLC10-2 | 2.1 | INTER-CONTROLLER NETWORK No. 2 | | | | |

| DATA TYPE | NAME | ORIGINAT-ING POINT | THROUGHPUT EVALUATION VALUE | | | |
|---|---|---|---|---|---|---|
| CONNECTION PATH | PLC10-4 | PLC10-4 | 0 | | | |

| DATA TYPE | NAME | ORIGINAT-ING POINT | THROUGHPUT EVALUATION VALUE | DATA 1 | | |
|---|---|---|---|---|---|---|
| ~~CONNECTION PATH~~ | ~~PLC10-5~~ | ~~PLC10-4~~ | ~~12.0~~ | ~~FIELD NETWORK~~ | | |
| CONNECTION PATH | PLC10-5 | PLC10-4 | 3.2 | INTER-CONTROLLER NETWORK No. 1 | PLC10-1 | INTER-CONTROLLER NETWORK No. 2 |

| DATA TYPE | NAME | ORIGINAT-ING POINT | THROUGHPUT EVALUATION VALUE | DATA 1 | | |
|---|---|---|---|---|---|---|
| CONNECTION PATH | PLC10-3 | PLC10-4 | 2.1 | INTER-CONTROLLER NETWORK No. 1 | | |

| DATA TYPE | NAME | ORIGINAT-ING POINT | THROUGHPUT EVALUATION VALUE | DATA 1 | | |
|---|---|---|---|---|---|---|
| CONNECTION PATH | PLC10-1 | PLC10-4 | 2.1 | INTER-CONTROLLER NETWORK No. 1 | | |

| DATA TYPE | NAME | ORIGINAT-ING POINT | THROUGHPUT EVALUATION VALUE | DATA 1 | DATA 2 | DATA 3 |
|---|---|---|---|---|---|---|
| ~~CONNECTION PATH~~ | ~~PLC10-2~~ | ~~PLC10-4~~ | ~~3.2~~ | ~~INTER-CONTROLLER NETWORK No. 1~~ | PLC10-1 | ~~INTER-CONTROLLER NETWORK No. 2~~ |
| CONNECTION PATH | PLC10-2 | PLC10-4 | 3.11 | INTER-CONTROLLER NETWORK No. 1 | PLC10-1 | INFORMATION-RELATED NETWORK No. 3 |

FIG.46-1

| DATA TYPE | NAME | ORIGINAT-ING POINT | THROUGHPUT EVALUATION VALUE |
|---|---|---|---|
| CONNECTION PATH | PLC10-5 | PLC10-5 | 0 |

| DATA TYPE | NAME | ORIGINAT-ING POINT | THROUGHPUT EVALUATION VALUE | DATA 1 | DATA 2 | DATA 3 | DATA 4 | DATA 5 |
|---|---|---|---|---|---|---|---|---|
| ~~CONNECTION PATH~~ | ~~PLC10-4~~ | ~~PLC10-5~~ | ~~12.0~~ | ~~FIELD NETWORK~~ | | | | |
| ~~CONNECTION PATH~~ | ~~PLC10-4~~ | ~~PLC10-5~~ | ~~4.21~~ | ~~INTER-CONTROLLER NETWORK No. 2~~ | ~~PLC10-2~~ | ~~INFORMATION-RELATED NETWORK No. 3~~ | ~~PLC10-1~~ | ~~INTER-CONTROLLER NETWORK No. 1~~ |
| CONNECTION PATH | PLC10-3 | PLC10-5 | 3.2 | INTER-CONTROLLER NETWORK No. 2 | PLC10-1 | INTER-CONTROLLER NETWORK No. 1 | | |

| DATA TYPE | NAME | ORIGINAT-ING POINT | THROUGHPUT EVALUATION VALUE | DATA 1 | DATA 2 | DATA 3 | DATA 4 | DATA 5 |
|---|---|---|---|---|---|---|---|---|
| ~~CONNECTION PATH~~ | ~~PLC10-3~~ | ~~PLC10-5~~ | ~~10.1~~ | ~~FIELD NETWORK~~ | ~~PLC10-1~~ | ~~INTER-CONTROLLER NETWORK No.1~~ | | |
| ~~CONNECTION PATH~~ | ~~PLC10-3~~ | ~~PLC10-5~~ | ~~4.21~~ | ~~INTER-CONTROLLER NETWORK No.2~~ | ~~PLC10-2~~ | ~~INFORMATION RELATED NETWORK No.3~~ | ~~PLC10-1~~ | ~~INTER-CONTROLLER NETWORK No.1~~ |
| CONNECTION PATH | PLC10-3 | PLC10-5 | 3.2 | INTER-CONTROLLER NETWORK No. 2 | PLC10-1 | INTER-CONTROLLER NETWORK No. 1 | | |

| DATA TYPE | NAME | ORIGINATING POINT | THROUGHPUT EVALUATION VALUE | DATA 1 | DATA 2 | DATA 3 |
|---|---|---|---|---|---|---|
| ~~CONNECTION PATH~~ | ~~PLC10-1~~ | ~~PLC10-5~~ | ~~13.1~~ | ~~FIELD NETWORK~~ | ~~PLC10-4~~ | ~~INTER-CONTROLLER NETWORK No.1~~ |
| ~~CONNECTION PATH~~ | ~~PLC10-1~~ | ~~PLC10-5~~ | ~~3.11~~ | ~~INTER-CONTROLLER NETWORK No.2~~ | ~~PLC10-2~~ | ~~INFORMATION-RELATED NETWORK No.3~~ |
| CONNECTION PATH | PLC10-1 | PLC10-5 | 2.1 | INTER-CONTROLLER NETWORK No. 2 | | |

PIg5

FIG.46-5

| DATA TYPE | NAME | ORIGINAT-ING POINT | THROUGHPUT EVALUATION VALUE | DATA 1 | DATA 2 | DATA 3 | DATA 4 | DATA 5 |
|---|---|---|---|---|---|---|---|---|
| ~~CONNECTION PATH~~ | ~~PLC10-2~~ | ~~PLC10-5~~ | ~~14.2~~ | ~~FIELD NETWORK~~ | ~~PLC10-4~~ | ~~INTER-CONTROLLER NETWORK No.1~~ | ~~PLC10-1~~ | ~~INTER-CONTROLLER NETWORK No.2~~ |
| ~~CONNECTION PATH~~ | ~~PLC10-2~~ | ~~PLC10-5~~ | ~~14.11~~ | ~~FIELD NETWORK~~ | ~~PLC10-2~~ | ~~INTER-CONTROLLER NETWORK No.1~~ | ~~PLC10-1~~ | ~~INFORMATION-RELATED NETWORK No.3~~ |
| CONNECTION PATH | PLC10-2 | PLC10-5 | 2.1 | INTER-CONTROLLER NETWORK No. 2 | | | | |

| DATA TYPE | NAME | ORIGINAT-ING POINT | THROUGHPUT EVALUATION VALUE | DATA 1 | DATA 2 | DATA 3 | DATA 4 | DATA 5 | |
|---|---|---|---|---|---|---|---|---|---|
| CONNECTION PATH | PLC α | PLC π | 2.1 | INTER-CONTROLLER NETWORK No. 1 | | | | | ← Pαg |
| CONNECTION PATH | PLC ε | PLC π | 2.1 | INTER-CONTROLLER NETWORK No. 1 | | | | | ← Pεg |
| CONNECTION PATH | PLC β | PLC π | 3.11 | INTER-CONTROLLER NETWORK No. 1 | PLC α | INFORMATION-RELATED NETWORK No. 5 | | | ← Pβg |
| CONNECTION PATH | PLC μ | PLC π | 3.11 | INTER-CONTROLLER NETWORK No. 1 | PLC α | INFORMATION-RELATED NETWORK No. 5 | | | ← Pμg |
| CONNECTION PATH | PLC θ | PLC π | 4.21 | INTER-CONTROLLER NETWORK No. 1 | PLC α | INFORMATION-RELATED NETWORK No. 5 | PLC β | INTER-CONTROLLER NETWORK No. 2 | ← Pθg |
| CONNECTION PATH | PLC κ | PLC π | 4.21 | INTER-CONTROLLER NETWORK No. 1 | PLC α | INFORMATION-RELATED NETWORK No. 5 | PLC β | INTER-CONTROLLER NETWORK No. 2 | ← Pκg |
| CONNECTION PATH | PLC ω | PLC π | 4.21 | INTER-CONTROLLER NETWORK No. 1 | PLC α | INFORMATION-RELATED NETWORK No. 5 | PLC μ | INTER-CONTROLLER NETWORK No. 3 | ← Pωg |
| CONNECTION PATH | PLC ψ | PLC π | 4.21 | INTER-CONTROLLER NETWORK No. 1 | PLC α | INFORMATION-RELATED NETWORK No. 5 | PLC μ | INTER-CONTROLLER NETWORK No. 3 | ← Pψg |

| DATA TYPE | NAME | TRANSFER DESTINATION NETWORK NUMBER | RELAY DESTINATION NETWORK NUMBER | RELAY DESTINATION STATION NUMBER | |
|---|---|---|---|---|---|
| ROUTING PARAMETERS (OUTPUT IN (2-4-1)) | PLCπ | 5 | 1 | 1 | ~501 |
| ROUTING PARAMETERS (OUTPUT IN (2-6-1)) | PLCπ | 2 | 1 | 1 | ~502 |
| ROUTING PARAMETERS (OUTPUT IN (2-8-1)) | PLCπ | 3 | 1 | 1 | ~503 |

| DATA TYPE | NAME | TRANSFER DESTINATION NETWORK NUMBER | RELAY DESTINATION NETWORK NUMBER | RELAY DESTINATION STATION NUMBER | |
|---|---|---|---|---|---|
| ROUTING PARAMETERS (OUTPUT IN (2-6-1)) | PLCα | 2 | 5 | 2 | ~504 |
| ROUTING PARAMETERS (OUTPUT IN (2-8-1)) | PLCα | 3 | 5 | 3 | ~505 |

| DATA TYPE | NAME | TRANSFER DESTINATION NETWORK NUMBER | RELAY DESTINATION NETWORK NUMBER | RELAY DESTINATION STATION NUMBER | |
|---|---|---|---|---|---|
| ROUTING PARAMETERS (OUTPUT IN (2-6-2)) | PLCβ | 1 | 5 | 1 | ~506 |

| DATA TYPE | NAME | TRANSFER DESTINATION NETWORK NUMBER | RELAY DESTINATION NETWORK NUMBER | RELAY DESTINATION STATION NUMBER | |
|---|---|---|---|---|---|
| ROUTING PARAMETERS (OUTPUT IN (2-8-2)) | PLCμ | 1 | 5 | 1 | ~507 |

| DATA TYPE | NAME | TRANSFER DESTINATION NETWORK NUMBER | RELAY DESTINATION NETWORK NUMBER | RELAY DESTINATION STATION NUMBER | |
|---|---|---|---|---|---|
| ROUTING PARAMETERS (OUTPUT IN (2-4-1)) | PLC π | 5 | 1 | 1 | |
| ROUTING PARAMETERS (OUTPUT IN (2-6-1)) | PLC π | 2 | 1 | 1 | |
| ROUTING PARAMETERS (OUTPUT IN (2-8-1)) | PLC π | 10 | 1 | 1 | ~513 |

| DATA TYPE | NAME | TRANSFER DESTINATION NETWORK NUMBER | RELAY DESTINATION NETWORK NUMBER | RELAY DESTINATION STATION NUMBER | |
|---|---|---|---|---|---|
| ROUTING PARAMETERS (OUTPUT IN (2-6-1)) | PLC α | 2 | 5 | 2 | |
| ROUTING PARAMETERS (OUTPUT IN (2-8-1)) | PLC α | 10 | 5 | 3 | ~515 |

| DATA TYPE | NAME | TRANSFER DESTINATION NETWORK NUMBER | RELAY DESTINATION NETWORK NUMBER | RELAY DESTINATION STATION NUMBER |
|---|---|---|---|---|
| ROUTING PARAMETERS (OUTPUT IN (2-6-2)) | PLCβ | 1 | 5 | 1 |

| DATA TYPE | NAME | TRANSFER DESTINATION NETWORK NUMBER | RELAY DESTINATION NETWORK NUMBER | RELAY DESTINATION STATION NUMBER |
|---|---|---|---|---|
| ROUTING PARAMETERS (OUTPUT IN (2-8-2)) | PLCµ | 1 | 5 | 1 |

| DATA TYPE | NAME | TRANSFER DESTINATION NETWORK NUMBER | RELAY DESTINATION NETWORK NUMBER | RELAY DESTINATION STATION NUMBER |
|---|---|---|---|---|
| ROUTING PARAMETERS (OUTPUT IN (2-4-1)) | PLC π | 5 | 9 | 1 |
| ROUTING PARAMETERS (OUTPUT IN (2-6-1)) | PLC π | 2 | 9 | 1 |
| ROUTING PARAMETERS (OUTPUT IN (2-8-1)) | PLC π | 10 | 9 | 1 |

| DATA TYPE | NAME | TRANSFER DESTINATION NETWORK NUMBER | RELAY DESTINATION NETWORK NUMBER | RELAY DESTINATION STATION NUMBER |
|---|---|---|---|---|
| ROUTING PARAMETERS (OUTPUT IN (2-6-1)) | PLC α | 2 | 5 | 2 |
| ROUTING PARAMETERS (OUTPUT IN (2-8-1)) | PLC α | 10 | 5 | 3 |

| DATA TYPE | NAME | TRANSFER DESTINATION NETWORK NUMBER | RELAY DESTINATION NETWORK NUMBER | RELAY DESTINATION STATION NUMBER |
|---|---|---|---|---|
| ROUTING PARAMETERS (OUTPUT IN (2-6-2)) | PLC β | 9 | 5 | 1 |

| DATA TYPE | NAME | TRANSFER DESTINATION NETWORK NUMBER | RELAY DESTINATION NETWORK NUMBER | RELAY DESTINATION STATION NUMBER |
|---|---|---|---|---|
| ROUTING PARAMETERS (OUTPUT IN (2-8-2)) | PLCμ | ///// | 5 | 1 |

NETWORK PLC CONTROL SYSTEM ENGINEERING CONFIGURATION LAYOUT AND CONNECTION PATH DISPLAY

CROSS REFERENCE TO RELATED APPLICATIONS

This application is a National Stage of International Application No. PCT/JP2007/061060 filed May 31, 2007, the contents of all of which are incorporated herein by reference in their entirety.

TECHNICAL FIELD

The present invention relates to a control system engineering apparatus that supports setting and managing system configurations for a control system in which a plurality of control devices such as programmable controllers are connected to one another via networks.

BACKGROUND ART

Conventionally, programmable controllers (hereinafter, "PLCs") are used for controlling production facilities. Engineering apparatuses are connected to such PLCs to perform predetermined programming processes or maintenance. Generally speaking, an engineering apparatus operates in a personal computer and has a function of supporting creation of a computer program used for the control exercised by the PLCs as well as connecting the personal computer in which the engineering apparatus is operating to the PLCs, transferring the created computer program to the PLCs, and monitoring the state in which the PLCs are exercising control.

Each of the PLCs has a base (a "back plane") so that a communication unit used for a network connection is attached to the base. By connecting two or more communication units to one another via a communication line such as a cable, a control system that includes a plurality of PLCs is constructed. In a control system for a large-scale production facility, a large number of PLCs are used. In that situation, the networks that connect the PLCs to one another also have complicated configurations.

Some of the engineering apparatuses described above are capable of creating network configurations of the control system offline, displaying the network configurations with graphics, and monitoring the PLCs and transferring computer programs to the PLCs by using the graphic display. In some situations, however, a control system having a complicated configuration includes a plurality of PLCs of mutually the same type, and it is difficult to distinguish the PLCs that require settings from the other PLCs, on a screen displayed by the engineering apparatus. To cope with this situation, a technique for displaying, with highlight, PLCs that are the targets in a monitoring process or a setting process has been proposed (see, for example, Patent Document 1).
Patent Document 1: Japanese Patent Application Laid-open No. 2006-277734

DISCLOSURE OF INVENTION

Problem to be Solved by the Invention

According to an aspect to disclosed in Patent Document 1, a user of an engineering apparatus lays out PLCs by using the engineering apparatus, in advance, based on actual network configurations and creates, while offline, information about the network configurations and the system configurations of the control system by setting set values into each of the PLCs. In the case where information about the network configurations and the system configurations of the PLCs in a control system having a complicated configuration is created offline, a problem remains where there is a possibility that errors may be made regarding, for example, connections between the PLCs.

Further, although the technique disclosed in Patent Document 1 makes it possible to display locations of the target PLCs with highlight, Patent Document 1 does not disclose, for example, how to find an optimal connection path for transmitting information from a position in which an engineering apparatus is connected to the target PLCs.

Furthermore, in a control system in which a plurality of networks are connected to one another, routing parameters are set into PLCs each of which is positioned between networks, the routing parameters making it possible to transfer data over a plurality of networks. However, another problem remains where it is difficult for a third party to understand which transient transfer each of the parameters is intended for, in terms of understanding which element is a request source and which element is a request destination in the transient transfer. In addition, in the case where additions and/or changes are made to the configurations of an existing control system or in the case where a new control system is constructed, the routing parameters are calculated by human labor, and yet another problem remains where it is not easy for a person who constructs the system to calculate the routing parameters.

In view of the problems described above, it is an object of the present invention to obtain a control system engineering apparatus with which it is possible to collect network configurations and PLC system configurations in an existing control system including a plurality of PLCs and to automatically display the configurations in a graphical manner.

Further, it is another object of the present invention to obtain a control system engineering apparatus with which, in the case where the network configurations are created offline in a graphical manner, it is possible to automatically calculate an optimal connection path extending from a position at an originating point to a PLC in a target position and to display the optimal connection path with highlight.

Furthermore, it is yet another object of the present invention to obtain a control system engineering apparatus with which it is possible to easily set network parameters including the routing parameters into the PLCs, even in a situation where additions and/or changes are made to the configurations of an existing control system or in a situation where a new control system is constructed.

Means for Solving Problem

In order to achieve the object, a control system engineering apparatus according to the present includes a communicating means that connects to one of a plurality of control devices included in a control system in which the plurality of control devices are connected to one another via one or more networks; an originating control device specifying means that specifies the one of the control devices connected to the communicating means as an originating control device; an online network configuration information collecting means that collects, from the control devices included in the control system and via the communicating means, network configuration information including configurations of the control devices that the control devices have and networks to which the control devices are connected; a displayed object coordinate calculator that causes objects to represent constituent elements of the control system and calculates coordinates that are required when the configurations of the control devices and connection relationships between the control devices and the networks obtained by the online network configuration information collecting means are displayed on a display means by using the objects; and a system configuration display means that displays a system configuration of the control system on the display means, based on the objects and the coordinates calculated by the displayed object coordinate calculator, wherein the displayed object coordinate calculator includes: a network grid layout function that extracts the networks from the online network configuration information and lays out the extracted networks as rectangular network grids in an up-and-down direction according to a predetermined rule; a control device grid layout function that creates a grid model by extracting the control devices from the online network configuration information, laying out each of rectangular control device grids so as to be positioned below a corresponding one of the network grids connected to a corresponding one of the control devices, and laying out each of rectangular wiring grids in an upward direction toward a corresponding one of the network grids having a connection relationship therewith so as to be positioned between a corresponding one of the control device grids and the corresponding one of the network grids; a grid size calculating function that calculates grid sizes by calculating a size of each of the control device grids in the grid model based on information of the configurations of the control devices included in the online network configuration information and changing sizes of relevant ones of the wiring grids and the network grids according to the size of each of the control devices; and a grid coordinate calculating function that calculates coordinates of each grid in the grid model by using the grid sizes, while using a predetermined position in the grid model as a point of reference, and wherein the network grid layout function classifies the extracted networks according to types thereof, and performs a process of laying out the networks for each of the types of the classified networks; out of the control devices connected to a network, the larger a value indicating how many control devices or what percentage of the control devices are each also connected to one or more field networks is, the lower position the network is laid out in; the larger a value indicating how many control devices or what percentage of the control devices are each connected only to one or more other information-related networks is, the upper position the network is laid out in; and the larger a value indicating how many control devices or what percentage of the control devices are each also connected to one or more other inter-controller networks is, the upper position the network is laid out in, and the control device grid layout function lays out two or more of the control device grids that are connected to a mutually same network so as to be positioned closer to one another.

Effect of the Invention

According to the present invention, an advantageous effect is achieved where it is possible to display, in a graphical manner, the information about the network configurations and the system configurations of the control devices, including the connection relationships thereof, in the entirety of the control system that includes a plurality of controllers such as the PLCs, by making a connection to the control system and collecting the information therefrom, and to easily understand the entirety of the system configuration of the networks and the control devices included in the control system and also, where it is possible to easily understand the entirety of the system configuration of the networks and the controlling devices included in the control system because the collected pieces of network configuration information are displayed according to the order of networks that is easily understood the user. Further, another advantageous effect is achieved where it is also possible to easily understand the status of the entirety of the system configuration of the networks and the control devices included in the control system.

BRIEF DESCRIPTION OF DRAWINGS

FIG. 1 is a schematic diagram of an exemplary network configuration of a control system.

FIG. 4-1 is a drawing of an exemplary configuration of a control system.

FIG. 4-2 is a drawing of an example of a grid model corresponding to FIG. 4-1.

FIG. 5-1 is a drawing of another exemplary configuration of a control system.

FIG. 5-2 is a drawing of an example of a grid model corresponding to FIG. 5-1.

FIG. 6-1 is a drawing of yet another exemplary configuration of a control system.

FIG. 6-2 is a drawing of an example of a grid model corresponding to FIG. 6-1.

FIG. 7-1 is a drawing of yet another exemplary configuration of a control system.

FIG. 7-2 is a drawing of yet another exemplary configuration of a control system.

FIG. 7-3 is a drawing of an example of a grid model corresponding to FIG. 7-1.

FIG. 7-4 is a drawing of an example of a grid model corresponding to FIG. 7-2.

FIG. 9-1 is a flowchart of an example of a procedure in a network configuration information collecting process (part 1).

FIG. 9-2 is another flowchart of the example of the procedure in the network configuration information collecting process (part 2).

FIG. 9-3 is yet another flowchart of the example of the procedure in the network configuration information collecting process (part 3).

FIG. 10 is a drawing of an example of connection path information stored in an online connection path storing unit.

FIG. 11 is a drawing of an example of network configuration information stored in an online network configuration information storing unit.

FIG. 12 is a drawing of examples of constraints used in a network information collecting process.

FIG. 13 is a drawing of examples of priority levels used in a network information outputting process.

FIG. 14-1 is a flowchart of an example of a procedure in a displayed object coordinate calculating process.

FIG. 14-2 is a flowchart of an example of a procedure in a network grid layout process.

FIG. 14-3 is a flowchart of an example of a procedure in a PLC grid layout process.

FIG. 14-4 is a flowchart of an example of a procedure in a grid size calculating process.

FIG. 14-5 is a flowchart of an example of a procedure in a grid coordinate calculating process.

FIG. 16-1 is a drawing of an example of a procedure in the PLC grid layout process (part 1).

FIG. 16-2 is a drawing of another example of the procedure in the PLC grid layout process (part 2).

FIG. 16-3 is a drawing of yet another example of the procedure in the PLC grid layout process (part 3).

FIG. 16-4 is a drawing of yet another example of the procedure in the PLC grid layout process (part 4).

FIG. 16-5 is a drawing of yet another example of the procedure in the PLC grid layout process (part 5).

FIG. 22-1 is a schematic block diagram of a functional configuration of a network grid layout function included in a control system engineering apparatus according to an aspect of the present invention.

FIG. 22-2 is a schematic block diagram of a functional configuration of a PLC grid layout function.

FIG. 23-1 is a flowchart of an example of a procedure in a network grid layout process according to a second embodiment of the present invention (part 1).

FIG. 23-2 is a flowchart of an example of a procedure in a PLC grid layout process according to the second embodiment (part 2).

FIG. 23-3 is another flowchart of the example of the procedure in the PLC grid layout process according to the second embodiment (part 3).

FIG. 24 is a drawing of a result of the network grid layout process according to the second embodiment.

FIG. 25-1 is a drawing of an example of a procedure in the PLC grid layout process according to the second embodiment (part 1).

FIG. 25-2 is a drawing of another example of the procedure in the PLC grid layout process according to the second embodiment (part 2).

FIG. 25-3 is a drawing of yet another example of the procedure in the PLC grid layout process according to the second embodiment (part 3).

FIG. 25-4 is a drawing of yet another example of the procedure in the PLC grid layout process according to the second embodiment (part 4).

FIG. 25-5 is a drawing of yet another example of the procedure in the PLC grid layout process according to the second embodiment (part 5).

FIG. 29 is a drawing of a system configuration obtained by displaying the control system shown in FIG. 28 by using the method according to the first embodiment.

FIG. 30 is a drawing of a grid model created by using the method according to the second embodiment with respect to the control system shown in FIG. 28.

FIG. 34-1 is a drawing of an example of a procedure in the connection path displaying process performed on a system configuration information display screen (part 1).

FIG. 34-2 is a drawing of another example of the procedure in the connection path displaying process performed on the system configuration information display screen (part 2).

FIG. 34-3 is a drawing of yet another example of the procedure in the connection path displaying process performed on the system configuration information display screen (part 3).

FIG. 34-4 is a drawing of yet another example of the procedure in the connection path displaying process performed on the system configuration information display screen (part 4).

FIG. 34-5 is a drawing of yet another example of the procedure in the connection path displaying process performed on the system configuration information display screen (part 5).

FIG. 36-1 is a flowchart of an example of a procedure in an offline connection path analyzing process (part 1).

FIG. 36-2 is another flowchart of the example of the procedure in the offline connection path analyzing process (part 2).

FIG. 36-3 is another flowchart of the example of the procedure in the offline connection path analyzing process (part 3).

FIG. 37-1 is a drawing of an example of connection path storing information stored in an offline connection path storing unit (part 1).

FIG. 37-2 is a drawing of another example of the connection path storing information stored in the offline connection path storing unit (part 2).

FIG. 37-3 is a drawing of yet another example of the connection path storing information stored in the offline connection path storing unit (part 3).

FIG. 37-4 is a drawing of yet another example of the connection path storing information stored in the offline connection path storing unit (part 4).

FIG. 37-5 is a drawing of yet another example of the connection path storing information stored in the offline connection path storing unit (part 5).

FIG. 38 is a drawing of an example of a throughput model according to a fourth embodiment of the present invention.

FIG. 42 is a flowchart of an example of a procedure in an optimal connection path calculating process.

FIG. 43-1 is a drawing of connection path data that is obtained in the case where a connection path analyzing process is performed by using a PLC 10-1 as an originating PLC (part 1).

FIG. 43-2 is another drawing of connection path data that is obtained in the case where the connection path analyzing process is performed by using the PLC 10-1 as the originating PLC (part 2).

FIG. 43-3 is yet another drawing of connection path data that is obtained in the case where the connection path analyzing process is performed by using the PLC 10-1 as the originating PLC (part 3).

FIG. 43-4 is yet another drawing of connection path data that is obtained in the case where the connection path analyzing process is performed by using the PLC 10-1 as the originating PLC (part 4).

FIG. 43-5 is yet another drawing of connection path data that is obtained in the case where the connection path analyzing process is performed by using the PLC 10-1 as the originating PLC (part 5).

FIG. 44-1 is a drawing of connection path data that is obtained in the case where the connection path analyzing process is performed by using a PLC 10-2 as the originating PLC (part 1).

FIG. 44-2 is another drawing of connection path data that is obtained in the case where the connection path analyzing process is performed by using the PLC 10-2 as the originating PLC (part 2).

FIG. 44-3 is yet another drawing of connection path data that is obtained in the case where the connection path analyzing process is performed by using the PLC 10-2 as the originating PLC (part 3).

FIG. 44-4 is yet another drawing of connection path data that is obtained in the case where the connection path analyzing process is performed by using the PLC 10-2 as the originating PLC (part 4).

FIG. 44-5 is yet another drawing of connection path data that is obtained in the case where the connection path analyzing process is performed by using the PLC 10-2 as the originating PLC (part 5).

FIG. 45-1 is a drawing of connection path data that is obtained in the case where the connection path analyzing process is performed by using a PLC 10-4 as the originating PLC (part 1).

FIG. 45-2 is another drawing of connection path data that is obtained in the case where the connection path analyzing process is performed by using the PLC 10-4 as the originating PLC (part 2).

FIG. 45-3 is yet another drawing of connection path data that is obtained in the case where the connection path analyzing process is performed by using the PLC 10-4 as the originating PLC (part 3).

FIG. 45-4 is yet another drawing of connection path data that is obtained in the case where the connection path analyzing process is performed by using the PLC 10-4 as the originating PLC (part 4).

FIG. 45-5 is yet another drawing of connection path data that is obtained in the case where the connection path analyzing process is performed by using the PLC 10-4 as the originating PLC (part 5).

FIG. 46-1 is a drawing of connection path data that is obtained in the case where the connection path analyzing process is performed by using a PLC 10-5 as the originating PLC (part 1).

FIG. 46-2 is another drawing of connection path data that is obtained in the case where the connection path analyzing process is performed by using the PLC 10-5 as the originating PLC (part 2).

FIG. 46-3 is yet another drawing of connection path data that is obtained in the case where the connection path analyzing process is performed by using the PLC 10-5 as the originating PLC (part 3).

FIG. 46-4 is yet another drawing of connection path data that is obtained in the case where the connection path analyzing process is performed by using the PLC 10-5 as the originating PLC (part 4).

FIG. 46-5 is yet another drawing of connection path data that is obtained in the case where the connection path analyzing process is performed by using the PLC 10-5 as the originating PLC (part 5).

FIG. 51-1 is a flowchart of an example of a procedure in a routing parameter calculating process (part 1).

FIG. 51-2 is another flowchart of the example of the procedure in the routing parameter calculating process (part 2).

FIG. 52 is a drawing of examples of connection paths to the PLCs with respect to the control system shown in FIG. 28.

FIG. 53-1 is a drawing of routing parameters that are set into a PLC (part 1).

FIG. 53-2 is a drawing of more routing parameters that are set into another PLC (part 2).

FIG. 53-3 is a drawing of more routing parameters that are set into yet another PLC (part 3).

FIG. 53-4 is a drawing of more routing parameters that are set into yet another PLC (part 4).

FIG. 55-1 is a flowchart of an example of a procedure in a parameter collectively rewriting process (part 1).

FIG. 55-2 is another flowchart of the example of the procedure in the parameter collectively rewriting process (part 2).

FIG. 56-1 is a drawing of routing parameters that are obtained after a configuration of a control system has been changed part 1).

FIG. 56-2 is a drawing of more routing parameters that are obtained after the configuration of the control system has been changed (part 2).

FIG. 56-3 is a drawing of more routing parameters that are obtained after the configuration of the control system has been changed (part 3).

FIG. 56-4 is a drawing of more routing parameters that are obtained after the configuration of the control system has been changed (part 4).

FIG. 57-1 is a flowchart of an example of a procedure in a parameter collectively rewriting process performed on a plurality of networks (part 1).

FIG. 57-2 is another flowchart of the example of the procedure in the parameter collectively rewriting process performed on the plurality of networks (part 2).

FIG. 58-1 is a drawing of routing parameters that are obtained after a configuration of a control system has been changed (part 1).

FIG. 58-2 is a drawing of more routing parameters that are obtained after the configuration of the control system has been changed (part 2).

FIG. 58-3 is a drawing of more routing parameters that are obtained after the configuration of the control system has been changed (part 3).

FIG. 58-4 is a drawing of more routing parameters that are obtained after the configuration of the control system has been changed (part 4).

Figure 2:
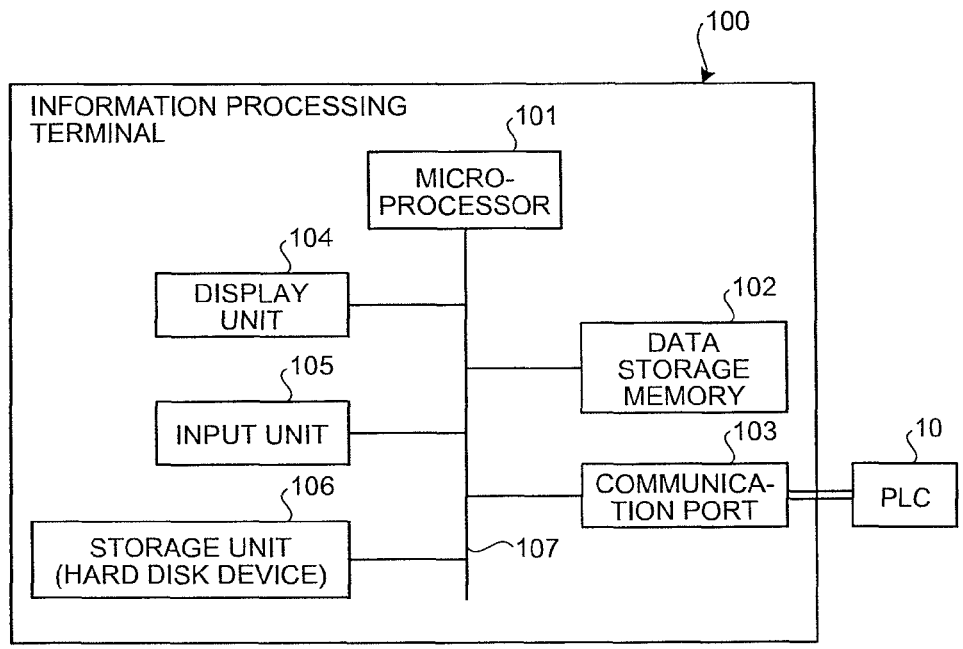
FIG. 2 is a schematic block diagram of a hardware configuration of a control system engineering apparatus.

EXPLANATIONS OF LETTERS OR NUMERALS 10, 10-1 to 10-13 PLC (Programmable Controller)
11-1A to 11-5B communication unit
12-3 to 12-5 input/output unit
13-3 add-on base
21 information-related network No. 3
22A inter-controller network No. 1
22B inter-controller network No. 2
23 field network
100 control system engineering apparatus
101, 155 microprocessor
102, 156 data storage memory
103 communication port
104, 112, 151 display unit
105, 152 input unit
106, 154 storage unit
107, 157 bus
111 communicating unit
113 originating PLC specifying unit
114 online network configuration information collecting unit
115 online connection path storing unit
116 online network configuration information storing unit
117 displayed object coordinate calculator
118 system configuration display unit
119 controlling unit
120 connection path display unit
121 system configuration editing unit
122 offline network configuration information storing unit
123 connection path analyzing and selecting unit
124 throughput model storing unit
125 offline connection path storing unit
126 optimal connection path calculator
127 routing parameter calculator
150 display device
1171 grid model storing function
1172 network grid layout function
1173 PLC grid layout function
1174 grid size calculating function
1175 grid coordinate calculating function
1271 connection path reversing function
1272 transfer destination network number extracting function
1273 relay destination network number extracting function
1274 relay destination station number extracting function
11721 PLC-connected-to-other-network extracting means
11722 network type sorting means
11731 PLC grid layout candidate extracting means
11732 PLC grid layout candidate selecting means

BEST MODE(S) FOR CARRYING OUT THE INVENTION

In the following sections, exemplary embodiments of a control system engineering apparatus according to the present invention will be explained in detail, with reference to the accompanying drawings. The present invention is not limited to these exemplary embodiments.

First Embodiment

In a first embodiment of the present invention, a control system engineering apparatus and a control system engineering method with which it is possible to collect network configuration information and connection path information online from a control system for, for example, a production facility in which a plurality of PLCs are connected to one another via networks and to display the entirety of a system configuration of network configurations and PLCs included in a control system, based on the network configuration information and the connection path information will be explained.

Figures 1, 4:
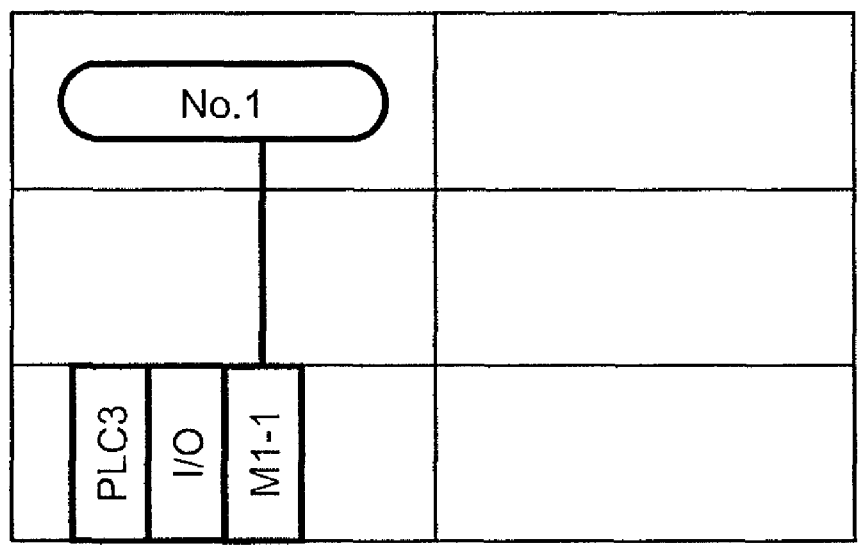
Figures 2, 4:
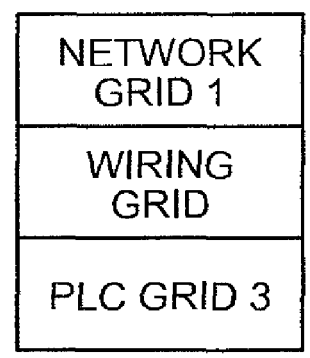

FIG. 1 is a schematic diagram of an exemplary network configuration of a control system. The control system is, for example, included in a production facility and has a configuration in which a plurality of PLCs are connected to one another via networks. In the present example, PLCs 10-1 and 10-2 are connected to an information-related network 21, whereas the PLC 10-1 and PLCs 10-3 and 10-4 are connected to an inter-controller network 22A, while the PLCs 10-1 and 10-2 and a PLC 10-5 are connected to an inter-controller network 22B, and the PLCs 10-4 and 10-5 are connected to each other via a field network 23. To the PLC 10-3 connected to the inter-controller network 22A, a control system engineering apparatus 100 according to an aspect of the present invention is connected, via a Universal Serial Bus (USB) cable 30.

In this situation, information-related networks are each a network to which one or more PLCs and one or more information processing terminals such as personal computers are connected in a mixed-type manner. An example of an information-related network is an Ethernet (a registered trademark). Inter-controller networks are each a network to which only PLCs are connected. Field networks are each a network to which PLCs and control targets of the PLCs such as servo motors are connected in a mixed-type manner. Generally speaking, an inter-controller network 22 is configured by using a communication line having a higher communication speed than the field network 23 is. Further, it is assumed that it is possible to assign a network number to the information-related network 21 and to the inter-controller network 22, but it is not possible to assign a network number to the field network 23. In the example shown in FIG. 1, a network number "No. 1" is assigned to the inter-controller network 22A, whereas a network number "No. 2" is assigned to the inter-controller network 22B, and a network number "No. 3" is assigned to the information-related network 21.

On a base of the PLC 10-1, as communication units, communication units 11-1A and 11-1B used for communicating in the inter-controller networks 22A and 22B as well as a communication unit 11-1C used for communicating in the information-related network 21 are provided.

In the following explanation, each of the PLCs that are included in any of the networks will be generally referred to as a "station". Among stations in an inter-controller network, a station in particular that manages the stations in the inter-controller network and stores therein a station number of the station itself and information (a total number of stations) indicating how many stations are managed by the station will be referred to as a management station. One management station is provided in one inter-controller network. Further, in an inter-controller network, the other stations each of which stores therein a station number thereof will be referred to as regular stations. In the drawings illustrating the communication units 11 used for performing communication in the inter-controller networks 22A and 22B, for example, in an expression "M1-3RG", "M" denotes a communication unit used for performing communication in an inter-controller network, whereas "1" denotes the network number assigned to the inter-controller network, while the numeral "3" following the hyphen "-" denotes the station number of the PLC (the communication unit 11) in the inter-controller network, and the last two letters indicate whether the station is a management station or a regular station. When the station is a management station, the last two letters are "MG". When the station is a regular station, the last two letters are "RG".

In the drawings illustrating the communication units 11 used for performing communication in the information-related network 21, for example, in an expression "E3-1", "E" denotes a communication unit used for performing communication in the information-related network, whereas "3" denotes the network number assigned to the information-related network, while the numeral "1" following the hyphen "-" denotes the station number of the PLC (the communication unit 11) in the information-related network.

Thus, the communication unit 11-1A is a communication unit that is connected to the inter-controller network 22A as a regular station of which the station number is 3. The communication unit 11-1B is a communication unit that is connected to the inter-controller network 22B as a regular station of which the station number is 2. Further, the communication unit E3-1 is a communication unit that is connected to the information-related network 21 as a station of which the station number is 1.

On a base of the PLC 10-2, as communication units, a communication unit 11-2A used for communicating in the inter-controller network 22B and a communication unit 11-2B used for communicating in the information-related network 21 are provided. The communication unit 11-2A is a communication unit that is connected to the inter-controller network 22B as a management station of which the station number is 1. The communication unit 11-2B is a communication unit that is connected to the information-related network 21 as a station of which the station number is 2.

On a base of the PLC 10-3, as a communication unit, a communication unit 11-3 used for communicating in the inter-controller network 22A is provided. The communication unit 11-3 is a communication unit that is connected to the inter-controller network 22A as a management station of which the station number is 1. Further, on the base of the PLC 10-3, an input/output (I/O) unit 12-3 is provided. In addition, an add-on base 13-3 in which two input/output units 12-3 are installed is attached to the base of the PLC 10-3.

On a base of the PLC 10-4, in addition to an input/output unit 12-4, a communication unit 11-4A used for communicating in the field network 23 and a communication unit 11-4B used for communicating in the inter-controller network 22A are provided, as communication units.

In this situation, in the drawings illustrating the communication units 11 used for performing communication in the field network 23, for example, in an expression "C MASTER", "C" denotes a communication unit used for communicating in the field network, whereas the following character string denotes whether the station is a master station or a local station. When the station is a local station, the station number of the PLC (the communication unit 11) in the field network is added thereto, following the character string. The names "master station" and "local station" are used to refer to stations in field networks. "Master stations" correspond to "management stations" in inter-controller networks, whereas "local stations" correspond to "regular stations" in inter-controller networks.

Thus, the communication unit 11-4A is a communication unit that is connected to the field network 23 as a master station. The communication unit 11-4B is a communication unit that is connected to the inter-controller network 22A as a regular station of which the station number is 2.

On a base of the PLC 10-5, in addition to an input/output unit 12-5, a communication unit 11-5A used for communicating in the field network 23 and a communication unit 11-5B used for communicating in the inter-controller network 22B are provided, as communication units. The communication unit 11-5A is a communication unit that is connected to the field network 23 as a local station of which the station number is 1. The communication unit 11-5B is a communication unit that is connected to the inter-controller network 22B as a regular station of which the station number is 3.

Each of the PLCs stores therein project information including base information that has been set into the PLC to have the PLC operate, as well as connected network information related to the networks to which the PLC belongs, and computer programs. The base information includes the number of units (the number of slots) that are installed on the base of the PLC, as well as the types of the units installed in the slots of the base, and information regarding an add-on base connected to the base. Further, the connected network information includes the types and the network numbers of the networks to which the PLC belongs, as well as the station number in the network, the type indicating whether the station is a management station or a regular station, and the total number of stations. In the following explanation, the base information and the connected network information may also be collectively referred to as system configuration information.

FIG. 2 is a schematic block diagram of a hardware configuration of a control system engineering apparatus. The control system engineering apparatus 100 is configured with an information processing terminal such as a personal computer. The control system engineering apparatus 100 is configured in such a manner that the following elements are connected to one another via a bus 107: a microprocessor 101 for performing processes by using engineering tools (i.e., processes to set and manage a system configuration) based on a computer program; a data storage memory 102 for storing therein temporary data related to the processes; a communication port 103 for performing communication with the PLCs 10; a display unit 104 for displaying the engineering tools (windows for displaying trees, icons, and the like); an input unit 105 such as a keyboard, a mouse, and the like; and a storage unit 106 that is configured with, for example, a hard disk device and stores therein data that has been set by using the engineering tools (i.e., the settings of the system configuration).

In the example shown in FIG. 1, the control system engineering apparatus 100 is connected to the PLC 10-3 via the USB cable 30. Thus, under constraints described below, the control system engineering apparatus 100 collects information such as PLC data related to the control system and connection paths to the PLCs 10 and displays the system configuration in a graphical manner.

Figure 3:
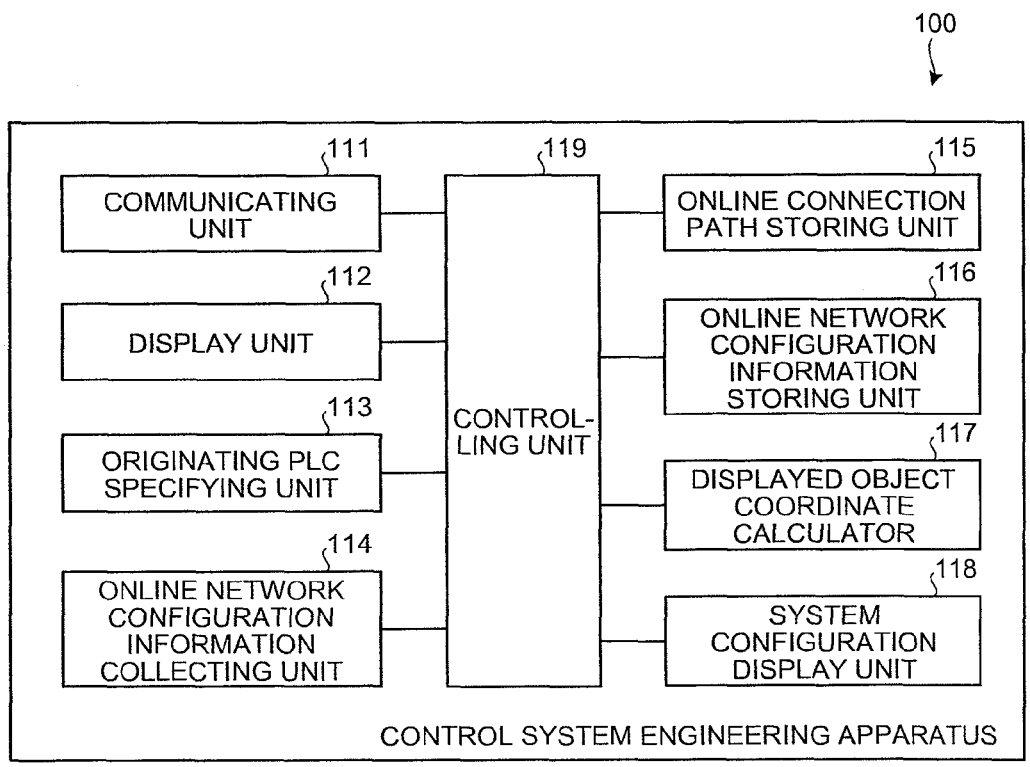
FIG. 3 is a schematic block diagram of a functional configuration of a control system engineering apparatus according to a first embodiment of the present invention.

FIG. 3 is a schematic block diagram of a functional configuration of the control system engineering apparatus according to the first embodiment of the present invention. The control system engineering apparatus 100 includes a communication unit 111, a display unit 112, an originating PLC specifying unit 113, an online network configuration information collecting unit 114, an online connection path storing unit 115, an online network configuration information storing unit 116, a displayed object coordinate calculator 117, a system configuration display unit 118, and a controlling unit 119 that controls these processing units.

The communication unit 111 connects to one of the PLCs included in the control system and performs communication. The display unit 112 is a means that displays the system configuration information that has been created by the system configuration display unit 118. The communication unit 111 corresponds to the communicating means in the claims, whereas the display unit 112 corresponds to the display means in the claims.

The originating PLC specifying unit 113 specifies which PLC the control system engineering apparatus 100 should be connected to. The process performed by the originating PLC specifying unit 113 may be realized with a technique described in, for example, Publication of Japanese Patent No. 3587099. The originating PLC specifying unit 113 corresponds to the originating control device specifying means in the claims.

The online network configuration information collecting unit 114 collects the system configuration information including the connected network information indicating the networks connected to the PLCs included in the control system while using the PLC specified by the originating PLC specifying unit 113 as an originating point and the base information indicating the system configurations of the PLCs (the configurations of the units installed on the bases) as well as the connection path information indicating the connection paths to the PLCs. Also, the online network configuration information collecting unit 114 has a function of creating network information indicating the PLCs connected to the networks (i.e., the configurations of the networks), based on the collected system configuration information. The online network configuration information collecting unit 114 stores the connected network information and the base information that have been collected and the created network into the online network configuration information storing unit 116, as PLC data and as network data, respectively. The online network configuration information collecting unit 114 also stores the collected connection path information into the online connection path storing unit 115. The online network configuration information collecting unit 114 corresponds to the online network configuration information collecting means in the claims.

The online connection path storing unit 115 stores therein the connection path information indicating the connection paths to the PLCs that has been used in the process performed by the online network configuration information collecting unit 114. The connection path information indicates communication paths each of which is used when an access is made from the PLC to which the control system engineering apparatus 100 is connected, to another PLC.

The online network configuration information storing unit 116 stores therein, as the network configuration information, the connected network information and the base information that have been collected by the online network configuration information collecting unit 114 and the network information that has been created by the online network configuration information collecting unit 114. As explained above, the connected network information is the information that indicates the networks connected to the PLCs included in the control system. The base information is the information that indicates the number of units (the number of slots) that are installed on the same base as each of the PLCs is, the types and the attributes of the units, as well as an add-on base that is connected to the base and the number of units that are installed on the add-on base and the types and the attributes of the units. The network information is the information including the PLCs included in the networks and attributes that have been set into the communication units of the PLCs.

The displayed object coordinate calculator 117 reads the network configuration information stored in the online network configuration information storing unit 116, analyzes the contents of the read network configuration information, and calculates coordinates of each of displayed objects (hereinafter, may be simply referred to as "objects") for the purpose of displaying the entirety of the system configuration of the networks and the PLCs included in the control system. The displayed object coordinate calculator 117 corresponds to the displayed object coordinate calculator in the claims.

The system configuration display unit 118 displays the displayed objects on the display unit 112 based on the coordinates that have been calculated by the displayed object coordinate calculator 117. The system configuration display unit 118 corresponds to the system configuration display means in the claims.

Next, the displayed object coordinate calculator 117 will be explained further in detail. The displayed object coordinate calculator 117 has a function of calculating layout information in which a grid model is used, at an intermediate step before the coordinates of the objects that are subject to a displaying process performed by the system configuration display unit 118 are eventually calculated.

The grid model is a model that expresses layout relationships among objects by using rectangular cells. In the grid model in the present example, three types of grids such as network grids, PLC grids, and wiring grids are used.

Each of the network grids is a rectangular cell (a grid) that represents a network. No other grid is laid out to the left or to the right of a network grid. In the case where a plurality of network grids are present, the network grids are laid out in an up-and-down direction.

Each of the PLC grids is a rectangular cell (a grid) that represents a PLC. Each of the PLC grids is laid out below the network grid representing the network to which the PLC is connected, together with a wiring grid, which is explained later. Each of the PLC grids corresponds to a control device grid in the claims.

Each of the wiring grids is a rectangular cell (a grid) that represents a wiring used for connecting a PLC and a network together. Each of the wiring grids is laid out between a network grid and a PLC grid and always extends only in an upward direction from a PLC grid.

Further, as another rule, any network grid that is positioned above PLC grids that have been added thereto extends in the width direction so as to be inclusive of the added PLCs that are positioned below.

Figures 1, 7:
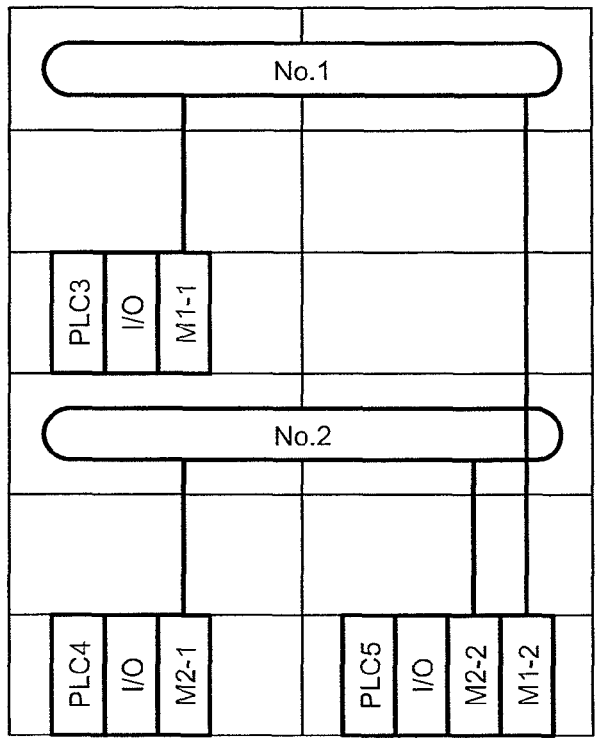
Figures 2, 7:
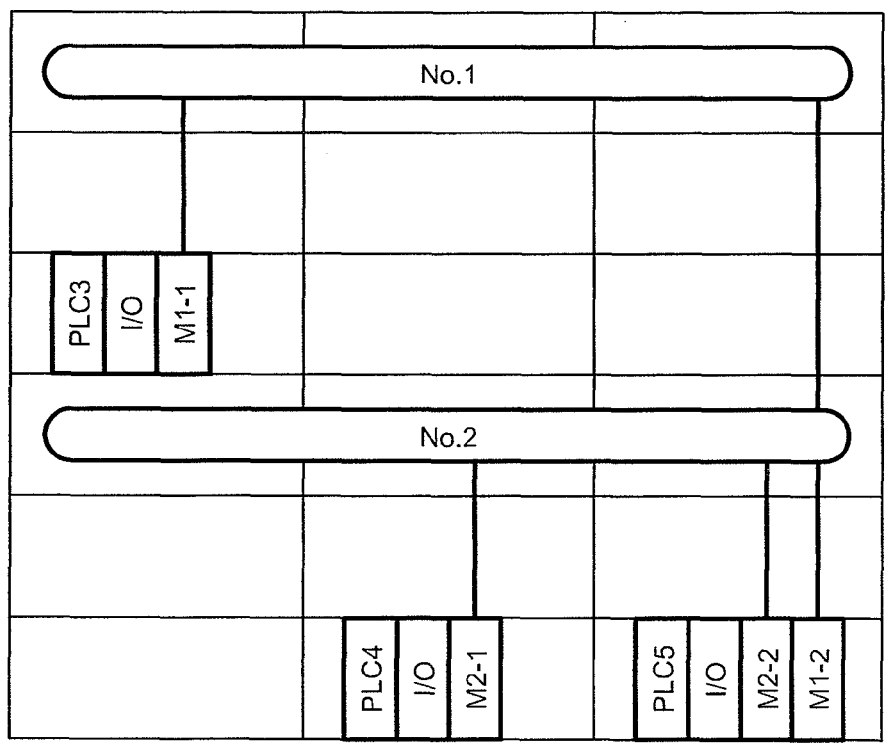
Figures 3, 7:
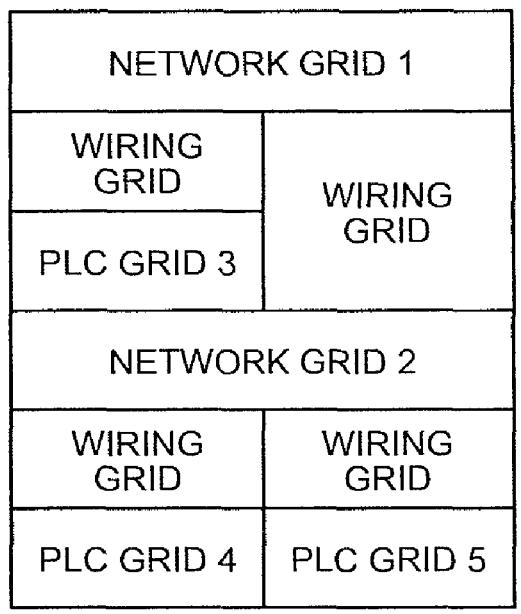
Figures 4, 7:
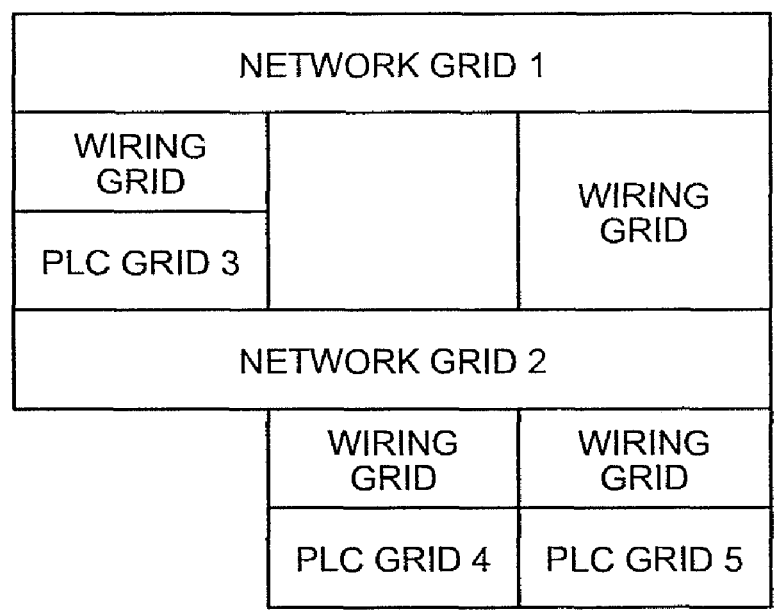

Next, a specific example of a grid model will be explained. FIGS. 4-1 to 7-4 are drawings of exemplary configurations of a control system and examples of grid models corresponding thereto. FIG. 4-2 is obtained by expressing a PLC 3 connected to a network No. 1 shown in FIG. 4-1 by using a grid model. As shown in FIG. 4-2, a PLC grid 3 is laid out below a network grid 1. A wiring grid is laid out from the PLC grid 3 toward the network grid 1.

Figures 1, 5:
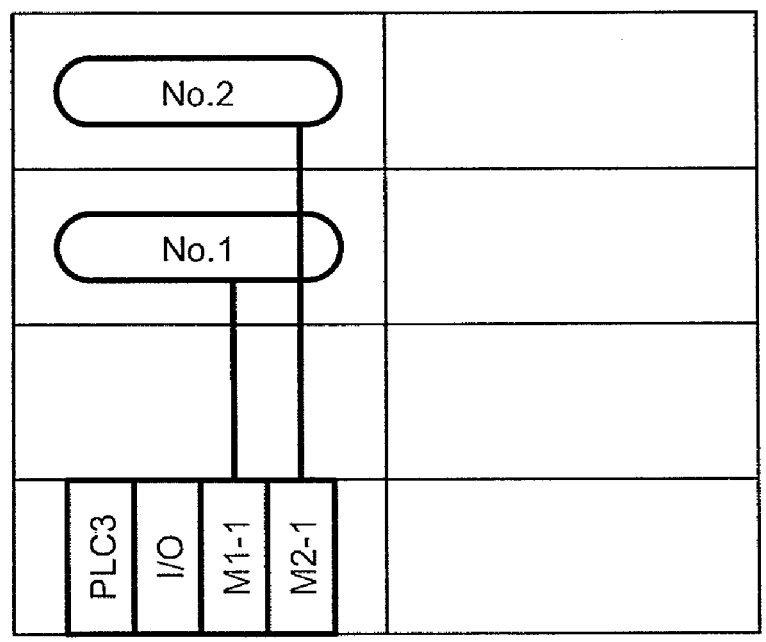
Figures 2, 5:
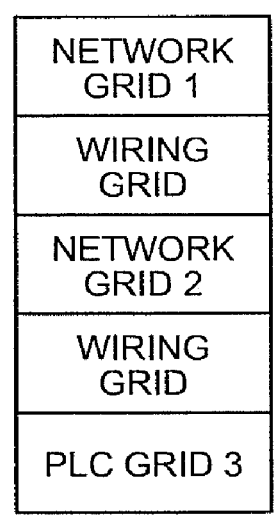

In a grid model corresponding to a situation in which, as shown in FIG. 5-1, the PLC 3 is connected to two networks that are namely the networks No. 1 and No. 2, wiring grids are laid out in an upward direction from the PLC grid 3 to the network grid 1 and to a network grid 2 that are laid out in an up-and-down direction, as shown in FIG. 5-2.

Figures 1, 6:
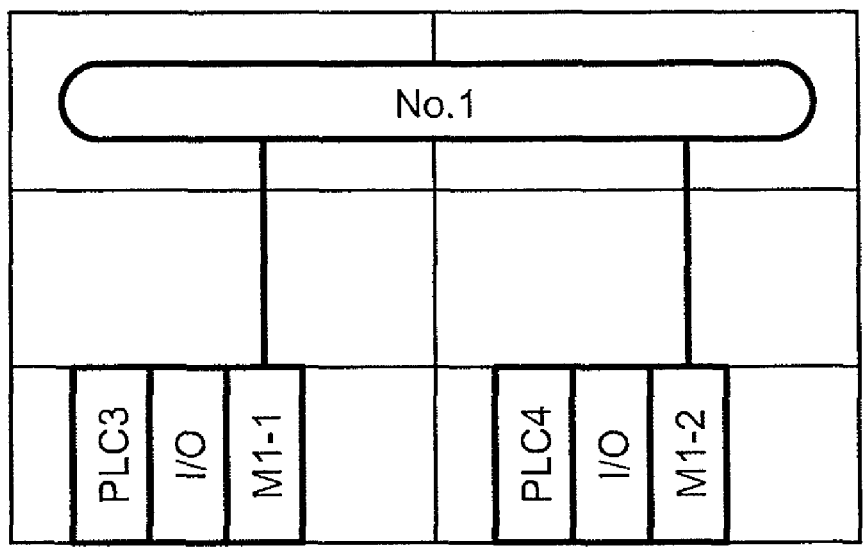
Figures 2, 6:
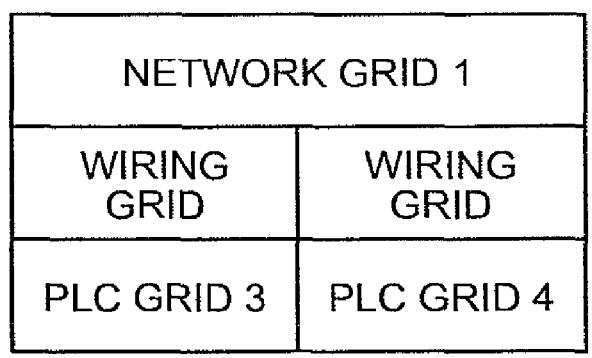

In a grid model corresponding to a situation in which, as shown in FIG. 6-1, two PLCs that are namely the PLC 3 and a PLC 4 are connected to one network that is namely the network No. 1, wiring grids are respectively laid out from two PLC grids (the PLC grid 3 and a PLC grid 4) that are laid out in a row in a left-and-right direction, toward the network grid 1, as shown in FIG. 6-2. In this situation, as shown in FIG. 6-1, because the two PLCs 3 and 4 are connected to the network No. 1, the network grid 1 has a shape that extends in a left-and-right direction so as to be inclusive of the two PLC grids 3 and 4, as shown in FIG. 6-2.

A grid model corresponding to a situation in which, as shown in FIG. 7-1 or FIG. 7-2, the PLC-3 is connected to the network No. 1, whereas the PLC 4 is connected to the network No. 2, while a PLC 5 is connected to the two networks that are namely the networks No. 1 and No. 2 is shown in FIG. 7-3 or FIG. 7-4. More specifically, because the two networks No. 1 and No. 2 are present, the two network grids 1 and 2 are laid out in an up-and-down direction. In the present example, the network grid 1 is laid out above the network grid 2. Also, because the PLC 3 is connected only to the network No. 1, the PLC grid 3 is laid out so as to be positioned between the network grid 1 and the network grid 2. A wiring grid is laid out from the PLC grid 1 toward the network grid 1. Also, because the PLC 4 is connected only to the network No. 2, the PLC grid 4 is laid out below the network grid 2. A wiring grid is laid out from the PLC grid 4 toward the network grid 2. Furthermore, because the PLC 5 is connected to both of the networks No. 1 and No. 2, a PLC grid 5 is laid out below the network grid 2. Wiring grids are laid out toward the network grid 1 and toward the network grid 2. The network grid 1 has a shape that extends in a left-and-right direction so as to be inclusive of the PLC grids 3 and 5, whereas the network grid 2 has a shape that extends in a left-and-right direction so as to be inclusive of the PLC grids 4 and 5.

While being compliant with the rules for grid models as described above, the displayed object coordinate calculator 117 calculates the coordinates of the objects included in the control system that is subject to the displaying process performed by the system configuration display unit 118, by using the grids.

Figure 8:
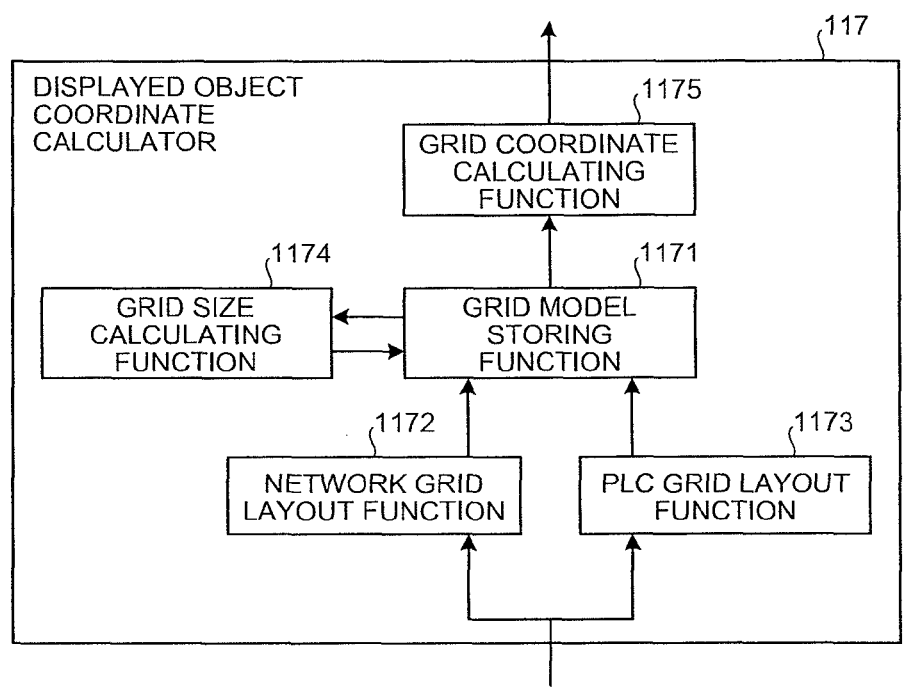
FIG. 8 is a schematic block diagram of a functional configuration of a displayed object coordinate calculator.

FIG. 8 is a schematic block diagram of a functional configuration of the displayed object coordinate calculator. As shown in FIG. 8, the displayed object coordinate calculator 117 includes a grid model storing function 1171, a network grid layout function 1172, a PLC grid layout function 1173, a grid size calculating function 1174, and a grid coordinate calculating function 1175.

The grid model storing function 1171 stores therein a grid model that has been laid out by the network grid layout function 1172 and the PLC grid layout function 1173 as well as a grid model including grid sizes that have been calculated by the grid size calculating function 1174.

The network grid layout function 1172 reads the network configuration information stored in the online network configuration information storing unit 116, analyzes layout relationships among the network based on the contents of the read network configuration information, and calculates and lays out a grid model for the networks. The result of the process is stored into the grid model storing function 1171.

The PLC grid layout function 1173 reads the network configuration information stored in the online network configuration information storing unit 116, analyzes connection relationships between PLCs and the networks to which the PLCs are connected based on the contents of the read network configuration information, and calculates and lays out a grid model for the PLCs and the wirings. In this situation, into the grid model that has been calculated by the network grid layout function 1172 and has been stored in the grid model storing function 1171, PLC grids and wiring grids are laid out. After that, the result of the process is stored into the grid model storing function 1171. The PLC grid layout function 1173 corresponds to the control device grid layout function in the claims.

With respect to each of the grids, especially each of the PLC grids, that are in the grid model stored in the grid model storing function 1171, the grid size calculating function 1174 calculates a size that is required when the corresponding PLC is displayed by using the base information of the PLC stored in the online network configuration information storing unit 116. The grid model used in this situation is the grid model in which the network grids, the PLC grids, and the wiring grids have been laid out. As the base information, the number of units and the types thereof that are installed on the base of the corresponding PLC, whether an add-on base is present, as well as the number of units and the types thereof that are installed on the add-on base are used. Further, the result of the process is added to the grid model stored in the grid model storing function 1171 and stored.

The grid coordinate calculating function 1175 calculates grid coordinates by sequentially adding each of the grid sizes, starting with the PLC grid positioned on the upper left, with respect to the PLC grids stored in the grid model that includes the grid sizes and is stored in the grid model storing function 1171. The calculation result is output to the system configuration display unit 118, together with the grid model.

Next, a procedure starting from a network configuration information collecting process up to a system configuration information displaying process that is performed in the control system engineering apparatus 100 configured as described above will be sequentially explained.

Figures 1, 9:
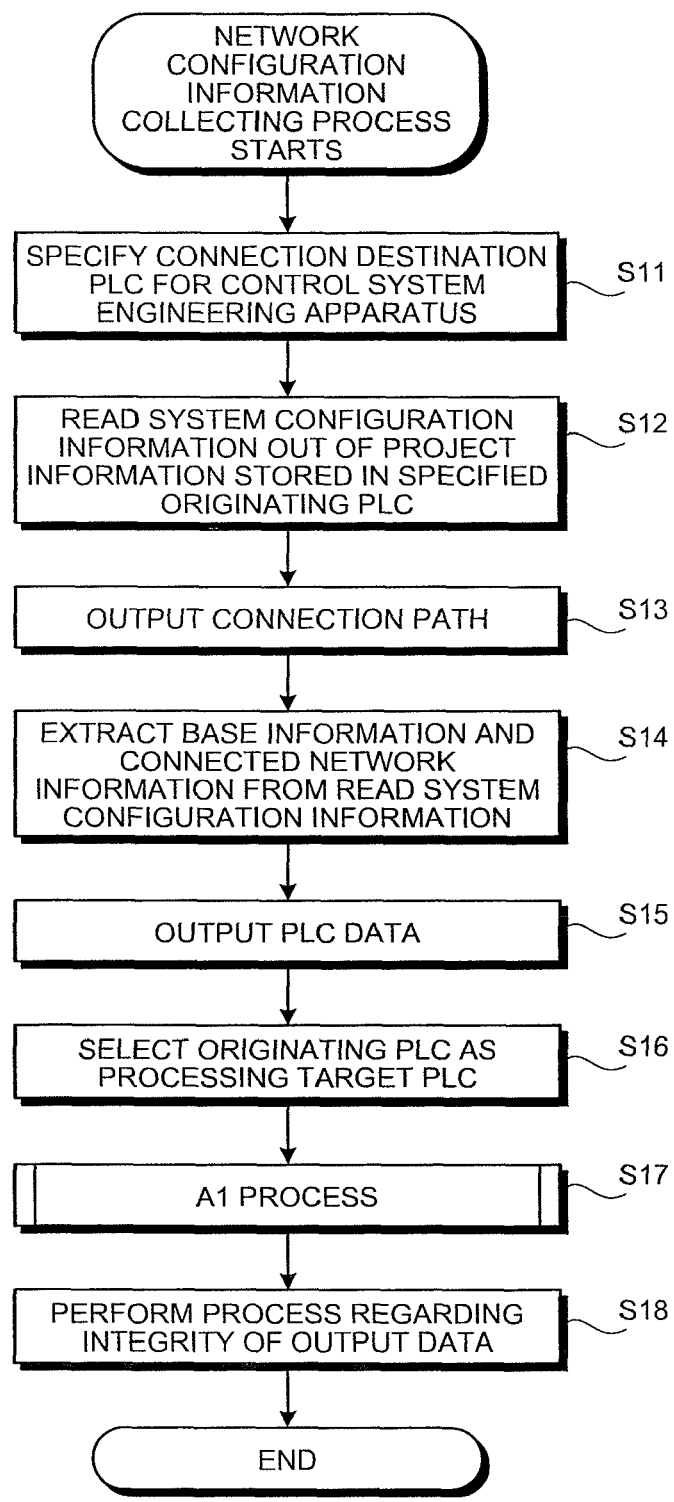

<Network Configuration Information Collecting Process>
(1) Overview of the Process FIGS. 9-1 to 9-3 are flowcharts of an example of a procedure in the network configuration information collecting process. First, a user of the control system engineering apparatus 100 specifies which PLC the control system engineering apparatus 100 should be connected to, through the originating PLC specifying unit 113 (step S11). Because the PLC that has been specified at this time will be used as the originating point when the network configuration information is collected, the specified PLC will be referred to as an "originating PLC".

The online network configuration information collecting unit 114 reads the system configuration information out of the project information stored in the specified originating PLC (step S12). Also, at the same time, the online network configuration information collecting unit 114 outputs a connection path extending to the originating PLC (step S13) and stores the connection path into the online connection path storing unit 115, as the connection path information.

Subsequently, the online network configuration information collecting unit 114 extracts the base information and the connected network information from the system configuration information that has been read at step S12 (step S14) and outputs the extracted information to the online network configuration information storing unit 116, as the PLC data (step S15). After that, the online network configuration information collecting unit 114 selects the originating PLC as a processing target PLC (step S16) and performs an A1 process shown in FIGS. 9-2 (step S17).

FIGS. 9-2 is a flowchart of a procedure in the A1 process performed at step S17 shown in FIGS. 9-1. First, the online network configuration information storing unit 116 collecting unit 114 judges whether an A2 process shown in FIGS. 9-3 has been performed on each of all the networks to which the originating PLC is connected (step S31). In the case where the A2 process has been performed on each of all the networks connected to the target PLC (step S31: Yes), the A1 process is ended, and the process returns to the flowchart shown in FIGS. 9-1.

In contrast, in the case where the A2 process has not been performed on each of all the networks connected to the target PLC (step S31: No), it is judged whether it is possible to further collect information with respect to each of the networks (step S32). The judgment regarding whether it is possible to perform the network information collecting process is made based on constraints regarding a pre-defined range in which it is possible to perform the network information collecting process. In the case where it is possible to further collect information with respect to each of the networks (step S32: Yes), one of the networks on which the A2 process shown in FIG. 9-3 has not yet been performed is selected as a processing target network (step S33), so that a network information outputting process shown in FIG. 9-3 is performed on the selected network (step S34).

After that, it is judged whether there is any network on which the A2 process has not yet been performed (step S35). In the case where there is at least one network on which the A2 process has not yet been performed (step S35: Yes), the process returns to step S33, so that the processes described above are repeatedly performed. In contrast, in the case where there is no network on which the A2 process has not yet been performed (step S35: No), the A1 process is ended, and the process returns to FIG. 9-1.

Conversely, in the case where, at step S32, it is not possible to further collect information with respect to each of the networks (step S32: No), network information is created by using the PLC data that has been output, so that the created network information is output to the online network configuration information storing unit 116, as network data (step S36). The network information is obtained by putting together, for each of the networks, the PLCs that are included in the network as well as the information that has been set with respect to the PLCs.

FIG. 9-3 is a flowchart of an example of a procedure in the A2 process performed at step S34 shown in FIG. 9-2. In the A2 process, the online network configuration information collecting unit 114 first reads the system configuration information out of the project information stored in a PLC that is connected to the network and serves as a management station (when the network is an inter-controller network) or a master station (when the network is a field network) (step S51). Subsequently, the online network configuration information collecting unit 114 extracts the total number of stations from the connected network information included in the read system configuration information (step S52).

After that, the online network configuration information collecting unit 114 reads the system configuration information out of the project information stored in each of the PLCs that are connected to the network (step S53). Subsequently, the online network configuration information collecting unit 114 extracts the base information and the connected network information from the read system configuration information (step S54), creates network information by putting together setting information of the PLCs included in the network, by using the extracted information, and outputs the created network information to the online network configuration information storing unit 116, as network data (step S55).

Subsequently, the online network configuration information collecting unit 114 judges whether data has been output for each of all the PLCs of which the information has been collected (step S56). In the case where the data has been output for each of all the PLCs (step S56: Yes), the A2 process regarding the target network is ended, and the process returns to the A1 process shown in FIG. 9-2. In contrast, in the case where data has not been output for each of all the PLCs (step S56: No), connection paths to the PLCs are output to the online connection path storing unit 115 (step S57), and also, the PLC data of the PLCs that have been extracted at step S54 is output to the online network configuration information storing unit 116 (step S58).

After that, based on the predetermined constraints, it is judged whether it is possible to further collect information with respect to networks regarding the PLCs (step S59). In the case where it is possible to collect information with respect to networks (step S59: Yes), a PLC on which the A1 process shown in FIG. 9-2 has not yet been performed is selected as a processing target PLC (step S60), so that the A1 process shown in FIG. 9-2 is performed (step S61). Further, it is judged whether there is any PLC on which the A1 process has not yet been performed (step S62). In the case where there is at least one PLC on which the A1 process has not yet been performed (step S62: Yes), the process returns to step S60, so that the processes described above are repeatedly performed. In contrast, in the case where there is no PLC on which the A1 process has not yet been performed (step S62: No), the A2 process is ended. Also, in the case where, at step S59, it is not possible to collect information with respect to networks (step S59: No), the A2 process is ended.

After that, the process returns to FIG. 9-1 where, after the A1 process shown at step S17 has been performed, the online network configuration information collecting unit 114 performs a process regarding integrity of the data that has been output (step S18). Examples of the process regarding integrity of the data include a process that is performed, in the case where two pieces of network data with respect to one network are present in the online network configuration information storing unit 116 due to some constraints, so as to put these two pieces of data together to make a piece of network data regarding the one network. The network configuration information collecting process has thus been completed.

As a result of the processes described above, the online connection path storing unit 115 stores therein the connection path information, from the PLC to which the control system engineering apparatus 100 is connected, to the PLCs included in the networks of which it is possible to collect the information. The online network configuration information storing unit 116 stores therein the network configuration information including the connected network information and the base information regarding the PLCs included in the networks of which it is possible to collect the information as well as the network information including the PLCs.

(2) Specific Examples of the Process

In the explanation above, the overview of the network configuration information collecting process is described. In the following sections, specific examples of the process will be explained by using the control system configured as shown in FIG. 1 as an example. FIG. 10 is a drawing of an example of the connection path information stored in the online connection path storing unit, as a result of the network configuration information collecting process. Similarly, FIG. 11 is a drawing of an example of the network configuration information stored in the online network configuration information storing unit. The pieces of data in FIGS. 10 and 11 are shown according to the order in which the pieces of data are created. Also, in FIGS. 10 and 11, each of the networks is referred to by using the expression such as "a network type+a network number" instead of the reference numerals/characters shown in FIG. 1.

As shown in FIG. 10, the connection path information includes a "data type" indicating the type of the stored data, a "name" indicating a terminating PLC, an "originating PLC", and "data 1", "data 2" and so on indicating the networks and/or the nodes (the PLCs) that form the paths on the way. In the present example, networks are listed in a column of "data ($2n$–1)", whereas PLCs are listed in a column of "data ($2n$)", where n is a natural number.

Also, as shown in FIG. 11, the network configuration information includes a "data type" indicating the type of the stored data, a "name" indicating a target PLC, and "data 1", "data 2" and so on indicating the contents that are defined for each of the data types with regard to the PLC. As explained above, the network configuration information includes the three types of information such as the based information, the connected network information, and the network information. Thus, the contents of the stored data vary depending on the type of the data.

For example, in the case where the base information is stored, "PLC base" is stored as the data type. In each of the data columns, the type of a unit installed in a different one of the slots is stored. In the case where there is an add-on base, the type of a unit installed in a different one of the slots of the add-on base is also stored. Further, in the case where the connected network information is stored, "PLC network" is stored as the data type. In each of the data columns, information related to a different one of the communication units installed on the base of the PLC listed under the "name" is stored. Furthermore, in the case where the network information is stored, "network" is stored as the data type. In each of the data columns, information related to the communication unit of a different one of the PLCs included in the network listed under the "name" is stored. In the present example, it is assumed that these pieces of data are stored according to the order of the station numbers.

(2-1) Regarding the Originating PLC

In FIG. 1, the control system engineering apparatus 100 is connected to the PLC 10-3. Thus, first, the user specifies the PLC 10-3 as the originating PLC through the originating PLC specifying unit 113 included in the control system engineering apparatus 100. After that, the online network configuration information collecting unit 114 reads the system configuration information out of the project information stored in the originating PLC that is connected via the USB cable 30 and outputs a connection path P3c extending to the originating PLC to the online connection path storing unit 115.

The read system configuration information includes, as the base information, information indicating that a CPU unit is installed in a slot 1, the I/O unit 12-3 is installed in a slot 2, the inter-controller network unit 11-3 is installed in a slot 3, and the I/O units 12-3 are installed in slots 1 and 2 of the add-on base 13-3. Also, the read system configuration information includes, as the connected network information, information indicating that the network type is the inter-controller network No. 1, whereas the inter-controller network unit 11-3 has a station number 1 and is a management station, and the total number of stations in the inter-controller network No. 1 is three.

In this situation, the online network configuration information collecting unit 114 outputs, as the connection path information, the contents shown as the connection path P3c in FIG. 10 to the online connection path storing unit 115 and the contents shown as PLC data P3b and P3n in FIG. 11 to the online network configuration information storing unit 116.

Further, the online network configuration information collecting unit 114 selects the PLC 10-3 serving as the originating PLC as a processing target, so that the A1 process shown in FIG. 9-2 is performed.

(2-2) Network Connected to the PLC 10-3

In the A1 process shown in FIG. 9-2 in which the PLC 10-3 is used as the processing target, because the A2 process shown in FIG. 9-3 has not yet been performed on the inter-controller network No. 1 (22A) connected to the PLC 10-3, the constraints are checked to see if it is possible to further collect information with respect to the network. FIG. 12 is a drawing of examples of the constraints used in the network information collecting process. Because none of the constraints shown in FIG. 12 is applicable to the inter-controller network No. 1 (22A) that is a network connected to the PLC 10-3 shown in FIG. 1, the online network configuration information collecting unit 114 selects the inter-controller network No. 1 (22A) as a target of the A2 process and performs the A2 process shown in FIG. 9-3.

(2-3) Regarding the Inter-Controller Network No. 1

In the A2 process shown in FIG. 9-3 in which the inter-controller network No. 1 (22A) is used as the processing target, first, the online network configuration information collecting unit 114 reads the system configuration information out of the project information stored in the PLC 10-3, which is a management station connected to the inter-controller network No. 1. In the present example, however, of the system configuration information of the PLC 10-3, the PLC data P3b and P3n have already been output as shown in FIG. 11. Thus, it is not necessary to read the data again. Accordingly, of the system configuration information of the management station PLC (i.e., the PLC 10-3), because the connected network information P3n includes the information related to the total number of stations indicating the PLCs connected to the inter-controller network No. 1, the total number of stations "3" is extracted.

After that, the online network configuration information collecting unit 114 reads the system configuration information out of the project information stored in the PLCs corresponding to the different station numbers on the paths "the PLC 10-3→the inter-controller network No. 1→each station". In other words, in this situation, information of the PLC 10-4 and the PLC 10-1 is newly collected.

After that, the online network configuration information collecting unit 114 creates network information based on the extracted information and outputs the created network information to the online network configuration information storing unit 116, as network data M1. In other words, the online network configuration information collecting unit 114 creates the network information regarding the inter-controller network No. 1 shown as the network data M1 in FIG. 11, by using the information regarding the communication unit 11-3 of the PLC 10-3 that has already been stored in the online network configuration information storing unit 116 and the information regarding the communication units 11-1A and 11-4B of the PLCs 10-4 and 10-1 that has been extracted.

Subsequently, for each of all of the pieces of data regarding the PLC 10-4 and the PLC 10-1 that have newly been collected, the online network configuration information collecting unit 114 judges whether the data has been output to the online connection path storing unit 115 or the online network configuration information storing unit 116. In the present example, neither one of the pieces of data regarding the PLC 10-4 and the PLC 10-1 has been output to the online connection path storing unit 115 and the online network configuration information storing unit 116. Thus, the paths to the PLCs 10-4 and 10-1 that have been read are output to the online connection path storing unit 115 as connection paths P4c and P1c, respectively. The PLC data of the PLCs 10-4 and 10-1 is output to the online network configuration information storing unit 116, as base information P4b and P1b and connected network information P4n and P1n, respectively.

After that, the online network configuration information collecting unit 114 judges whether it is possible to further collect information with respect to networks regarding the PLCs 10-4 and 10-1 of which the information has been collected. In the present example, the PLCs for which it is judged whether it is possible to further collect information with respect to networks are the PLC 10-4 (of which the station number is 2) and the PLC 10-1 (of which the station number is 3). In that situation, it is acceptable to start the process with either one of the PLCs. In other words, no priority levels are set for performing the process. In the present example, it is assumed that the process is performed according to the order of the station numbers. Accordingly, after the process regarding the PLC 10-4 of which the station number is 2 has been finished, the process regarding the PLC 10-1 of which the station number is 3 is performed.

(2-4) The PLC 10-4

First, with regard to the PLC 10-4, the constraints shown in FIG. 12 are checked to see if it is possible to further collect information with respect to networks. As a result, none of the constraints shown in FIG. 12 is applicable to the PLC 10-4. Thus, the PLC 10-4 is selected as a processing target, so that the A1 process shown in FIG. 9-2 is performed.

(2-4-1) The A1 Process

In the A1 process in which the PLC 10-4 is used as the processing target, of the networks to which the PLC 10-4 is connected, the data of the inter-controller network No. 1 has already been output to the online network configuration information storing unit 116 as the network data M1, and the A2 process has already been performed; however, the A2 process has not yet been performed on the field network 23. Thus, the online network configuration information collecting unit 114 checks the constraints by using FIG. 12 to see if it is possible to further collect information with respect to the network regarding the field network 23. In the present example, because none of the constraints is applicable, the online network configuration information collecting unit 114 selects the field network 23 as a processing target and performs the A2 process shown in FIG. 9-3.

(2-4-2) The A2 Process

Subsequently, in the A2 process in which the field network 23 is used as the processing target, the system configuration information is read out of the project information stored in the PLC 10-4, which is a master station PLC connected to the field network 23. However, of the system configuration information of the PLC 10-4, the data of the base information P4b and the connected network information P4n has already been output. Thus, it is not necessary to read the data again. Accordingly, from the connected network information P4n in the system configuration information of the PLC 10-4 serving as a master station that has already been output, the total number of stations "2" indicating the PLCs connected to the field network 23 is extracted.

After that, the online network configuration information collecting unit 114 reads the system configuration information out of the project information stored in the PLCs corresponding to the different station numbers, by using the paths "the PLC 10-3→the inter-controller network No. 1→the PLC 10-4→the field network 23→each station". In other words, in this situation, information of the PLC 10-5 is newly collected.

(2-4-3) The Field Network 23→the PLC 10-5

The system configuration information of the PLC 10-5 that has newly been read includes, as the base information, information indicating that a CPU unit is installed in a slot 1, the I/O unit 12-5 is installed in a slot 2, the communication unit 11-5A used for communicating in the field network 23 is installed in a slot 3, and the communication unit 11-5B used for communicating in the inter-controller network 22B is installed in a slot 4. Further, the system configuration information includes, as the connected network information, information indicating the field network 23 and the local station 1 as well as information indicating the inter-controller network No. 2, the station number 3, and a regular station. Further, the online network configuration information collecting unit 114 creates network information regarding the field network 23 based on the extracted system configuration information and the system configuration information regarding the PLC 10-4 that has already been output and outputs the created network information to the online network configuration information storing unit 116, as network data C shown in FIG. 11.

Subsequently, regarding the PLC 10-5 of which the information has newly been collected, the online network configuration information collecting unit 114 judges whether the data has been output to the online connection path storing unit 115 or the online network configuration information storing unit 116. In the present example, because the data of the PLC 10-5 has not yet been output, the path that has been read is output to the online connection path storing unit 115 as a connection path P5c, whereas the PLC data is output to the online network configuration information storing unit 116 as base information P5b and connected network information P5n.

After that, based on the constraints shown in FIG. 12, the online network configuration information collecting unit 114 checks to see if it is possible to further collect information with respect to networks regarding the PLC 10-5 of which the information has been collected. In the present example, because a constraint B is applicable, the A2 process in which the field network 23 is used as the processing target is ended. In addition, the A1 process in which the PLC 10-4 is used as the processing target as described in (2-4) is also ended.

(2-5) The PLC 10-1

After that, with regard to the PLC 10-1, the constraints shown in FIG. 12 are checked to see if it is possible to further collect information with respect to networks. Because none of the constraints shown in FIG. 12 is applicable to the PLC 10-1, the PLC 10-1 is selected as a processing target, so that the A1 process shown in FIG. 9-2 is performed.

In the A1 process in which the PLC 10-1 is used as the processing target, of the networks to which the PLC 10-1 is connected, the A2 process has not yet been performed on the inter-controller network No. 2 or on the information-related network No. 3. Accordingly, the online network configuration information collecting unit 114 selects a PLC to be used as a processing target based on priority levels that have been set according to a predetermined criterion and performs the process. FIG. 13 is a drawing of examples of the priority levels used in a network information outputting process. In the present example, the inter-controller networks 22A and 22B having the highest possibility of having PLCs connected thereto are configured so as to have the highest priority level in the process. The field network 23 and the information-related network 21 are configured so as to have lower priority levels in the process, in the stated order.

(2-6) The Inter-Controller Network No. 2

According to the priority levels shown in FIG. 13, the online network configuration information collecting unit 114 selects the inter-controller network No. 2 and checks the constraints using FIG. 12 to see if it is possible to further collect information with respect to the network. In the present example, because none of the constraints is applicable, the inter-controller network No. 2 is selected as a processing target, so that the A2 process shown in FIG. 9-3 is performed.

In the A2 process in which the inter-controller network No. 2 is used as the processing target, the online network configuration information collecting unit 114 reads the system configuration information out of the project information stored in the PLC 10-2, which is the management station connected to the inter-controller network No. 2. Of the read system configuration information, because the connected network information includes the information related to the total number of stations indicating the PLCs connected to the inter-controller network No. 2, the total number of stations "3" is extracted.

After that, the online network configuration information collecting unit 114 reads the system configuration information out of the project information stored in the PLCs corresponding to the different station numbers, by using the paths "the PLC 10-3→the inter-controller network No. 1→the PLC 10-1→the inter-controller network No. 2→each station". In other words, in this situation, information of the PLC 10-2 and the PLC 10-5 is collected.

The system configuration information of the PLC 10-2 that has newly been read includes, as the base information, information indicating that a CPU unit is installed in a slot 1, the communication unit 11-2A used for communicating in the inter-controller network No. 2 is installed in a slot 2, and the communication unit 11-2B used for communicating in the information-related network No. 3 is installed in a slot 2. Further, the system configuration information includes, as the connected network information, information indicating the inter-controller network No. 2, the station number 1, and a management station, as well as information indicating the information-related network No. 3, the station number 2, and an IP address.

Further, the system configuration information of the PLC 10-5 includes, as the base information, information indicating that a CPU unit is installed in a slot 1, the I/O unit 12-5 is installed in a slot 2, the communication unit 11-5A used for communicating in the field network 23 is installed in a slot 3, and the communication unit 11-5B used for communicating in the inter-controller network No. 2 is installed in a slot 4. Further, the system configuration information includes, as the connected network information, information indicating the field network, the local station 1, as well as information indicating the inter-controller network No. 2, the station number 3, and a regular station.

Further, the online network configuration information collecting unit 114 creates network information regarding the inter-controller network No. 2 based on the extracted system information and the PLC data related to the PLC 10-1 that has already been stored in the online network configuration information storing unit 116 and outputs the created network information to the online network configuration information storing unit 116 as network data M2.

Subsequently, of the system configuration information that has newly been collected, although the data regarding the PLC 10-5 has already been output, the data regarding the PLC 10-2 has not yet been output. Accordingly, the path to the PLC 10-2 that has been read is output to the online connection path storing unit 115 as a connection path P2c, whereas the PLC data is output to the online network configuration information storing unit 116, as base information P2b and connected network information P2n.

(2-7) The PLC 10-2

After that, with regard to the PLC 10-2, the constraints shown in FIG. 12 are checked to see if it is possible to further collect information with respect to networks. Because none of the constraints shown in FIG. 12 is applicable to the PLC 10-2, the PLC 10-2 is selected as a processing target, so that the A1 process shown in FIG. 9-2 is performed.

In the A2 process in which the PLC 10-2 is used as the processing target, of the networks to which the PLC 10-2 is connected, the A2 process has not yet been performed on the information-related network No. 3. Accordingly, the online network configuration information collecting unit 114 checks the constraints shown in FIG. 12 to see if it is possible to further collect information with respect to the network. In the present example, because a constraint C is applicable, there is no network of which it is possible to collect the information. As a result, the online network configuration information collecting unit 114 creates network information with regard to the information-related network No. 3 within the possible range, by using the PLC data of the PLC 10-2 and outputs the created network information to the online network configuration information storing unit 116 as network data E3-2. The A1 process in which the PLC 10-2 is used as the processing target is thus ended. Also, the A2 process in which the inter-controller network No. 2 is used as the processing target as described in (2-6) is also ended.

(2-8) The Information-Related Network No. 3

After that, with regard to the information-related network No. 3, the constraints shown in FIG. 12 are checked to see if it is possible to further collect information with respect to the network. Because the constraint C is applicable to the information-related network 21, the online network configuration information collecting unit 114 creates network information with regard to the information-related network No. 3 within the possible range and outputs the created network information to the online network configuration information storing unit 116, as network data E3-1. The A1 process in which the PLC 10-1 is used as the processing target as described in (2-5) is thus ended. Further, the A2 process in which the inter-controller network No. 1 is used as the processing target as described in (2-3) is ended. Furthermore, the A1 process in which the PLC 10-3 is used as the processing target as described in (2-2) is ended.

After that, the online network configuration information collecting unit 114 performs the process regarding integrity of the data that has been output. In the present example, due to the constraint C shown in FIG. 12 that defines whether it is possible to further collect information with respect to networks, the network data regarding the information-related network No. 3 is individually output as network data E3-1 and as network data E3-2, as shown in FIG. 11. Thus, a process is performed so that these pieces of data are put together as network data E3. The network configuration information collecting process has thus been completed.

<PLC Grid Layout Process>

(1) Overview of the Process

Figures 1, 14:
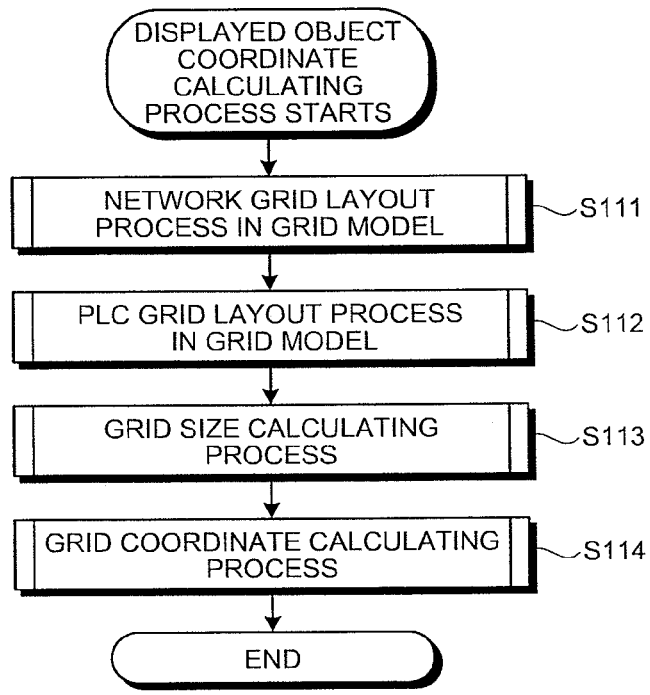
Figures 2, 14:
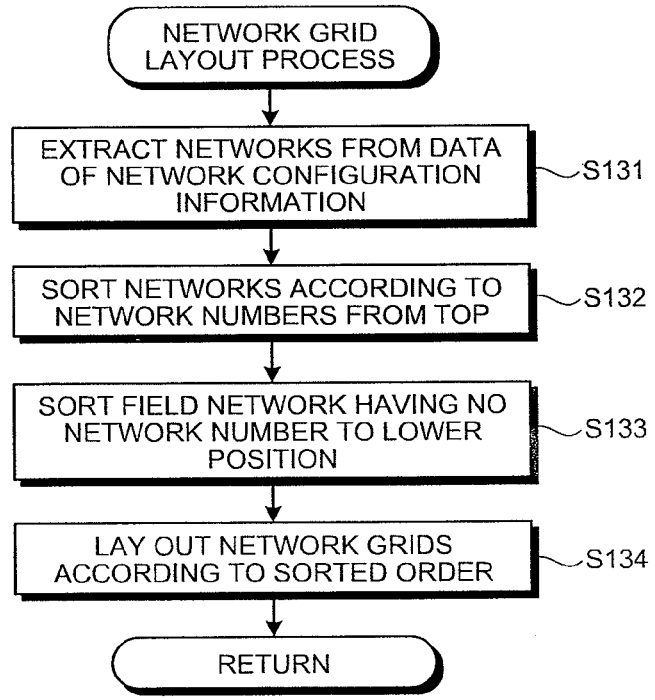
Figures 3, 14:
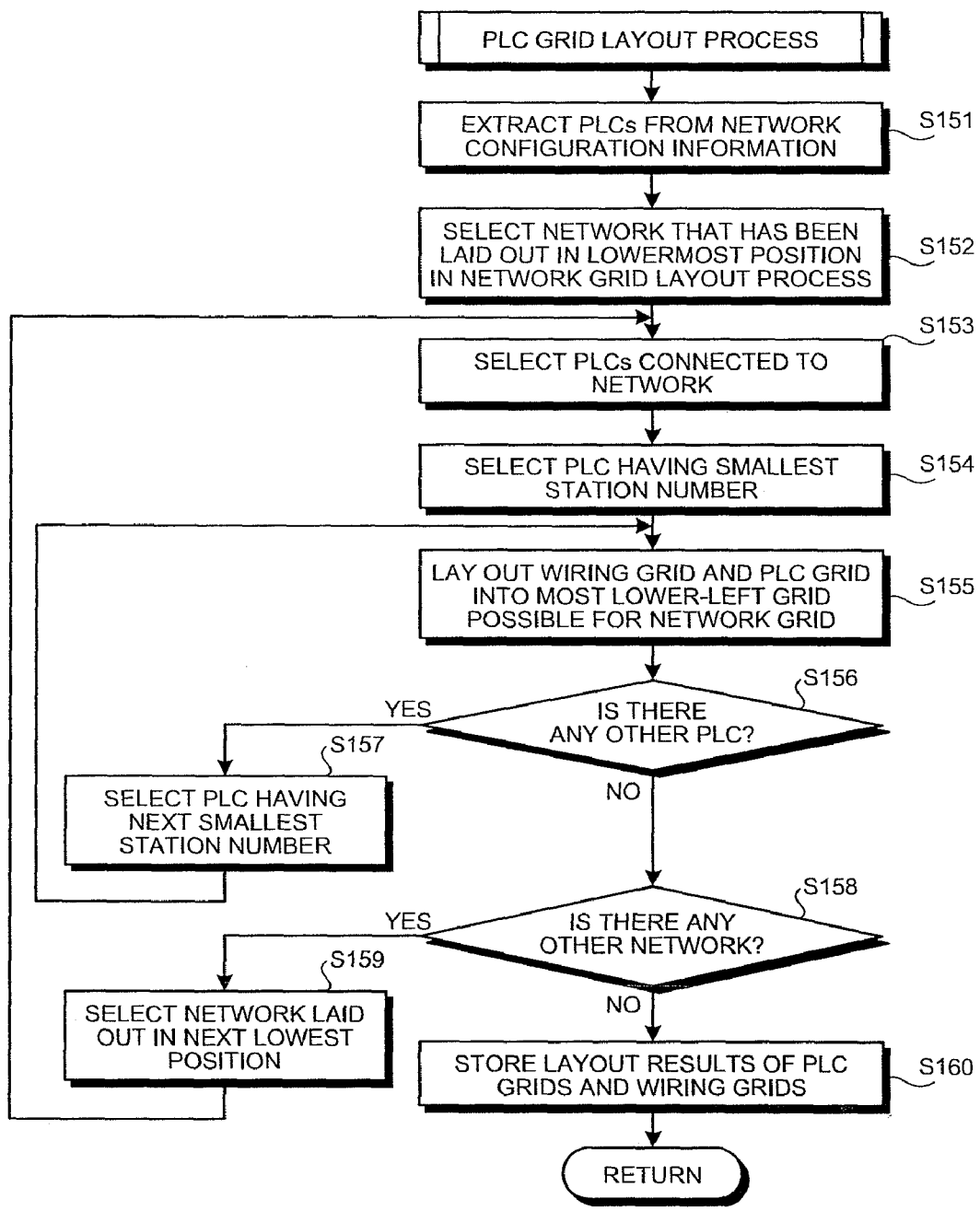
Figures 4, 14:
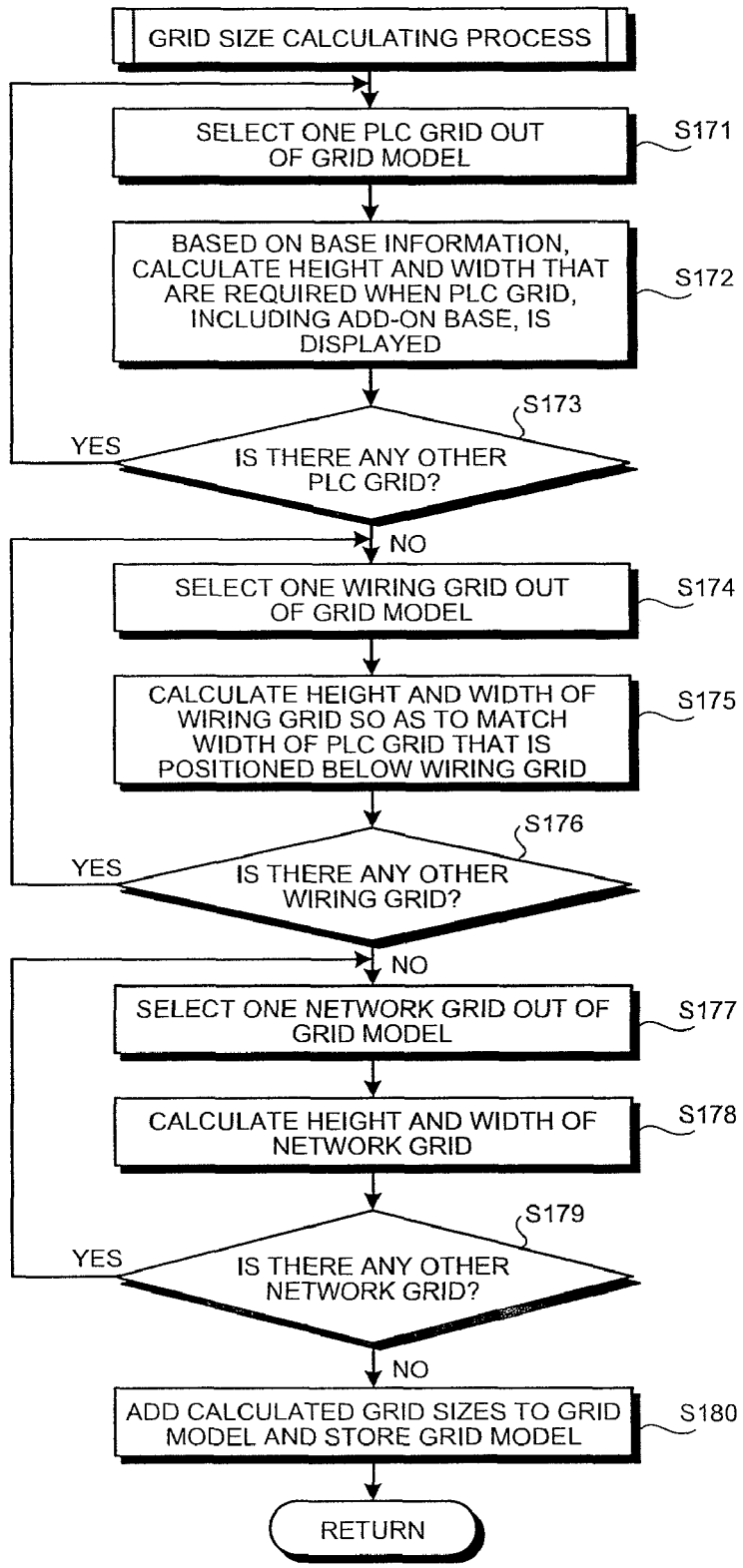
Figures 5, 14:
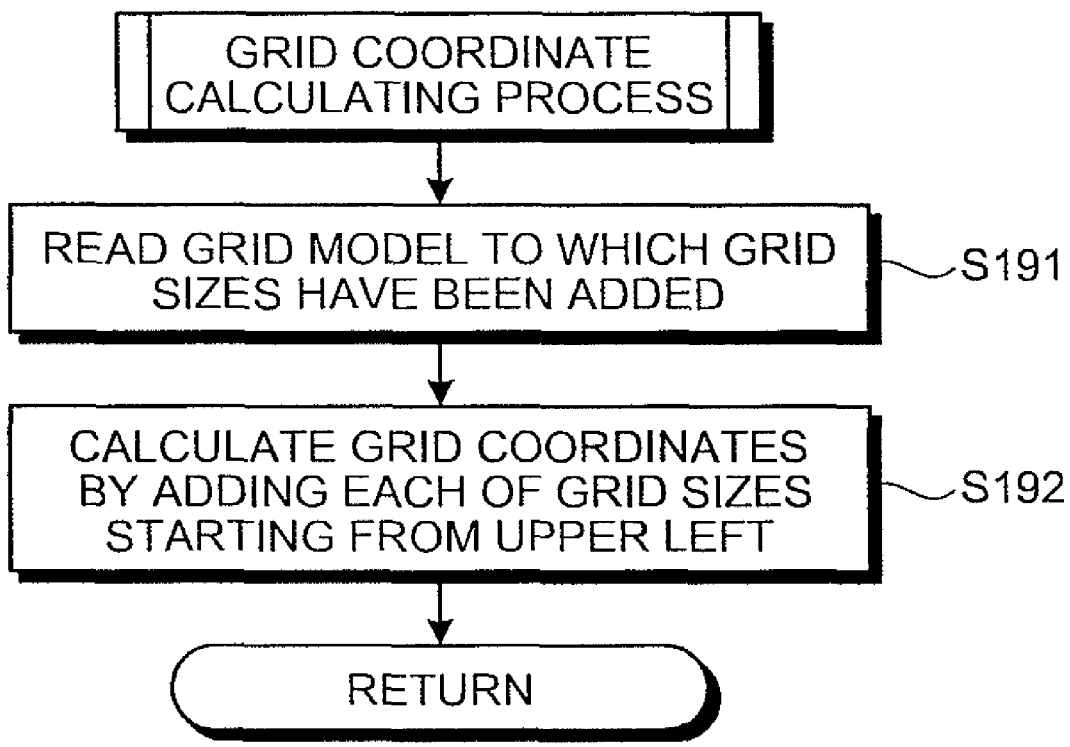

FIGS. 14-1 to 14-5 are flowcharts of examples of procedures in a displayed object coordinate calculating process. In the following explanation, it is assumed that the displayed object coordinate calculating process is performed by using the grid model described above.

In the following sections, an overview of the procedure in the displayed object coordinate calculating process will be explained, with reference to FIG. 14-1. First, the network grid layout function 1172 included in the displayed object coordinate calculator 117 performs a network grid layout process according to a predetermined rule, by using the network information stored in the online network configuration information storing unit 116 in the grid model (step S111).

Subsequently, the PLC grid layout function 1173 performs a PLC grid layout process so as to lay out PLC grids and wiring grids according to a predetermined rule, by using the base information stored in the online network configuration information storing unit 116 in the grid model (step S112). In the PLC grid layout process, the PLC grids and the wiring grids are laid out for the network grids that have been laid out at step S111. The results of the network grid layout process performed at step S111 and the PLC grid layout process performed at step S112 are stored into the grid model storing function 1171.

After that, the grid size calculating function 1174 calculates the size of each of the grids, according to the base information and a predetermined rule used for laying out the grids and stores the result into the grid model storing function 1171 (step S113). Further, based on the grid sizes that have been stored in the grid model storing function 1171, the grid coordinate calculating function 1175 calculates coordinates used for displaying the grids on the display unit 112 (step S114). The displayed object coordinate calculating process has thus been completed.

Next, the details of the processes performed at each of the steps shown in FIG. 14-1 will be explained. FIG. 14-2 is a flowchart of an example of a procedure in the network grid layout process. First, the network grid layout function 1172 included in the displayed object coordinate calculator 117 refers to the network data stored in the online network configuration information storing unit 116 and extracts the networks (step S131).

Subsequently, the extracted networks are sorted according to the network numbers thereof, from the top (step S132). The field network to which no network number is assigned is sorted to a lower position (step S133). The network grids are laid out according to the sorted order (step S134), and the result is stored into the grid model storing function 1171. The network grid layout process has thus been completed.

FIG. 14-3 is a flowchart of an example of a procedure in the PLC grid layout process. The PLC grid layout function 1173 extracts the PLCs from the base information stored in the online network configuration information storing unit 116 (step S151). Subsequently, of the extracted PLCs, the network that is laid out in the lowermost position as a result of the network grid layout process performed at step S111 is selected (step S152). After that, the PLCs that are connected to the selected network are selected (step S153). Of the selected PLCs, the PLC having the smallest station number is selected (step S154). After that, the selected PLC grid and a wiring grid are laid out into the most lower-left grid possible for the network grid that has been selected at step S152 (step S155). In this situation, the wiring grid is laid out between the PLC grid and the network grid. Also, in the case where the PLC grid is connected not only to the network that has been selected at step S152 but also to one or more other networks, wiring grids are laid out in an upward direction so as to reach such networks.

After that, of the PLCs that are connected to the network that has been selected at step S152, it is judged whether there is any other PLC (step S156). In the case where there is at least one other PLC (step S156: Yes), the PLC having the next smallest station number is selected (step S157), and the process returns to step S155. The same process is repeatedly performed until there is no unselected PLC that is connected to the network that has been selected at step S152.

In contrast, in the case where there is no other PLC at step S156 (step S156: No), it is judged whether there is any other network (step S158). In the case where there is at least one other network (step S158: Yes), the network that is laid out in the next lowest position as a result of the network grid layout process performed at step S111 is selected (step S159), and the process returns to step S153. The processes described above are repeatedly performed until the PLC grids and the wiring grids are laid out for the network that is laid out in the uppermost position. Conversely, in the case where there is no other network (step S158: No), the results of laying out the PLC grids and the wiring grids are stored into the grid model storing function 1171 (step S160), and the PLC grid layout process has thus been completed.

FIG. 14-4 is a flowchart of an example of a procedure in the grid size calculating process. First, the grid size calculating function 1174 selects one PLC grid out of the grid model stored in the grid model storing function 1171 (step S171). Subsequently, with regard to the PLC corresponding to the selected PLC grid, the grid size calculating function 1174 reads the base information out of the online network configuration information storing unit 116 and calculates a height and a width that are required when the PLC grid, including add-on base information, is displayed (step S172). In this situation, one unit that is installed on the base and has the smallest dimension is expressed by using a rectangle, as a reference unit. The size of each of the other units and the add-on base that are installed on the base is calculated as a multiple of the size of the reference unit. For example, in the case where the size of the reference unit in an up-and-down direction (hereinafter, the "height direction") is 10, whereas the size of the reference unit in a left-and-right direction (hereinafter, the "width direction") is 10 and if three units are installed on the base, the height of the base will be 10, and the width of the base will be 30. Also, if an add-on base is installed, because the add-on base is rendered so as to be added in the height direction, the height will be extended to 20.

After that, the grid size calculating function 1174 judges whether there is any other PLC grid in the grid model stored in the grid model storing function 1171 (step S173). In the case where there is at least one other PLC grid (step S173: Yes), the process returns to step S171. The processes described above are repeatedly performed until there is no unselected PLC grid.

In contrast, in the case where there is no other PLC grid (step S173: No), the grid size calculating function 1174 selects one wiring grid stored in the grid model storing function 1171 (step S174). The grid size calculating function 1174 then calculates the height and the width of the selected wiring grid (step S175). In this situation, the height of the wiring grid is configured so as to have a predetermined value, whereas the width of the wiring grid is configured so as to be equal to the width of the PLC grid that is laid out below the wiring grid.

After that, the grid size calculating function 1174 judges whether there is any other wiring grid in the grid model stored in the grid model storing function 1171 (step S176). In the case where there is at least one other wiring grid (step S176: Yes), the process returns to step S174. The processes described above are repeatedly performed until there is no unselected wiring grid.

In contrast, in the case where there is no other wiring grid (step S176: No), the grid size calculating function 1174 selects one network grid stored in the grid model storing function 1171 (step S177). The grid size calculating function 1174 then calculates the height and the width of the selected network grid (step S178). In this situation, the height of the network grid is configured so as to have a predetermined value, whereas the width is configured so as to be inclusive of the wiring grids laid out below the network grid.

After that, the grid size calculating function 1174 judges whether there is any other network unit in the grid model stored in the grid model storing function 1171 (step S179). In the case where there is at least one other network grid (step S179: Yes), the process returns to step S177. The processes described above are repeatedly performed until there is no unselected network grid.

In contrast, in the case where there is no other network grid (step S179: No), the grid size calculating function 1174 stores the grid model including the grid sizes that have been calculated in the processes described above into the grid model storing function 1171 (step S180). The grid size calculating process has thus been completed.

FIG. 14-5 is a flowchart of an example of a procedure in a grid coordinate calculating process. The grid coordinate calculating function 1175 reads the grid model to which the grid sizes have been added and that is stored in the grid model storing function 1171 (step S191) and calculates the grid coordinates by sequentially adding each of the grid sizes starting from the upper left of the grid model (step S192). The grid coordinate calculating process has thus been completed.

(2) Specific Examples of the Process

In the explanation above, the overview of the displayed object coordinate calculating process is described. In the following sections, specific examples of the process will be explained by using the control system configured as shown in FIG. 1 as an example. In the present example, it is assumed that the displayed object coordinate calculating process is performed by using the connection path information shown in FIG. 10 and the network configuration information shown in FIG. 11.

(2-1) Network Grid Layout Process

First, from the network configuration information shown in FIG. 11 that is stored in the online network configuration information storing unit 116, the pieces of network data M1, M2, C, and E3 in each of which the data type is indicated as "network" are referenced, and the inter-controller network No. 1, the inter-controller network No. 2, the field network, and the information-related network No. 3 are extracted.

Figure 15:
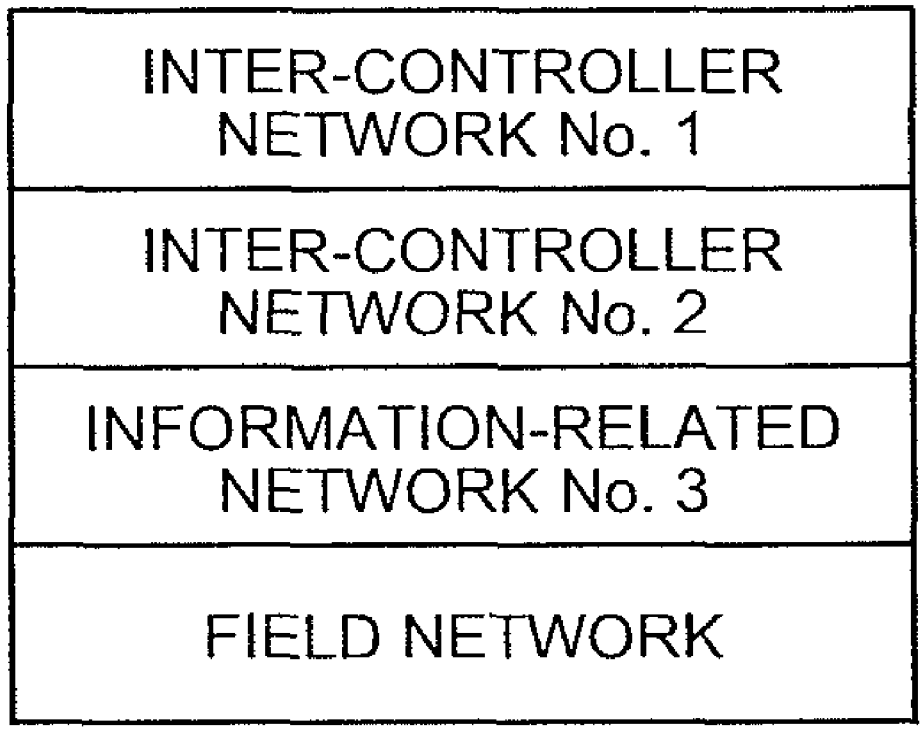
FIG. 15 is a drawing of a result of the network grid layout process.

Subsequently, the extracted networks are sorted according to the network numbers thereof. In this situation, the networks are laid out in the following order, from the top: the inter-controller network No. 1 (22A)→the inter-controller network No. 2 (22B)→the information-related network No. 3 (21)→the field network (23) (the numerals in the parentheses are the reference numerals/characters used in FIG. 1). After that, the network grids are laid out according to the sorted order. FIG. 15 is drawing of a result of the network grid layout process. In the state shown in FIG. 15, only the layout relationships in the up-and-down direction have been confirmed, and the layout relationships in the left-and-right direction have not yet been confirmed.

(2-2) PLC Grid Layout Process

Figures 1, 16:
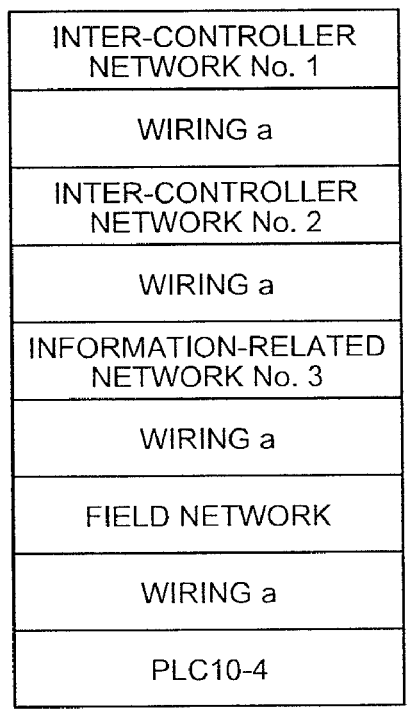
Figures 2, 16:
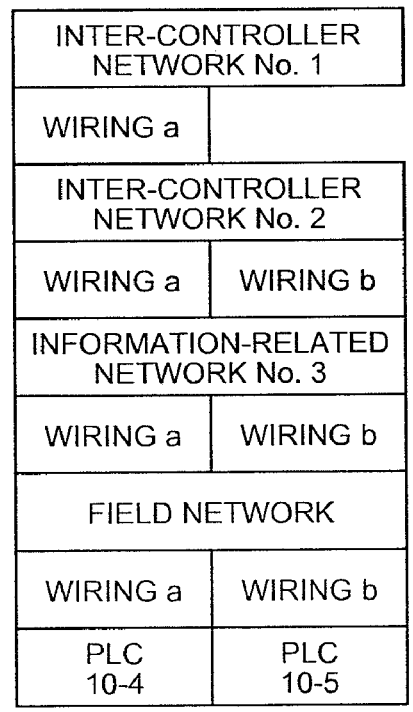
Figures 5, 16:
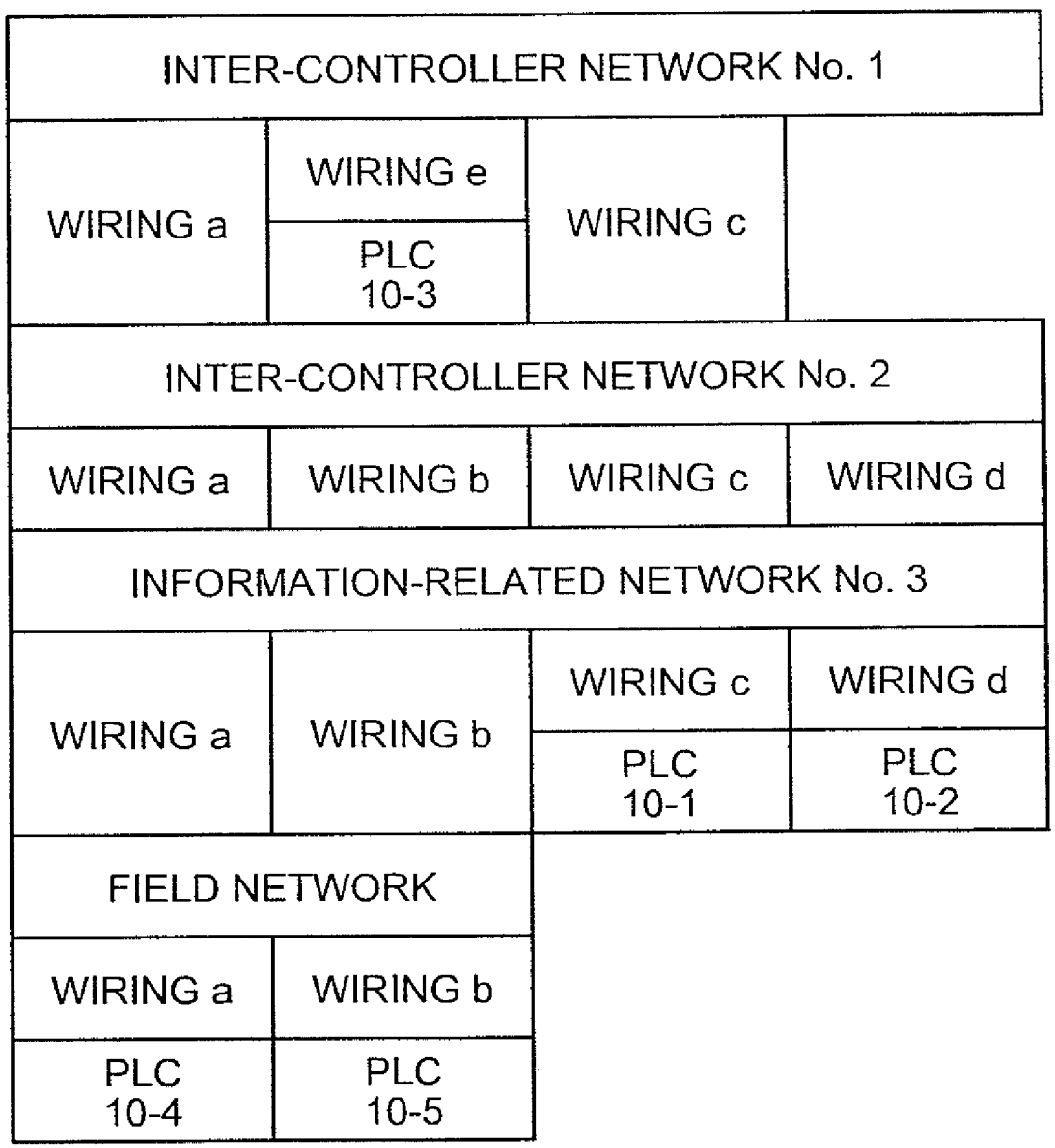

FIGS. 16-1 to 16-5 are drawings of examples of a procedure in the PLC grid layout process. In the following sections, the PLC grid layout process will be explained, with reference to FIGS. 16-1 to 16-5.

First, from the online network configuration information storing unit 116 shown in FIG. 11, the PLC grid layout function 1173 included in the displayed object coordinate calculator 117 extracts the pieces of connected network information P3n, P1n, P4n, P2n, and P5n in each of which the data type is indicated as "PLC network".

Subsequently, based on the extracted pieces of connected network information, the PLCs that are connected to the field network, which is the network laid out in the lowermost position in FIG. 15, are obtained. In the present example, the PLC 10-4 (the connected network information P4n) and the PLC 10-5 (the connected network information P5n) are obtained. Of these PLCs (the PLC 10-4 [a master station] and the PLC 10-5 [a local station 1]), the PLC having the smaller station number should be processed first; however, because the network is a field network, the master station will be processed first, and the local stations will be processed second, according to the station numbers thereof. Accordingly, the process will be performed, starting with the PLC 10-4.

First, a PLC 10-4 grid and a wiring grid are laid out into the most lower-left position possible for the field network grid shown in FIG. 15. As shown in the connected network information P4n in FIG. 11, because the PLC 10-4 is also connected to the inter-controller network No. 1, wiring grids "a" are also laid out from the PLC 10-4 grid to an inter-controller network No. 1 grid. In this situation, the widths of the PLC 10-4 grid, the network grids, and the wiring grids "a" are all equal. The result of this process is shown in FIG. 16-1.

Subsequently, a process is performed on the PLC 10-5, which is a local station. A PLC 10-5 grid and a wiring grid "b" are laid out into the next most lower-left position possible for the field network grid shown in FIG. 16-1. As shown in the connected network information P5n in FIG. 11, because the PLC 10-5 is also connected to the inter-controller network No. 2, wiring grids "b" are also laid out from the PLC 10-5 grid to an inter-controller network No. 2 grid. In this situation, the width of each of the network grids that are positioned above the field network is extended so as to be inclusive of the PLC 10-4 grid and the PLC 10-5 grid. The result of this process is shown in FIG. 16-2. Because there is no other PLCs connected to the field network, the process to lay out the PLC grids and the wiring grids for the field network has thus been completed.

Subsequently, the information-related network No. 3 is selected as a network to be laid out above the field network, and the PLCs (the PLCs 10-1 and 10-2) that connected to the information-related network No. 3 are obtained. In this situation, a PLC grid layout process is performed on the PLC 10-1 (the connected network information P1n; the station number 1) and the PLC 10-2 (the connected network information P2n; the station number 2) that have not yet been laid out. In the present example, the process is performed in the ascending order of the station numbers (i.e., the PLC 10-14 the PLC 10-2).

First, a PLC 10-1 grid and a wiring grid "c" are laid out into the next most lower-left position possible for an information-related network No. 3 grid shown in FIG. 16-2. In this situation, because the wiring grids "a" and "b" for the PLC 10-4 and the PLC 10-5 have already been laid out below the information-related network No. 3, the PLC 10-1 grid and the wiring grid "c" are laid out so as to be positioned on the right of the PLC 10-5.

In this situation, the layout process is performed under the condition that a higher priority is given to layouts according to the station numbers in any network laid out below, so that the layout relationships of the PLC grids that have been laid out below will not be separated. In this situation, at the same time, the wirings to the networks that have been laid out above are also laid out. Thus, there is a possibility that the stations in the network positioned above may not be necessarily laid out according to the station numbers thereof, depending on the circumstances of the layouts that have already been determined.

Also, as shown in the connected network information P1n in FIG. 11, because the PLC 10-1 is also connected to the inter-controller networks No. 2 and No. 1, wiring grids "c" are laid out from the PLC 10-1 grid to the inter-controller network No. 2 grid and to the inter-controller network No. 1 grid. The result of this process is shown in FIG. 16-3.

Next, a layout process is performed on a PLC 10-2 grid, which has the next smallest station number. The PLC 10-2 grid and a wiring grid "d" are laid out into the next most lower-left position possible for the information-related network No. 3 grid shown in FIG. 16-3. In this situation, the wiring grids "a", "b", and "c" for the PLC 10-4 grid, the PLC 10-5 grid, and the PLC 10-1 grid have already been laid out with the information-related network No. 3. Thus, according to the constraints described above, the PLC 10-2 grid and the wiring grid "d" are laid out so as to be positioned on the right of the PLC 10-1. In addition, as shown in the connected network information P2n in FIG. 11, because the PLC 10-2 is also connected to the inter-controller network No. 2, another wiring grid "d" is laid out from the PLC 10-2 grid to the inter-controller network No. 2 grid. The result of this process is shown in FIG. 16-4. Because there is no other PLCs connected to the information-related network No. 3, the process to lay out the PLC grids and the wiring grids for the information-related network No. 3 has thus been completed.

After that, the inter-controller network No. 2 is selected as a network to be laid out above the information-related network No. 3; however, of the PLCs (the PLCs 10-2, 10-1, and 10-5) that are connected to the inter-controller network No. 2, there is no PLC that has not yet been laid out. Accordingly, the inter-controller network No. 1 that is laid out farther above is selected. Of the PLCs (the PLCs 10-3, 10-1, and 10-4) that are connected to the inter-controller network No. 1, the PLC that has not yet been laid out is the PLC 10-3 (the connected network information P3n). Thus, a process to lay out a PLC grid and a wiring grid "e" for the PLC 10-3 is performed. For inter-controller networks, it is normally possible to perform the process according to the station numbers (in the ascending order of the station numbers of the PLCs), regardless of whether the station is a management station or a regular station. However, in the present example, there is only one processing target PLC that is connected to the inter-controller network No. 1 and has not yet been laid out. Thus, the layout process is performed only on the PLC 10-3.

The PLC 10-3 grid and the wiring grid "e" are laid out into the next most lower-left position possible for the inter-controller network No. 1 grid shown in FIG. 16-4. In this situation, the wiring grids "a" and "c" for the PLCs 10-4 and 10-1 have already been laid out with the inter-controller network No. 1. Because grids need to be laid out into the next most lower-left position possible, and the grids positioned between the wiring grid "a" and the wiring grid "c" are open, the PLC 10-3 grid and the wiring grid "e" are laid out into the open grids. The result of this process is shown in FIG. 16-5.

Because there is no other PLCs connected to the inter-controller network No. 1, the process to lay out the PLC grids and the wiring grids for the inter-controller network No. 1 has thus been completed. Also, because the inter-controller network No. 1 is the uppermost network, the PLC grid layout process has thus been completed.

(2-3) Grid Size Calculating Process

The grid size calculating function 1174 included in the displayed object coordinate calculator 117 calculates the size of each of the grids, with respect to the result of the grid layout process shown in FIG. 16-5. In particular, by using the base information stored in the online network configuration information storing unit 116, the grid size calculating function 1174 calculates the size of each of the PLC grids that is required when the corresponding PLC is displayed.

First, the grid size calculating function 1174 calculates the size of each of the PLC grids. In the PLC grid calculating process, it does not matter which PLC is processed first. In the present example, it is assumed that the size of each of the PLC grids is calculated in the following order of the PLC 10-1 to the PLC 10-5.

The grid size calculating function 1174 refers to the base information P1b for the PLC 10-1 stored in the online network configuration information storing unit 116 shown in FIG. 11, extracts the information indicating that there is no add-on base, and calculates the height of the grid as 30. At the same time, the grid size calculating function 1174 extracts the information indicating that the number of slots in the base is "4" from the base information P1b and calculates the width of the grid as 40.

Similarly, for the PLC 10-2, the grid size calculating function 1174 extracts the information indicating that there is no add-on base from the base information P2b and calculates the height of the grid as 30. Also, the grid size calculating function 1174 extracts the information indicating that the number of slots in the base is "3" from the base information P2b and calculates the width of the grid as 30.

For the PLC 10-3, the grid size calculating function 1174 extracts the information indicating that there is an add-on base from the base information P3b and calculates the height of the grid as 60. At the same time, the grid size calculating function 1174 extracts the information indicating that the number of slots in the base is "3" and that the number of slots in the add-on base is "2" z from the base information P3b and calculates the width of the grid as 30 so as to match the size of the base having a bigger size.

For the PLC 10-4, the grid size calculating function 1174 extracts the information indicating that there is no add-on base from the base information P4b and calculates the height of the grid as 30. Also, the grid size calculating function 1174 extracts the information indicating that the number of slots in the base is "4" from the base information P4b and calculates the width of the grid as 40.

Similarly, for the PLC 10-5, the grid size calculating function 1174 extracts the information indicating that there is no add-on base from the base information P5b and calculates the height of the grid as 30. At the same time, the grid size calculating function 1174 extracts the information indicating that the number of slots in the base is "4" from the base information P5b and calculates the width of the grid as 40.

After that, the grid size calculating function 1174 extracts PLC grids that are arranged in the same column in the height direction (the wiring direction), (the PLC grids that should have mutually the same width due to the layout relationships thereof), and configures the widths of the PLC grids so as to be uniformly equal to the PLC grid having the largest width. In the present example, because the PLC 10-3 grid having a width of 30 and the PLC 10-5 grid having a width of 40 are arranged in the same column in the height direction (the wiring direction), the width of the PLC 10-3 grid is changed so as to be equal to the width of the PLC 10-5 grid (i.e., 40), so that the width of the PLC 10-3 grid and the width the PLC 10-5 grid become equal.

After that, the grid size calculating function 1174 calculates the size of each of the wiring grids. In this situation, for each of the wiring grids, the height is configured so as to be a fixed value 10, whereas the width is configured so as to reflect the width of the PLC grid laid out below the wiring grid. Also, in the case where a PLC grid and a wiring grid are laid out so as to be positioned next to another wiring grid in the width direction, said another wiring grid is extended in the height direction to match a length corresponding to the sum of the heights of the PLC grid and the wiring grid.

Further, the grid size calculating function 1174 calculates the size of each of the network grids. In the network grid size calculating process, it does not matter which network is processed first. In the present example, it is assumed that the size of each of the network grids is calculated, starting with the network grid laid out in the upper position.

First, for the inter-controller network No. 1, the height is configured so as to be a fixed value 10, whereas the width is configured so as to be inclusive of the wiring grids "a", "e", and "c" that have been laid out below for the PLCs 10-4, 10-3, 10-1, respectively. More specifically, because the widths of the PLC 10-4 grid, the PLC 10-3 grid, and the PLC 10-1 grid are 40, 40, and 40, respectively, the width of the inter-controller network No. 1 grid is configured so as to be 120 (=40+40+40).

Similarly, for the inter-controller network No. 2, the height is configured so as to be a fixed value 10, whereas the width is configured so as to be inclusive of the wiring grids "b", "c", and "d" that have been laid out below for the PLCs 10-5, 10-1, 10-2, respectively. More specifically, because the widths of the PLC 10-5 grid, the PLC 10-1 grid, and the PLC 10-2 grid are 40, 40, and 30, respectively, the width of the inter-controller network No. 2 grid is configured so as to be 110 (=40+40+30).

Further, for the information-related network No. 3, the height is configured so as to be a fixed value 10, whereas the width is configured so as to be inclusive of the wiring grids "c" and "d" that have been laid out below for the PLCs 10-1 and 10-2, respectively. More specifically, because the widths of the PLC 10-1 grid and the PLC 10-2 grid are 40 and 30, respectively, the width of the information-related network No. 3 grid is configured so as to be 70 (=40+30).

Similarly, for the field network, the height is configured so as to be a fixed value 10, whereas the width is configured so as to be inclusive of the wiring grids "a" and "b" that have been laid out below for the PLCs 10-4 and 10-5, respectively. More specifically, because the widths of the PLC 10-4 grid and the PLC 10-5 grid are 40 and 40, respectively, the width of the field network grid is configured so as to be 80 (=40+40).

Figure 17:
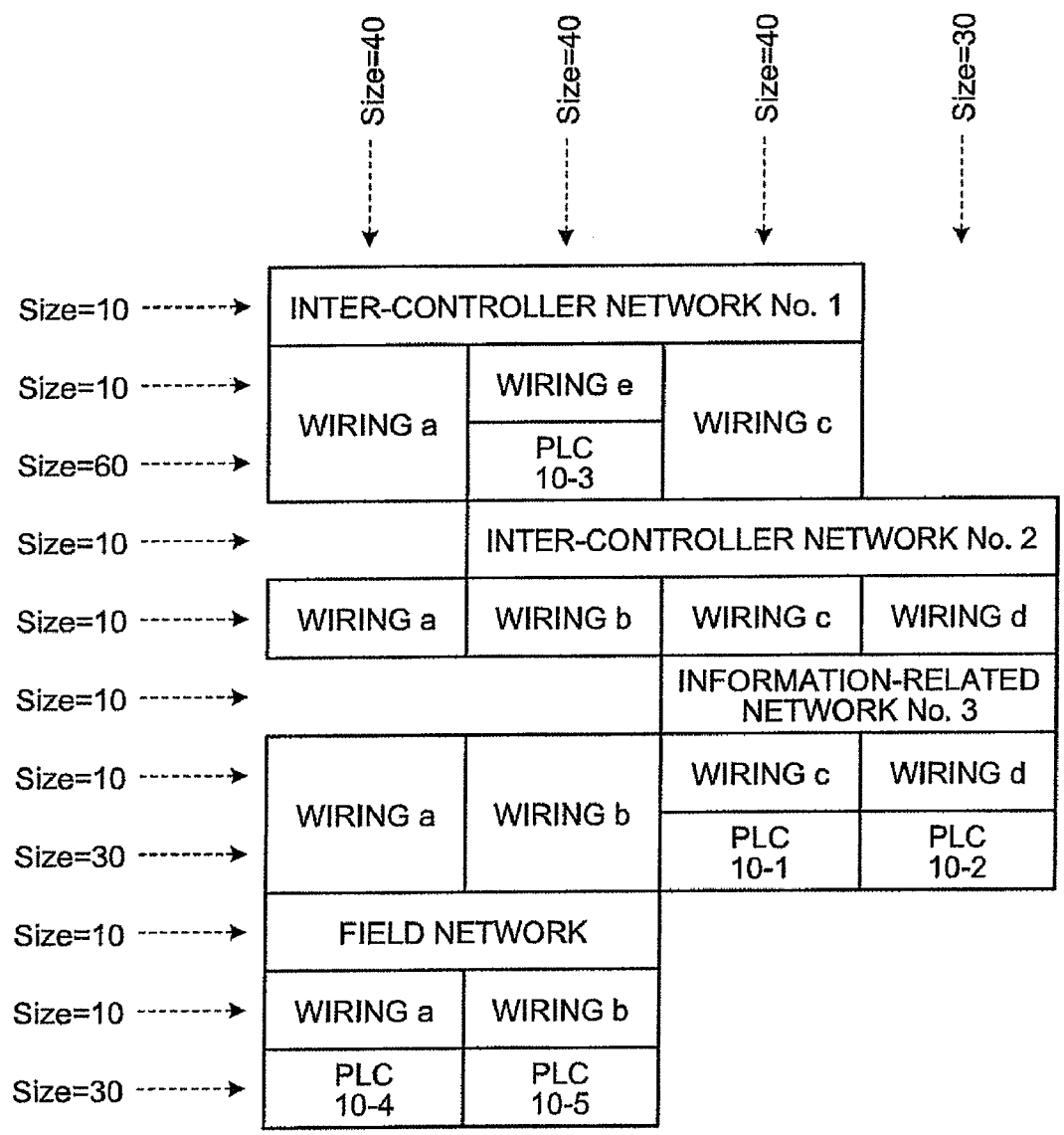
FIG. 17 is a drawing of an example of a result of the grid size calculating process.

FIG. 17 is a drawing of an example of a result of the grid size calculating process. The result shown in FIG. 17 is obtained by writing the results of the processes described above into the result of the grid layout process shown in FIG. 16-5. The result shown in FIG. 17 is stored into the grid model storing function 1171. The grid size calculating process has thus been completed.

(2-4) Grid Coordinate Calculating Process

The grid coordinate calculating function 1175 included in the displayed object coordinate calculator 117 reads the grid model including the results of the grid size calculating processes that has been stored in the grid model storing function 1171 and performs the process to calculate the grid coordinates by sequentially adding each of the grid sizes, starting from the upper left of the grid model.

Figure 18:
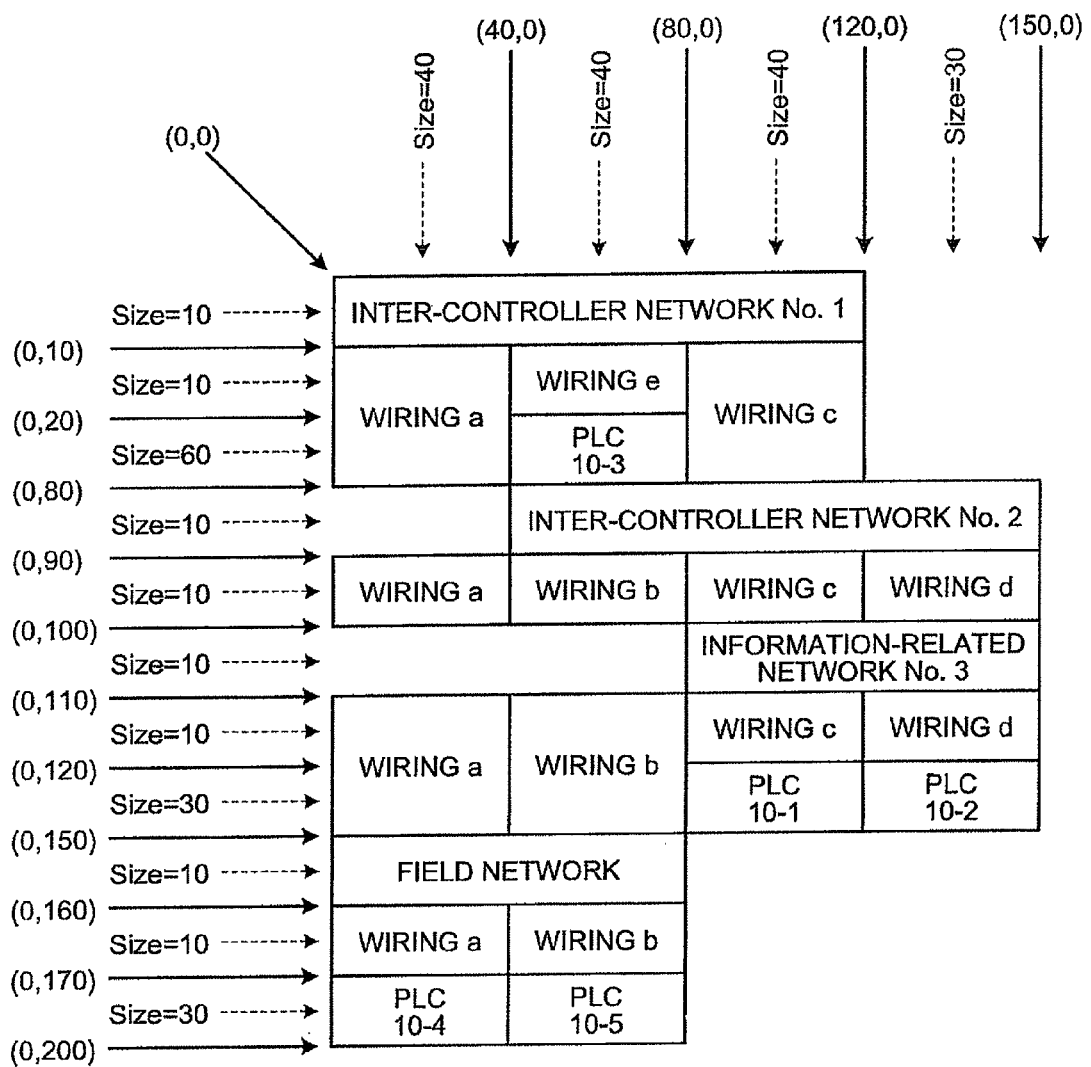
FIG. 18 is a drawing of an example of a result of the grid coordinate calculating process.

More specifically, the grid coordinate calculating function 1175 configures the coordinates of the upper left corner of the grid model shown in FIG. 17 that has been read, so as to be (0, 0) and calculates the coordinates of each of the grids by adding the size of the corresponding grid to the coordinate position. FIG. 18 is a drawing of an example of a result of the grid coordinate calculating process. The result shown in FIG. 18 is obtained by configuring the coordinates of the upper left corner so as to be (0, 0) and adding the size of each of the grids thereto, within the grid model FIG. 17. In the example shown in FIG. 18, the right direction from the origin of the coordinate axes corresponds to the positive direction on the x axis, whereas the downward direction from the origin of the coordinate axes corresponds to the positive direction on the y axis.

<System Configuration Displaying Process>

Figure 19:
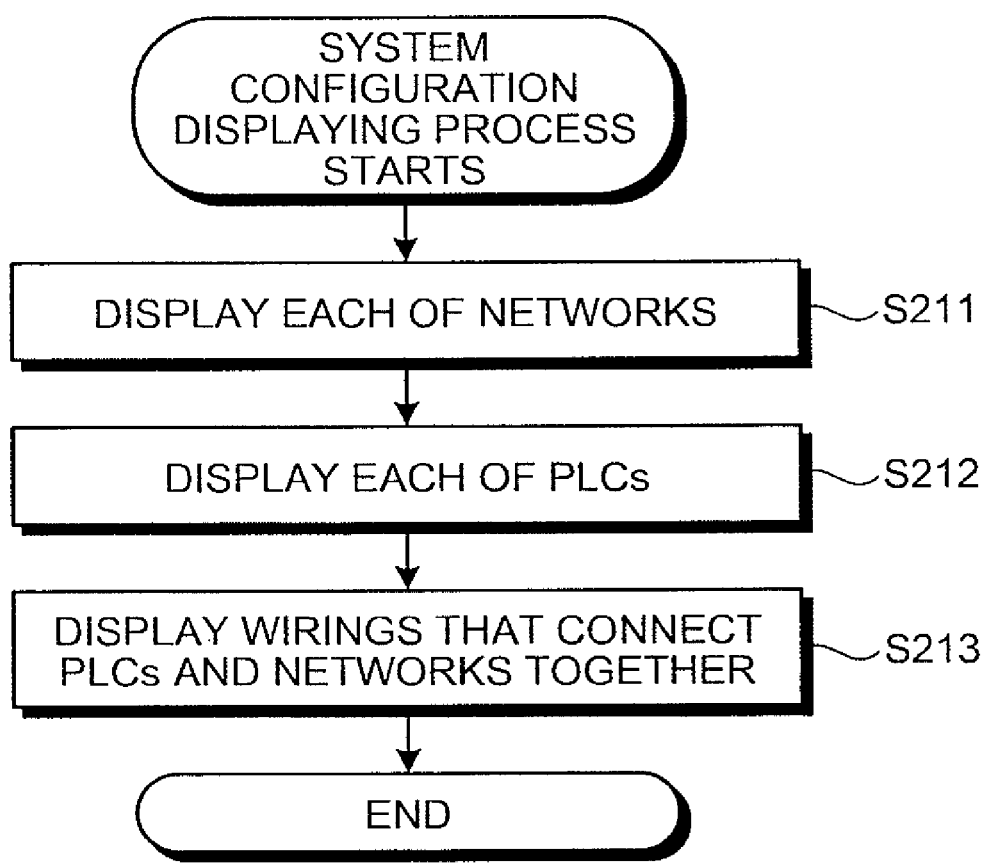
FIG. 19 is a flowchart of an example of a procedure in a system configuration displaying process.

FIG. 19 is a flowchart of an example of a procedure in a system configuration displaying process. First, the system configuration display unit 118 extracts the network grids from the grid model having the grid coordinates that have been calculated by the displayed object coordinate calculator 117 and displays each of the networks based on the coordinate position thereof (step S211). In this situation, a predetermined position in an area on the display unit 112 in which the system configuration is to be displayed is configured so as to correspond to the origin of the coordinate axes (0, 0) in the grid model, so that the networks are rendered based on the grid coordinates in the grid model, starting from the point. It is assumed that the networks are rendered with lines. The name of each of the networks is also displayed.

Subsequently, the system configuration display unit 118 extracts the PLC grids from the grid model and displays each of the PLC grids based on the coordinate position thereof (step S212). As for each of the PLC grids, a rectangular object is laid out based on coordinate information (or size information) included in the grid model. Also, in this situation, based on the base information of each of the PLCs, the system configuration display unit 118 performs a process to display the units installed in the slots of the base in divided areas, respectively, and to display the name of each of the units in a corresponding one of the divided areas.

After that, the system configuration display unit 118 displays lines (i.e., the wirings) that connect the PLCs and the networks together (step S213). This process is performed by connecting the communication units of the PLCs and the networks connected to the communication units together by using lines, based on the base information stored in the online network configuration information storing unit 116. The system configuration displaying process has thus been completed. Accordingly, the system configuration information that has been created by the system configuration display unit 118 is displayed on the display unit 112.

Figure 20:
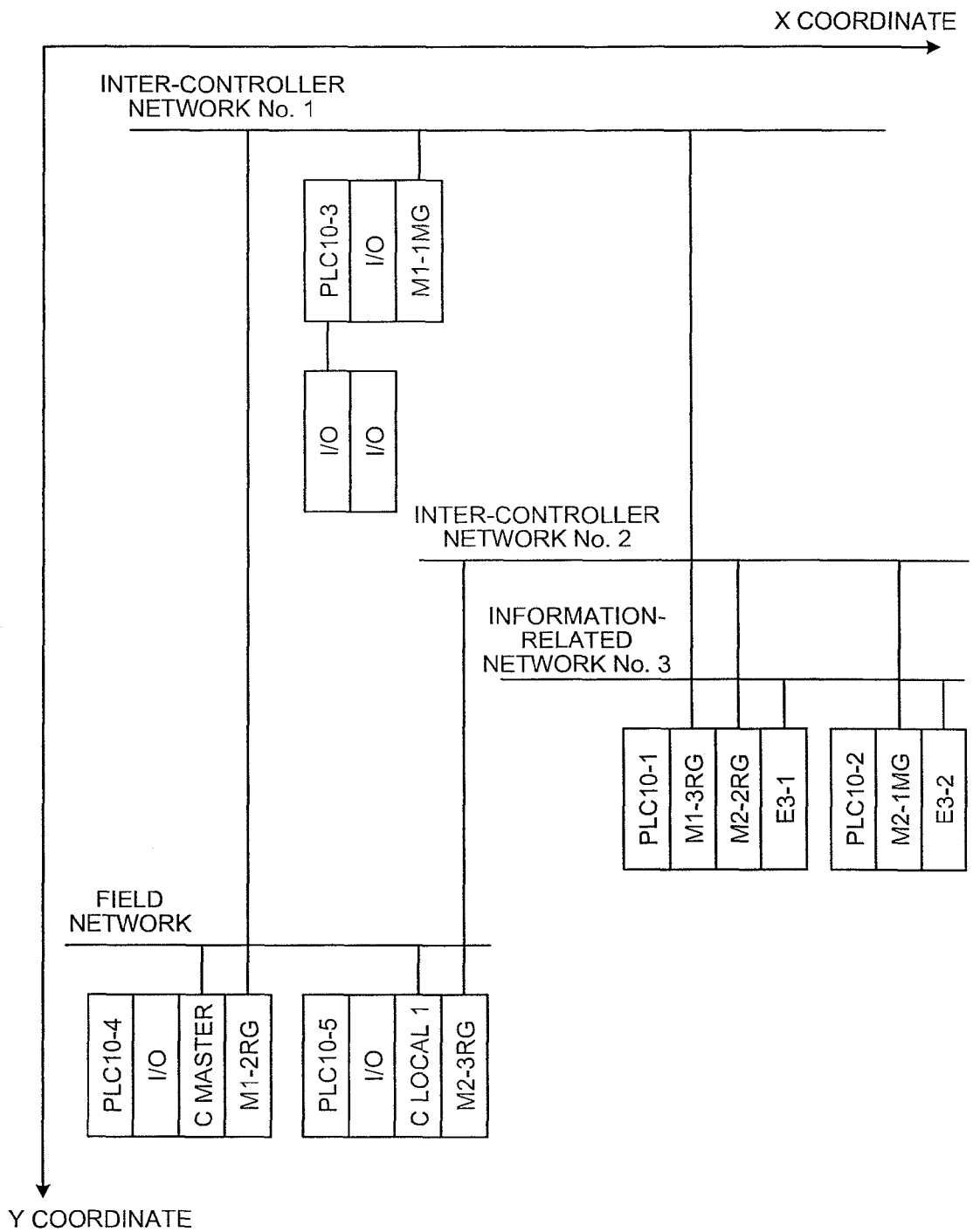
FIG. 20 is a drawing of an example of system configuration information displayed by a display unit as a result of the system configuration displaying process.

FIG. 20 is a drawing of an example of the system configuration information displayed by the display unit as a result of the system configuration displaying process. In the example shown in FIG. 20, in each of the communication units of the PLCs, a character string indicating one letter denoting the network type, the network number, the station number in the network, and letters denoting whether the station is a management station (a master station) or a regular station (a local station) is displayed, so that it is possible to easily recognize network parameters.

Also, when the project information stored in each of the PLCs is read, if a status (an operational condition or diagnosis information) of the PLC is also read, it is possible to display the status so as to be superimposed onto the display of the system configuration shown in FIG. 20.

According to the first embodiment, the network connection relationships and the PLC layout relationships that are within the analyzable range are automatically displayed in a graphic manner, by using the network configuration information that has been collected from the PLCs included in the actual control system. Thus, an advantageous effect is achieved where it is possible to reduce the human labor required in creation of a drawing such as a network system configuration diagram. In addition, another advantageous effect is achieved where it is possible to easily understand the entirety of the system configuration of the networks and the PLCs included in the control system for, for example, a production facility.

Further, because each of the wirings is always laid out in an upward direction from a PLC, it is possible to easily recognize how many PLCs belong to which network. Thus, another advantageous effect is achieved where it is possible to easily understand the entirety of the system configuration of the networks and the PLCs included in the control system and to understand the status thereof.

In the explanation above, the control system engineering apparatus 100 configured with, for example, a personal computer is connected to the PLC 10 included in the control system. However, another arrangement is acceptable in which the functions of the control system engineering apparatus 100 are included in a display device that is connected to a programmable controller and on which it is possible to establish settings for the operational state of the control system and for the control system. With this arrangement, it is possible to display, on the screen of the display device, the entirety of the system configuration of the networks and the PLCs included in the control system.

Figure 21:
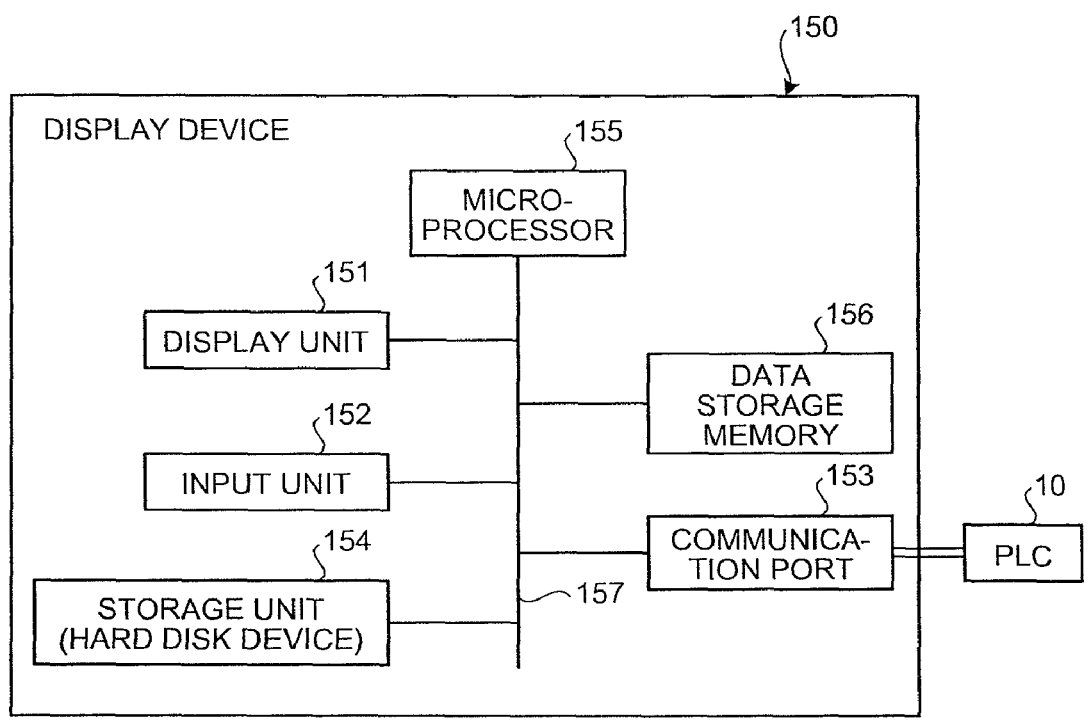
FIG. 21 is a block diagram of a hardware configuration of a display device having functions of a control system engineering apparatus.

FIG. 21 is a block diagram of a hardware configuration of a display device having the functions of a control system engineering apparatus. A display device 150 is configured in such a manner that the following elements are connected to a bus 157 in the display device 150: a display unit 151 for displaying a predetermined screen; an input unit 152 that is configured with touch keys or the like; a communication port 153 for communicating with a PLC 10; a storage unit 154 that is configured with, for example, a hard disk device, and stores therein data (i.e., a display screen computer program) that has been set by the display device 150; a microprocessor 155 for performing a process of displaying data on the display unit 151 (i.e., a process to execute the display screen computer program and display the predetermined screen and a process to set and manage the system configuration); and a data storage memory 156 for storing therein temporary data related to those processes. In the case where the input unit 152 is configured with a touch panel screen, the input unit 152 and the display unit 151 are configured so as to be one unit.

With this arrangement, there is no need to provide a separate information processing terminal that causes the control system engineering apparatus 100 to operate and to connect the information processing terminal to a PLC 10. As a result, it is possible to easily understand the configuration and the status of the entirety of the system on the display device 150 included in the control system.

Second Embodiment

In the first embodiment, the network grids are laid out according to the order of the numbers assigned to the networks, whereas the PLC grids are laid out in the ascending order of the station numbers within each selected network. In contrast, in a second embodiment of the present invention, a control system engineering apparatus and a control system engineering method with which it is possible to automatically calculate and to display a layout that is not simply based on the order of the numbers but makes it easy to understand the entirety of the system configuration of the networks and the PLCs included in the control system will be explained.

Figures 1, 22:
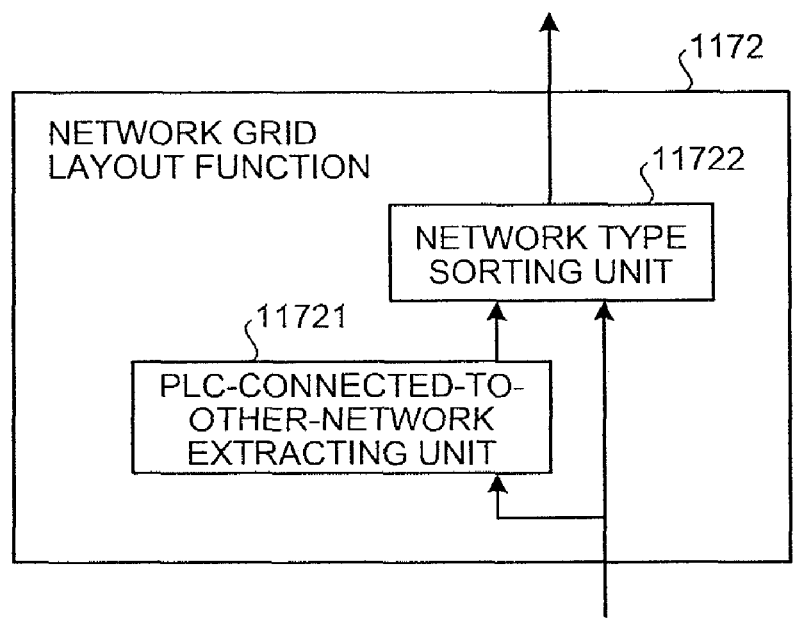
Figures 2, 22:
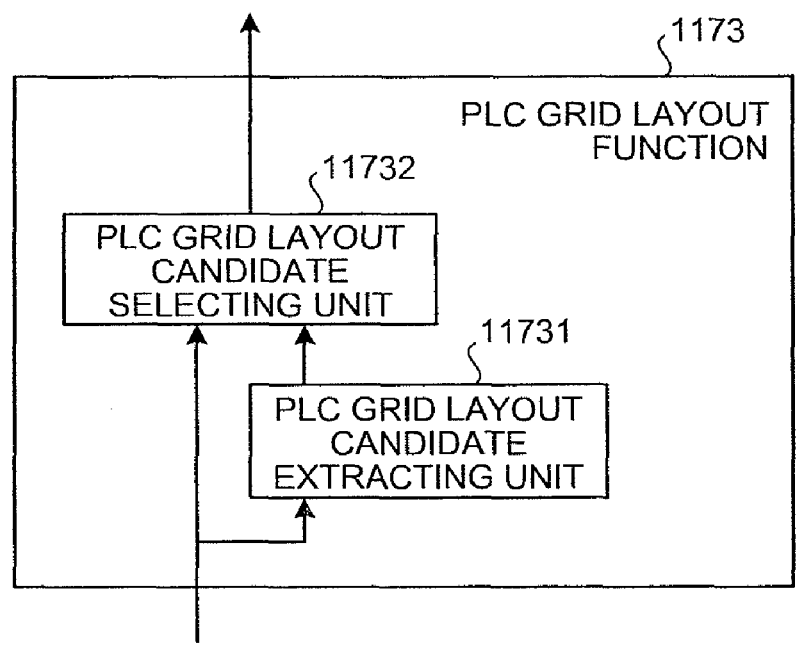

FIG. 22-1 is a schematic block diagram of a functional configuration of a network grid layout function included in a control system engineering apparatus according to an aspect of the present invention. Similarly, FIG. 22-2 is a schematic block diagram of a functional configuration of a PLC grid layout function according to the aspect of the present invention.

As shown in FIG. 22-1, the network grid layout function 1172 includes a PLC-connected-to-other-network extracting means 11721 that extracts, from among PLCs that are connected to one network, one or more PLCs each of which is also connected to one or more other networks; and a network type sorting means 11722 that sorts the networks into an optimal layout that makes it easy to understand the entire configuration of the control system by laying out the networks according to the following rules: (i) the higher the degree of a network being relevant to the field network is, the lower position the network is laid out in; and (ii) the higher the degree of a network being relevant to the information-related network 21 is, the higher position the network is laid out in.

In this situation, the degree of being relevant to the field network is determined as follows: Of the PLCs belonging to one network, the larger the number of PLCs belonging also to the field network is (or the higher the percentage of the PLCs belonging also to the field network is), the higher the degree of being relevant to the field network is. Similarly, the degree of being relevant to the information-related networks is determined as follows: Of the PLCs belonging to one network, the larger the number of PLCs belonging also to one or more information-related networks is (or the higher the percentage of the PLCs belonging also to one or more information-related networks is), the higher the degree of being relevant to the information-related networks is.

Further, as shown in FIG. 22-2, the PLC grid layout function 1173 includes: a PLC grid layout candidate extracting means 11731 that extracts layout candidates each of which will not separate the positional relationships of the PLCs that have already been laid out with the networks positioned below a selected network; and a PLC grid layout candidate selecting means 11732 that selects, out of the candidates, an optimal layout in which the PLCs are positioned closest to each other and best fit the order according to the station numbers thereof. The other constituent elements are the same as those in the first embodiment. Thus, the explanation thereof will be omitted.

Next, a procedure in the process according to the second embodiment will be explained. In a control system engineering process according to the second embodiment, the process is the same as the process in the first embodiment up to the step at which the data (the PLC data) of the network configuration information that has been collected by the online network configuration information collecting unit 114 is stored into the online network configuration information storing unit 116. However, the second embodiment is different from the first embodiment in terms of the process shown in FIG. 14-2 in which the displayed object coordinate calculator 117 performs the network grid layout process and the process shown in FIG. 14-3 in which the displayed object coordinate calculator 117 performs the PLC grid layout process, on the data of the network configuration information. Thus, in the following sections, a network grid layout process and a PLC grid layout process will be explained. Because the other processes are the same, the explanation thereof will be omitted.

(1) Overview of the Process (1-1) Network Grid Layout Process

It is an object of the second embodiment to configure the wirings for the networks in system configuration information to be created (or displayed) so as to intersect one another as little as possible. Thus, the second embodiment is characterized by laying out network grids and PLC grids according to Rules A to D listed below by giving priority thereto in the stated order.

A. In a system configuration of networks and PLCs included in a control system, the purposes of use of information-related networks such as Ethernets (a registered trademark), inter-controller networks, and field networks are clear. In other words, information-related networks are positioned in upper positions of the system, whereas inter-controller networks are positioned in middle positions of the system, and field networks are positioned in lower positions of the system. Accordingly, in the second embodiment, the networks are laid out according to that order.

B. The PLCs that are connected to mutually the same network are laid out so as to be positioned close to one another. In particular, for networks positioned in lower positions, it is often the case that one network forms one cell. Thus, the PLCs that are connected to mutually the same lower-position network are laid out so as to be positioned close to one another. In this situation, the "cell" denotes a group of PLCs obtained by, for example, classifying the processes in the control system according to the functions thereof. For example, in the case where the control system can be divided into steps such as a material applying step, an exposure step, a washing step, and the like, a group of apparatuses that perform the process at each of the steps is referred to as one cell.

C. It is often the case that each of the PLCs that are connected to an upper-position network plays a role of a self-controller. Thus, there is no need to lay out such PLCs so as to be positioned close to one another.

D. The networks and the PLCs are laid out according to the network numbers and the station numbers thereof.

Figures 1, 23:
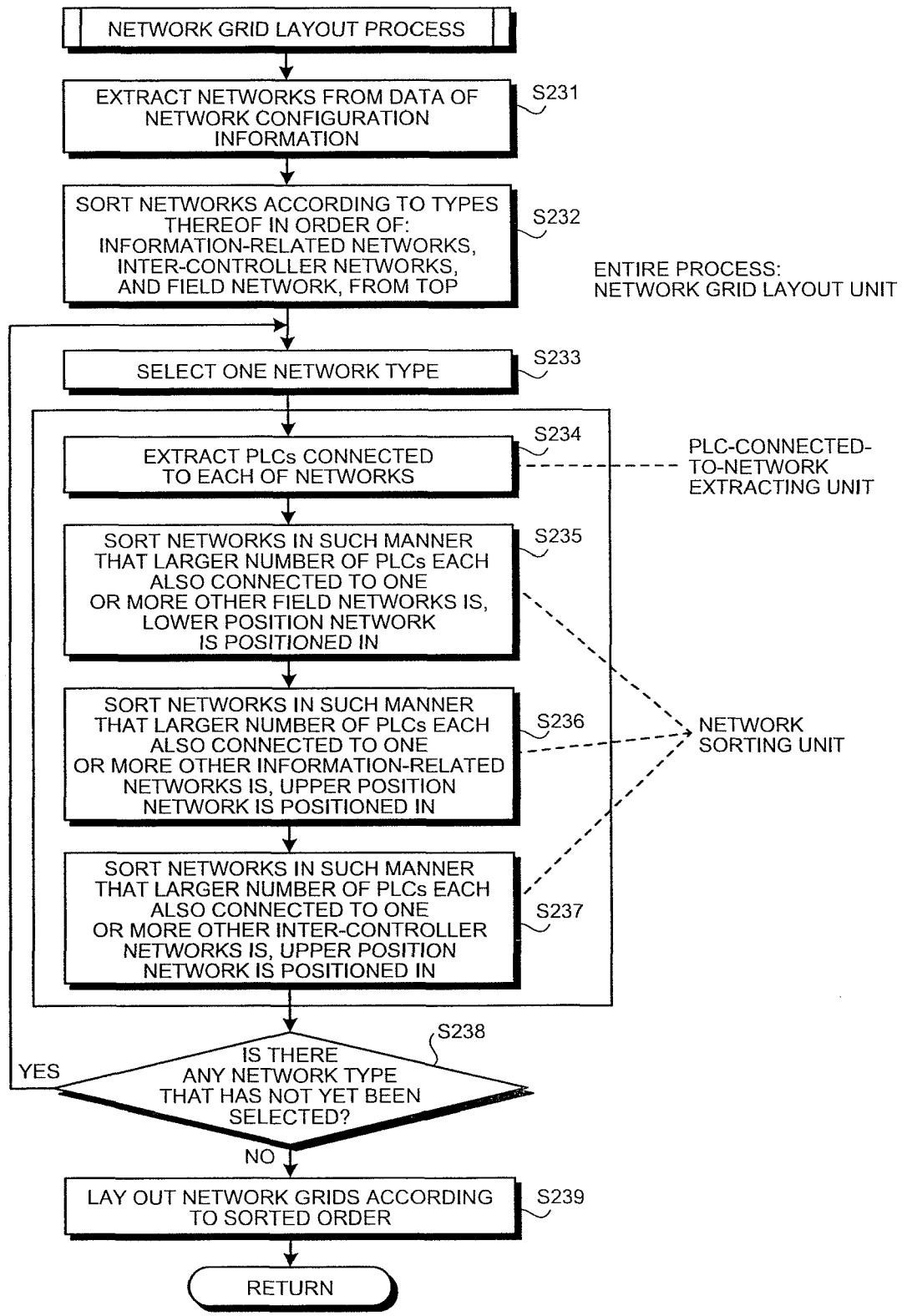
Figures 2, 23:
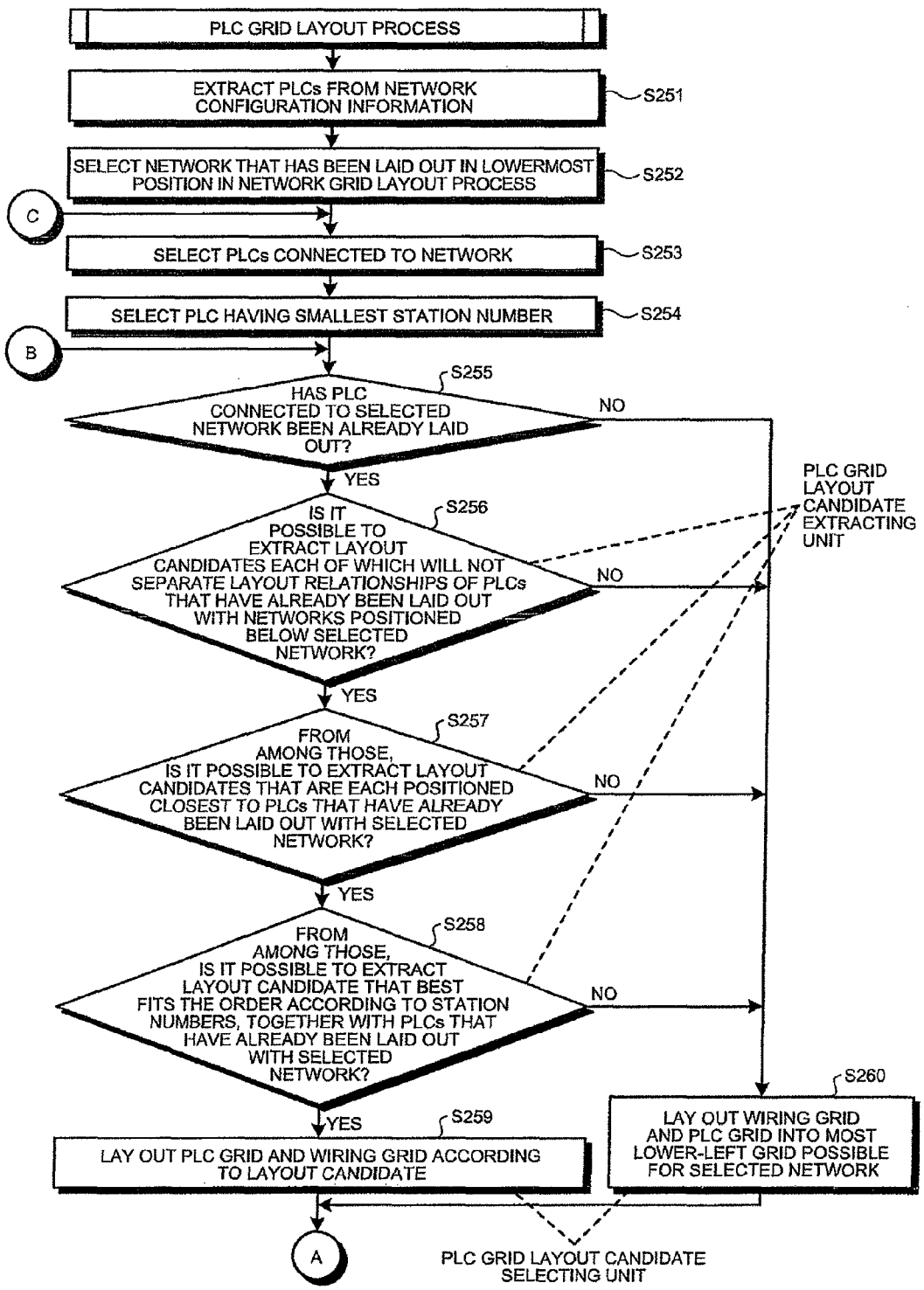
Figures 3, 23:
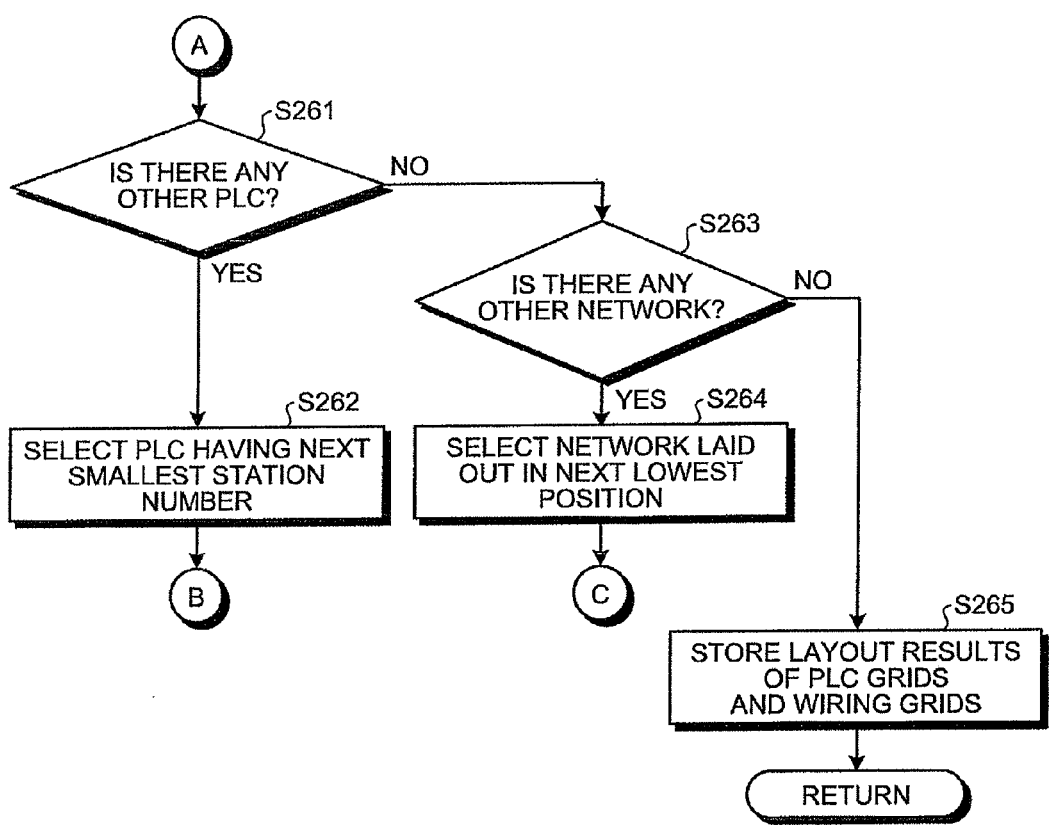

FIG. 23-1 is a flowchart of an example of a procedure in the network grid layout process according to the second embodiment. First, the network grid layout function 1172 refers to the network data stored in the online network configuration information storing unit 116 and extracts the networks (step S231). Subsequently, the extracted networks are sorted based on the types thereof and according to the Rule A listed above, in the following order from the top: information-related networks, inter-controller networks, and field networks (step S232).

After that, of the types of networks used in the sorting process, one network type is selected (step S233). Further, the PLC-connected-to-other-network extracting means 11721 extracts the PLCs that are connected to each of the networks of the selected network type (step S234).

After that, for each of the networks, the network type sorting means 11722 counts the number of PLCs each of which is also connected to one or more other field networks and lays out the networks in such a manner that the larger the number of PLCs each of which is connected to one or more other field networks is, the lower position the network is positioned in (step S235).

Subsequently, for each of the networks, the network type sorting means 11722 counts the number of PLCs each of which is also connected to one or more other information-related networks and lays out the networks in such a manner that the larger the number of PLCs each of which is connected to one or more other information-related networks is, the upper position the network is positioned in (step S236).

Lastly, for each of the networks, the network type sorting means 11722 counts the number of PLCs each of which is also connected to one or more other inter-controller networks and lays out the networks in such a manner that the larger the number of PLCs each of which is connected to one or more other inter-controller networks is, the upper position the network is positioned in (step S237). As explained above, the process is performed so as to sort the networks for each of the network types.

After that, it is judged whether there is any other network type that has not yet been selected (step S238). In the case where there is at least one other network type that has not yet been selected (step S238: Yes), the process returns to step S233. The processes described above are repeatedly performed until there is no other network type that has not yet been selected.

In contrast, in the case where there is no other network type that has not yet been selected (step S238: No), the network grid layout function 1172 lays out the network grids according to the sorted order (step S239) and stores the result into the grid model storing function 1171. The network grid layout process has thus been completed.

(1-2) PLC Grid Layout Process

FIGS. 23-2 to 23-3 are flowcharts of an example of a procedure in the PLC grid layout process according to the second embodiment. The PLC grid layout function 1173 extracts the PLCs from the base information stored in the online network configuration information storing unit 116 (step S251). Subsequently, the PLC grid layout function 1173 selects the network that is laid out in the lowermost position as a result of the network grid layout process shown in FIG. 23-1 (step S252). After that, the PLC grid layout function 1173 selects the PLCs that are connected to the selected network (step S253) and selects the PLC having the smallest station number out of the selected PLCs (step S254).

The PLC grid layout function 1173 then judges whether the PLC connected to the selected network has already been laid out (step S255). In the case where the PLC connected to the selected network has not yet been laid out (step S255: No), the PLC grid layout candidate selecting means 11732 lays out, with respect to the extracted PLC, a wiring grid and the PLC grid into the most lower-left grid possible for the selected network (step S260).

In contrast, at step S255, in the case where the PLC connected to the selected network has already been laid out (step S255: Yes), the PLC grid layout candidate extracting means 11731 judges whether it is possible to extract layout candidates each of which will not separate the positional relationships of the PLCs that have already been laid out with the networks positioned below the selected network (step S256).

In the case where it is not possible to extract any layout candidates that will not separate the positional relationships of the PLCs that have already been laid out with the networks positioned below the selected network (step S256: No), the PLC grid layout candidate selecting means 11732 lays out the wiring grid and the PLC grid into the most lower-left grid possible for the selected network (step S260).

In contrast, at step S256, in the case where it is possible to extract the layout candidates each of which will not separate the positional relationships of the PLCs that have already been laid out with the networks positioned below the selected network (step S256: Yes), the PLC grid layout candidate extracting means 11731 judges whether it is possible to extract, from those candidates, layout candidates that are each positioned closest to the PLCs that have already been laid out with the selected network (step S257).

In the case where it is not possible to extract any layout candidates that are each positioned closest to the PLCs that have already been laid out with the selected network (step S257: No), the PLC grid layout candidate selecting means 11732 lays out the wiring grid and the PLC grid into the most lower-left grid possible for the selected network (step S260).

In contrast, in the case where, at step S257, it is possible to extract layout candidates that are each positioned closest to the PLCs that have already been laid out with the selected network (step S257: Yes), the PLC grid layout candidate extracting means 11731 judges whether it is possible to extract, from those layout candidates, a layout candidate that will best fit the order according to the station numbers, together with the PLCs that have already been laid out with the selected network (step S258).

In the case where it is not possible to extract any layout candidate that will best fit the order according to the station numbers, together with the PLCs that have already been laid out with the selected network (step S258: No), the PLC grid layout candidate selecting means 11732 lays out the wiring grid and the PLC grid into the most lower-left grid possible for the selected network (step S260).

In contrast, in the case where, at step S258, it is possible to extract a layout candidate that will best fit the order according to the station numbers, together with the PLCs that have already been laid out with the selected network (step S258: Yes), the layout candidate is selected so that the PLC grid layout candidate selecting means 11732 lays out the wiring grid and the PLC grid according to the selected layout candidate (step S259).

After that or after the process at step S260 is performed, it is judged whether there is any other PLC that is connected to the network that has been selected at step S252 (step S261). In the case where there is at least one other PLC (step S261: Yes), the PLC having the next smallest station number is selected (step S262), and the process returns to step S255. The same process is repeatedly performed until there is no unselected PLC connected to the network that has been selected at step S252.

In contrast, at step S261, in the case where there is no other PLC (step S261: No), it is judged whether there is any other network (step S263). In the case where there is at least one other network (step S263: Yes), the network that is laid out in the next lowest position as a result of the network grid layout process is selected (step S264) and the process returns to step S253 so that the processes described above are repeatedly performed until PLC grids and wiring grids are laid out for the network that is laid out in the uppermost position. In contrast, in the case where there is no other network (step S263: No), the results of laying out the PLC grids and the wiring grids are stored into the grid model storing function 1171 (step S265). The PLC grid layout process has thus been completed.

(2) Specific Examples of the Process

In the explanation above, the overview of the process to lay out the network grids and the PLC grids is described. In the following sections, specific examples of the process will be explained by using the control system configured as shown in FIG. 1 as an example. In the present example, it is assumed that the grid layout process is performed by using the connection path information shown in FIG. 10 and the network configuration information shown in FIG. 11.

(2-1) Network Grid Layout Process

First, from the network configuration information shown in FIG. 11 that is stored in the online network configuration information storing unit 116, the pieces of network data M1, M2, C, and E3 for the inter-controller network No. 1, the inter-controller network No. 2, the field network, and the information-related network No. 3 in each of which the data type is indicated as "network" are extracted.

Subsequently, the extracted networks are sorted based on the network types thereof according to the rules described above. More specifically, the networks are sorted in the following order: the information-related network No. 3, the inter-controller network No. 1, the inter-controller network No. 2, and the field network. As for inter-controller networks, there are two networks that are namely the inter-controller network No. 1 and the inter-controller network No. 2. Thus, the inter-controller networks are sorted according to the network numbers thereof at this time, and the order of these inter-controller networks will be further sorted later.

First, the PLC-connected-to-other-network extracting means 11721 refers to the network data M1 stored in the online network configuration information storing unit 116 and extracts the PLCs that are connected to the inter-controller network No. 1. As a result, the PLC-connected-to-other-network extracting means 11721 obtains the PLCs 10-3, 10-1, and 10-4. Similarly, the PLC-connected-to-other-network extracting means 11721 extracts the PLCs that are connected to the inter-controller network No. 2. As a result, the PLC-connected-to-other-network extracting means 11721 obtains the PLCs 10-2, 10-1, and 10-5.

In this situation, of the extracted PLCs, the number of PLCs each of which is also connected to one or more other field networks is counted. Of the extracted PLCs, the PLCs that are each also connected to the field network are the PLCs 10-4 and 10-5. Accordingly, the number of PLCs each of which is also connected to one or more other field networks is one (i.e., the PLC 10-4) with regard to the inter-controller network No. 1 and is one (i.e., the PLC 10-5) with regard to the inter-controller network No. 2. The network type sorting means 11722 is configured so as to sort the networks in such a manner that the larger the number of PLCs each of which is also connected to one or more other field networks 23 is, the lower position the network is positioned in; however, in the present example, according to this criterion, it is not possible to sort the inter-controller network No. 1 and the inter-controller network No. 2, because the numbers of PLCs that have been counted are equal to each other.

After that, of the extracted PLCs, the number of PLCs each of which is also connected to one or more other information-related networks is counted. Of the extracted PLCs, the PLCs that are each also connected to the information-related network are the PLCs 10-1 and 10-2. Accordingly, the number of PLCs each of which is also connected to one or more other information-related networks is one (i.e., the PLC 10-1) with regard to the inter-controller network No. 1 and is two (i.e., the PLCs 10-1 and 10-2) with regard to the inter-controller network No. 2. The network type sorting means 11722 is configured so as to sort the networks in such a manner that the larger the number of PLCs each of which is also connected to one or more other information-related networks is, the upper position the network is positioned in. In the present example, according to this criterion, the inter-controller network No. 2 is sorted so as to be positioned above the inter-controller network No. 1.

As a result of the process described above, the sorting process has been completed. Thus, in the present example, it is not necessary to sort the networks based on the number of PLCs each of which is connected to one or more other inter-controller networks.

After that, the network grid layout function 1172 lays out the network grids according to the sorted order, and stores the result into the grid model storing function 1171. FIG. 24 is a drawing of a result of the network grid layout process according to the second embodiment.

(2-2) PLC Grid Layout Process

Figures 1, 25:
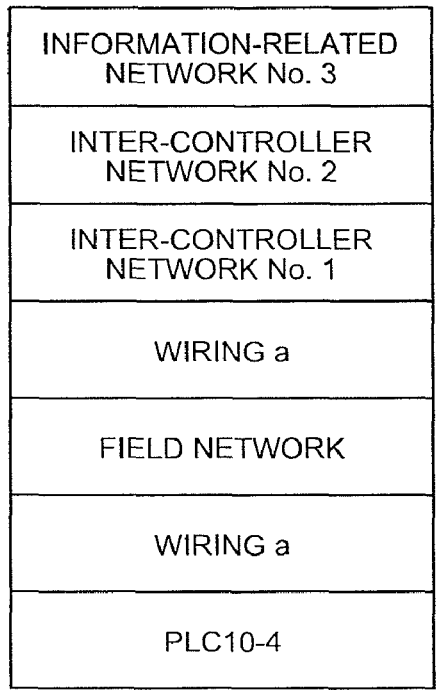
Figures 2, 25:
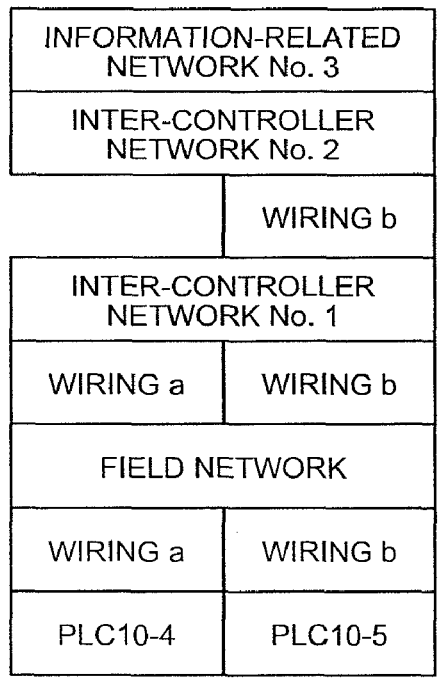
Figures 3, 25:
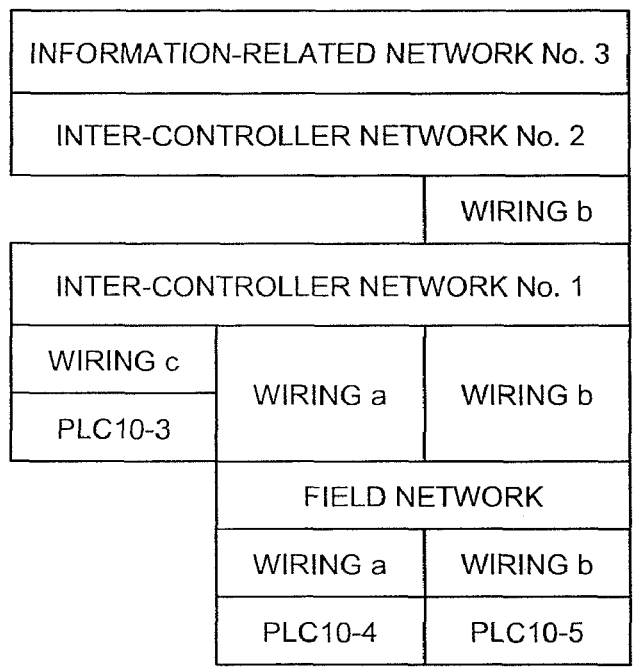
Figures 4, 25:
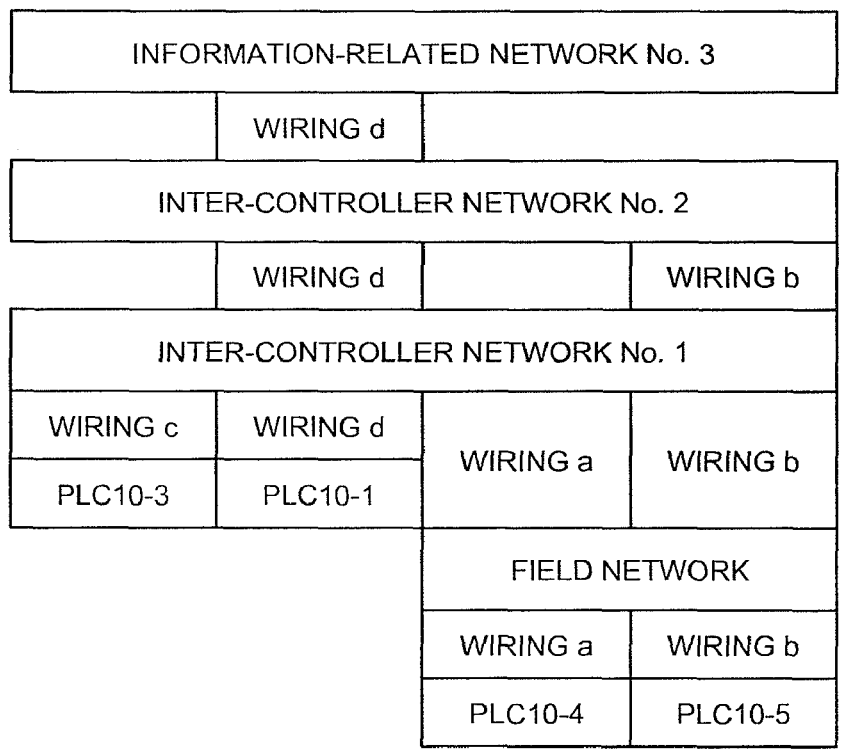
Figures 5, 25:
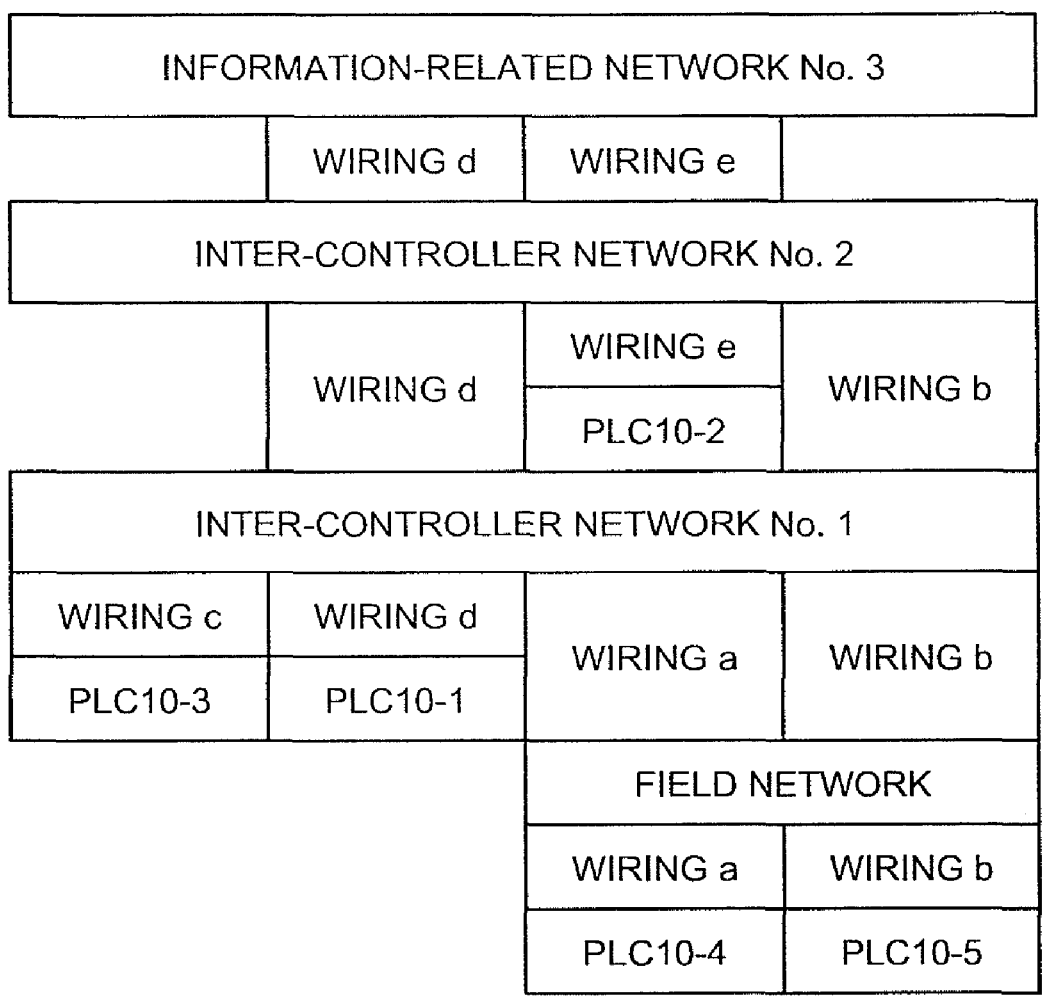

FIGS. 25-1 to 25-5 are drawings of examples of a procedure in the PLC grid layout process according to the second embodiment. In the following sections, the PLC grid layout process will be explained, with reference to FIGS. 25-1 to 25-5.

First, from the online network configuration information storing unit 116 shown in FIG. 11, the PLC grid layout function 1173 included in the displayed object coordinate calculator 117 extracts the pieces of connected network information P3n, P1n, P4n, P2n, and P5n in each of which the data type is indicated as "PLC network".

Subsequently, based on the extracted pieces of connected network information, the PLCs that are connected to the field network, which is the network laid out in the lowermost position in FIG. 24, are extracted. In the present example, the PLC-10 (the connected network information P4n) and the PLC 10-5 (the connected network information P5n) are obtained. Of these PLCs (i.e., the PLC 10-4 [a master station] and the PLC 10-5 [a local station 1]), the PLC having the smaller station number should be processed first; however, because the network is a field network, the master station will be processed first, and the local stations will be processed second, according to the station numbers thereof. Accordingly, the process will be performed in the following order: the PLC 10-44 the PLC 10-5.

First, a PLC 10-4 grid and a wiring grid "a" are laid out into the most lower-left position possible for the field network grid shown in FIG. 24. As shown in the connected network information P4n in FIG. 11, because the PLC 10-4 is also connected to the inter-controller network No. 1, another wiring grid "a" is laid out from the PLC 10-4 grid to the inter-controller network No. 1 grid. In this situation, the widths of the PLC 10-4 grid, the network grids, and the wiring grids "a" are all equal. The result of this process is shown in FIG. 25-1.

Subsequently, a process is performed on the PLC 10-5, which is a local station. A PLC 10-5 grid and a wiring grid "b" are laid out into the next most lower-left position possible for the field network grid shown in FIG. 25-1. In this situation, the wiring grid "a" for the PLC 10-4 has already been laid out with the field network grid. Thus, the layout candidates for the PLC 10-5 each of which will not separate the positional relationships of the PLCs that have already been laid out with the networks positioned below the network are "to the left of the PLC 10-4" and "to the right of the PLC 10-4". In either one of the layout candidates, the PLC 10-5 will be positioned closest to the PLC 10-4, which is connected to the field network. Of these layout candidates, the PLCs will be laid out according to the station numbers thereof when the PLC 10-5 is laid out so as to be positioned "to the right of the PLC 10-4", because the PLC 10-4 is a master station and the PLC 10-5 is a local station of which the station number is 1. Accordingly, a PLC 10-5 grid and a wiring grid "b" are laid out in that position.

As shown in the connected network information in FIG. 11, because the PLC 10-5 is also connected to the inter-controller network No. 2, wiring grids "b" are also laid out from the PLC 10-5 grid to the inter-controller network No. 2 grid. In this situation, the width of each of the network grids that are positioned above the field network grid is extended so as to be inclusive of the PLC 10-4 grid and the PLC 10-5 grid. The result of this process is shown in FIG. 25-2. Because there is no other PLCs connected to the field network, the process to lay out the PLC grids and the wiring grids for the field network 23 has thus been completed.

Subsequently, based on FIG. 24 (FIG. 25-2), the inter-controller network No. 1 is selected as a network to be laid out above the field network. The PLCs that are connected to the inter-controller network No. 1 are the PLC 10-1 (of which the station number is 2), the PLC 10-3 (of which the station number is 1), and the PLC 10-4 (of which the station number is 3). Of these PLCs, the PLCs that have not yet been laid out are the PLC 10-1 and the PLC 10-3. Thus, a PLC grid layout process is performed on the PLC 10-1 and the PLC 10-3. In the present example, the process is performed in the ascending order of the station numbers thereof, i.e., the PLC 10-3→the PLC 10-1.

First, a PLC 10-3 grid and a wiring grid "c" are laid out into the most lower-left position possible for the inter-controller network No. 1 grid shown in FIG. 25-2. In this situation, the wiring grids "a" and "b" for the PLCs 10-4 and 10-5 have already been laid out with the inter-controller network No. 1. Thus, the layout candidates for the PLC 10-3 each of which will not separate the positional relationships of the PLC 10-4 grid and the PLC 10-5 grid that have already been laid out with the networks (the field network) positioned below the network are "to the left of the PLC 10-4" and "to the right of the PLC 10-5". Of these layout candidates, the PLC 10-3 will be laid out so as to be positioned closest to the PLC 10-4 connected to the inter-controller network No. 1, when the PLC 10-3 is laid out so as to be positioned "to the left of the PLC 10-4". Accordingly, the PLC 10-3 grid and the wiring grid "c" are laid out in that position. The result of this process is shown in FIG. 25-3.

Next, a process to lay out a grid of the PLC 10-1, which has the next largest station number, is performed. A PLC 10-1 grid and a wiring grid "d" are laid out into the next most lower-left position possible for the inter-controller network No. 1 grid shown in FIG. 25-3. In this situation, the wiring grids "c", "a", and "b" for the PLCs 10-3, 10-4, and 10-5 have already been laid out with the inter-controller network No. 1. Thus, the layout candidates for the PLC 10-1 each of which will not separate the positional relationships of the PLC 10-4 grid and the PLC 10-5 grid that have already been laid out with the networks (the field network) positioned below the network are "to the left of the PLC 10-3", "to the right of the PLC 10-3 (=to the left of the PLC 10-4)", and "to the right of the PLC 10-5". Of these layout candidates, the PLC 10-1 will be laid out so as to be positioned closest to the PLCs 10-3 and 10-4 connected to the inter-controller network No. 1, and also, the PLC 10-1 will be laid out so as to best fit the order according to the station numbers together with the PLC 10-3 (of which the station number is 1) and the PLC 10-4 (of which the station number is 3) that have already been laid out with the inter-controller network No. 1, when the PLC 10-1 is laid out so as to be positioned "to the right of the PLC 10-3". Accordingly, the PLC 10-1 grid and the wiring grid "d" are laid out in that position.

As shown in the connected network information P1n in FIG. 11, because the PLC 10-1 is also connected to the inter-controller network No. 2 and to the information-related network No. 3, wiring grids "d" are also laid out from the PLC 10-1 grid to the inter-controller network No. 2 grid and to the information-related network No. 3. The result of this process is shown in FIG. 25-4. Because there is no other PLCs connected to the inter-controller network No. 1 grid, the process to lay out the PLC grids and the wiring grids for the inter-controller network No. 1 has thus been completed.

Subsequently, based on FIG. 24 (FIG. 25-4), the inter-controller network No. 2 is selected as a network to be laid out above the inter-controller network No. 1. The PLCs that are connected to the inter-controller network No. 2 are the PLC 10-1 (of which the station number is 2), the PLC 10-2 (of which the station number is 1), and the PLC 10-5 (of which the station number is 3). Of these PLCs, the PLC that has not yet been laid out is the PLC 10-2. Thus, a process to lay out a PLC grid and a wiring grid is performed on the PLC 10-2. In this situation, in the case where there are two or more PLCs that have not yet been laid out, the process is performed in the ascending order of the station numbers of the PLCs. Also, for the inter-controller networks, the process is performed according to the order of the station numbers, regardless of whether the station is a management station or a regular station.

A PLC 10-2 grid and a wiring grid "e" are laid out into the next most lower-left position possible for the inter-controller network No. 2 grid shown in FIG. 25-4. In this situation, the wiring grids "d" and "b" for the PLCs 10-1 and 10-5 have already been laid out with the inter-controller network No. 2. Thus, the layout candidates for the PLC 10-2 each of which will not separate the positional relationships of the PLCs 10-3, 10-1, 10-4, and 10-5 that have already been laid out with the networks (the inter-controller network No. 1 and the field network) positioned below the network are "the open grid to the left of the wiring 'd' connected to the PLC 10-1 below the inter-controller network No. 2", "the open grid between the wiring 'd' connected to the PLC 10-1 and the wiring 'b' connected to the PLC 10-5 below the inter-controller network No. 2", and "to the right of the wiring 'b' connected to the PLC 10-5 below the inter-controller network No. 2". Of these layout candidates, the PLC 10-2 will be laid out so as to be positioned closest to the PLC 10-1 connected to the inter-controller network No. 2, when the PLC 10-2 is laid out so as to be positioned in "the open grid between the wiring 'd' connected to the PLC 10-1 and the wiring 'b' connected to the PLC 10-5 below the inter-controller network No. 2". In the present example, it is not possible to extract, from those layout candidates, any layout candidate that will best fit the order according to the station numbers, together with the PLCs (i.e., the PLC 10-1 of which the station number is 2 and the PLC 10-5 of which the station number is 3) that have already been laid out with the inter-controller network No. 2. Thus, the layout candidate "the open grid between the wiring 'd' connected to the PLC 10-1 and the wiring 'b' connected to the PLC 10-5 below the inter-controller network No. 2" described above is selected. Accordingly, the PLC 10-2 grid and the wiring grid "e" are laid out in that position. The result of this process is shown in FIG. 25-5.

Subsequently, based on FIG. 24 (FIG. 25-5), the information-related network No. 3 is selected as a network to be laid out above the inter-controller network No. 2. However, of the PLCs (i.e., the PLCs 10-1 and 10-2) that are connected to the information-related network No. 3, there is no PLC that has not yet been laid out. Also, the information-related network 21 is the uppermost network. The PLC grid layout process has thus been completed.

Figure 26:
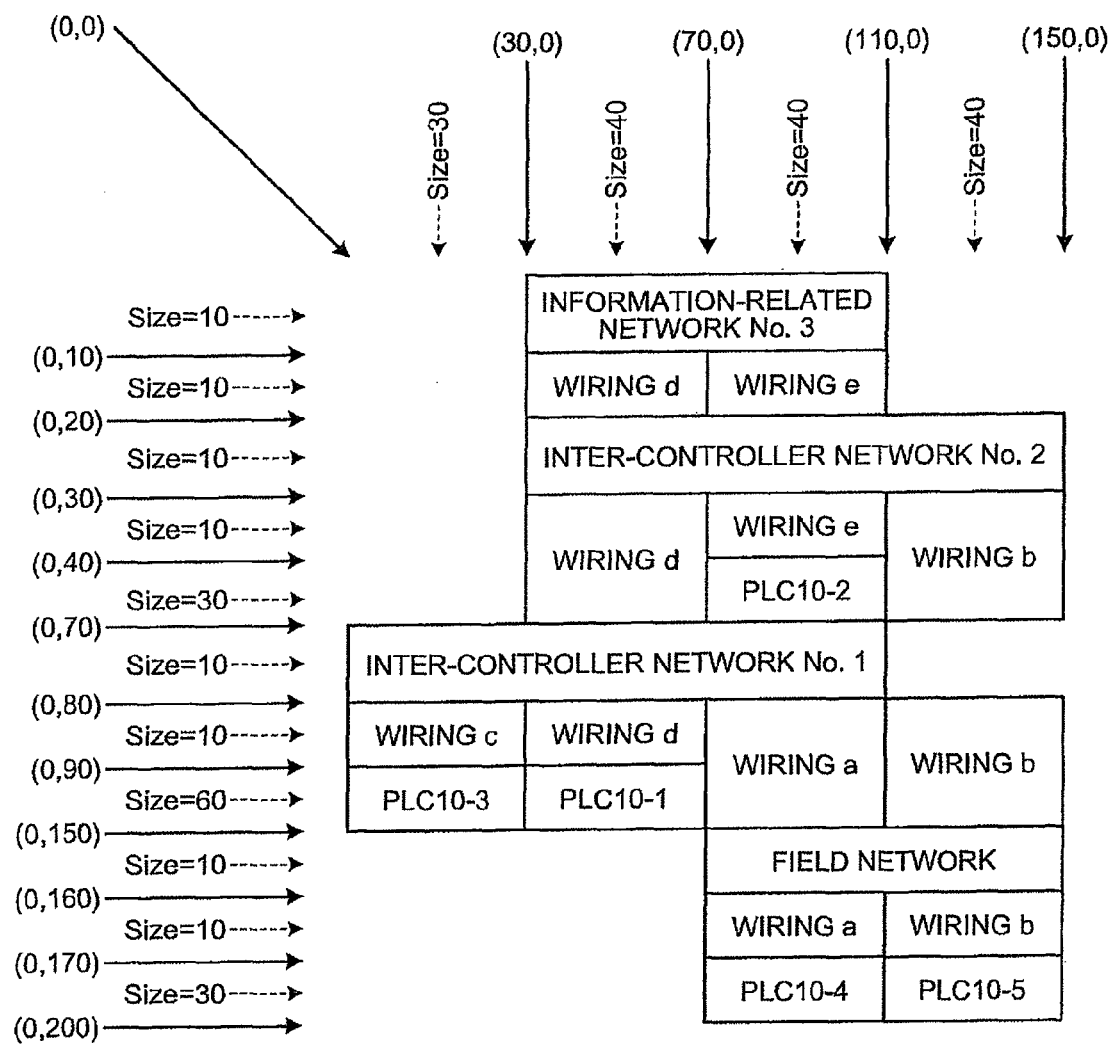
FIG. 26 is a drawing of a result of calculating grid sizes and grid coordinates with respect to the result shown in FIG. 25-5.

After that, as explained in the description of the first embodiment, with respect to the result shown in FIG. 25-5, the grid size calculating function 1174 performs the grid size calculating process to calculate the size of each of the grids (in particular, the size of each of the PLC grids that is required when the corresponding PLC is displayed based on the base information of the PLC). Also, the grid coordinate calculating process to calculate the grid coordinates by adding each of the grid sizes starting from the upper left is performed. FIG. 26 is a drawing of a result of calculating the grid sizes and the grid coordinates, with respect to the result shown in FIG. 25-5.

Figure 27:
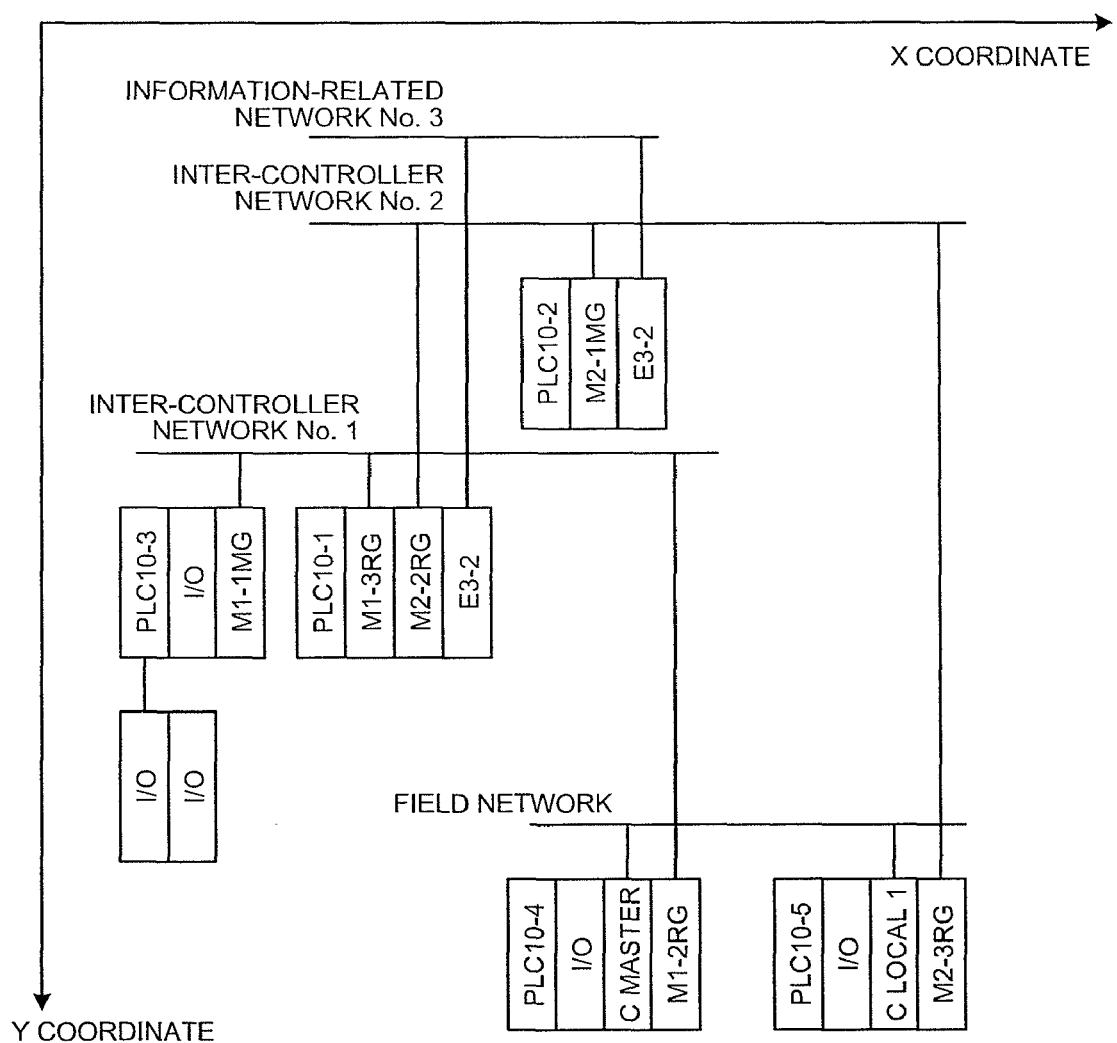
FIG. 27 is a drawing of an example of system configuration information displayed as a result of a system configuration displaying process.

Subsequently, the system configuration display unit 118 reads the grid model to which the grid coordinates have been added and that has been obtained as a result of the processes described above and displays the system configuration information on the display unit 112. FIG. 27 is a drawing of an example of the system configuration information displayed as a result of the system configuration displaying process. On the display screen, the information is displayed in such a manner that is close to a network configuration diagram of a control system created by human labor. In other words, the information-related network is displayed in an upper position, whereas the inter-controller networks are displayed in middle positions, and the field network is displayed in a lower position. Consequently, an advantageous effect is achieved where the user is able to more easily understand the configuration of the control system based on the network configurations than in the example according to the first embodiment.

According to the second embodiment, the collected pieces of network configuration information are displayed according to the order of networks that is easily understood by the user. Thus, an advantageous effect is achieved where it is possible to easily understand the entirety of the system configuration of the networks and the PLCs included in the control system.

Figure 28:
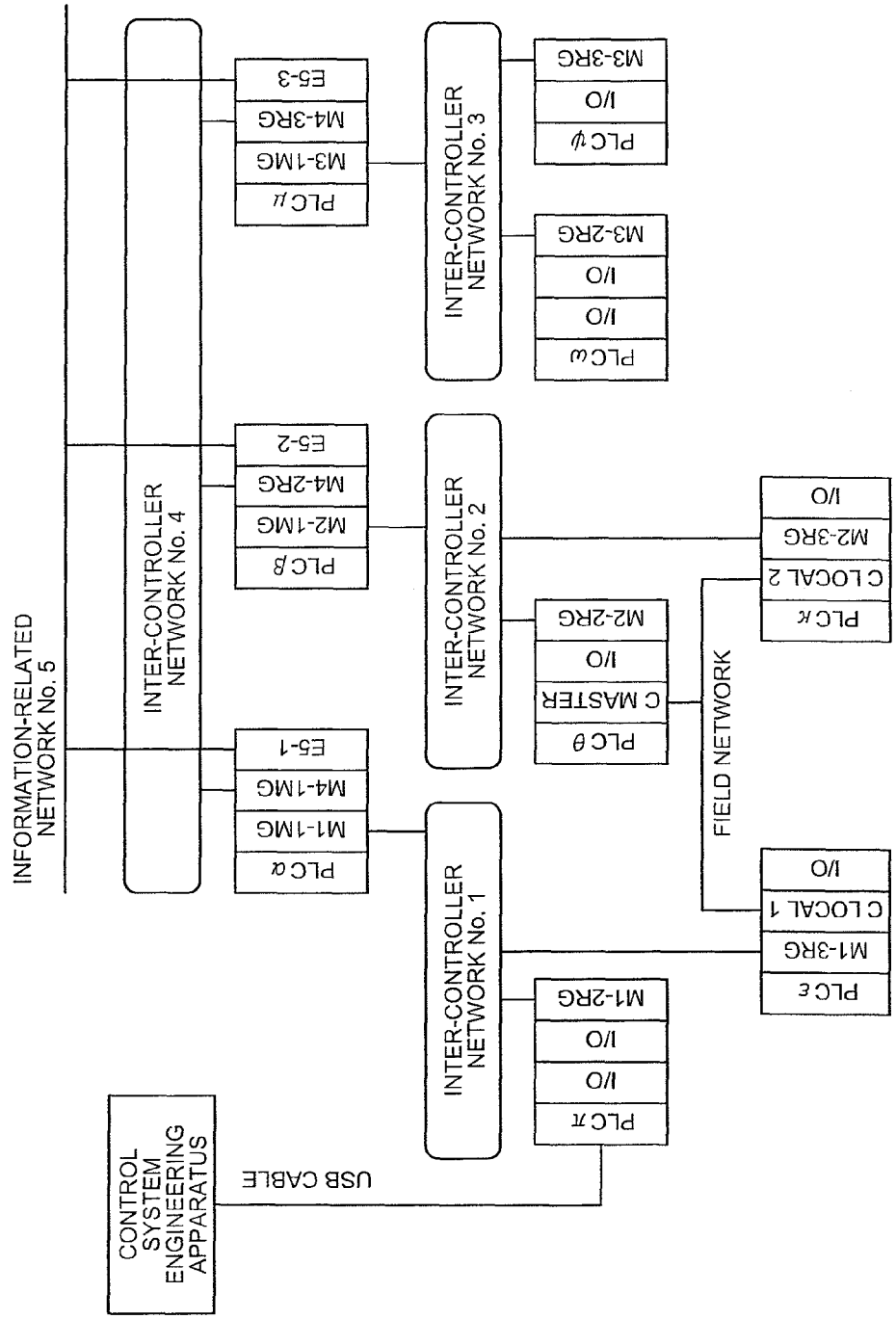
FIG. 28 is a drawing of another exemplary configuration of a control system.

FIG. 28 is a drawing of another exemplary configuration of a control system. In the example shown in FIG. 28, the control system is configured with a larger number of PLCs in a more complex manner than in the example shown in FIG. 1, which is a drawing of an example of the entirety of the system configuration of the networks and the PLCs included in the control system according to the first embodiment. Next, an example in which the system configuration information of the control system shown in FIG. 28 is displayed by using the method according to the first embodiment will be compared with an example in which the same system configuration information is displayed by using the method according to the second embodiment.

Figure 31:
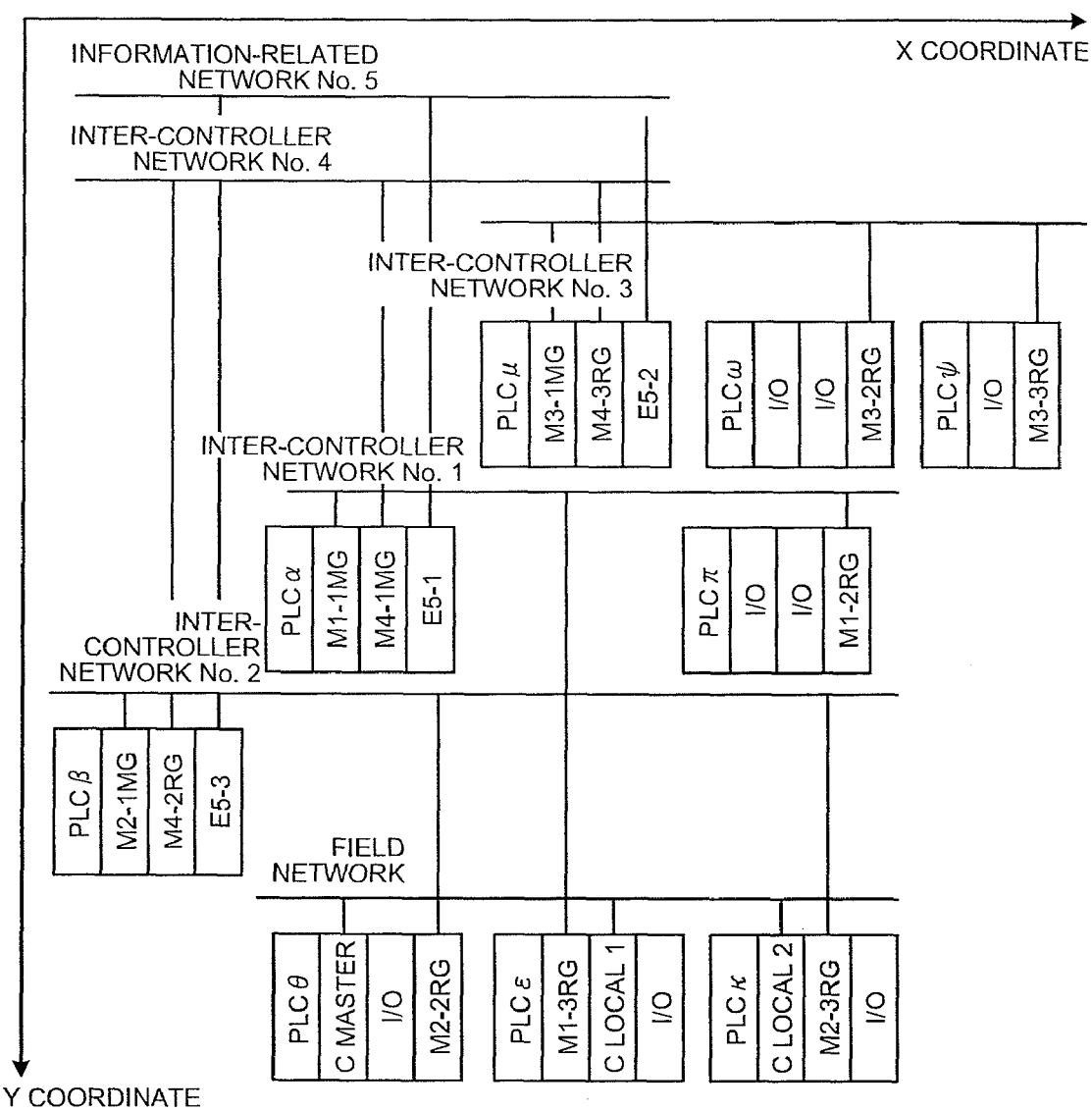
FIG. 31 is a drawing of a system configuration of the control system shown in FIG. 28 that is displayed based on the grid model shown in FIG. 30.

FIG. 29 is a drawing of a system configuration obtained by displaying the control system shown in FIG. 28 by using the method according to the first embodiment. In contrast, FIG. 30 is a drawing of a grid model created by using the method according to the second embodiment with respect to the control system shown in FIG. 28. FIG. 31 is a drawing of a system configuration of the control system shown in FIG. 28 that is displayed based on the grid model shown in FIG. 30.

In contrast to the display screen on which the system configuration shown in FIG. 29 is displayed by using the method according to the first embodiment, on the display screen on which the system configuration shown in FIG. 31 is displayed by using the method according to the second embodiment, the networks structuring the upper information-related portion of the control system are displayed in upper positions of the screen, whereas the networks structuring the lower field-related portion of the control system are displayed in the lower positions of the screen, and also, the PLCs that are connected to mutually the same network are displayed together. Thus, it is easier to understand the system configuration on the display screen shown in FIG. 31. In other words, on the display screen shown in FIG. 31 displayed by using the method according to the second embodiment, the system configuration is expressed in such a manner that is closer to the system configuration diagram shown in FIG. 28 that has manually been drawn by a user in an easy-to-understand manner than on the display screen on which the system configuration shown in FIG. 29 is displayed by using the method according to the first embodiment. Consequently, according to the second embodiment, it is possible to automatically display the system configuration information expressed in such a manner that is closer to a system configuration diagram manually drawn by human beings in an easy-to-understand manner.

Third Embodiment

In a third embodiment of the present invention, a control system engineering apparatus and a control system engineering method with which it is possible to display specific connection paths indicating which paths are used to connect to target PLCs in the first and the second embodiments will be explained. In the following sections, the results obtained in the first embodiment will be used in the explanation.

Figure 32:
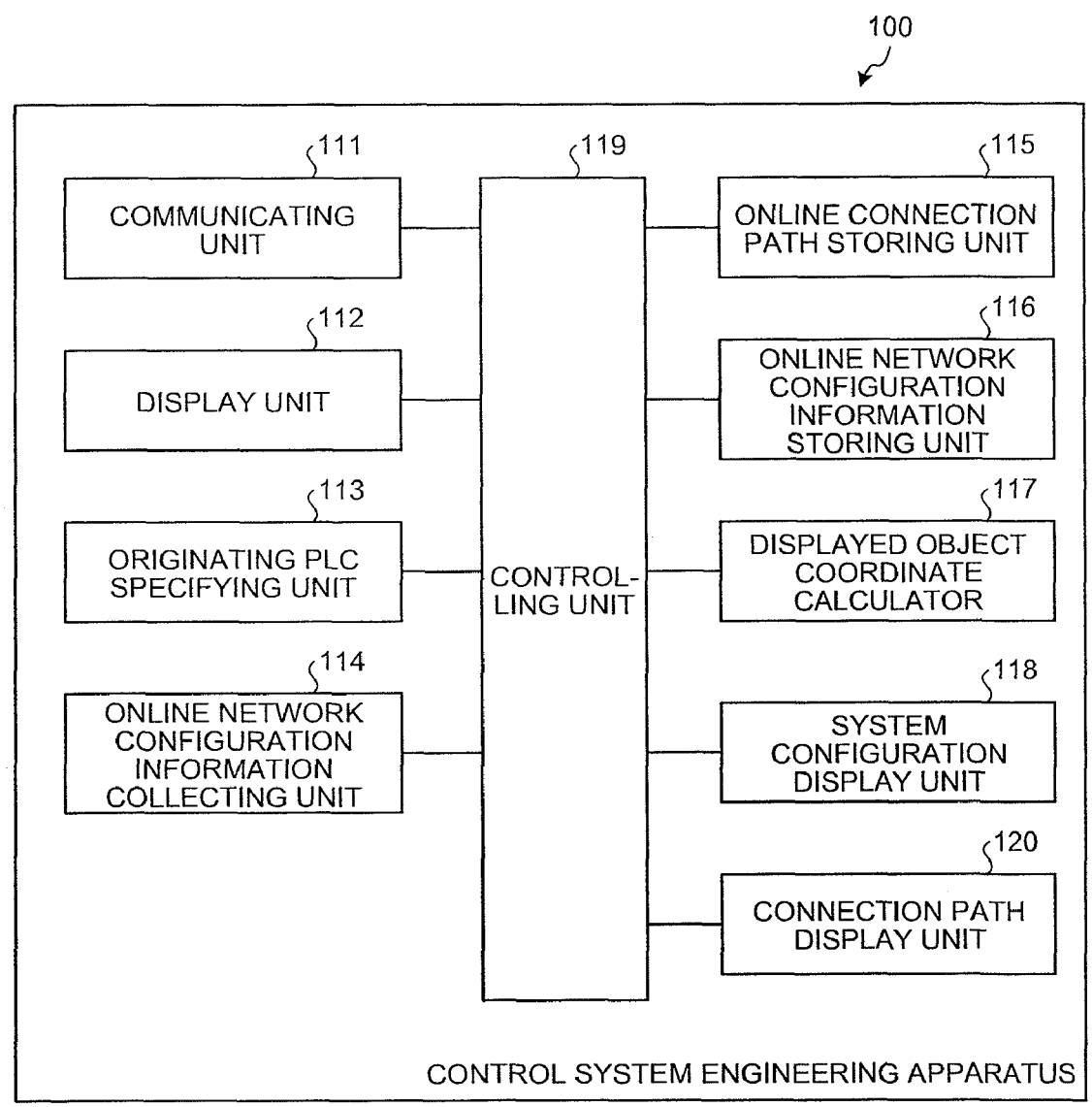
FIG. 32 is a schematic block diagram of a functional configuration of a control system engineering apparatus according to a third embodiment of the present invention.

FIG. 32 is a schematic block diagram of a functional configuration of a control system engineering apparatus according to the third embodiment of the present invention. In addition to the constituent elements shown in FIG. 3 according to the first embodiment, the control system engineering apparatus 100 further includes a connection path display unit 120 that displays, on the display unit 112, a connection path from an originating PLC to a target PLC based on the data including the coordinates that have been calculated by the displayed object coordinate calculator 117 and the connection paths stored in the online connection path storing unit 115. The connection path display unit 120 corresponds to the connection path display means in the claims. Some of the constituent elements that are the same as those in the first embodiment are referred to by using the same reference characters, and the explanation thereof will be omitted.

Figure 33:
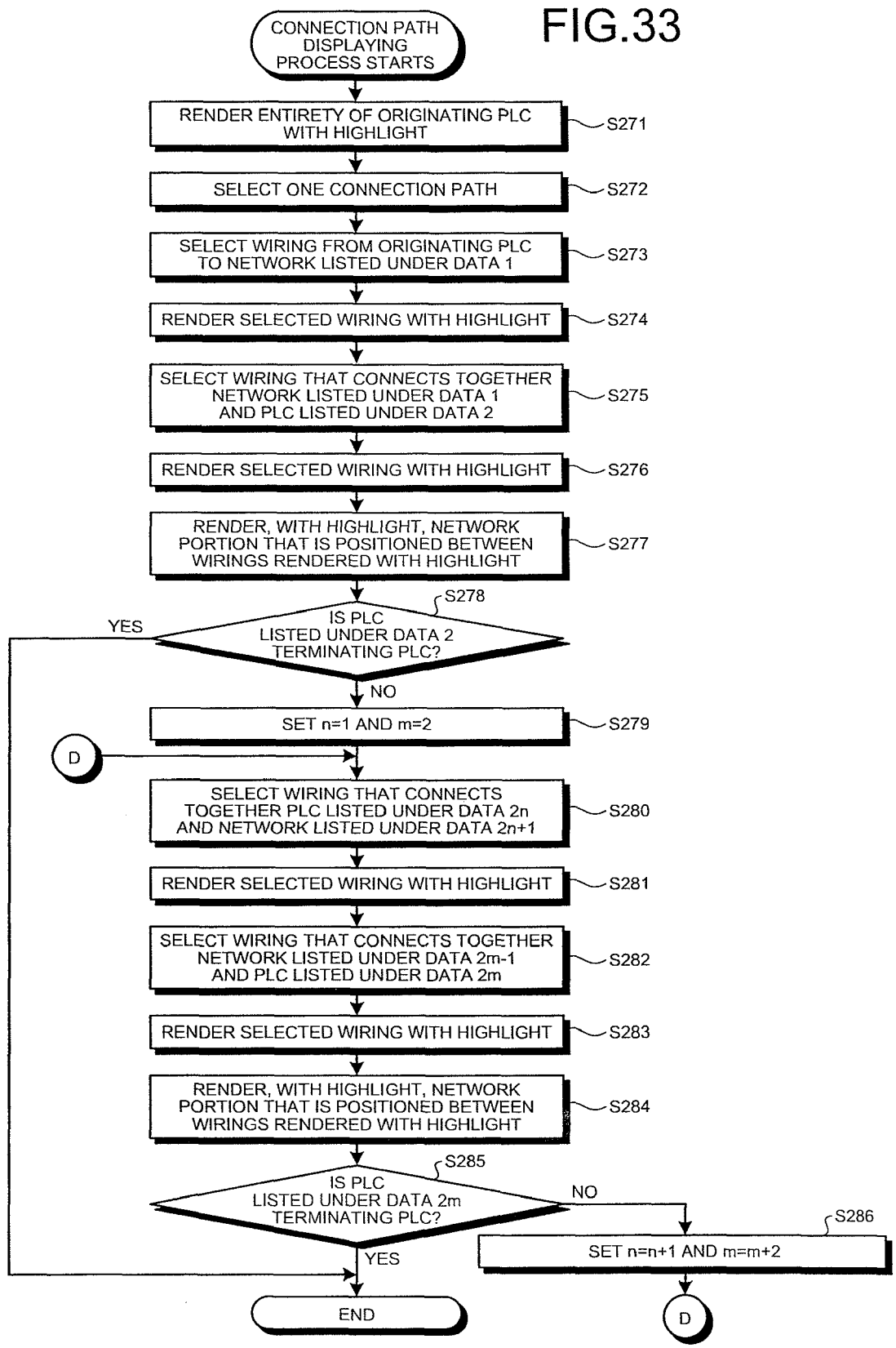
FIG. 33 is a flowchart of an example of a procedure in a connection path displaying process.
Figures 1, 34:
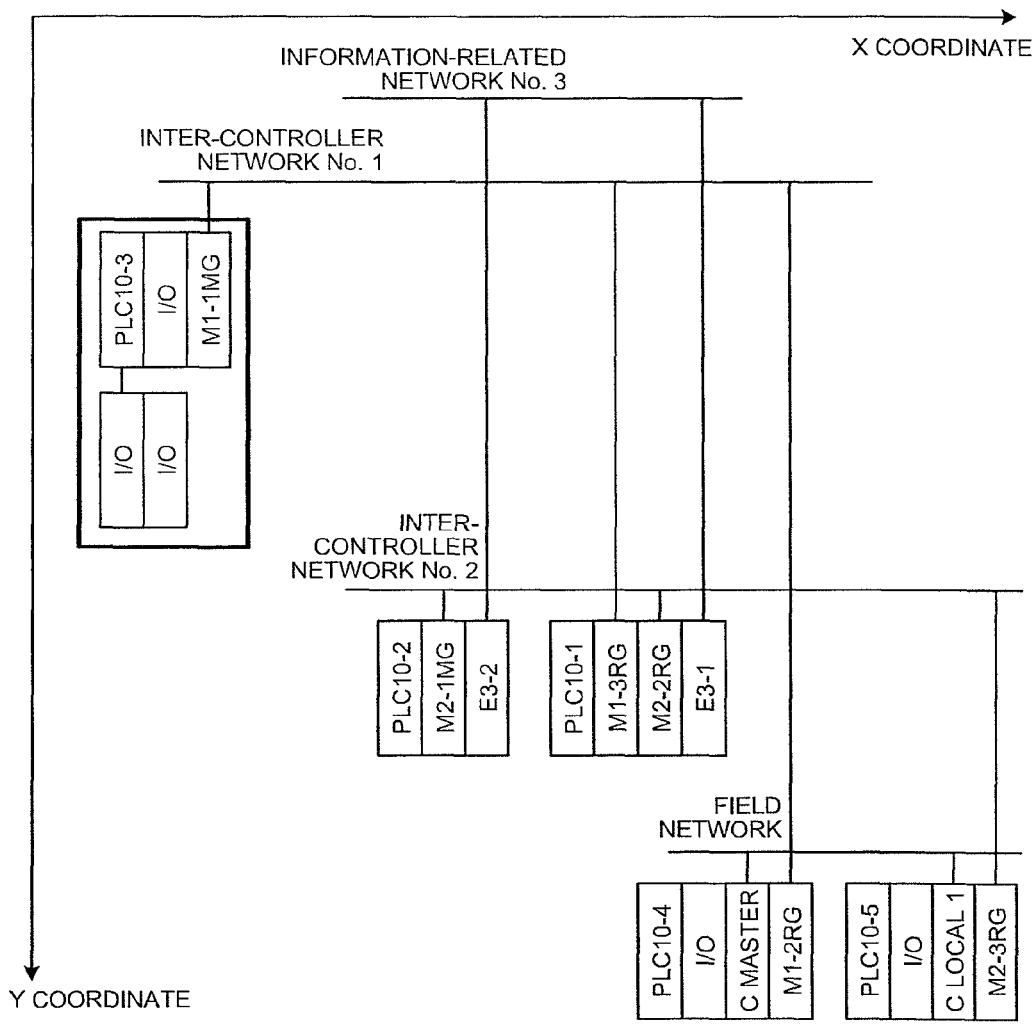
Figures 2, 34:
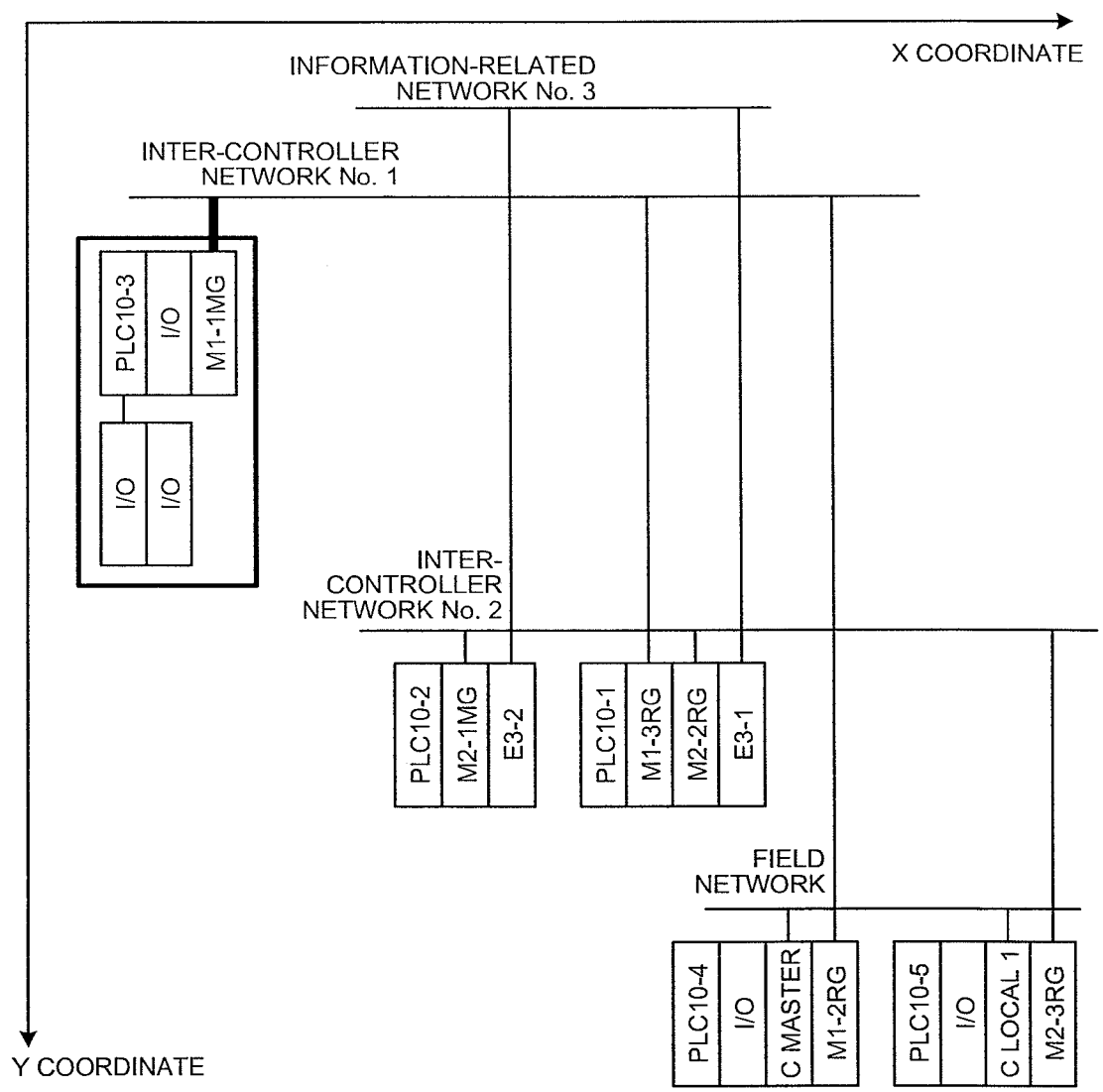
Figures 3, 34:
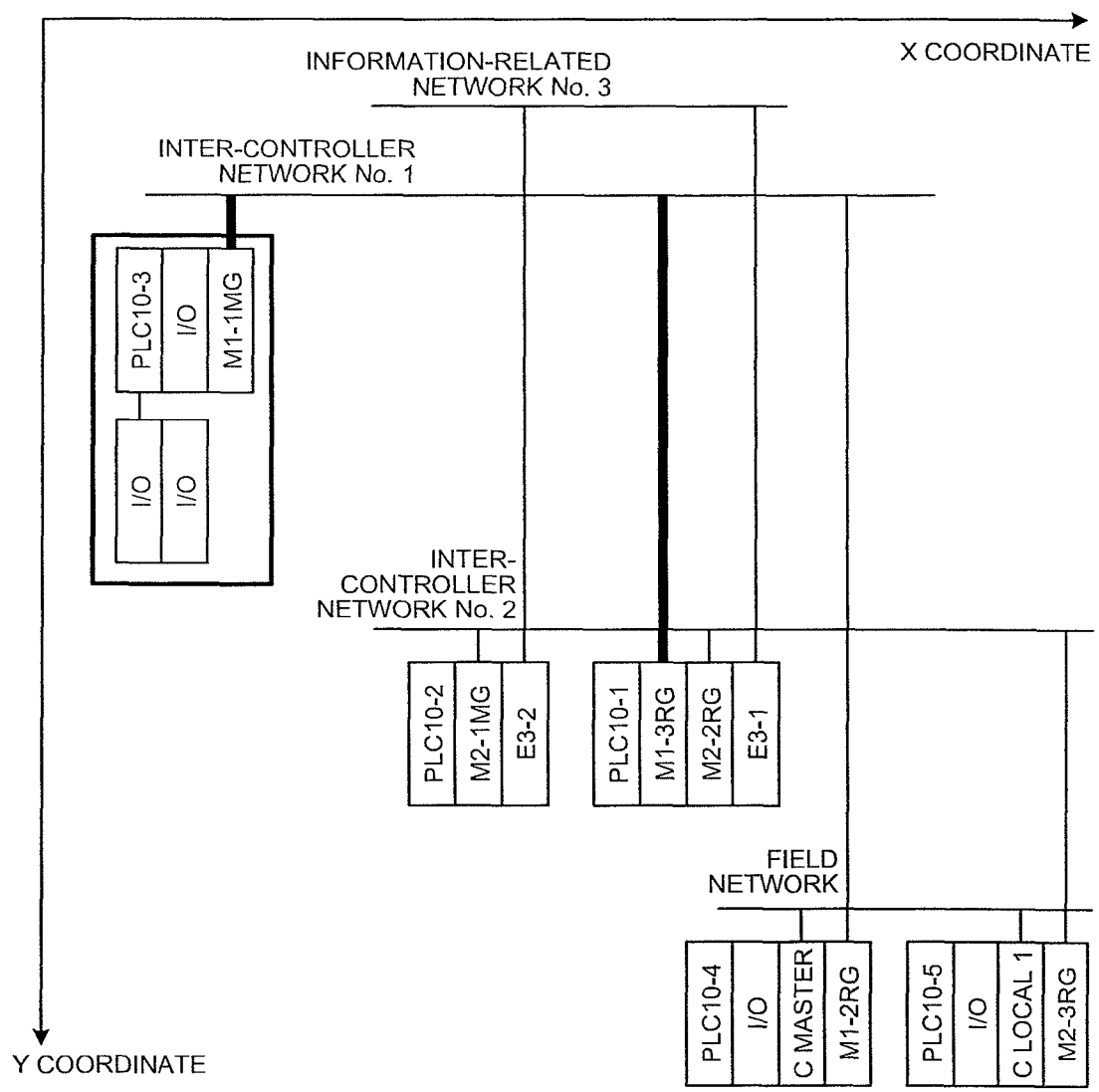
Figures 4, 34:
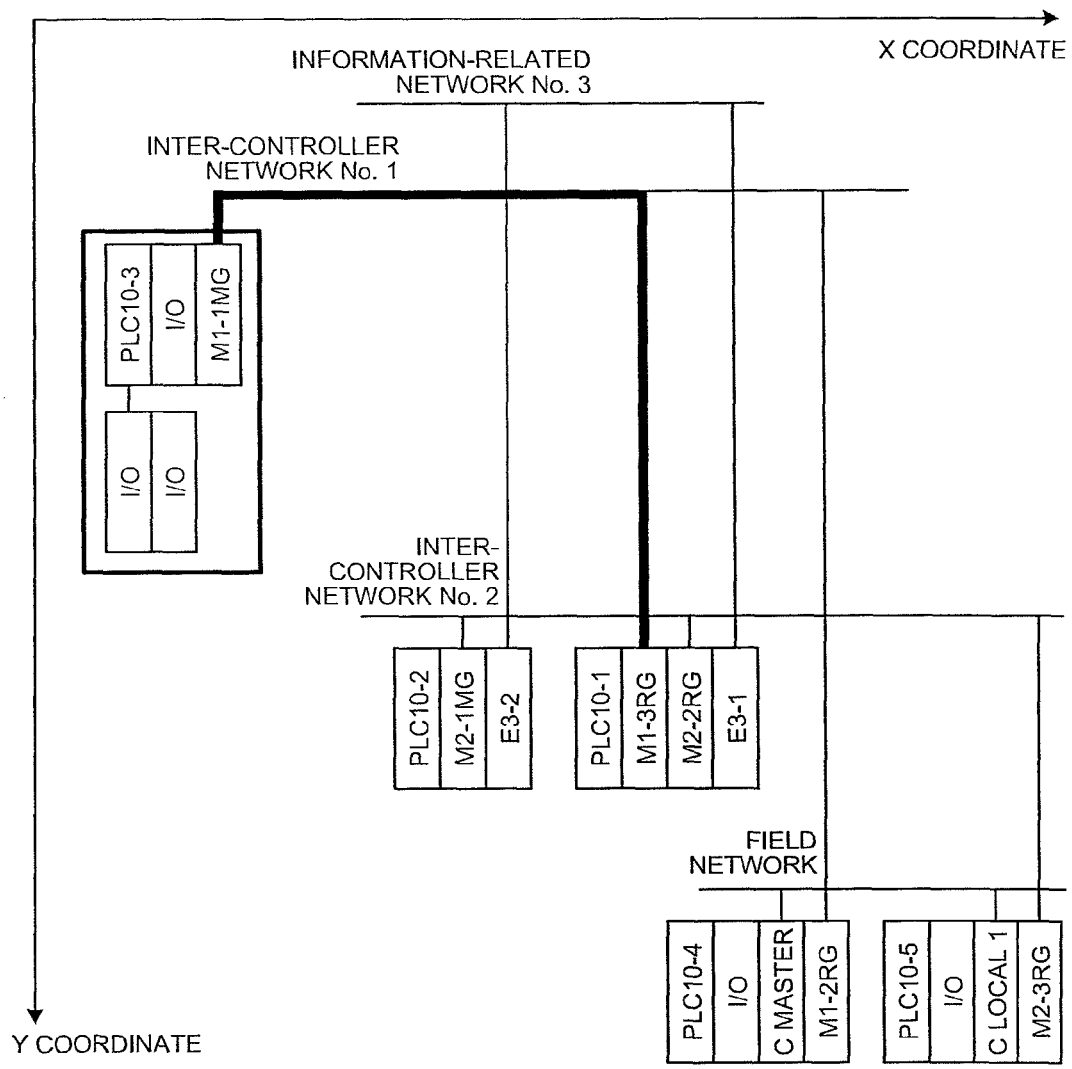
Figures 5, 34:
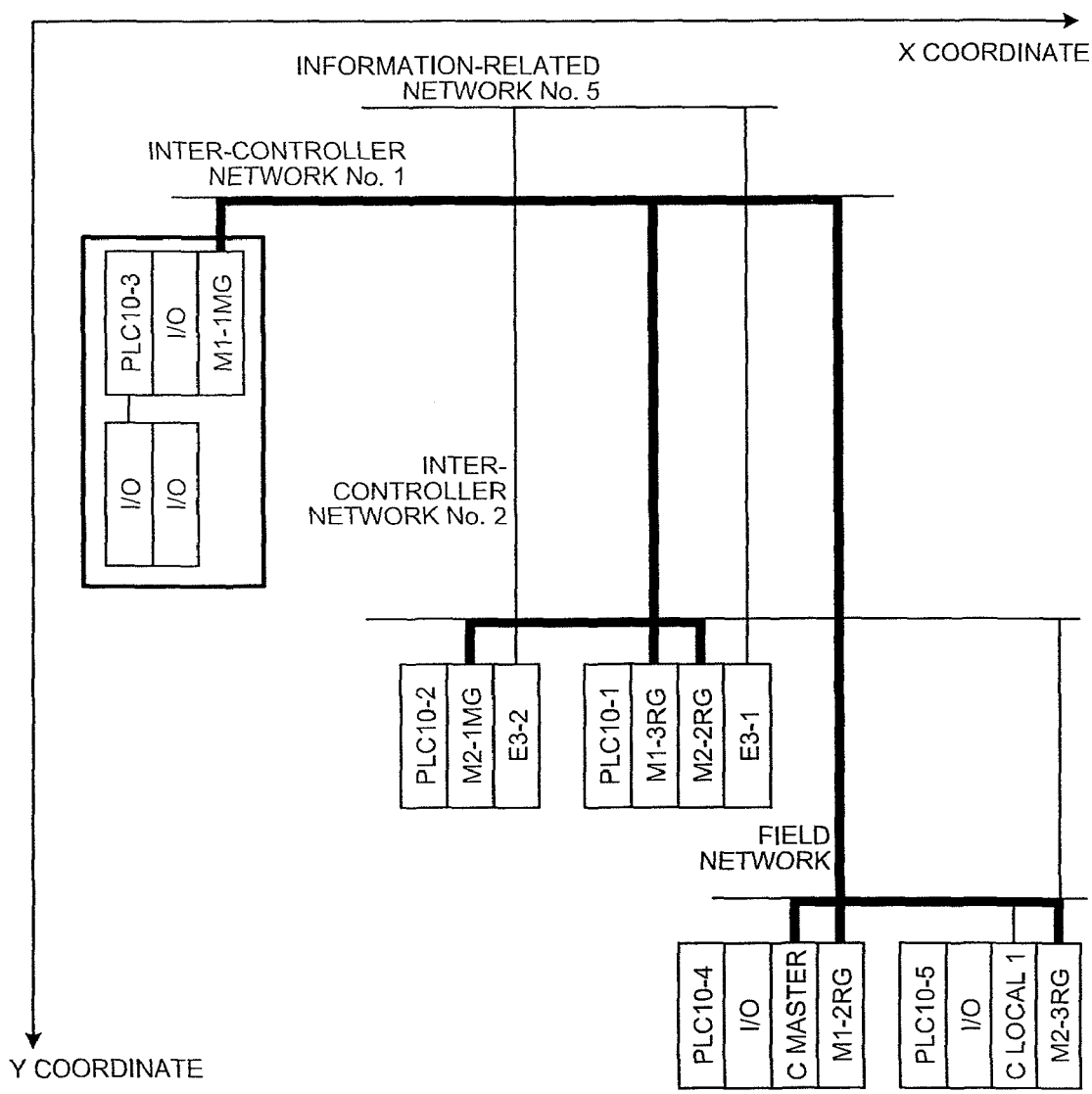

Next, a process to display a connection path from an originating PLC to a target PLC that is performed in the control system engineering apparatus 100 configured as described above will be explained. FIG. 33 is a flowchart of an example of a procedure in the connection path displaying process. FIGS. 34-1 to 34-5 are drawings of examples of a procedure in the connection path displaying process performed on a system configuration information display screen. This process is performed while the system configuration information displaying process is being performed according to the first or the second embodiment.

First, the connection path display unit 120 obtains the position of the object representing the originating PLC on the display unit 112 out of the displayed object coordinate calculator 117 and displays the entirety of the object representing the originating PLC with highlight (step S271, FIG. 34-1).

Subsequently, the connection path display unit 120 selects a specified piece of connection path information or an arbitrary piece of connection path information out of the connection paths stored in the online connection path storing unit 115 (step S272). The connection path display unit 120 then selects the wiring from the originating PLC to the network listed under the data 1 in the selected piece of connection path information (step S273). After that, the connection path display unit 120 obtains such a position on the display unit 112 that corresponds to the wiring out of the displayed object coordinate calculator 117 and renders the wiring with highlight (step S274, FIG. 34-2).

After that, the connection path display unit 120 selects the wiring that connects together the network listed under the data 1 and the PLC listed under the data 2 in the connection path information (step S275). The connection path display unit 120 then obtains such a position on the display unit 112 that corresponds to the wiring out of the displayed object coordinate calculator 117 and renders the wiring with highlight (step S276, FIG. 34-3).

Subsequently, the connection path display unit 120 renders, with highlight, a network portion that is positioned between the two wirings displayed with highlight (step S277, FIG. 34-4). After that, the connection path display unit 120 judges whether the PLC listed under the data 2 is the PLC listed under the name (i.e., the terminating PLC) in the connection path information (step S278).

In the case where the PLC listed under the data 2 is not the terminating PLC (step S278: No), the connection path display unit 120 sets n=1 and m=2 (step S279) and selects a wiring that connects together a PLC listed under data $2n$ and a network listed under data $2n+1$ in the connection path information (step S280). After that, the connection path display unit 120 obtains such a position on the display unit 112 that corresponds to the wiring out of the displayed object coordinate calculator and renders the wiring with highlight (step S281).

Subsequently, the connection path display unit 120 selects a wiring that connects together a network listed under data $2m-1$ and a PLC listed under data $2m$ in the connection path information (step S282). After that, the connection path display unit 120 obtains such a position on the display unit 112 that corresponds to the wiring out of the displayed object coordinate calculator 117 and renders the wiring with highlight (step S283). The connection path display unit 120 then renders, with highlight, a network portion that is positioned between the two wirings that have been rendered with highlight (step S284).

After that, the connection path display unit 120 judges whether the PLC listed under the data $2m$ is the PLC listed under the name (the terminating PLC) in the connection path information (step S285). In the case where the PLC listed under the data $2m$ is not the terminating PLC (step S285: No), the connection path display unit 120 sets n=n+1 and m=m+1 (step S286) and the process returns to step S280, so that the processes described above are repeatedly performed.

In contrast, in the case where the PLC listed under the data 2 is the terminating PLC at step S278 (step S278: Yes), or in the case where the PLC listed under the data $2m$ is the terminating PLC at step S285 (step S285: Yes), the process to display the connection path between the originating PLC and the target terminating PLC has been completed (FIG. 34-5).

According to the third embodiment, an advantageous effect is achieved where it is possible to easily recognize the connection path from the originating PLC to the terminating PLC in the networks included in the control system.

Fourth Embodiment

In the first through the third embodiments, the system configuration information is displayed by connecting the control system engineering apparatus to one of the PLCs included in the actual control system and obtaining, while online, the information of the system configuration of the network configurations and the PLCs included in the control system via the one of the PLCs. In contrast, in a fourth embodiment of the present invention, a control system engineering apparatus and a control system engineering method with which it is possible to determine PLCs that are reachable within a system configuration diagram edited offline and, in the case where there are a plurality of connection paths, it is further possible to automatically select an optimal path by referring to communication throughputs will be explained.

Figure 35:
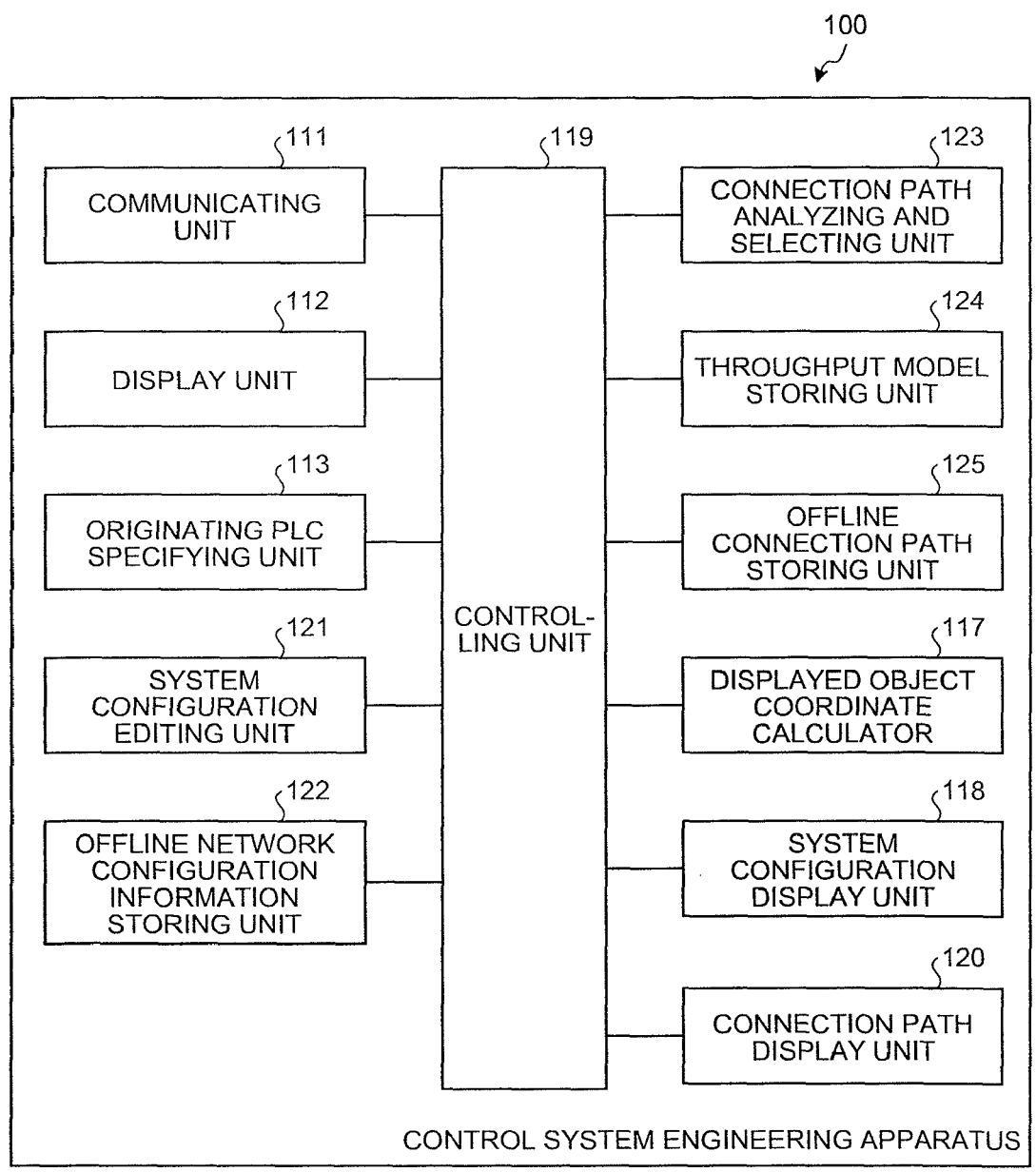
FIG. 35 is a schematic block diagram of a functional configuration of a control system engineering apparatus according to a fourth embodiment of the present invention.

FIG. 35 is a schematic block diagram of a functional configuration of the control system engineering apparatus according to the fourth embodiment of the present invention. The control system engineering apparatus 100 includes the communication unit 111, the display unit 112, the originating PLC specifying unit 113, a system configuration editing unit 121, an offline network configuration information storing unit 122, a connection path analyzing and selecting unit 123, a throughput model storing unit 124, an offline connection path storing unit 125, the displayed object coordinate calculator 117, the system configuration display unit 118, the connection path display unit 120, and the controlling unit 119 that controls these processing units.

The system configuration editing unit 121 provides the user, on the control system engineering apparatus 100, with a screen on which it is possible to set, while offline, the entirety of a system configuration of networks and PLCs included in a control system for, for example, a production facility and to manage the contents that have been set by the user. The system configuration editing unit 121 corresponds to the system configuration editing means in the claims.

The offline network configuration information storing unit 122 stores therein network configuration information including connected network information that indicates the state in which the PLCs included in the control system are connected to networks and base information that indicates the system configurations of the PLCs (the configurations of the units installed on the base), the network configuration information having directly been set by the user by using the system configuration editing unit 121. The network configuration information that is stored in the offline network configuration information storing unit 122 and includes the connected network information and the network configuration information is not created by the control system engineering apparatus 100's automatically collecting system configuration information online and creating network information, but is rather obtained by the user's directly inputting (while offline) the system configuration information and the network information regarding an existing control system to the control system engineering apparatus 100. Thus, the network configuration information may also be referred to as offline network configuration information. The offline network configuration information storing unit 122 corresponds to the offline network configuration information storing means in the claims.

The connection path analyzing and selecting unit 123 uses the PLC that has been specified by the originating PLC specifying unit 113 as the originating point and analyzes a connection path to each of the PLCs included in a network configuration that has been set by the system configuration editing unit 121. Also, the connection path analyzing and selecting unit 123 has a function of, in the case where there are a plurality of connection paths, referring to a network communication throughput database stored in the throughput model storing unit 124 and selecting an optimal one of the paths. The connection path analyzing and selecting unit 123 corresponds to the connection path analyzing and selecting means in the claims.

The throughput model storing unit 124 stores therein, as a database, a throughput model used for calculating a communication throughput for each of the connection paths in the control system. The throughput model storing unit 124 corresponds to the throughput model storing means in the claims.

The offline connection path storing unit 125 stores therein the connection paths to the PLCs (hereinafter, may also be referred to as "offline connection paths") that have been analyzed and selected by the connection path analyzing and selecting unit 123. The offline connection paths are characterized by further including throughput evaluation values, in addition to the data structure of the connection path information shown in FIG. 10 according to the first embodiment. The offline connection path storing unit 125 corresponds to the offline connection path storing means in the claims.

Some of the constituent elements that are the same as those in the first through the third embodiments are referred to by using the same reference characters, and the explanation thereof will be omitted. It should be noted, however, that in the fourth embodiment, the displayed object coordinate calculator 117 calculates the coordinates of displayed objects displayed on the display unit 112, by using the network configuration information stored in the offline network configuration information storing unit 122.

Next, a procedure starting from an offline control system configuration process up to an offline connection path displaying process that is performed in the control system engineering apparatus 100 configured as described above will be sequentially explained.

<Offline Control System Configuration Process>

The system configuration editing unit 121 establishes settings for the entirety of the system configuration of the networks and the PLCs included in the control system, the settings having been input by a user by using a drag-and-drop operations and/or a wizard via a graphical user interface.

Data of the system configuration (hereinafter, the "offline network configuration information") that has been set by the system configuration editing unit 121 is stored in the offline network configuration information storing unit 122. The data format is the same as that of the network configuration information stored in the online network configuration information storing unit 116 explained in the first embodiment. For example, when an operation to add an element (a network or a PLC) has been performed, the data of the element is added to the offline network configuration information stored in the offline network configuration information storing unit 122. Subsequently, the displayed object coordinate calculator 117 performs the process to calculate the coordinates on the entirety of the system configuration data to which the data of the element has been added, so that the system configuration is displayed on the display unit. Accordingly, when the same system configuration is expressed, although the order of the created pieces of data may be different depending on the order in which the operations to add the pieces of data are performed, the contents of the data (what the data signifies) are the same.

In the fourth embodiment, it is assumed that the configuration of the control system that is the same as the configuration shown in FIG. 1 according to the first embodiment is constructed offline by using a procedure described below. First, the PLC 10-3 is added, and after the inter-controller network No. 1 (22A) has been added, the PLC 10-1 and the PLC 10-4 are sequentially added. After that, the inter-controller network No. 2 (22B) is added, before the PLC 10-2 and the PLC 10-5 are sequentially added. Further, after the field network (23) has been added, the information-related network No. 3 (21) is added.

As a result, the contents of the data of the offline network configuration information stored in the offline network configuration information storing unit 122 will be the same as those shown in FIG. 11. Also, a display of the system configuration will be the same as the one shown in FIG. 20 (or FIG. 27 when the method according to the second embodiment is used). In the following sections, a screen showing the system configuration displayed on the display unit 112 as shown in FIG. 20 or FIG. 27 will be referred to as a system configuration diagram.

<Offline Connection Path Analyzing Process>
(1) Overview of the Process

By using the originating PLC specifying unit 113, an originating PLC (the PLC to which the control system engineering apparatus 100 is connected) is specified within the system configuration diagram that has been edited offline. After that, by using the PLC that has been specified by the originating PLC specifying unit 113 as the originating point, the connection path analyzing and selecting unit 123 analyzes the connection path to each of the PLCs included in the network configuration that has been set by the system configuration editing unit 121. In the following sections, the details of the process will be explained.

Figures 2, 36:
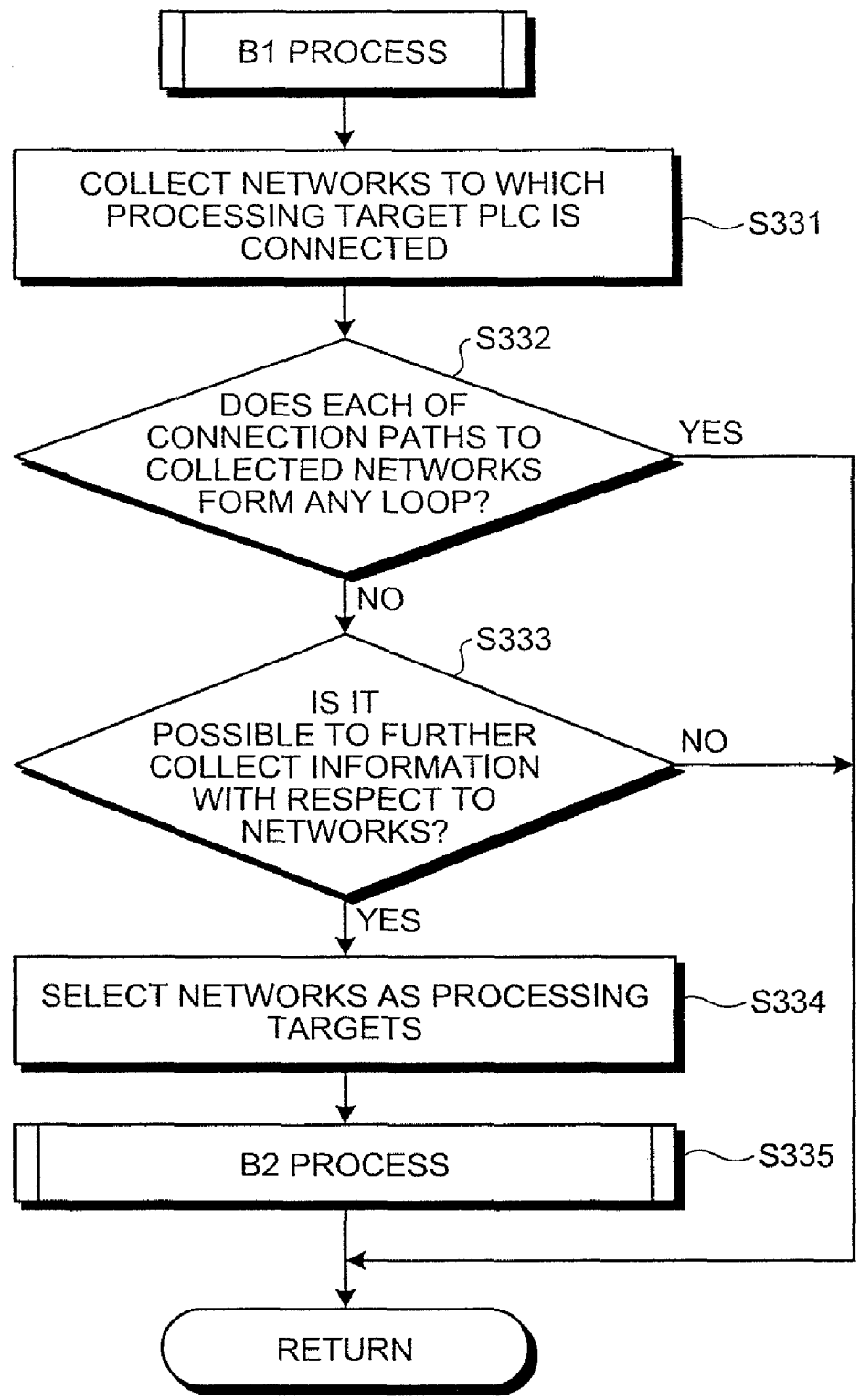
Figures 3, 36:
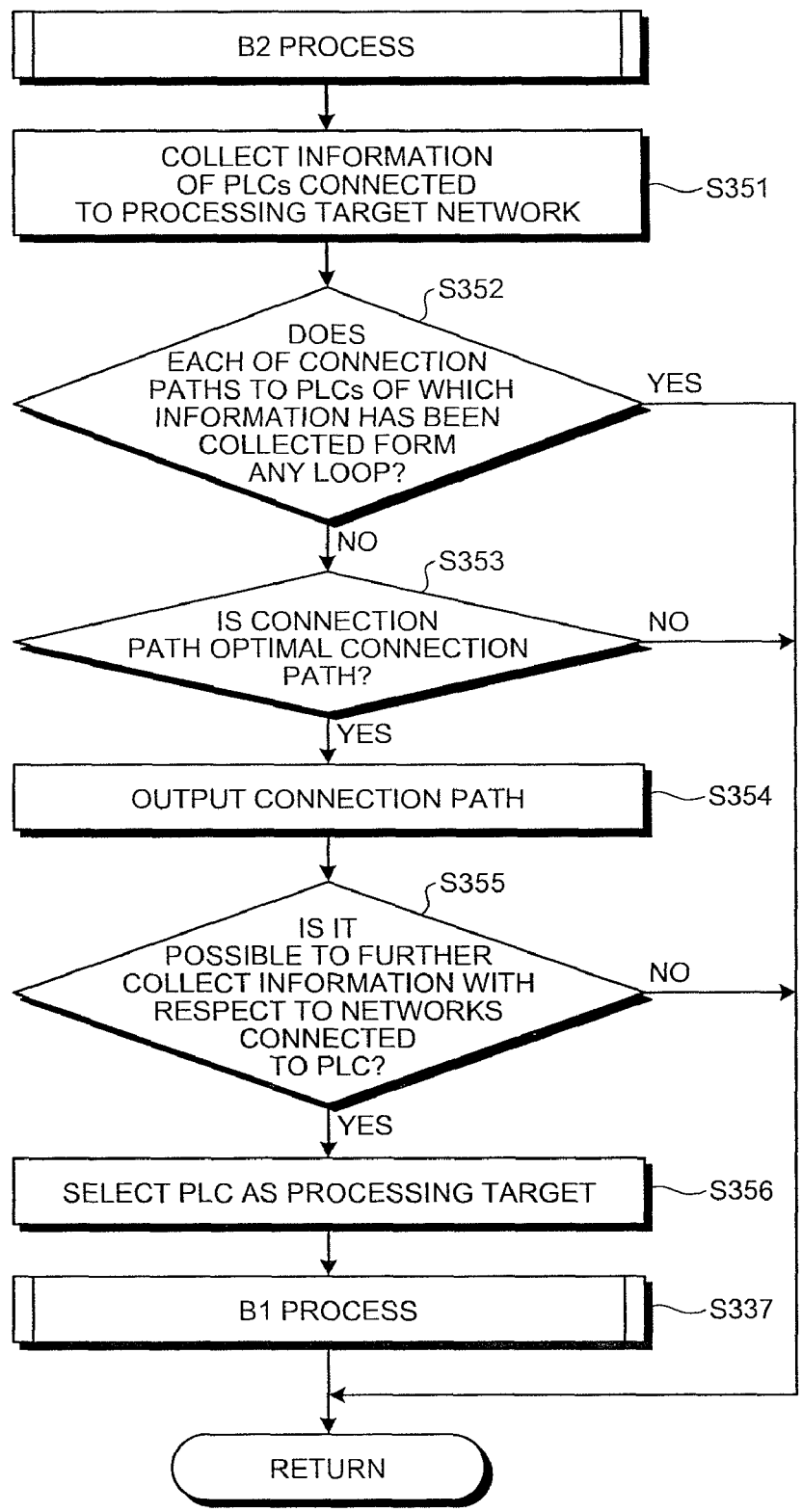

FIGS. 36-1 to 36-3 are flowcharts of an example of a procedure in an offline connection path analyzing process. First, when the originating PLC specifying unit 113 has specified a connection destination PLC (the originating PLC) to which the control system engineering apparatus 100 is connected (step S311), the connection path analyzing and selecting unit 123 outputs a connection path extending to the originating PLC that has been specified (step S312). After that, the connection path analyzing and selecting unit 123 selects the specified originating PLC as a processing target PLC (step S313) and performs a B1 process shown in FIG. 36-2 on the selected PLC (step S314). The offline connection path analyzing process has thus been completed.

FIG. 36-2 is a flowchart of a procedure in the B1 process performed at step S314. First, the connection path analyzing and selecting unit 123 collects the networks to which the processing target PLC is connected (step S331). More specifically, the connection path analyzing and selecting unit 123 collects connected network information of the processing target PLC out of the offline network configuration information storing unit 122. After that, the connection path analyzing and selecting unit 123 judges whether each of the connection paths to the networks of which the information has been collected forms any loop (step S332). In this situation, to judge whether a connection path forms any loop, in the case where the same element is included a plurality of times in the connection path, it is judged that the connection path forms a loop; otherwise, it is judged that the connection path does not form any loop.

In the case where the connection path does not form any loop (step S332: No), it is judged whether it is possible to further collect information with respect to networks under the constraints shown in FIG. 12 (step S333). In the case where it is possible to further collect information with respect to networks (step S333: Yes), the networks are selected as processing target networks (step S334), so that a B2 process shown in FIG. 36-3 is performed (step S335). Conversely, in the case where, at step S333, one or more of the constraints shown in FIG. 12 are applicable and it is not possible to further collect information with respect to networks (step S333: No), or in the case where, at step S332, the connection path forms at least one loop (step S332: Yes), the B1 process is ended, and the process returns to the process shown in FIG. 35.

FIG. 36-3 is a flowchart of an example of a procedure in the B2 process performed at step S335 shown in FIG. 36-2. In the B2 process, the connection path analyzing and selecting unit 123 first collects the PLCs that are connected to a processing target network (step S351). More specifically, the connection path analyzing and selecting unit 123 obtains the network information of the processing target network out of the offline network configuration information storing unit 122 and collects the PLCs that are connected to the processing target network out of the obtained network information. Subsequently, the connection path analyzing and selecting unit 123 judges whether each of the connection paths to the PLCs of which the information has been collected forms any loop (step S352).

In the case where the connection path does not form any loop (step S352: No), it is judged whether the connection path is an optimal connection path (step S353). The judgment regarding whether the connection path is an optimal connection path is made by, in the case where there are a plurality of connection paths, referring to communication throughput information stored in the throughput model storing unit 124 and judging whether the connection path has a good communication throughput. As a result, in the case where the connection path is not an optimal connection path (step S353: No), the B1 process is ended without outputting the connection path, so that the process returns to the process shown in FIG. 36-2.

Conversely, in the case where the connection path is an optimal connection path (step S353: Yes), the connection path is output to the offline connection path storing unit 125 (step S354), and it is judged whether it is possible to further collect information with respect to the networks connected to the PLC under the constraints shown in FIG. 12 (step S355). In the case where it is not possible to further collect information with respect to the networks (step S355: No), the B2 process is ended so that the process returns to the process shown in FIG. 36-2. In contrast, in the case where it is possible to further collect information with respect to the networks connected to the PLC (step S355: Yes), the PLC is selected as a processing target (step S356), so that the B1 process shown in FIG. 36-2 is performed (step S357).

Conversely, in the case where, at step S352, the connection path to the PLC forms at least one loop (step S352: Yes), the B1 process is ended without outputting the connection path, and the process returns to the process shown in FIG. 36-2.

(2) Specific Examples of the Process

In the explanation above, the overview of the offline connection path analyzing process is described. In the following sections, specific examples of the process will be explained by using the control system configured as shown in FIG. 1 as an example. FIGS. 37-1 to 37-5 are drawings of examples of connection path storing information stored in the offline connection path storing unit, as a result of the connection path analyzing and selecting process. In the present example, it is assumed that the offline network configuration information storing unit 122 stores therein the network configuration information shown in FIG. 11. The pieces of data in FIG. 11 and FIGS. 37-1 to 37-5 are shown according to the order in which the pieces of data are created. In the present example also, the constraints shown in FIG. 12 are used as the constraints.

FIG. 38 is a drawing of an example of a throughput model according to the fourth embodiment. In the fourth embodiment, it is assumed that a throughput of each of the PLCs is 1 Megabits per second (Mbps), whereas a throughput of the field network is 0.1 Mbps, while a throughput of each of the inter-controller networks is 10 Mbps, and a throughput of the information-related network is 100 Mbps. Also, a throughput evaluation value of the entirety of a connection path is calculated by adding together reciprocal numbers of throughput values of the elements included in the connection path. The smaller the throughput evaluation value of the entirety of the connection path is, the better the throughput is judged to be.

(2-1) The PLC 10-3

First, the connection path analyzing and selecting unit 123 outputs a connection path P3g extending to the PLC 10-3 that has been specified by the originating PLC specifying unit 113. This connection path is a connection path of which the terminating PLC is the same as the originating PLC, i.e. the PLC 10-3. By referring to conditions as shown in FIG. 38 used by the throughput model storing unit 124, a throughput evaluation value is calculated. Because the PLC 10-3 is the originating PLC, the throughput evaluation value is 0. The result of this process is shown in FIG. 37-1. After that, the B1 process shown in FIG. 36-2 is performed on the PLC 10-3 serving as the originating PLC.

(2-2) The Network Connected to the PLC 10-3

In the B1 process in which the PLC 10-3 is used as the processing target, the networks to which the PLC 10-3 is connected are collected. More specifically, a process to read the connected network information P3n that is stored in the offline network configuration information storing unit 122 shown in FIG. 11 is performed. In this situation, the inter-controller network No. 1 is collected. After that, a connection path to the collected network (the inter-controller network No. 1) is created, and it is checked to see whether the connection path forms any loop. In the present example, the connection path extends as follows: "PLC 10-3→the inter-controller network No. 1 (22A)", and because the same PLC does not appear a plurality of times, the connection path does not form any loop. Thus, the constraints shown in FIG. 12 are checked to see if it is possible to further collect information with respect to the network. In the present example, none of the constraints is applicable. Consequently, it is possible to further collect information with respect to the network. Thus, the inter-controller network No. 1 is selected as a processing target, so that the B2 process shown in FIG. 36-3 is performed.

(2-3) The PLCs Connected to the Inter-Controller Network No. 1

In a network information outputting process in which the inter-controller network No. 1 is used as the processing target, the PLCs connected to the inter-controller network No. 1 are collected. More specifically, from the network data M1 stored in the offline network configuration information storing unit 122 shown in FIG. 11, the PLCs that are connected to the inter-controller network No. 1 are searched for and extracted. In the present example, the PLCs 10-3, 10-4, and 10-1 are collected as the PLCs that are connected to the inter-controller network No. 1. After that, connection paths to the collected PLCs are created, and it is checked to see whether each of the connection paths to the PLCs forms any loop. It is assumed that this process is performed on the PLCs without any priority levels so that the PLCs are sequentially processed.

(2-4) The Inter-Controller Network No. 1→the PLC 10-3

The connection path to the PLC 10-3 extends as follows: "the PLC 10-3→the inter-controller network No. 1→the PLC 10-3". Because the same PLC appears a plurality of times, the connection path forms a loop. Thus, the process performed on the PLC 10-3 is ended without outputting this connection path.

(2-5) The Inter-Controller Network No. 1→the PLC 10-4

The connection path to the PLC 10-4 extends as follows: "the PLC 10-34 the inter-controller network No. 1→the PLC 10-4". Because none of the elements appears a plurality of times, the connection path does not form any loop. Thus, this connection path (i.e., a connection path P4g) is output as an optimal connection path. In this situation, the connection path analyzing and selecting unit 123 performs a calculation regarding a throughput of the connection path. By referring to FIG. 38, a throughput evaluation value up to the PLC 10-4 is calculated as follows:

$$(1/1)+(1/10)+(1/1)=2.1$$

Accordingly, the throughput value is input, when the connection path is output. After that, the constraints shown in FIG. 12 are checked to see if it is possible to further collect information with respect to networks. In the present example, none of the constraints is applicable. Consequently, it is possible to further collect information with respect to networks. Thus, the PLC 10-4 is selected as a processing target, so that the B1 process shown in FIG. 36-2 is performed.

(2-6) The Networks Connected to the PLC 10-4

In the B1 process in which the PLC 10-4 is used as the processing target, the networks to which the PLC 10-4 is connected are collected. More specifically, a process to read the networks stored in the connected network information P4n from the offline network configuration information shown in FIG. 11 is performed. In this situation, as the networks connected to the PLC 10-4, the field network and the inter-controller network No. 1 are collected. After that, connection paths to the collected networks are created, and it is checked to see whether each of the connection paths forms any loop. It is assumed that this process is performed on the networks without any priority levels so that the networks are sequentially processed.

(2-7) The PLC 10-4→the Field Network

The connection path to the field network extends as follows: "the PLC 10-3→the inter-controller network No. 1→the PLC 10-4→the field network". Because none of the elements appears a plurality of times, the connection path does not form any loop. Thus, the constraints shown in FIG. 12 are checked to see if it is possible to further collect information with respect to the network. In the present example, none of the constraints is applicable. Consequently, it is possible to further collect information with respect to the network. Thus, the field network is selected as a processing target, so that the B2 process shown in FIG. 36-3 is performed.

(2-8) The PLCs Connected to the Field Network

In the B2 process in which the field network is used as the processing target, the PLCs that are connected to the field network are collected. More specifically, from the network data C stored in the offline network configuration information shown in FIG. 11, the PLCs that are connected to the field network are searched for and extracted. In the present example, the PLCs 10-4 and 10-5 are collected as the PLCs that are connected to the field network. After that, connection paths to the collected PLCs are created, and it is checked to see whether each of the connection paths to the PLCs forms any loop. It is assumed that this process is performed on the PLCs without any priority levels so that the PLCs are sequentially processed.

(2-9) The Field Network→the PLC 10-4

The connection path to the PLC 10-4 extends as follows: "the PLC 10-3→the inter-controller network No. 1→the PLC 10-4→the field network→the PLC 10-4". Because the same PLC appears a plurality of times, the connection path forms a loop. Thus, the process performed on the PLC 10-4 is ended without outputting this connection path.

(2-10) The Field Network→the PLC 10-5

The connection path to the PLC 10-5 extends as follows: "the PLC 10-3→the inter-controller network No. 1→the PLC 10-4→the field network→the PLC 10-5". Because none of the elements appears a plurality of times, the connection path does not form any loop. Thus, this connection path (i.e., a connection path P5g-1) is output as an optimal connection path. In this situation, the connection path analyzing and selecting unit 123 performs a calculation regarding a throughput of the connection path. By referring to FIG. 38, a throughput evaluation value up to the PLC 10-5 is calculated as follows:

$$(1/1)+(1/10)+(1/1)+(1/0.1)+(1/1)=13.1$$

Accordingly, the throughput value is input, when the connection path is output. The result of this process is shown in FIG. 37-3. After that, the constraints shown in FIG. 12 are checked to see if it is possible to further collect information with respect to networks. In the present example, because the constraint B is applicable, the B1 process shown in FIG. 36-2 will not be performed. The B2 process in which the field network is used as the processing target as described in (2-8) has thus been completed.

(2-11) The PLCs Connected to the Inter-Controller Network No. 1

The connection path to the inter-controller network No. 1 that has been collected during the process described in (2-6) as one of the networks connected to the PLC 10-4 extends as follows: "the PLC 10-3→the inter-controller network No. 1→the PLC 10-4→the inter-controller network No. 1". Because the same network appears a plurality of times, the connection path forms a loop. Thus, the B2 process shown in FIG. 36-3 will not be performed. The B1 process in which the PLC 10-4 is used as the processing target as described in (2-6) has thus been completed.

(2-12) Regarding the PLC 10-1

The connection path to the PLC 10-1 that has been collected during the process described in (2-3) as one of the PLCs connected to the inter-controller network No. 1 extends as follows: "the PLC 10-3→the inter-controller network No. 1→the PLC 10-1". Because none of the elements appears a plurality of times, the connection path does not form any loop. Thus, this connection path (i.e., a connection path P1g) is output as an optimal connection path. In this situation, the connection path analyzing and selecting unit 123 performs a calculation regarding a throughput of the connection path. By referring to FIG. 38, a throughput evaluation value up to the PLC 10-1 is calculated as follows:

$$(1/1)+(1/10)+(1/1)=2.1$$

Accordingly, the throughput value is input, when the connection path is output. The result of this process is shown in FIGS. 37-4. After that, the constraints shown in FIG. 12 are checked to see if it is possible to further collect information with respect to networks. In the present example, none of the constraints is applicable. Consequently, it is possible to further collect information with respect to networks. Thus, the PLC 10-1 is selected as a processing target, so that the B1 process shown in FIGS. 36-2 is performed.

(2-13) The Networks Connected to the PLC 10-1

In the B1 process in which the PLC 10-1 is used as the processing target, the networks to which the PLC 10-1 is connected are collected. More specifically, a process to read the network information from the connected network information P1n that is stored in the offline network configuration information shown in FIG. 11 is performed. In this situation, the inter-controller network No. 1, the inter-controller network No. 2, and the information-related network No. 3 are collected as the networks connected to the PLC 10-1. After that, connection paths to the collected networks are created, and it is checked to see whether each of the connection paths forms any loop. It is assumed that this process is performed on the networks without any priority levels so that the networks are sequentially processed.

(2-14) The PLC 10-1 and the Inter-Controller Network No. 1

The connection path to the inter-controller network No. 1 extends as follows: "the PLC 10-3→the inter-controller network No. 1→the PLC 10-1→the inter-controller network No. 1". Because the same network appears a plurality of times, the connection path forms a loop. Thus, the B2 process shown in FIG. 36-3 will not be performed.

(2-15) The PLC 10-1→the Inter-Controller Network No. 2

The connection path to the inter-controller network No. 2 extends as follows: "the PLC 10-3→the inter-controller network No. 1→the PLC 10-1→the inter-controller network No. 2". Because none of the elements appears a plurality of times, the connection path does not form any loop. Thus, the constraints shown in FIG. 12 are checked to see if it is possible to further collect information with respect to the network. In the present example, none of the constraints is applicable. Consequently, it is possible to further collect information with respect to the network. Thus, the inter-controller network No. 2 is selected as a processing target, so that the B2 process shown in FIG. 36-3 is performed.

(2-16) The PLCs Connected to the Inter-Controller Network No. 2

In the B2 process in which the inter-controller network No. 2 is used as the processing target, the PLCs connected to the inter-controller network No. 2 are collected. More specifically, from the network data M2 stored in the offline network configuration information shown in FIG. 11, the PLCs that are connected to the inter-controller network No. 2 are searched for and extracted. In the present example, the PLCs 10-2, 10-1, and 10-5 are collected as the PLCs that are connected to the inter-controller network No. 2. After that, connection paths to the collected PLCs are created, and it is checked to see whether each of the connection paths to the PLCs forms any loop. It is assumed that this process is performed on the PLCs without any priority levels so that the PLCs are sequentially processed.

(2-17) The Inter-Controller Network No. 2→the PLC 10-2

The connection path to the PLC 10-2 extends as follows: "the PLC 10-3→the inter-controller network No. 1→the PLC 10-1→the inter-controller network No. 2→the PLC 10-2". Because none of the elements appears a plurality of times, the connection path does not form any loop. Thus, this connection path (i.e., a connection path P2g-1) is output as an optimal connection path. In this situation, the connection path analyzing and selecting unit 123 performs a calculation regarding a throughput of the connection path. By referring to FIG. 38, a throughput evaluation value up to the PLC 10-2 is calculated as follows:

$$(1/1)+(1/10)+(1/1)+(1/10)+(1/1)=3.2$$

Accordingly, the throughput value is input, when the connection path is output. The result of this process is shown in FIG. 37-5. After that, the constraints shown in FIG. 12 are checked to see if it is possible to further collect information with respect to the networks connected to the PLC 10-2. In the present example, because none of the constraints is applicable, the PLC 10-2 is selected as a processing target, so that the B1 process shown in FIG. 36-2 is performed.

(2-18) The Networks Connected to the PLC 10-2

In the B1 process in which the PLC 10-2 is used as the processing target, the networks to which the PLC 10-2 is connected are collected. More specifically, a process to read the networks stored in the connected network information P2n from the offline network configuration information shown in FIG. 11 is performed. In this situation, the inter-controller network No. 2 and the information-related network No. 3 are collected as the networks that are connected to the PLC 10-2. After that, connection paths to the collected networks are created, and it is checked to see whether each of the connection paths forms any loop. It is assumed that this process is performed on the networks without any priority levels so that the networks are sequentially processed.

(2-19) The PLC 10-2→the Inter-Controller Network No. 2

The connection path to the inter-controller network No. 2 extends as follows: "the PLC 10-3→the inter-controller network No. 1→the PLC 10-1→the inter-controller network No. 2→the PLC 10-2→the inter-controller network No. 2". Because the same network appears a plurality of times, the connection path forms a loop. Thus, the B2 process shown in FIG. 36-3 will not be performed.

(2-20) The PLC 10-2→the Information-Related Network No. 3

The connection path to the information-related network No. 3 extends as follows: "the PLC 10-3→the inter-controller network No. 1→the PLC 10-1→the inter-controller network No. 2→the PLC 10-2→the information-related network No. 3". Because none of the elements appears a plurality of times, the connection path does not form any loop. Thus, the constraints shown in FIG. 12 are checked to see if it is possible to further collect information with respect to the network. In the present example, because none of the constraints is applicable, the information-related network No. 3 is selected as a processing target, so that the B2 process shown in FIG. 36-3 is performed.

(2-21) The PLCs Connected to the Information-Related Network No. 3

In the B2 process in which the information-related network No. 3 is used as the processing target, the PLCs connected to the information-related network No. 3 are collected. More specifically, from the network data E3 stored in the offline network configuration information shown in FIG. 11, the PLCs that are connected to the information-related network No. 3 are searched for and extracted. In the present example, the PLCs 10-1 and 10-2 are collected as the PLCs that are connected to the information-related network No. 3. After that, connection paths to the collected PLCs are created, and it is checked to see whether each of the connection paths to the PLCs forms any loop. It is assumed that this process is performed on the PLCs without any priority levels so that the PLCs are sequentially processed.

(2-22) The Information-Related Network No. 3→the PLC 10-1

The connection path to the PLC 10-1 extends as follows: "the PLC 10-3→the inter-controller network No. 1→the PLC 10-1→the inter-controller network No. 2→the PLC 10-2→the information-related network No. 3→the PLC 10-1". Because the same PLC appears a plurality of times, the connection path forms a loop. Thus, this connection path will not be output.

(2-23) The Information-Related Network No. 3→the PLC 10-2

The connection path to the PLC 10-2 extends as follows: "the PLC 10-3→the inter-controller network No. 1→the PLC 10-1→the inter-controller network No. 2→the PLC 10-2→the information-related network No. 3→the PLC 10-2". Because the same PLC appears a plurality of times, the connection path forms a loop. Thus, this connection path will not be output. The B2 process in which the information-related network No. 3 is used as the processing target as described in (2-20) has thus been completed. Also, the B1 process in which the PLC 10-2 is used as the processing target as described in (2-17) has thus been completed.

(2-24) The Inter-Controller Network No. 2→the PLC 10-1

The connection path to the PLC 10-1 extends as follows: "the PLC 10-3→the inter-controller network No. 1→the PLC 10-1→the inter-controller network No. 2→the PLC 10-1". Because the same PLC appears a plurality of times, the connection path forms a loop. Thus, the B1 process shown in FIG. 36-2 will not be performed.

(2-25) The Inter-Controller Network No. 2→the PLC 10-5

The connection path to the PLC 10-5 extends as follows: "the PLC 10-3→the inter-controller network No. 1→the PLC 10-1→the inter-controller network No. 2→the PLC 10-5". Because none of the elements appears a plurality of times, the connection path does not form any loop. In this situation, the connection path analyzing and selecting unit 123 performs a calculation regarding a throughput of the connection path. By referring to FIG. 38, a throughput evaluation value up to the PLC 10-5 is calculated as follows:

$$(1/1)+(1/10)+(1/1)+(1/10)+(1/1)=3.2$$

However, as for the path up to the PLC 10-5, the connection path P5*g*-1 had already been output, as shown in FIG. 37-3. Because the throughput value of the connection path P5*g*-1 is 13.1, the connection path calculated this time has a better throughput value. Accordingly, the connection path that has been calculated this time having the better throughput is output as an optimal connection path P5*g*, so as to replace the connection path that had already been output. The result of this process is shown in FIG. 37-3. In FIG. 37-3, the lines striking through the contents of the data for the connection path P37-3 indicate that the data is deleted and overwritten with the data positioned below. After that, the constraints shown in FIG. 12 are checked to see if it is possible to further collect information with respect to networks. In the present example, because none of the constraints is applicable, the PLC 10-5 is selected as a processing target, so that the B1 process shown in FIG. 36-2 is performed.

(2-26) The Networks Connected to the PLC 10-5

In the B1 process in which the PLC 10-5 is used as the processing target, the networks to which the PLC 10-5 is connected are collected. More specifically, a process to read the networks stored in the connected network information P5*n* from the offline network configuration information shown in FIG. 11 is performed. In this situation, the field network and the inter-controller network No. 2 are collected as the networks that are connected to the PLC 10-5. After that, connection paths to the collected networks are created, and it is checked to see whether each of the connection paths forms any loop. It is assumed that this process is performed on the networks without any priority levels so that the networks are sequentially processed.

(2-27) The PLC 10-5→the Field Network

The connection path to the field network extends as follows: "the PLC 10-3→the inter-controller network No. 1→the PLC 10-1→the inter-controller network No. 2→the PLC 10-5→the field network". Because none of the elements appears a plurality of times, the connection path does not form any loop. Thus, the constraints shown in FIG. 12 are checked to see if it is possible to further collect information with respect to the network. In the present example, because none of the constraints is applicable, the field network is selected as a processing target, so that the B2 process shown in FIG. 36-3 is performed.

(2-28) The PLCs Connected to the Field Network

In the B2 process in which the field network is used as the processing target, information of the PLCs that are connected to the field network is collected. More specifically, from the network data C stored in the offline network configuration information shown in FIG. 11, the PLCs that are connected to the field network are searched for and extracted. In the present example, the PLCs 10-4 and 10-5 are collected as the PLCs that are connected to the field network. After that, connection paths to the collected PLCs are created, and it is checked to see whether each of the connection paths to the PLCs forms any loop. It is assumed that this process is performed on the PLCs without any priority levels so that the PLCs are sequentially processed.

(2-29) The Field Network→the PLC 10-4

The connection path to the PLC 10-4 extends as follows: "the PLC 10-3→the inter-controller network No. 1→the PLC 10-1→the inter-controller network No. 2→the PLC 10-5→the field network→the PLC 10-4". Because none of the elements appears a plurality of times, the connection path does not form any loop. In this situation, the connection path analyzing and selecting unit 123 performs a calculation regarding a throughput of the connection path. By referring to FIG. 38, a throughput evaluation value up to the PLC 10-4 is calculated as follows:

$$(1/1)+(1/10)+(1/1)+(1/10)+(1/1)+(1/0.1)+(1/1)=14.2$$

However, as for the path up to the PLC 10-4, the connection path P4g had already been output, as shown in FIG. 37-2. Because the throughput value of the connection path P4g is 2.1, the existing connection path has a better throughput value than the connection path calculated this time. Accordingly, the connection path that had already been output and has the better throughput is selected as an optimal connection path (FIG. 37-2).

(2-30) The Field Network→the PLC 10-5

The connection path to the PLC 10-5 extends as follows: "the PLC 10-3→the inter-controller network No. 1→the PLC 10-1→the inter-controller network No. 2→the PLC 10-5→the field network→the PLC 10-5". Because the same PLC appears a plurality of times, the connection path forms a loop. Thus, this connection path will not be output. The B2 process in which the field network is used as the processing target as described in (2-28) has thus been completed.

(2-31) The PLC 10-5→the Inter-Controller Network No. 2

The connection path to the inter-controller network No. 2 extends as follows: "the PLC 10-3→the inter-controller network No. 1→the PLC 10-1→the inter-controller network No. 2→the PLC 10-5→the inter-controller network No. 2". Because the same network appears a plurality of times, the connection path forms a loop. Thus, the B2 process shown in FIG. 36-3 will not be performed. The B1 process in which the PLC 10-5 is used as the processing target as described in (2-26) has thus been completed. Also, the B2 process shown in FIG. 36-3 in which the inter-controller network No. 2 is used as the processing target as described in (2-16) has thus been completed.

(2-32) The PLCs Connected to the Information-Related Network No. 3

The connection path to the information-related network No. 3 that has been collected during the process described in (2-13) as one of the networks selected by the PLC 10-1 extends as follows: "the PLC 10-3→the inter-controller network No. 1→the PLC 10-3→the information-related network No. 3". Because none of the elements appears a plurality of times, the connection path does not form any loop. Thus, the constraints shown in FIG. 12 are checked to see if it is possible to further collect information with respect to the network. In the present example, none of the constraints is applicable. Consequently, it is possible to further collect information with respect to the network. Thus, the information-related network No. 3 is selected as a processing so that the B2 process shown in FIG. 36-3 is performed.

In the B2 process in which the information-related network No. 3 is used as the processing target, the PLCs that are connected to the information-related network No. 3 are collected. More specifically, from the network data E3 stored in the offline network configuration information shown in FIG. 11, the PLCs that are connected to the information-related network No. 3 are searched for and extracted. In the present example, the PLCs 10-1 and 10-2 are collected as the PLCs that are connected to the information-related network No. 3. After that, connection paths to the collected PLCs are created, and it is checked to see whether each of the connection paths to the PLCs forms any loop. It is assumed that this process is performed on the PLCs without any priority levels so that the PLCs are sequentially processed.

(2-33) The Information-Related Network No. 3→the PLC 10-1

The connection path to the PLC 10-1 extends as follows: "the PLC 10-3→the inter-controller network No. 1→the PLC 10-3→the information-related network No. 3→the PLC 10-1". Because the same PLC appears a plurality of times, the connection path forms a loop. Thus, this connection path will not be output.

(2-34) The Information-Related Network No. 3→the PLC 10-2

The connection path to the PLC 10-2 extends as follows: "the PLC 10-3→the inter-controller network No. 1→the PLC 10-3→the information-related network No. 3→the PLC 10-2". Because none of the elements appears a plurality of times, the connection path does not form any loop. In this situation, the connection path analyzing and selecting unit 123 performs a calculation regarding a throughput of the connection path. By referring to FIG. 38, a throughput evaluation value up to the PLC 10-2 is calculated as follows:

$$(1/1)+(1/10)+(1/1)+(1/100)+(1/1)=3.11$$

However, as for the path up to the PLC 10-2, the connection path P2g-1 had already been output, as shown in FIG. 37-5. Because the throughput value of the connection path P2g-1 is 3.2, the connection path calculated this time has a better throughput value. Accordingly, the connection path that has been calculated this time having the better throughput is output as an optimal connection path P2g, so as to replace the connection path P2g-1 that had already been output. The result of this process is shown in FIG. 37-5. After that, the constraints shown in FIG. 12 are checked to see if it is possible to further collect information with respect to networks. In the present example, because none of the constraints is applicable, the PLC 10-2 is selected as a processing target, so that the B1 process shown in FIG. 36-2 is performed.

(2-35) The Networks Connected to the PLC 10-2

In the B1 process in which the PLC 10-2 is used as the processing target, the networks to which the PLC 10-2 is connected are collected. More specifically, a process to read the networks stored in the connected network information P2n from the offline network configuration information shown in FIG. 11 is performed. In this situation, the inter-controller network No. 2 and the information-related network No. 3 are collected as the networks that are connected to the PLC 10-2. After that, connection paths to the collected networks are created, and it is checked to see whether each of the connection paths forms any loop. It is assumed that this process is performed on the networks without any priority levels so that the networks are sequentially processed.

(2-36) The PLC 10-2→the Inter-Controller Network No. 2

The connection path to the inter-controller network No. 2 extends as follows: "the PLC 10-3→the inter-controller network No. 1→the PLC 10-3→the information-related network No. 3→the PLC 10-2→the inter-controller network No. 2". Because none of the elements appears a plurality of times, the connection path does not form any loop. Thus, the constraints shown in FIG. 12 are checked to see if it is possible to further collect information with respect to the network. In the present example, because none of the constraints is applicable, the inter-controller network No. 2 is selected as a processing so that the B2 process shown in FIG. 36-3 is performed.

(2-37) The PLCs Connected to the Inter-Controller Network No. 2

In the B2 process in which the inter-controller network No. 2 is used as the processing target, information of the PLCs that are connected to the inter-controller network No. 2 is collected. More specifically, from the network data M2 stored in the offline network configuration information shown in FIG. 11, the PLCs that are connected to the inter-controller network No. 2 are searched for and extracted. In the present example, the PLCs 10-2, 10-1, and 10-5 are collected as the PLCs that are connected to the inter-controller network No. 2. After that, connection paths to the collected PLCs are created, and it is checked to see whether each of the connection paths to the PLCs forms any loop. It is assumed that this process is performed on the PLCs without any priority levels so that the PLCs are sequentially processed.

(2-38) The Inter-Controller Network No. 2→the PLC 10-2

The connection path to the PLC 10-2 extends as follows: "the PLC 10-3→the inter-controller network No. 1→the PLC 10-1→the information-related network No. 3→the PLC 10-2→the inter-controller network No. 2→the PLC 10-2". Because the same PLC appears a plurality of times, the connection path forms a loop. Thus, this connection path will not be output.

(2-39) The Inter-Controller Network No. 2→the PLC 10-1

The connection path to the PLC 10-1 extends as follows: "the PLC 10-3→the inter-controller network No. 1→the PLC 10-3→the information-related network No. 3→the PLC 10-2→the inter-controller network No. 2→the PLC 10-1". Because the same PLC appears a plurality of times, the connection path forms a loop. Thus, this connection path will not be output.

(2-40) The Inter-Controller Network No. 2→the PLC 10-5

The connection path to the PLC 10-5 extends as follows: "the PLC 10-3→the inter-controller network No. 1→the PLC 10-3→the information-related network No. 3→the PLC 10-2→the inter-controller network No. 2→the PLC 10-5". Because none of the elements appears a plurality of times, the connection path does not form any loop. In this situation, the connection path analyzing and selecting unit 123 performs a calculation regarding a throughput of the connection path. By referring to FIG. 38, a throughput evaluation value up to the PLC 10-5 is calculated as follows:

$$(1/1)+(1/10)+(1/1)+(1/100)+(1/1)+(1/10)+(1/1)=4.21$$

However, as for the path up to the PLC 10-5, the connection path P5g had already been output, as shown in FIG. 37-3. Because the throughput value of the connection path P5g is 3.2, the existing connection path has a better throughput value than the connection path calculated this time. Accordingly, the connection path that had already been output and has the better throughput is selected as an optimal connection path (FIG. 37-3). The B2 process in which the inter-controller network No. 2 is used as the processing target as described in (2-37) has thus been completed.

(2-41) The PLCs Connected to the Information-Related Network No. 3

The connection path to the information-related network No. 3 that has been collected during the process described in (2-35) as one of the networks connected to the PLC 10-2 extends as follows: "the PLC 10-3→the inter-controller network No. 1→the PLC 10-1→the information-related network No. 3→the PLC 10-2→the information-related network No. 3". Because the same network appears a plurality of times, the connection path forms a loop. Thus, the B2 process shown in FIG. 36-3 will not be performed. The B1 process shown in FIG. 36-2 in which the PLC 10-2 is used as the processing target as described in (2-35) has thus been completed. Also, the B2 process in which the information-related network No. 3 is used as the processing target as described in (2-32) has thus been completed. In addition, the B1 process in which the PLC 10-1 is used as the processing target as described in (2-13) has thus been completed. Further, the B2 process in which the inter-controller network No. 1 is used as the processing target as described in (2-11) has thus been completed. Furthermore, the B1 process in which the PLC 10-3 is used as the processing target as described in (2-2) has thus been completed. As a result, the connection path analyzing process has thus been completed.

<Connection Path Displaying Process>

When the connection paths as shown in FIGS. 37-1 to 37-5 have been stored in the offline connection path storing unit 125 as a result of the offline connection path analyzing process described above, the connection path display unit 120 displays the connection paths with highlight on the display unit 112, based on the stored connection paths.

Figure 39:
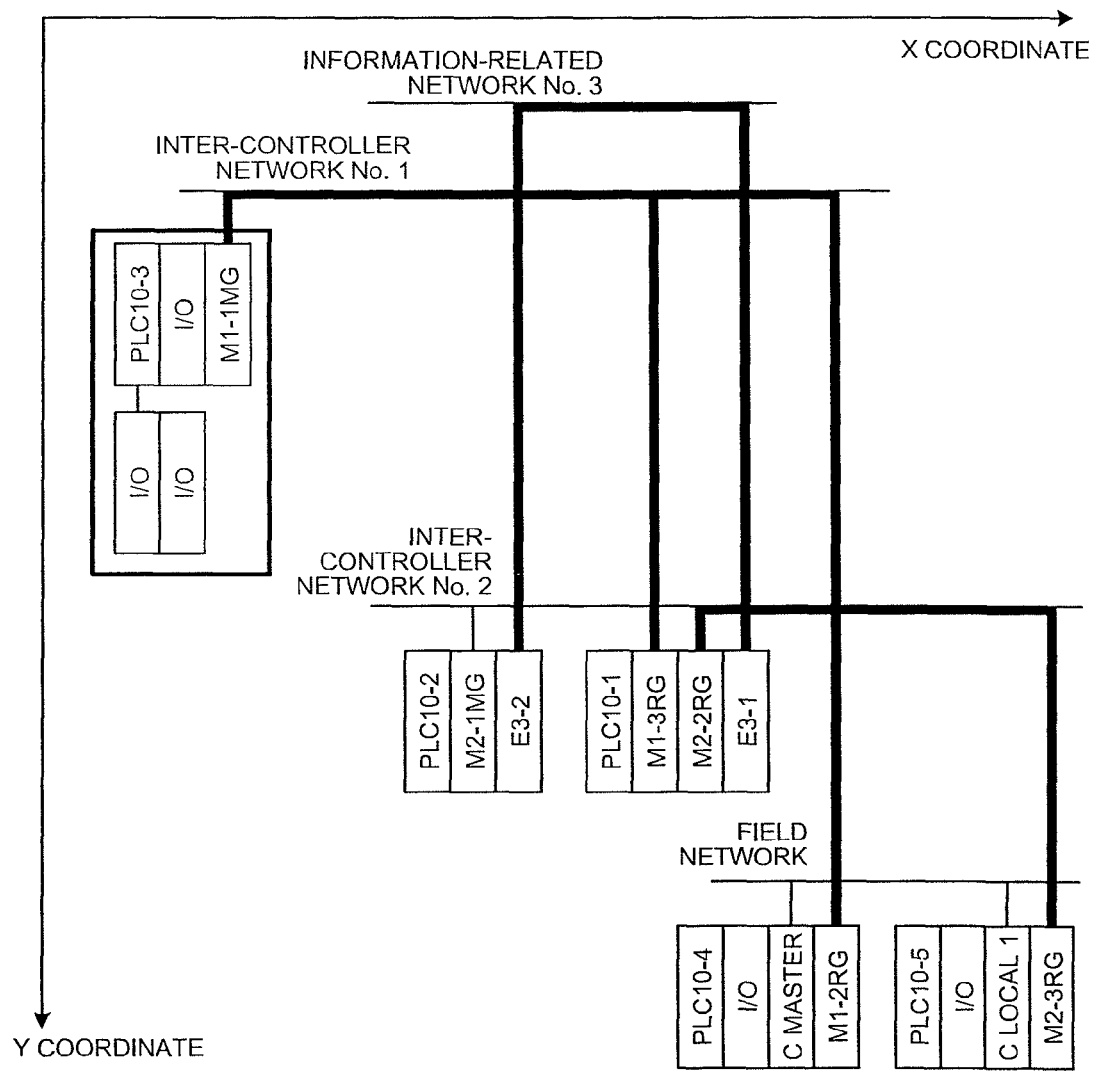
FIG. 39 is a drawing of an example of a display screen displaying offline connection paths.

FIG. 39 is a drawing of an example of a display screen displaying the offline connection paths. As shown in FIG. 39, it is possible to easily understand the connection paths to the PLCs. In this situation, as described above, the paths having better communication throughputs have been selected.

Another arrangement is also acceptable in which accessible PLCs and inaccessible PLCs are displayed with highlight in such a manner that they are distinguishable from each other. With this arrangement for the display, it is possible to easily recognize the PLCs that are accessible (or to easily recognize the PLCs that are inaccessible) from the originating PLC.

Figure 40:
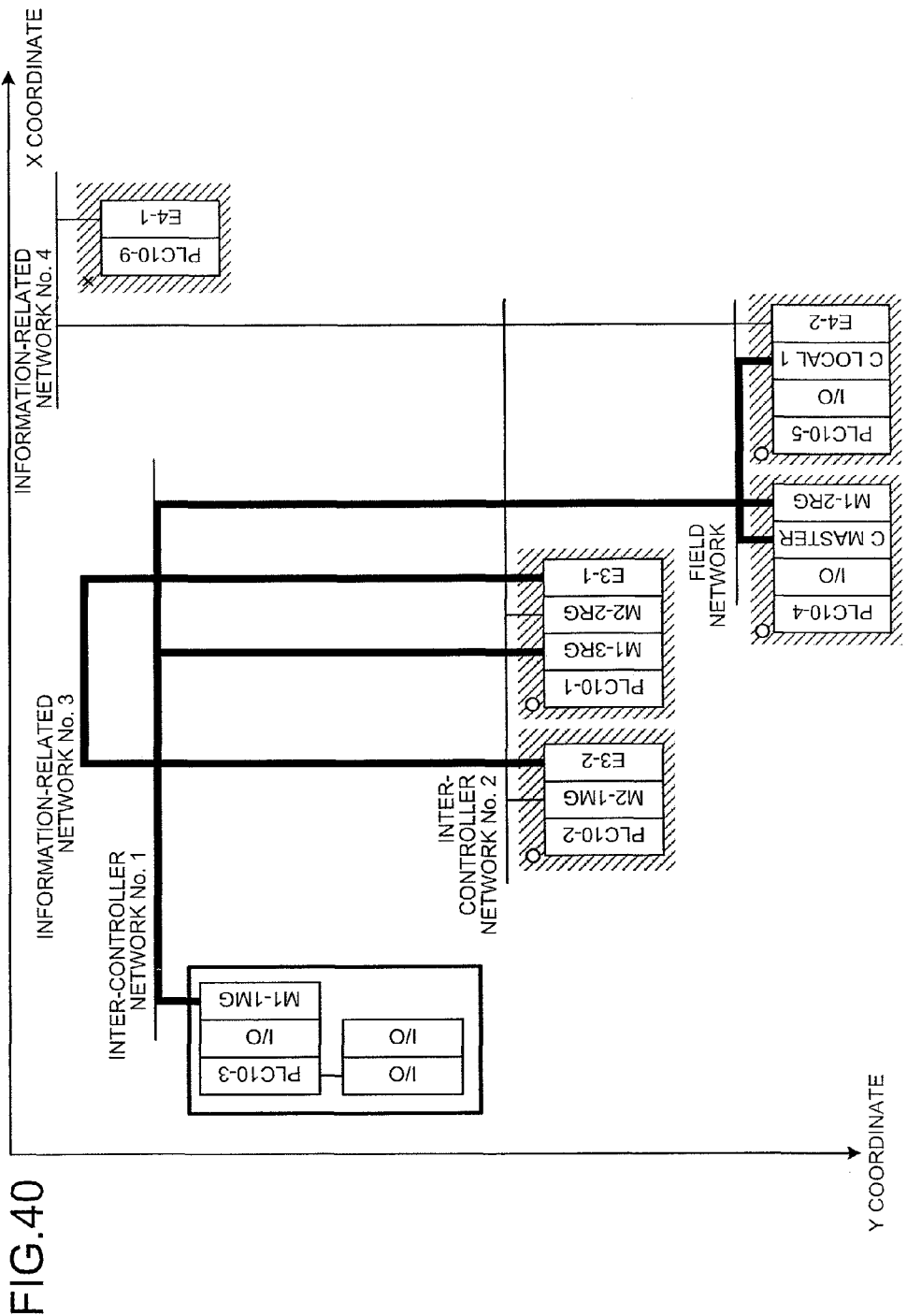
FIG. 40 is a drawing of another example of a display screen displaying offline connection paths.

FIG. 40 is a drawing of another example of a display screen displaying offline connection paths. In FIG. 40, the PLCs that are accessible from the originating PLC under the constraints shown in FIG. 12 are each indicated with an "O" mark placed nearby. In contrast, the PLCs that are inaccessible from the originating PLC due to the constraints shown in FIG. 12 are each indicated with an "X" mark placed nearby. With this arrangement, it is possible to immediately distinguish the PLCs that are accessible from the originating PLC from the PLCs that are inaccessible from the originating PLC. In the example shown in FIG. 40, beyond the PLC 10-5, a PLC 10-9 is connected thereto via an information-related network No. 4. However, because the PLC 10-9 is only accessible via the PLC 10-5, which is a local station in the field network, the constraint B shown in FIG. 12 is applicable thereto. Accordingly, the PLC 10-9 is indicated as inaccessible.

According to the fourth embodiment, an advantageous effect is achieved where, in the network diagram of the control system created offline, it is possible to easily recognize the PLCs that are accessible from the PLC serving as the originating point and to understand, in advance, the connection paths to the PLCs in such situations. In addition, another advantageous effect is achieved where, in the case where there are a plurality of connection paths from the originating PLC, the optimal connection path that is selected according to the predetermined criteria is automatically selected.

Fifth Embodiment

Due to the connection constraints described above as shown in FIG. 12, in the networks included in the control system, it is not necessarily the case that all the PLCs in the system are accessible regardless of where the control system engineering apparatus is connected. As a result, if there is an inaccessible PLC, it is necessary to perform an operation to once remove a connection cable that connects the control system engineering apparatus and another PLC together and to make a new connection to the target PLC. Further, the communication speed may be lowered depending on where the control system engineering apparatus is connected.

To cope with these circumstances, in a fifth embodiment of the present invention, a control system engineering apparatus and a control system engineering method with which, in the networks included in the control system, it is possible to automatically calculate, in the configuration according to the fourth embodiment, such a PLC used as a connection point (the originating PLC) for the control system engineering apparatus that makes it possible to connect to all the PLCs and makes it possible to perform communication at a high speed (i.e., using such paths that make an overall throughput optimal).

Figure 41:
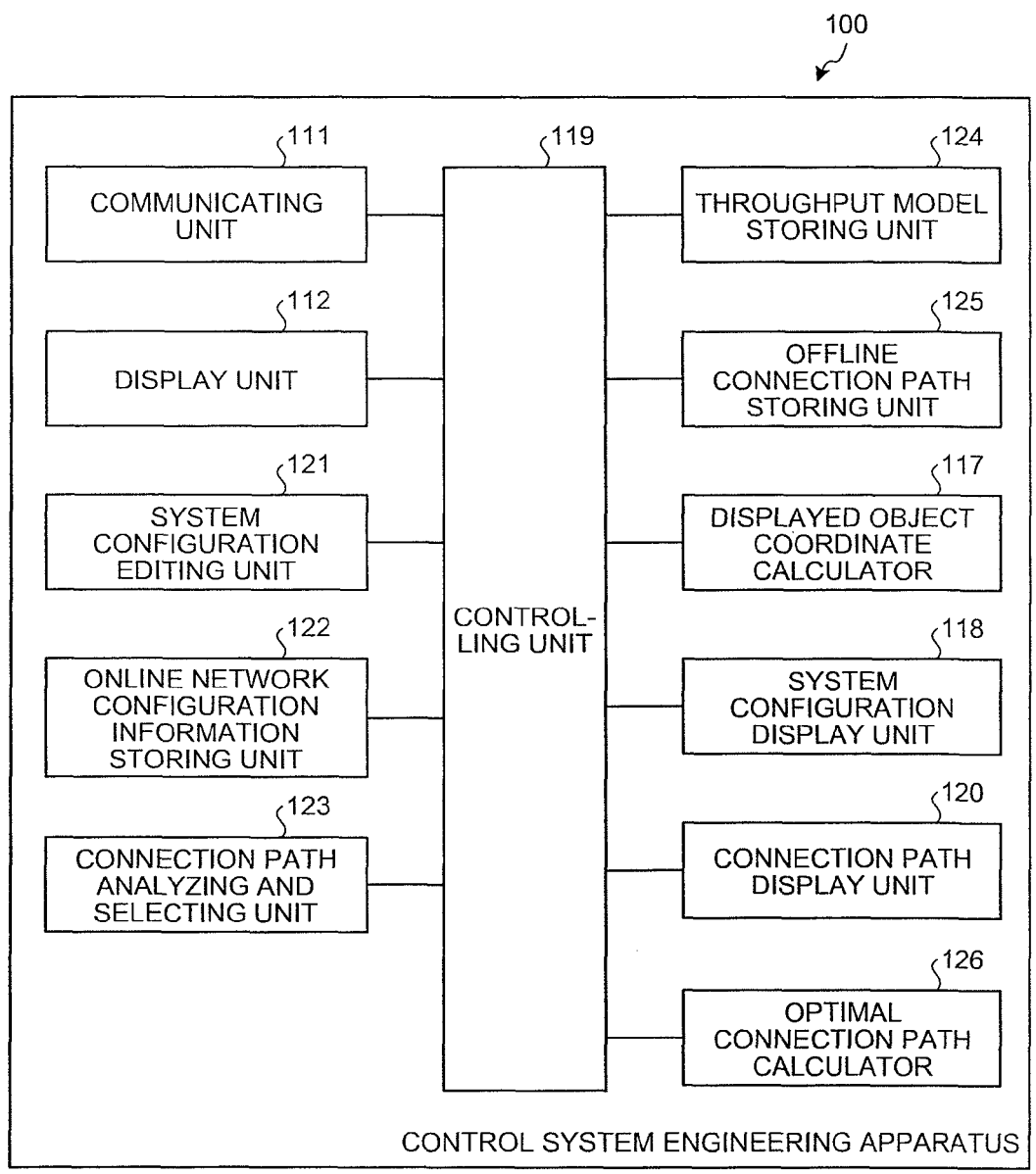
FIG. 41 is a schematic block diagram of a functional configuration of a control system engineering apparatus according to a fifth embodiment of the present invention.

FIG. 41 is a schematic block diagram of a functional configuration of a control system engineering apparatus according to the fifth embodiment of the present invention. In contrast to the configuration shown in FIG. 35 according to the fourth embodiment, the control system engineering apparatus 100 is characterized by omitting the originating PLC specifying unit 113 and further including an optimal connection path calculator 126.

The optimal connection path calculator 126 has a function of extracting only such candidates that each make it possible to connect to all the PLCs by sequentially applying the connection path analyzing and selecting process performed by the connection path analyzing and selecting unit 123 to each of all the candidates for the connection point (i.e., the originating PLC) for the control system engineering apparatus 100 and further extracting, from among the extracted candidates, the candidate that has a good overall communication throughput to the PLCs so as to obtain optimal connection paths. The optimal connection path calculator 126 corresponds to the optimal connection path calculator in the claims.

Next, processes performed in the control system engineering apparatus configured according to the fifth embodiment will be explained. FIG. 42 is a flowchart of an example of a procedure in an optimal connection path calculating process. In the following sections, the optimal connection path calculating process will be explained by using the control system configured as shown in FIG. 1 as an example. First, the optimal connection path calculator 126 extracts PLCs each of which is a candidate for an originating PLC (step S371). More specifically, the optimal connection path calculator 126 extracts all the PLCs stored in the offline network configuration information shown in FIG. 11. In the present example, five PLCs that are namely the PLCs 10-1 to 10-5 are extracted.

After that, the offline connection path analyzing process shown in FIGS. 36-1 to 36-3 is performed by using each of the extracted PLCs as the originating PLC (step S372). The connection path data that is obtained as a result of performing the offline connection path analyzing process by using the PLC 10-3 as the originating PLC is the same as the result shown in FIGS. 37-1 to 37-5 according to the fourth embodiment. FIGS. 43-1 to 43-5 are drawings of connection path data that is obtained in the case where the connection path analyzing process is performed by using the PLC 10-1 as the originating PLC. FIGS. 44-1 to 44-5 are drawings of connection path data that is obtained in the case where the connection path analyzing process is performed by using the PLC 10-2 as the originating PLC. FIGS. 45-1 to 45-5 are drawings of connection path data that is obtained in the case where the connection path analyzing process is performed by using the PLC 10-4 as the originating PLC. FIGS. 46-1 to 46-5 are drawings of connection path data that is obtained in the case where the connection path analyzing process is performed by using the PLC 10-5 as the originating PLC.

After that, with respect to each of the results obtained by performing the connection path analyzing process, it is checked to see if it is possible to connect to all the PLCs (step S373). At this point in time, depending on which PLC is selected as the originating point, situations may arise where there are one or more PLCs to which it is not possible to connect, due to the constraints shown in FIG. 12. Thus, it is checked to see if there is any conflict with the constraints shown in FIG. 12. In the present example, it is possible to connect to all the PLCs no matter which one of the PLCs is used as the originating PLC.

Next, among the results obtained by performing the connection path analyzing process, the throughput evaluation values for the entirety of the system configuration (total throughput evaluation values) are compared (step S374). The throughput model used in this process is the same as the throughput model shown in FIG. 38 used in the fourth embodiment. Throughput evaluation values and a total value thereof obtained by using each of the PLCs as the originating point are shown below:

<When the PLC 10-1 is Used as the Originating PLC>
the PLC 10-1 ($P1g1$)=0
the PLC 10-2 ($P2g1$)=2.01
the PLC 10-3 ($P3g1$)=2.1
the PLC 10-4 ($P4g1$)=2.1
the PLC 10-5 ($P5g1$)=2.1
The total throughput evaluation value=8.31
<When the PLC 10-2 is used as the originating PLC>
the PLC 10-1 ($P1g2$)=2.01
the PLC 10-2 ($P2g2$)=0
the PLC 10-3 ($P3g2$)=3.2
the PLC 10-4 ($P4g2$)=3.2
the PLC 10-5 ($P5g2$)=2.1
The total throughput evaluation value=10.51
<When the PLC 10-3 is Used as the Originating PLC>
the PLC 10-1 ($P1g$)=2.1
the PLC 10-2 ($P2g$)=3.11
the PLC 10-3 ($P3g$)=0
the PLC 10-4 ($P4g$)=2.1
the PLC 10-5 ($P5g$)=3.2
The total throughput evaluation value=10.51
<When the PLC 10-4 is Used as the Originating PLC>
the PLC 10-1 ($P1g4$)=2.1
the PLC 10-2 ($P2g4$)=3.11
the PLC 10-3 ($P3g4$)=2.1
the PLC 10-4 ($P4g4$)=0
the PLC 10-5 ($P5g4$)=3.2
The total throughput evaluation value=10.51
<When the PLC 10-5 is Used as the Originating PLC>
the PLC 10-1 ($P1g5$)=2.1
the PLC 10-2 ($P2g5$)=2.1
the PLC 10-3 ($P3g5$)=3.2
the PLC 10-4 ($P4g5$)=3.2
the PLC 10-5 ($P5g5$)=0
The total throughput evaluation value=10.6

After that, the optimal connection path calculator 126 extracts one of the candidates that has the best throughput for the entirety of the system configuration, based on the total throughput evaluation values each of which has been calculated by using a different one of the PLCs as the originating point (step S375) and outputs the result to the offline connection path storing unit 125, as optimal connection paths (step S376). Because the throughput model used in the fourth embodiment is used, such a candidate that has the smallest total throughput evaluation value is the optimal candidate.

Based on the results listed above, the total throughput evaluation value for the connection path data that is obtained when the PLC 10-1 is used as the originating PLC is the smallest. Thus, the optimal connection path indicated in FIG. 43-1 to FIG. 43-5 is output to the offline connection path storing unit 125 as the optimal connection path. Thus, the optimal connection path calculating process has thus been completed.

Figure 47:
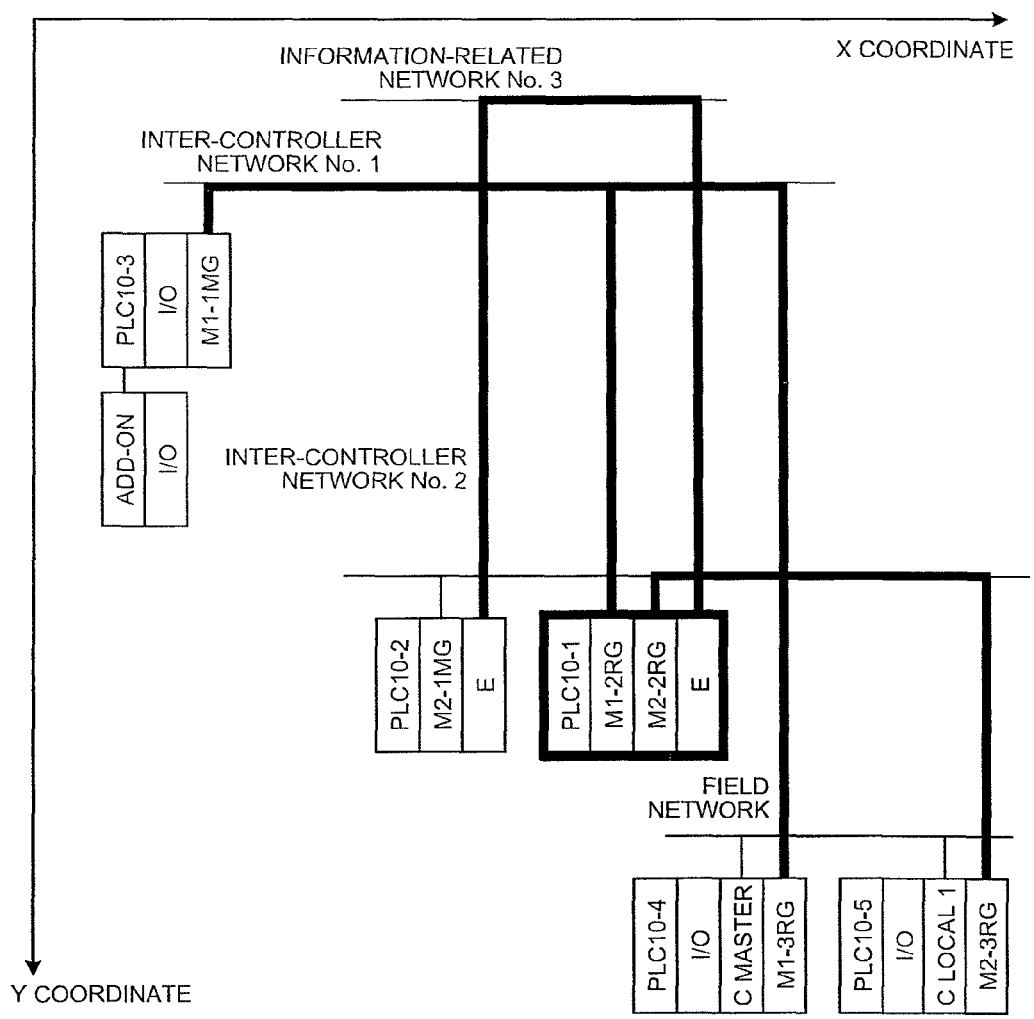
FIG. 47 is a drawing of an example of a display screen displaying optimal connection paths.

After that, the connection path display unit 120 displays the optimal connection paths in an offline system configuration diagram, based on the optimal connection paths that have been calculated by the optimal connection path calculator 126. FIG. 47 is a drawing of an example of a display screen displaying the optimal connection paths. FIG. 47 is obtained by displaying the connection paths by using the connection path displaying process according to the third embodiment, based on the optimal connection path indicated in FIGS. 43-1. As a result, the user of the control system engineering apparatus 100 is able to understand that, when the control system engineering apparatus 100 is connected to the PLC 10-1, it is possible to connect to all the PLCs included in the control system and to transfer data with a high throughput.

According to the fifth embodiment, it is possible to calculate such a position in the networks in the control system constructed offline that makes it possible to access all the PLCs in the control system and makes it possible to perform communication at a high speed. As a result, by connecting the control system engineering apparatus in the position, an advantageous effect is achieved where it is possible to reduce the time period that is required when an operation to download or upload data related to settings is performed.

Sixth Embodiment

In a sixth embodiment of the present invention, a control system engineering apparatus and a control system engineering method with which it is possible to automatically calculate and set a routing parameter used for routing received data to a target PLC into a PLC that is positioned on the way on any of the connection paths from an originating PLC to the other PLCs will be explained. In the following sections, routing parameters used in control systems will be briefly explained first, before the details of the sixth embodiment are explained.

A routing function in a control system is a function for, in a system including a plurality of networks, transferring, by way of a transient transfer, data to be transferred over a plurality of networks to a station having a network number from another network. To realize the routing function, it is necessary to set a routing parameter and to bring the set routing parameter into correspondence with a PLC that plays a role of a bridge to a request destination network number.

Also, it is necessary to set routing parameters into a request source and into a relay station in the transient transfer. In this situation, the "relay station" denotes a PLC that is connected to the plurality of networks. Normally, it is necessary to set two routing parameters into the relay station such as a routing parameter for a transfer from the request source to the request destination (an outgoing transfer) and another routing parameter for a transfer from the request destination to the request source (a returning transfer). It is not necessary to set a routing parameter into the request destination.

Figure 48:
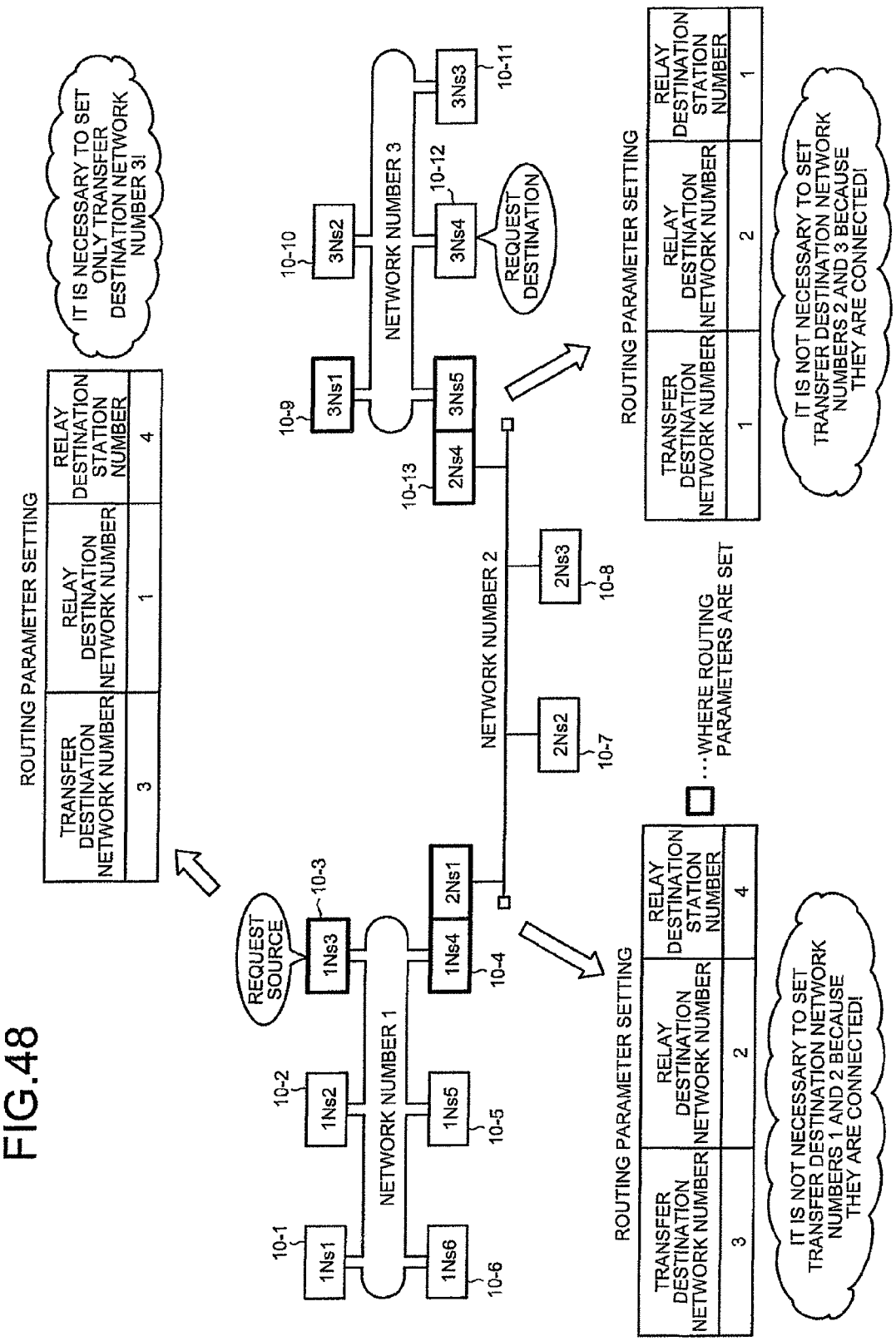
FIG. 48 is a drawing of examples of routing parameters that are set in a control system.

FIG. 48 is a drawing of examples of routing parameters that are set in a control system. In FIG. 48, one or more communication units are shown in each of the rectangles representing the PLCs. In the notations for the communication units, for example, the station having the station number "1" for a network No. 1 is expressed as "1Ns1". A PLC connected to a plurality of networks is provided with a plurality of network units.

In the example shown in FIG. 48, the control system is configured in such a manner that three networks that are namely the network No. 1, a network No. 2, and a network No. 3 are connected to one another. Six PLCs (i.e., PLCs 10-1 to 10-6) are connected to the network No. 1. Of these PLCs, the PLC 10-4 of which the station number is 4 is also connected to the network No. 2 that is positioned adjacent to the network No. 1. Accordingly, the PLC 10-4 has a communication unit 1Ns4 used for performing communication with the network No. 1 as well as a communication unit 2Ns1 used for performing communication with the network No. 2. Further, four PLCs (i.e., PLCs 10-4, 10-7, 10-8, and 10-13) are connected to the network No. 2. Of these PLCs, the PLC 10-4 having the station number "1" for the network No. 2 is also connected to the network No. 1 that is positioned adjacent to the network No. 2. Also, the PLC 10-13 having the station number "4" for the network No. 2 is also connected to the network No. 3 that is positioned adjacent to the network No. 2. Accordingly, the PLC 10-13 has a communication unit 2Ns4 used for performing communication with the network No. 2 as well as a communication unit 3Ns5 used for performing communication with the network No. 3. In addition, five PLCs (i.e., PLCs 10-9 to 10-13) are connected to the network No. 3. Of these PLCs, the PLC 10-13 having the station number "5" for the network No. 3 is also connected to the network No. 2 that is positioned adjacent to the network No. 3.

In the following sections, an example will be explained in which data will be transferred by way of a transient transfer from the PLC 10-3 connected to the network No. 1 to the PLC 10-12 connected to the network No. 3. In this situation, it is necessary to set routing parameters into the PLC 10-3 that is connected to the network No. 1 and requests the transient transfer, into the PLC 10-4 that plays a bridging role between the network No. 1 and the network No. 2, and into the PLC 10-13 that plays a bridging role between the network No. 2 and the network No. 3. In the following sections, a process to set the routing parameters into the stations will be explained.

(1) The PLC 10-3 Connected to the Network No. 1

Into the PLC 10-3, a transfer destination network number "3", the communication unit "1Ns4" in the relay station, and the network number "1" of the network relaying the data to that point are set as a routing parameter.

(2) The PLC 10-4 Connected to the Network No. 1

Into the PLC 10-4, the transfer destination network number "3", the communication unit "2Ns4" in the relay station, and the relay network number "2" to that point are set as a routing parameter. Into the PLC 10-13 that is explained in (3) below, a routing parameter for transferring the data from the network No. 2 to the network No. 1 is set. It is therefore not necessary to set a routing parameter for the returning transfer into the PLC 10-4.

(3) the PLC 10-13 Connected to the Network No. 2

As for a setting for the transfer destination, it is not necessary to set a routing parameter for the outgoing transfer into the PLC 10-13 because the network lies beyond the PLC 10-13 is the transfer destination network No. 3. However, as for a routing parameter for the returning transfer, the network number "1" of the network serving as the transfer source is set as the transfer destination network number, and also, the communication unit "2Ns1" in the relay station for the returning transfer, and the relay network number "2" to that point are set.

By setting the routing parameters into the stations in this manner, it is possible to transfer the data from the PLC 10-3 connected to the network No. 1 to the PLC 10-12 connected to the network No. 3.

Next, a procedure in the data transfer in which the routing parameters that have been set as described above are used will be briefly explained. First, the PLC 10-3 connected to the network No. 1 transmits the data to be transmitted to the PLC 10-13 connected to the network No. 3, based on the routing parameter. More specifically, according to the set parameter indicating that the transfer destination network number is "3", whereas the relay destination network is "1", and the relay destination station number is "4", the PLC 10-3 transmits the data. As a result, the data transmitted from the PLC 10-3 is transmitted to the PLC 10-4 (the PLC having the station number "4" for the network No. 1 and having the communication unit 1Ns4) via the network No. 1.

When the communication unit 1Ns4 included in the PLC 10-4 has received the data, because the destination is indicated as the PLC 10-12 connected to the network No. 3, the communication unit 1Ns4 transmits the data to the PLC 10-13 having the relay destination station number "4" for the relay destination network No. 2, via the communication unit 2Ns1 and the network No. 2, by referring to the routing parameter. Because the received data is indicated as data to be transmitted to the PLC 10-12 connected to the network No. 3, the PLC 10-13 transmits the data to the PLC 10-12 via the communication unit 3Ns5 and the network No. 3. The outgoing data transfer has thus been completed.

Next, the data transfer (i.e., the returning data transfer) from the PLC 10-12 connected to the network No. 3, which is the request destination, to the PLC 10-3 connected to the network No. 1, which is the request source, will be explained. In this situation, the PLC 10-12 connected to the network No. 3 transmits the data of which the destination is indicated as the PLC 10-3 connected to the network No. 1, which is the transfer destination. The data will reach the PLC 10-13 via the network No. 3. Because the destination of the data is indicated as the PLC 10-3 connected to the transfer destination network No. 1, the PLC 10-13 transfers the data to the PLC 10-4 connected to the network No. 2, of which the relay destination network is "network No. 2" and the relay destination station number is "1", by referring to the routing parameter.

Because the destination of the data is indicated as the PLC 10-3 connected to the network No. 1, the PLC 10-4 connected to the network No. 2 transmits the data to the PLC 10-3, which is the destination, via the communication unit 1Ns4 that is installed on the same base and via the network No. 1. After that, the PLC 10-3 receives the data from the PLC 10-12 connected to the network No. 3. The returning data transfer has thus been completed.

The data transfer over the plurality of networks in the control system is performed by using the mechanism described above. In the following sections, a process to set network parameters into the PLCs included in the controls system will be explained.

Figure 49:
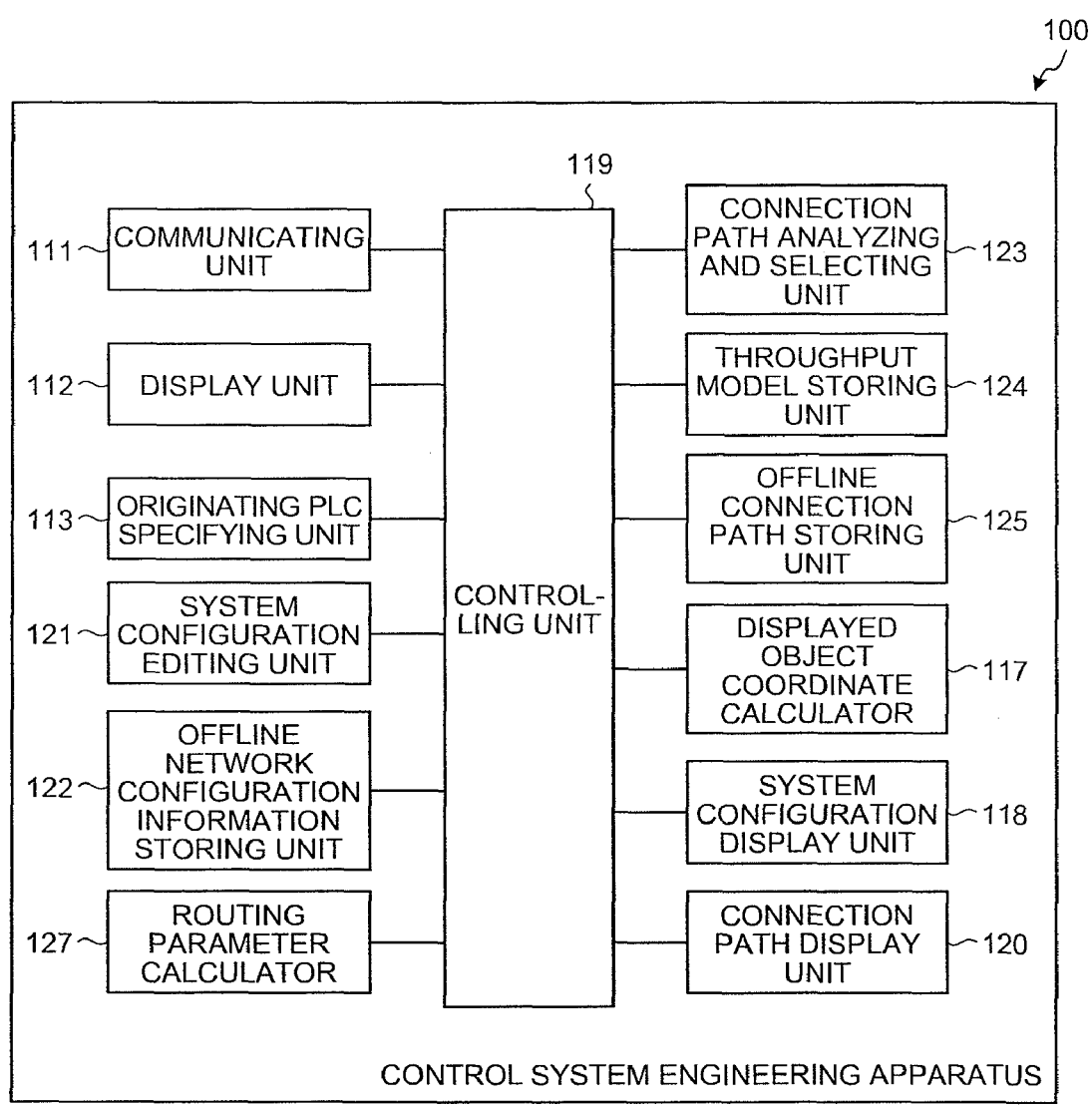
FIG. 49 is a schematic block diagram of a functional configuration of a control system engineering apparatus according to a sixth embodiment of the present invention.

FIG. 49 is a schematic block diagram of a functional configuration of the control system engineering apparatus according to the sixth embodiment of the present invention. In addition to the configuration shown in FIG. 35 according to the fourth embodiment, the control system engineering apparatus 100 according to the sixth embodiment further includes a routing parameter calculator 127 that reads the connection paths from the originating PLC to the PLCs stored in the offline connection path storing unit 125 and calculates routing parameters for the PLCs into which it is necessary to set routing parameters on each of the connection paths. The routing parameter calculator 127 corresponds to the routing parameter calculator in the claims. Some of the constituent elements that are the same as those in FIG. 35 according to with the fourth embodiment are referred to by using the same reference characters, and the explanation thereof will be omitted.

Figure 50:
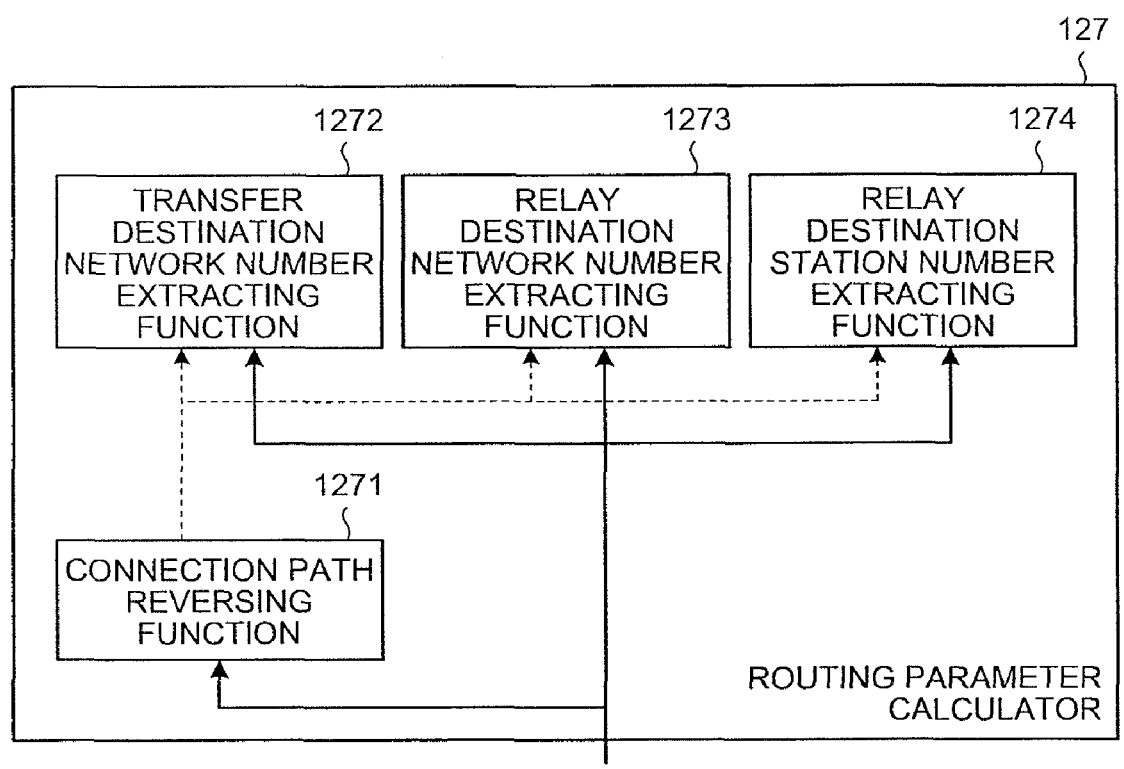
FIG. 50 is a schematic block diagram of a functional configuration of a routing parameter calculator.

FIG. 50 is a schematic block diagram of a more detailed functional configuration of the routing parameter calculator. As shown in FIG. 50, the routing parameter calculator 127 includes a connection path reversing function 1271, a transfer destination network number extracting function 1272, a relay destination network number extracting function 1273, and a relay destination station number extracting function 1274.

The connection path reversing function 1271 extracts the connection paths stored in the offline connection path storing unit 125 and creates reverse connection paths by reversing the order of the data.

The transfer destination network number extracting function 1272 extracts the transfer destination network number for each routing parameter, based on the connection paths stored in the offline connection path storing unit 125 and the reverse connection paths that have been created by the connection path reversing function 1271.

The relay destination network number extracting unit extracts the relay destination network number for each routing parameter, based on the connection paths stored in the offline connection path storing unit 125 and the reverse connection paths that have been created by the connection path reversing function 1271.

The relay destination station number extracting unit extracts the relay destination station number for each routing parameter, based on the connection paths stored in the offline connection path storing unit 125 and the reverse connection paths that have been created by the connection path reversing function 1271.

(1) Overview of the Process

Figures 1, 51:
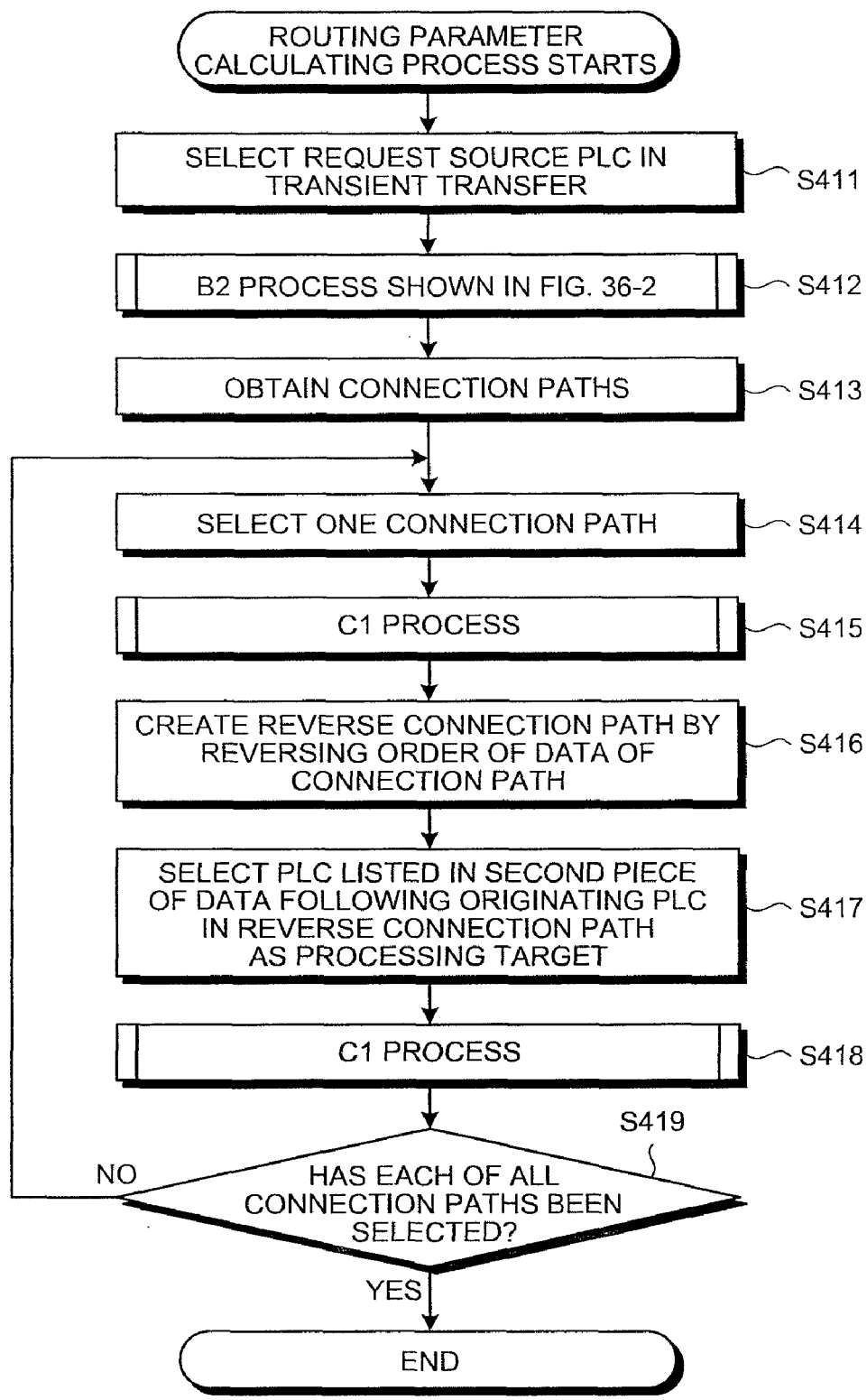
Figures 2, 51:
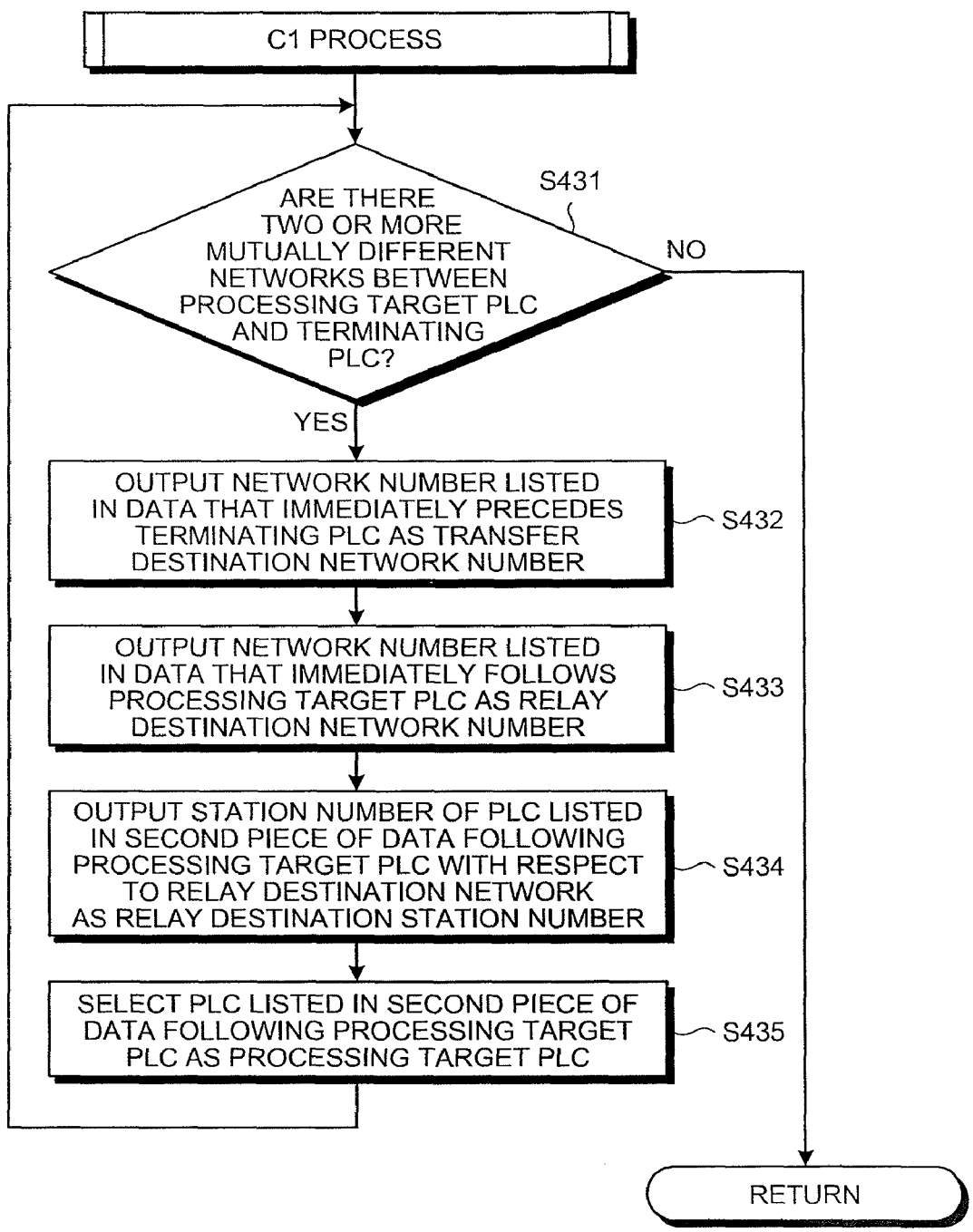

Next, a routing parameter calculating process performed in the control system engineering apparatus 100 configured as described above will be explained. FIGS. 51-1 to FIG. 51-2 are flowcharts of an example of a procedure in the routing parameter calculating process. First, a user specifies a request source PLC in a transient transfer through the originating PLC specifying unit 113 (step S411). In the following sections, the request source PLC will be referred to as the "originating PLC".

Subsequently, the originating PLC that has been specified by the originating PLC specifying unit 113 is selected as a processing target so that the B2 process shown in FIG. 36-2 according to the fourth embodiment is performed (step S412), and the connection paths are obtained (step S413).

One connection path is selected out of the obtained connection paths (step S414). Subsequently, the originating PLC on the selected connection path is selected as a processing target, so that a C1 process is performed (step S415).

As shown in FIG. 51-2, in the C1 process, it is judged first whether there are two or more mutually different networks between the processing target PLC and the terminating PLC (step S431). In the case where two or more mutually different networks are not present (step S431: No), the C1 process is ended, and the process returns to the process shown in FIG. 51-1. In contrast, in the case where there are mutually different networks (step S431: Yes), the network number listed in the piece of data that immediately precedes the terminating PLC on the selected connection path is output as the transfer destination network number (step S432).

Subsequently, the network number listed in the piece of data that immediately follows the processing target PLC on the selected connection path is output as the relay destination network number (step S433). Further, the station number of the PLC listed in the second piece of data following the processing target PLC, with respect to the relay destination network that has been output at step S433 is output as the relay destination station number (step S434).

After that, the PLC listed in the second piece of data following the processing target PLC is selected as a processing target (step S435), and the process returns to step S431 so that the processes described above are repeatedly performed.

When the C1 process has been completed, the process returns to the process shown in FIG. 51-1 so that the connection path reversing function 1271 creates a reverse connection path by reversing the order of the data of the selected connection path (step S416). In other words, the originating PLC on the selected connection path is used as the terminating PLC, whereas the terminating PLC on the selected connection path is used as the originating PLC.

After that, the PLC listed under the second piece of data following the originating PLC in the reverse connection path data having the reverse order is selected as a processing target (step S417), so that the C1 process is performed (step S418).

After the C1 process performed on the reverse connection path has been completed, it is checked to see if the process has been performed on each of all the connection paths that have been obtained at step S413 (step S419). In the case where there is at least one connection path on which the process has yet not been performed (step S419: No), the process returns to step S414, so that the processes described above are repeatedly performed. In contrast, in the case where the process has been performed on each of all the connection paths (step S419: Yes), the routing parameter calculating process has been completed.

(2) Specific Examples of the Process

In the explanation above, the overview of the routing parameter calculating process is described. In the following sections, specific examples of the process will be explained by using the control system configured as shown in FIG. 28 as an example. The offline connection path analyzing process shown in FIGS. 36-1 to 36-3 according to the fourth embodiment is performed, while using the control system shown in FIG. 28 as a target and using a PLC $\pi$ as the originating PLC. FIG. 52 is a drawing of examples of connection paths to the PLCs with respect to the control system shown in FIG. 28. FIGS. 53-1 to 53-4 are routing parameters that are obtained as a result of the routing parameter calculating process and are set into PLCs.

(2-1) Connection Path Obtaining Process

First, by performing the offline connection path analyzing process shown in FIGS. 36-1 to 36-3 while using the request source PLC $\pi$ in the transient transfer that has been specified by the originating PLC specifying unit 113 as the originating PLC, connection paths P$\alpha$g to P$\psi$g shown in FIG. 52 are obtained.

(2-2) The Connection Path P$\alpha$g

First, the connection path P$\alpha$g is selected out of the connection paths shown in FIG. 52 and the process described below is performed on the connection path P$\alpha$g.

(2-2-1) The PLC $\pi$ on the Connection Path

The C1 process shown in FIG. 51-2 is performed while using the PLC $\pi$ serving as the originating PLC on the connection path P$\alpha$g as the processing target PLC. In the C1 process in which the PLC $\pi$ is used as the processing target, two or more mutually different networks are not present before the terminating PLC on the connection path P$\alpha$g. The C1 process in which the PLC $\pi$ is used as the processing target PLC has thus been completed.

(2-2-2) PLC $\pi$ on the Reverse Connection Path

Subsequently, "the PLC $\alpha$→the inter-controller network No. 1→the PLC $\pi$", which is obtained by reversing the order of the connection path data of the connection path P$\alpha$g "the PLC $\pi$→the inter-controller network No. 1→the PLC $\alpha$" will be referred to as a reverse connection path P$\alpha$g'. The PLC $\pi$, which is the PLC listed in the second piece of data following the PLC $\alpha$ serving as the originating PLC on the reverse connection path P$\alpha$g', is selected as a processing target PLC, so that the C1 process is performed. However, in the C1 process in which the PLC $\pi$ is used as the processing target, two or more mutually different networks are not present before the terminating PLC on the reverse connection path P$\alpha$g'. The C1 process in which the PLC $\pi$ is used as the processing target has thus been completed.

(2-3) The Connection Path P$\epsilon$g

A connection path P$\epsilon$g is selected out of the connection paths shown in FIG. 52, and the process is performed on the connection path P$\epsilon$g. The result of this process is the same as the result obtained with the connection path P$\alpha$g described in (2-2). Thus, no routing parameter is calculated.

(2-4) The Connection Path P$\beta$g

A connection path P$\beta$g is selected out of the connection paths shown in FIG. 52, and the process described below is performed on the connection path P$\beta$g.

(2-4-1) The Connection Path

The C1 process shown in FIG. 51-2 is performed while using the PLC $\pi$ serving as the originating PLC on the connection path P$\beta$g as the processing target PLC. In the C1 process in which the PLC $\pi$ is used as the processing target, there are two or more mutually different networks before the terminating PLC on the connection path P$\beta$g. Thus, the network number "5" of the information-related network No. 5 listed in the piece of data (data 3) that immediately precedes the PLC $\beta$ serving as the terminating PLC is output as the transfer destination network number.

Also, the network number "1" of the inter-controller network No. 1 listed in the piece of data (data 1) that immediately follows the PLC $\pi$ serving as the processing target is output as the relay destination network number. Further, the station number "1" of the PLC $\alpha$ with respect to the inter-controller network No. 1, the PLC $\alpha$ being listed in the second piece of data (data 2) following the PLC $\pi$ serving as the processing target is obtained from the offline network configuration information storing unit 122 and is output as the relay destination station number.

After that, the PLC $\alpha$, which is listed in the second piece of data (the data 2) following the PLC $\pi$ serving as the processing target, is selected as a processing target, so that the C1 process is performed. In the C1 process in which the PLC $\alpha$ is used as the processing target, two or more mutually different networks are not present before the terminating PLC on the connection path P$\beta$g. The C1 process in which the connection path PLC $\alpha$ is used as the processing target has thus been completed. The result of this process is shown on line 501 in FIG. 53-1.

(2-4-2) The Reverse Connection Path

Subsequently, "the PLC $\beta$→the information-related network No. 5→the PLC $\alpha$→the inter-controller network No. 1→the PLC $\pi$", which is obtained by reversing the order of the connection path data of the connection path P$\beta$g "the PLC $\pi$→the inter-controller network No. 1→the PLC $\alpha$→the information-related network No. 5→the PLC $\beta$" will be referred to as a reverse connection path P$\beta$g'. The PLC $\alpha$, which is listed in the second piece of data following the PLC $\beta$ serving as the originating PLC on the reverse connection path P$\beta$g', is selected as a processing target, so that the C1 process is performed. However, in the C1 process in which the PLC α is used as the processing target, two or more mutually different networks are not present before the terminating PLC on the reverse connection path Pβg'. The C1 process in which the PLC α is used as the processing target PLC has thus been completed.

(2-5) The Connection Path Pμg

A connection path Pμg is selected out of the connection paths shown in FIG. 52, and the process is performed on the connection path Pμg. The result of this process is the same as the result obtained with the connection path Pβg described in (2-4). Thus, the calculated routing parameter is the same, and no routing parameter is newly output.

(2-6) The Connection Path Pθg

A connection path Pθg is selected out of the connection paths shown in FIG. 52, and the process described below is performed on the connection path Pθg.

(2-6-1) The Connection Path

The C1 process shown in FIG. 51-2 is performed while using the PLC π serving as the originating PLC on the connection path Pθg as the processing target PLC. In the C1 process in which the PLC π is used as the processing target, there are two or more mutually different networks before the terminating PLC on the connection path Pθg. Thus, the network number "2" of the inter-controller network No. 2 listed in the piece of data (data 5) that immediately precedes the PLC θ serving as the terminating PLC is output as the transfer destination network number.

Also, the network number "1" of the inter-controller network No. 1 listed in the piece of data (data 1) that immediately follows the PLC π serving as the processing target is output as the relay destination network number. Further, the station number "1" of the PLC α with respect to the inter-controller network No. 1, the PLC α being listed in the second piece of data (data 2) following the PLC π serving as the processing target is obtained from the offline network configuration information storing unit 122 and is output as the relay destination station number. The result of this process is shown on line 502 in FIG. 53-1.

After that, the PLC α, which is listed in the second piece of data (the data 2) following the PLC π serving as the processing target, is selected as a processing target, so that the C1 process is performed. In the C1 process in which the PLC α is used as the processing target, there are two or more mutually different networks before the terminating PLC on the connection path Pθg. Thus, the network number "2" of the inter-controller network 22B listed in the piece of data (the data 5) that immediately precedes the PLC θ serving as the terminating PLC is output as the transfer destination network number.

Also, the network number "5" of the information-related network No. 5 listed in the piece of data (data 3) that immediately follows the PLC α serving as the processing target is output as the relay destination network number. Further, the station number "2" of the PLC β with respect to the information-related network No. 5, the PLC β being listed in the second piece of data (data 4) following the PLC α serving as the processing target is obtained from the offline network configuration information storing unit 122 and is output as the relay destination station number. The result of this process is shown on line 504 in FIG. 53-2.

After that, the PLC β, which is the PLC listed in the second piece of data following the PLC α serving as the processing target, is selected as a processing target PLC, so that the C1 process is performed. In the C1 process in which the PLC β is used as the processing target, two or more mutually different networks are not present before the terminating PLC on the connection path Pθg. The C1 process in which the PLC β is used as the processing target has thus been completed.

(2-6-2) The Reverse Connection Path

Subsequently, "the PLC θ→the inter-controller network No. 2→the PLC β→the information-related network No. 5→the PLC α→the inter-controller network No. 1→the PLC π", which is obtained by reversing the order of the connection path data of the connection path Pθg "the PLC π→the inter-controller network No. 1→the PLC α→the information-related network No. 5→the PLC β→the inter-controller network No. 2→the PLC θ" will be referred to as a reverse connection path Pθg'. The PLC β, which is listed in the second piece of data following the PLC θ serving as the originating PLC on the reverse connection path Pθg', is selected as a processing target, so that the C1 process is performed.

In the C1 process in which the PLC β is used as the processing target, there are two or more mutually different networks before the terminating PLC on the connection path Pθg'. Thus, the network number "1" of the inter-controller network No. 1 listed in the piece of data that immediately precedes the PLC π serving as the terminating PLC is output as the transfer destination network number. Also, the network number "5" of the information-related network No. 5 listed in the piece of data (the data 3) that immediately follows the PLC β serving as the processing target is output as the relay destination network number. Further, the station number "1" of the PLC α with respect to the information-related network No. 5, the PLC α being listed in the second piece of data (the data 4) following the PLC β serving as the processing target is obtained from the offline network configuration information storing unit 122 and is output as the relay destination station number. The result of this process is shown on line 506 in FIG. 53-3.

After that, the PLC α, which is listed in the second piece of data following the PLC β serving as the processing target, is selected as a processing target, so that the C1 process is performed. In the C1 process in which the PLC α is used as the processing target, two or more mutually different networks are not present before the terminating PLC on the connection path Pθg'. The C1 process in which the connection path PLC α is used as the processing target has thus been completed.

(2-7) The Connection Path κKg

A connection path Pκg is selected out of the connection paths shown in FIG. 52, and the process is performed on the connection path Pκg. The result of this process is the same as the result obtained with the connection path Pθg described in (2-6). Thus, the calculated routing parameter is the same, and no routing parameter is newly output.

(2-8) The Connection Path Pωg

A connection path Pωg is selected out of the connection paths shown in FIG. 52, and the process described below is performed on the connection path Pωg.

(2-8-1) The Connection Path

The C1 process shown in FIG. 51-2 is performed while using the PLC π serving as the originating PLC on the connection path Pωg as the processing target PLC. In the C1 process in which the PLC π is used as the processing target, there are two or more mutually different networks before the terminating PLC on the connection path Pωg. Thus, the network number "3" of the inter-controller network No. 3 listed in the piece of data (data 5) that immediately precedes the PLC ω serving as the terminating PLC is output as the transfer destination network number.

Also, the network number "1" of the inter-controller network No. 1 listed in the piece of data (data 1) that immediately follows the PLC π serving as the processing target is output as the relay destination network number. Further, the station number "1" of the PLC α with respect to the inter-controller network No. 1, the PLC α being listed in the second piece of data (data 2) following the PLC π serving as the processing target is obtained out of the offline network configuration information and is output as the relay destination station number. The result of this process is shown on line 503 in FIG. 53-1.

After that, the PLC α, which is listed in the second piece of data (the data 2) following the PLC π serving as the processing target, is selected as a processing target, so that the C1 process is performed. In the C1 process in which the PLC α is used as the processing target, there are two or more mutually different networks before the terminating PLC on the connection path Pωg. Thus, the network number "3" of the inter-controller network No. 3 listed in the piece of data (the data 5) that immediately precedes the PLC ω serving as the terminating PLC is output as the transfer destination network number.

Also, the network number "5" of the information-related network No. 5 listed in the piece of data (data 3) that immediately follows the PLC α serving as the processing target is output as the relay destination network number. Further, the station number "3" of the PLC μ with respect to the information-related network No. 5, the PLC μ being listed in the second piece of data (data 4) following the PLC α serving as the processing target is obtained from the offline network configuration information storing unit 122 and is output as the relay destination station number. The result of this process is shown on line 505 in FIG. 53-2.

After that, the PLC μ, which is the PLC listed in the second piece of data following the PLC α serving as the processing target, is selected as a processing target PLC, so that the C1 process is performed. In the C1 process in which the PLC μ is used as the processing target, two or more mutually different networks are not present before the terminating PLC on the connection path Pωg. The C1 process in which the PLC β is used as the processing target has thus been completed.

(2-8-2) The Reverse Connection Path

Subsequently, "the PLC ω→the inter-controller network No. 3→the PLC μ→the information-related network No. 5→the PLC α→the inter-controller network No. 1→the PLC π", which is obtained by reversing the order of the connection path data of the connection path Pωg "the PLC π→the inter-controller network No. 1→the PLC α→the information-related network No. 5→the PLC μ→the inter-controller network No. 3→the PLC ω" will be referred to as a reverse connection path Pωg'. The PLC μ, which is listed in the second piece of data following the PLC ω serving as the originating PLC on the reverse connection path Pωg', is selected as a processing target, so that the C1 process is performed.

In the C1 process in which the PLC μ is used as the processing target, there are two or more mutually different networks before the terminating PLC on the connection path Pωg'. Thus, the network number "1" of the inter-controller network No. 1 listed in the piece of data that immediately precedes the PLC π serving as the terminating PLC is output as the transfer destination network number. Also, the network number "5" of the information-related network No. 5 listed in the piece of data that immediately follows the PLC μ serving as the processing target is output as the relay destination network number. Further, the station number "1" of the PLC α with respect to the information-related network No. 5, the PLC α being listed in the second piece of data following the PLC μ serving as the processing target is obtained from the offline network configuration information storing unit 122 and is output as the relay destination station number. The result of this process is shown on line 507 in FIG. 53-4.

Subsequently, the PLC α, which is listed in the second piece of data following the PLC μ serving as the processing target, is selected as a processing target, so that the C1 process is performed. In the C1 process in which the PLC α is used as the processing target, two or more mutually different networks are not present before the terminating PLC on the connection path Pωg'. The C1 process in which the connection path PLC α is used as the processing target has thus been completed.

(2-9) The Connection Path Pψg

A connection path Pψg is selected out of the connection paths shown in FIG. 52, and the process is performed on the connection path Pψg. The result of this process is the same as the result obtained with the connection path Pωg described in (2-8). Thus, the calculated routing parameter is the same, and no routing parameter is newly output.

The routing parameters shown in FIGS. 53-1 to 53-4 that have been obtained in the manner described above are set into the corresponding PLCs each of which is listed under the "name". More specifically, shown in FIG. 53-1 are the routing parameters that are set into the PLC π. Also, shown in FIG. 53-2 are the routing parameters that are set into the PLC α. Similarly, shown in FIG. 53-3 are the routing parameters that are set into the PLC β. Further, shown in FIG. 53-4 are the routing parameters that are set into the PLC μ.

According to the sixth embodiment, the control system engineering apparatus 100 performs the process that involves calculations by human labor according to conventional techniques. Thus, an advantageous effect is achieved where it is possible to eliminate the human labor for calculating the routing parameters. In addition, another advantageous effect is achieved where it is also possible to easily set the network parameters including routing parameters into the PLCs in a situation where additions and/or changes are made to the configuration of an existing control system or in a situation where a new control system is constructed. Further, because the connection paths are displayed, yet another advantageous effect is achieved where it is possible to easily recognize which one of the connection paths, each of the calculated routing parameters in the PLCs corresponds to.

Seventh Embodiment

In a seventh embodiment of the present invention, a control system engineering apparatus and a control system engineering method with which, in the case where it is necessary to change the network parameters in an already-working control system, it is possible to automatically rewrite the network parameters of the PLCs, including incidental changes made to the routing parameters will be explained.

Figure 54:
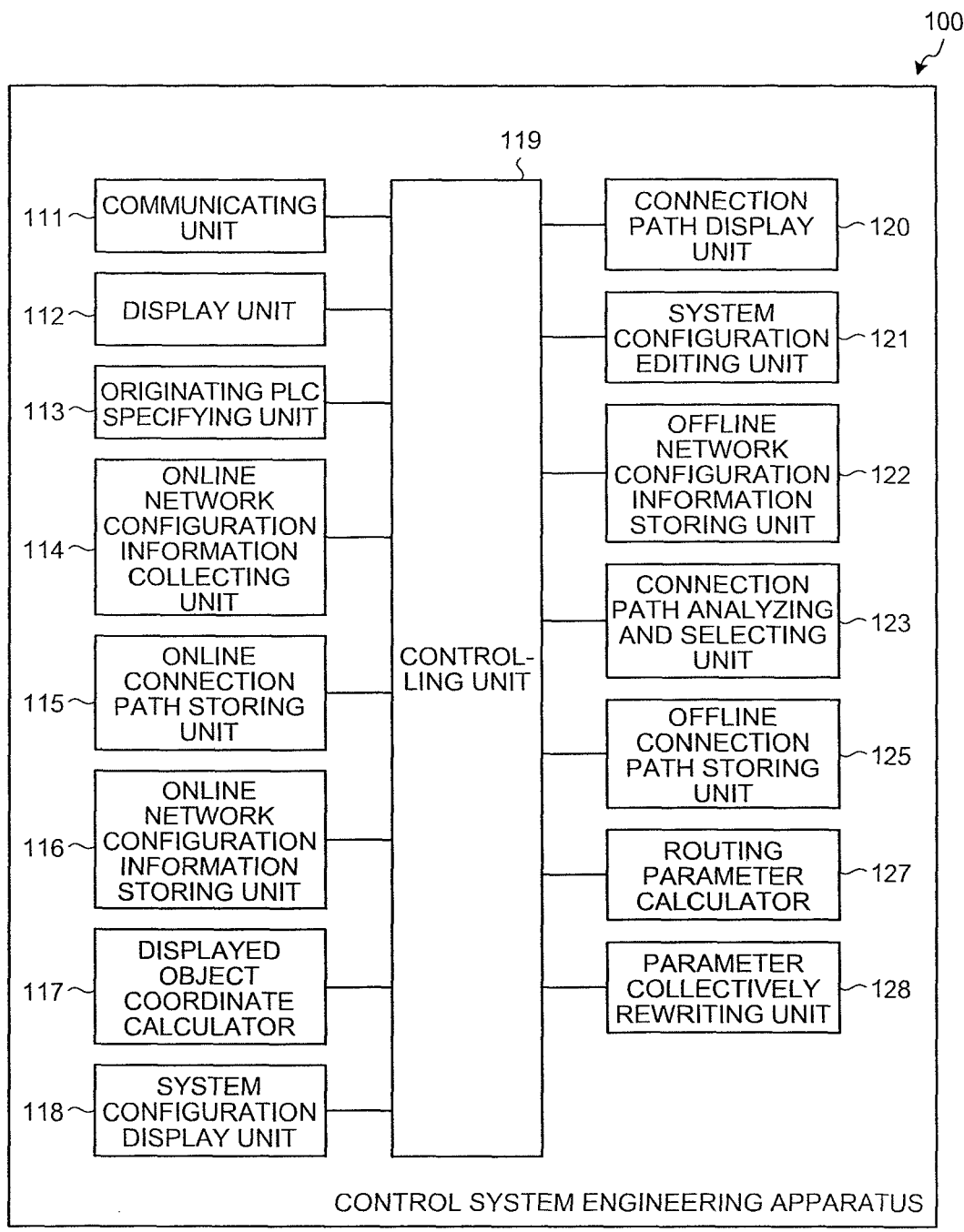
FIG. 54 is a schematic block diagram of a functional configuration of a control system engineering apparatus according to a seventh embodiment of the present invention.

FIG. 54 is a schematic block diagram of a functional configuration of the control system engineering apparatus according to the seventh embodiment of the present invention. The control system engineering apparatus 100 includes the communication unit 111, the display unit 112, the originating PLC specifying unit 113, the online network configuration information collecting unit 114, the online connection path storing unit 115, the online network configuration information storing unit 116, the displayed object coordinate calculator 117, the system configuration display unit 118, the system configuration editing unit 121, the offline network configuration information storing unit 122, the connection path analyzing and selecting unit 123, the offline connection path storing unit 125, the connection path display unit 120, a parameter collectively rewriting unit 128, and the controlling unit 119 that controls these processing units. More specifically, in contrast to the configuration according to the first embodiment and the configuration according to the sixth embodiment, the control system engineering apparatus 100 is configured so as to omit the throughput model storing unit 124 and so as to further include the parameter collectively rewriting unit 128.

The parameter collectively rewriting unit 128 automatically performs a process of changing the network parameters, including a process of changing the routing parameters, on a control system. In this situation, the parameter collectively rewriting unit 128 rewrites the network parameters in such an order that does not make the PLCs included in the control system inaccessible because of the changes made to the parameters. The parameter collectively rewriting unit 128 corresponds to the parameter collectively rewriting means in the claims. Some of the constituent elements that are the same as those in the embodiments described above are referred to by using the same reference characters, and the explanation thereof will be omitted.

(1) Overview of the Process

Figures 1, 55:
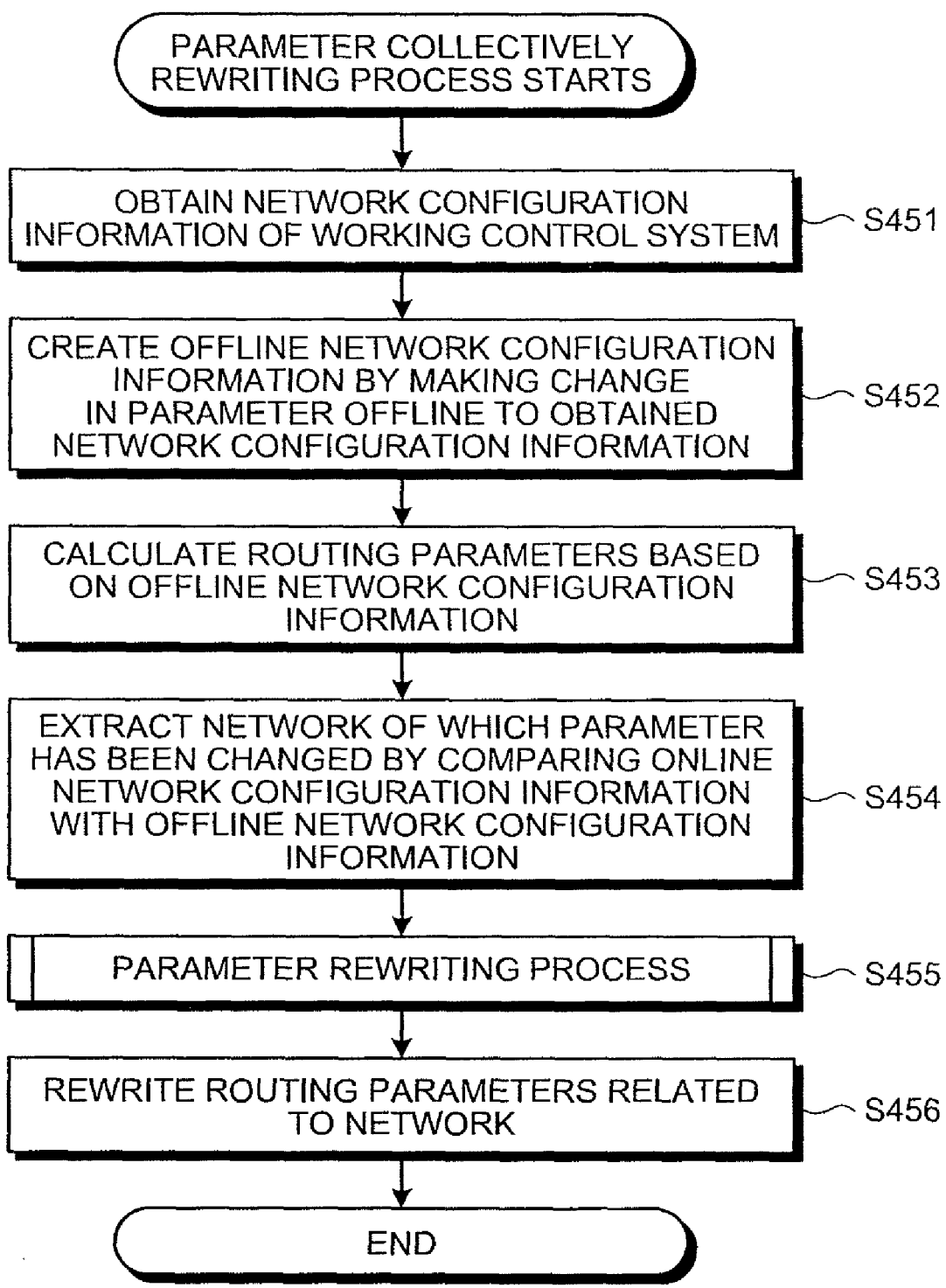
Figures 2, 55:
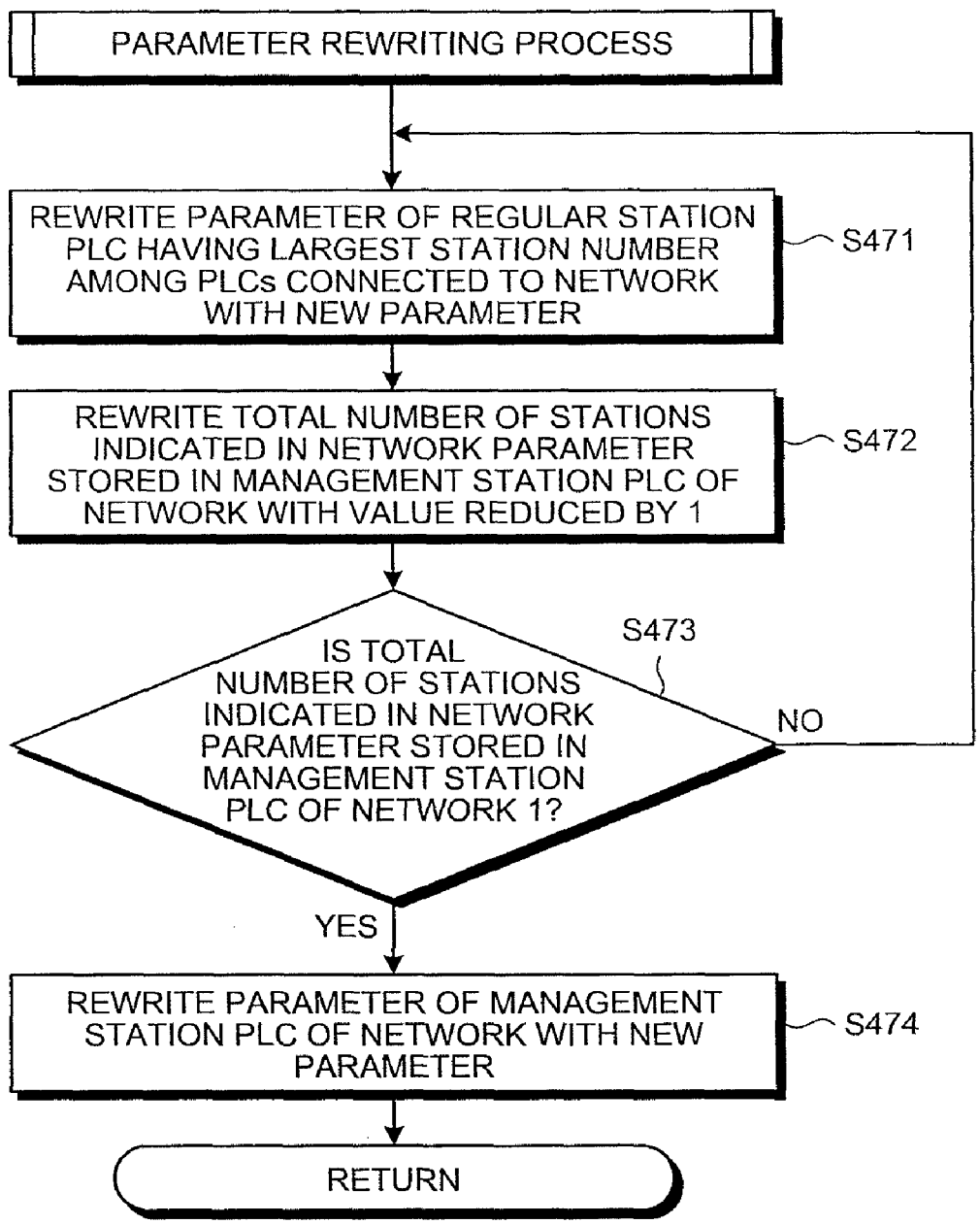

FIGS. 55-1 to 55-2 are flowcharts of an example of a procedure in a parameter collectively rewriting process. First, the control system engineering apparatus 100 that is connected to one of the PLCs included in a control system obtains the network configuration information from the working control system by using the method described in the first embodiment (step S451). In the following sections, the obtained network configuration information will be referred to as the "online network configuration information".

Subsequently, with respect to the obtained online network configuration information, a change made to a parameter is edited offline (step S452), so that offline network configuration information is created. In this situation, it is assumed that a network parameter of one network has been changed. After that, based on the offline network configuration information that has been edited offline, routing parameters are calculated (step S453).

Subsequently, the network of which the parameter has been changed is extracted by comparing the online network configuration information with the edited offline network configuration information (step S454). After that, the parameter rewriting process shown in FIG. 55-2 is performed on the PLCs connected to the extracted network (step S455).

The process continues into the flowchart shown in FIG. 55-2. Of the PLCs that are connected to the extracted network, the parameter of such a PLC that is a regular station and has the largest station number is rewritten with a new parameter (step S471). Subsequently, a rewriting process to reduce, by 1, the total number of stations indicated in a network parameter stored in the management station PLC of the network is performed (step S472).

After that, it is judged whether the total number of stations indicated in the network parameter stored in the management station PLC of the network has become one (step S473). In the case where the total number of stations indicated in the network parameter stored in the management station PLC is not one (step S473: No), the process returns to step S471, and the processes described above are repeatedly performed until the total number of stations indicated in the network parameter stored in the management station PLC becomes one.

In contrast, in the case where the total number of stations indicated in the network parameter stored in the management station PLC is one (step S473: Yes), the parameter of the management station PLC of the network is rewritten with a new parameter (step S474). The parameter rewriting process has thus been completed, and the process returns to the process shown in FIG. 55-1.

Returning to the description of FIG. 55-1, the routing parameters that are related to the network that has been selected at step S454 are rewritten (step S456), and the parameter collectively rewriting process has thus been completed.

(2) Specific Examples of the Process

In the explanation above, the overview of the parameter collectively rewriting process is described. In the following sections, specific examples of the process will be explained in detail. In the following sections, an example will be explained in which the inter-controller network No. 3 is changed to an inter-controller network No. 10 in the control system shown in FIG. 28 that is working with the routing parameters shown in FIGS. 53-1 to 53-4 that have been calculated in the sixth embodiment.

First, the online network configuration information of the working control system shown in FIG. 28 is obtained by using the method explained in the first embodiment and is stored into the online network configuration information storing unit 116.

Subsequently, with respect to the online network configuration information, the system configuration editing unit 121 creates offline network configuration information in which the inter-controller network No. 3 has been changed to the inter-controller network No. 10, by using the method explained in the fourth embodiment and stores the created offline network configuration information into the offline network configuration information storing unit 122. Also, based on the offline network configuration information in which the change has been made, routing parameters are calculated by using the method explained in the sixth embodiment. FIGS. 56-1 to 56-4 are drawings of the routing parameters that are obtained after the configuration of the control system has been changed. On line 503 in FIG. 53-1 and on line 505 in FIG. 53-2, the transfer destination network number is indicated as "3". In contrast, on line 513 in FIG. 56-1 and on line 515 in FIG. 56-2, the same sections have been changed so as to indicate "10".

After that, the network of which the parameter has been changed is extracted by comparing the online network configuration information with the offline network configuration information. In the present example, the change that has been made to the section indicating the inter-controller network No. 3 in the online network configuration information, so as to indicate the inter-controller network No. 10 in the offline network configuration information is extracted.

Subsequently, the process to rewrite the parameters of the PLCs shown in FIG. 55-2 is performed with respect to the inter-controller network No. 3 to which the change has been made. First, in the working control system, the parameter of a PLC ψ (of which the station number is 3) that is a regular station PLC and has the largest station number among the PLCs that are connected to the inter-controller network No. 3 is rewritten with a new parameter. In other words, a process to rewrite "the regular station of which the station number is 3 for the inter-controller network No. 3" with "the regular station of which the station number is 3 for the inter-controller network No. 10" is performed.

Subsequently, in the working control system, a rewriting process to reduce, by 1, the total number of stations indicated in the network parameter stored in the PLC μ that is connected to the inter-controller network No. 3 and serves as the management station PLC is performed. In other words, the total number of stations of the inter-controller network No. 3 is changed from "3" to "2". As a result, at this point in time, the inter-controller network No. 3 is operating in such a state that the PLC μ and the PLC ω are connected thereto, while the PLC ψ is physically connected thereto but is not operating as a station in the inter-controller network No. 3.

After that, because the total number of stations indicated in the network parameter stored in the PLC μ that is connected to the inter-controller network No. 3 and serves as the management station PLC is not "1", but is "2", the parameter of a PLC ω (of which the station number is 2) that is a regular station PLC and has, at this point in time, the largest station number among the PLCs that are connected to the inter-controller network No. 3 is rewritten with a new parameter. In other words, a process to rewrite "the regular station of which the station number is 2 for the inter-controller network No. 3" with "the regular station of which the station number is 2 for the inter-controller network No. 10" is performed.

Subsequently, the total number of stations indicated in the network parameter stored in the PLC μ that is connected to the inter-controller network No. 3 and serves as the management station PLC is reduced by 1. In other words, the total number of stations of the inter-controller network No. 3 is changed from "2" to "1". As a result, at this point in time, the inter-controller network No. 3 is operating in such a state that only the PLC μ is connected thereto, while the PLC ω and the PLC ψ are physically connected thereto but are not operating as stations in the inter-controller network No. 3.

After that, because the total number of stations indicated in the network parameter stored in the PLC μ that is connected to the inter-controller network No. 3 and serves as the management station PLC is "1", the parameter of the PLC μ serving as the management station is rewritten with a new parameter. In other words, "the management station of which the station number is 1 for the inter-controller network No. 3" is rewritten with "the management station of which the station number is 1 for the inter-controller network No. 10". As a result, at this point in time, the inter-controller network No. 3 has been changed to the inter-controller network No. 10. The inter-controller network No. 10 is operating in such a state that the PLC μ, the PLC ω, and the PLC ψ are connected thereto. The process to rewrite the parameters of the PLCs shown in FIG. 55-2 has thus been completed.

After that, the process to rewrite the routing parameters related to the inter-controller network No. 3 to which the change has been made is performed. In the present example, the inter-controller network No. 3 has been changed to the inter-controller network No. 10. Accordingly, the routing parameters related to the inter-controller network No. 10 among the routing parameters that have newly and automatically been calculated and are shown in FIGS. 56-1 to 56-4 are rewritten. In other words, new routing parameters Pπq shown in FIG. 56-1 are written into the PLC π, whereas new routing parameters Pαq shown in FIG. 56-2 are written into the PLC α. Because there is no other network to which changes have been made, the parameter collectively rewriting process has thus been completed.

According to the seventh embodiment, an advantageous effect is achieved where, in the case where it is necessary to change the network parameters, it is possible to automatically write the changes in the network parameters including the routing parameters into the PLCs to which the changes have been made. According to conventional techniques, in the case where it is necessary to change the network parameters, it is necessary to connect the control system engineering apparatus 100 to the PLCs to which the changes have been made, so that new settings can be written into the PLCs individually, and this process requires much human labor. In contrast, according to the seventh embodiment, an advantageous effect is achieved where it is possible to change the network parameters of the PLCs via the networks.

Eighth Embodiment

In the seventh embodiment, the method that is effective in a situation where it is necessary to change the parameter in one network in an already-working control system has been explained. In an eighth embodiment of the present invention, a situation where it is necessary to change parameters in a plurality of networks will be explained.

Even in the situation where it is necessary to change the parameters in a plurality of networks, it is possible to automatically rewrite the network parameters of the PLCs, including the changes made to the routing parameters, by sequentially applying the process described in the seventh embodiment to each of the changes; however, there is a possibility that there may be one or more PLCs in which the routing parameters need to be rewritten a plurality of times. Thus, the rewriting processes are automatically performed, but are not efficient. To cope with this situation, in the eighth embodiment, a control system engineering apparatus and a control system engineering method with which it is possible to perform these processes collectively will be explained.

The configuration of the control system engineering apparatus used in the eighth embodiment is the same as the configuration shown in FIG. 54 according to the seventh embodiment. However, the parameter collectively rewriting unit 128 has a function of firstly updating network parameters that do not include routing parameters, sequentially starting with the network positioned farthest from an originating PLC toward the originating PLC and subsequently updating the routing parameters, sequentially starting with the PLC positioned closest to the originating PLC toward the PLCs in the networks positioned farther. With this arrangement, it is possible to avoid the situation in which communication becomes impossible during the updating process of the network parameters.

(1) Overview of the Process

Figures 1, 57:
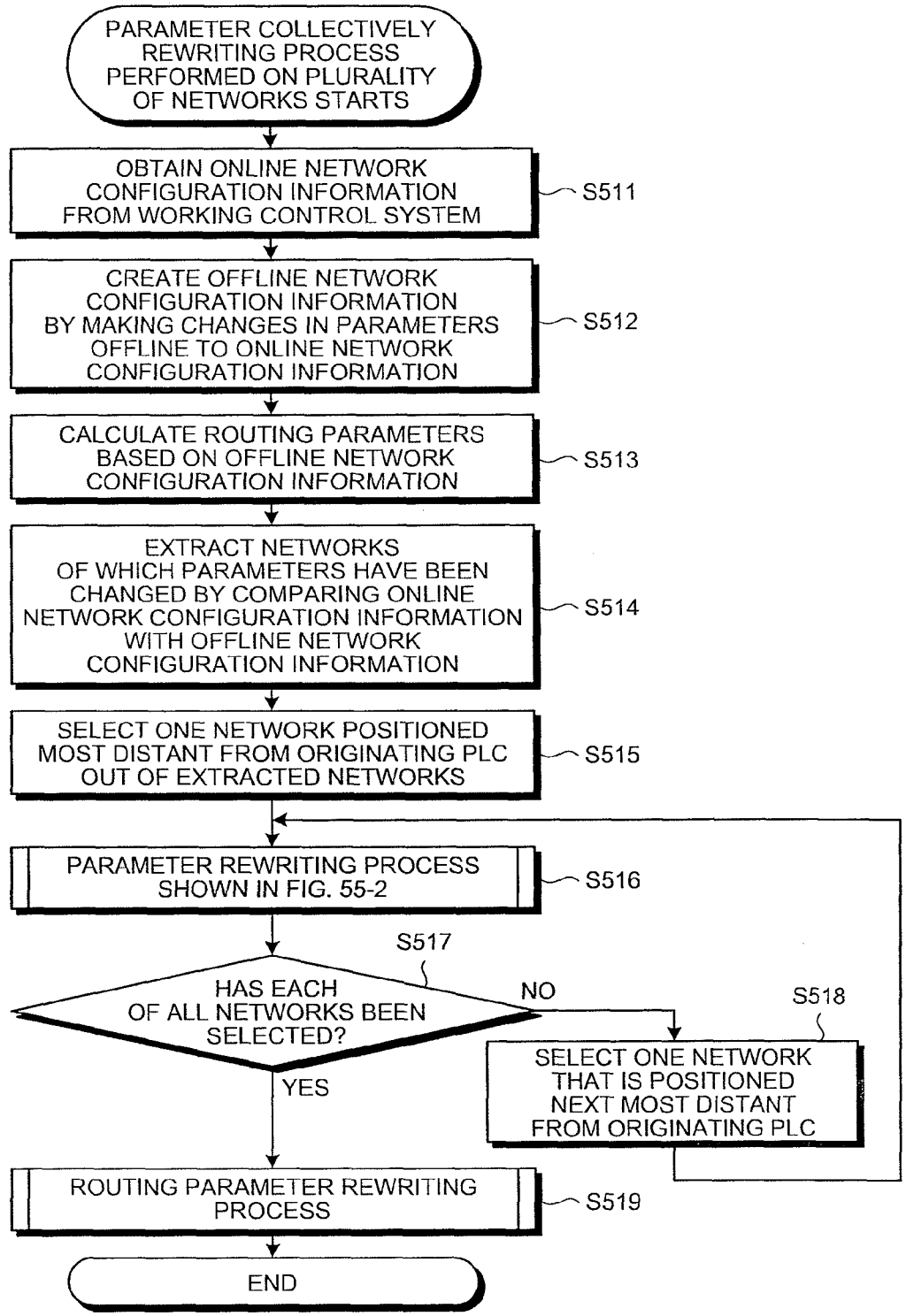
Figures 2, 57:
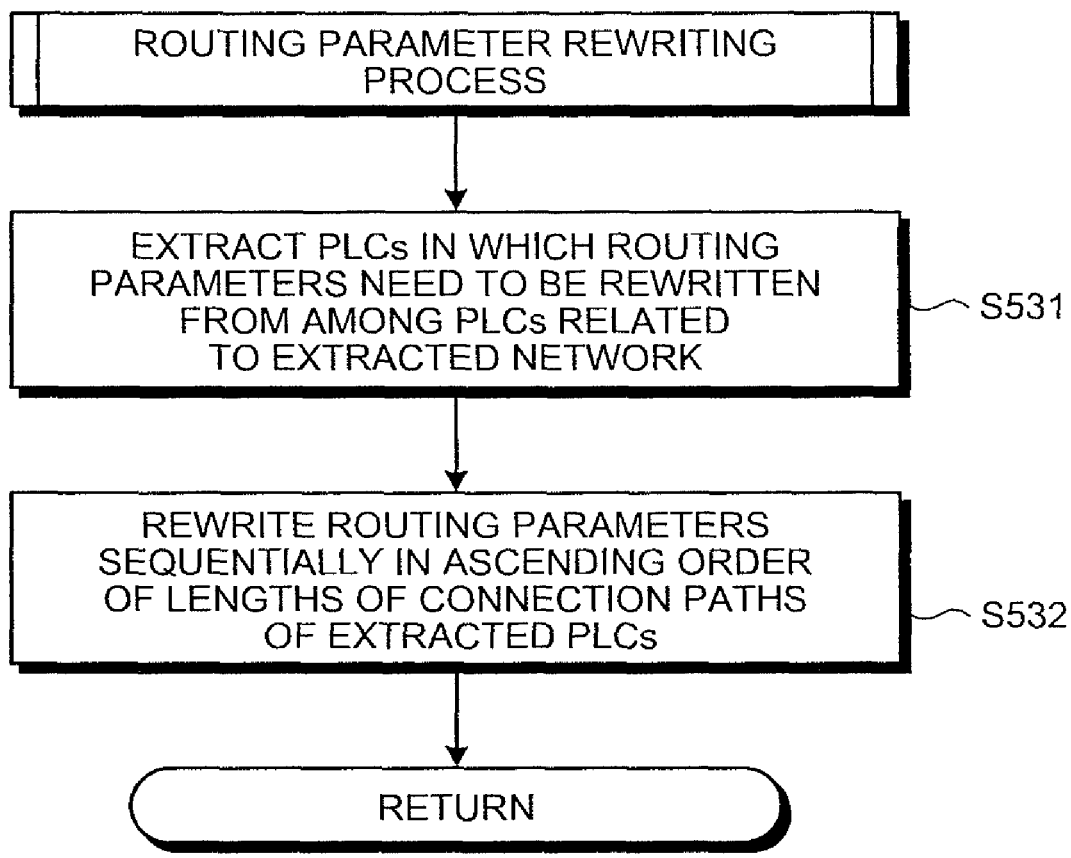

FIGS. 57-1 to 57-2 are flowcharts of an example of a procedure in a parameter collectively rewriting process performed on a plurality of networks. First, the control system engineering apparatus 100 that is connected to one of the PLCs included in a control system obtains the online network configuration information from the working control system (step S511). The result is stored into the online network configuration information storing unit 116.

Subsequently, with respect to the obtained online network configuration information, changes made to the parameters are edited offline (step S512), and the result is stored into the offline network configuration information storing unit 122 as offline network configuration information. In this situation, it is assumed that network parameters of two or more networks have been changed. After that, based on the offline network configuration information that has been edited offline, the process to calculate the routing parameters is performed (step S513).

Subsequently, the networks of which the parameters have been changed are extracted by comparing the online network configuration information that has been obtained at step S511 with the offline network configuration information that has been edited at step S512 (step S514).

After that, of the extracted networks, the network that has the most distant connection path from the originating PLC is selected by referring to the offline connection path information stored in the offline connection path storing unit 125 (step S515). After that, the process to rewrite the parameters of the PLCs connected to the selected network as shown in FIG. 55-2 is performed (step S516). Because the process to rewrite the parameters of the PLCs has already been explained in the seventh embodiment, the explanation thereof will be omitted.

When the process to rewrite the parameters of the PLCs as shown in FIG. 55-2 has been completed with respect to the network that has been selected at step S515, it is judged whether each of all the networks of which the parameters have been changed and that have been extracted at step S514 has been selected (step S517). In the case where all of the networks to which the changes have been made have not been selected (step S517: No), one of the extracted networks that is positioned next most distant from the originating PLC is selected (step S518). After that, the process returns to step S516, and the processes described above are repeatedly performed until all the networks to which the changes have been made have sequentially been selected in descending order of the distances of the connection paths from the originating PLC. In contrast, in the case where each of all the networks to which the changes have been made has been selected (step S517: Yes), the routing parameter rewriting process shown in FIGS. 57-2 is performed (step S519).

The process continues into the flowchart shown in FIG. 57-2. Of the PLCs that are related to the networks on which the network parameter rewriting process has been performed, the PLCs in which the routing parameters need to be rewritten are extracted (step S531). The routing parameters of the extracted PLCs are sequentially rewritten, in ascending order of the lengths of the connection paths stored in the offline connection path storing unit 125 (step S532). The routing parameter rewriting process has thus been completed. Also, the parameter collectively rewriting process has thus been completed.

(2) Specific Examples of the Process

In the explanation above, the overview of the parameter collectively rewriting process performed on the plurality of networks is described. In the following sections, specific examples of the process will be explained in detail. In the following sections, an example will be explained in which the inter-controller network No. 1 is changed to an inter-controller network No. 9, whereas the inter-controller network No. 3 is changed to the inter-controller network No. 10, in the control system shown in FIG. 28 that is working with the routing parameters shown in FIGS. 53-1 to 53-4 that have been calculated in the sixth embodiment.

First, the online network configuration information of the working control system shown in FIG. 28 is obtained by using the method explained in the first embodiment and is stored into the online network configuration information storing unit 116.

Subsequently, offline network configuration information in which the inter-controller network No. 1 has been changed to the inter-controller network No. 9, whereas the inter-controller network No. 3 has been changed to the inter-controller network No. 10 by the system configuration editing unit 121, while offline, by using the method explained in the fourth embodiment is stored into the offline network configuration information storing unit 122. Also, based on the offline network configuration information in which the change has been made, routing parameters are calculated by using the method explained in the sixth embodiment. FIGS. 58-1 to 58-4 are drawings of routing parameters that are obtained after the configuration of the control system has been changed.

After that, the networks of which the parameters have been changed are extracted by comparing the online network configuration information with the offline network configuration information. In the present example, the changes that have been made to the sections indicating the inter-controller networks No. 1 and No. 3 in the online network configuration information, so as to indicate the inter-controller networks No. 9 and No. 10 in the offline network configuration information are extracted.

Subsequently, the process to rewrite the parameters of the PLCs shown in FIG. 55-2 is performed with respect to the inter-controller networks to which the changes have been made. More specifically, first, the process to rewrite the parameters of the PLCs is performed with respect to the inter-controller network No. 1 to which the change has been made, and subsequently, the process to rewrite the parameters of the PLCs is performed with respect to the inter-controller network No. 3 to which the change has been made.

After that, the process shown in FIG. 57-2 to rewrite the routing parameters related to the inter-controller networks No. 1 and No. 3 to which the changes have been made is performed as described below.

First, with respect to the routing parameters that have newly been calculated and are shown in FIGS. 58-1 to 58-4, the PLCs in which the routing parameters need to be rewritten are extracted. In the present example, the inter-controller network No. 1 has been changed to the inter-controller network No. 9, whereas the inter-controller network No. 3 has been changed to the inter-controller network No. 10. Thus, all the routing parameters shown in FIGS. 53-1 to 53-4 that include these and are presently working need to be rewritten. In other words, new routing parameters shown in FIG. 58-1 need to be written into the PLC $\pi$. In addition, new routing parameters shown in FIG. 58-2 need to be written into the PLC $\alpha$. Further, another new routing parameter shown in FIG. 58-3 needs to be written into the PLC $\beta$. Also, yet another new routing parameter P$\mu$q shown in FIG. 58-4 needs to be written into the PLC $\mu$.

To perform the process to write these routing parameters into the PLCs, the routing parameters are sequentially rewritten in ascending order of the lengths of the connection paths stored in the offline connection path storing unit 125. In this situation, the offline connection paths stored in the offline connection path storing unit 125 are the connection paths that have been used to calculate the routing parameters with respect to the network system configuration edited offline. In the present example, because the PLC $\pi$, which is directly connected, has the shortest connection path, the new routing parameters shown in FIG. 58-1 are written into the PLC $\pi$ first.

After that, by referring to the offline connection path storing unit 125, the PLC having the shortest connection path among those is extracted. The PLC having the shortest connection path among those is the PLC $\alpha$. Thus, secondly, the new routing parameters shown in FIG. 58-2 are written into the PLC $\alpha$.

Similarly, the PLC $\beta$ and the PLC $\mu$ have the next shortest connection paths. Thus, the new routing parameter shown in FIG. 58-3 is written into the PLC $\beta$, whereas the new routing parameter shown in FIG. 58-4 is written into the PLC $\mu$. The routing parameter rewriting process and the parameter collectively rewriting process performed on the plurality of networks have thus been completed.

In this situation, in the case where the method described in the seventh embodiment is sequentially applied to each of the PLCs in which the network parameters need to be rewritten, it is possible to automatically rewrite the network parameters of the PLCs, including the changes made to the routing parameters; however, there is a possibility that there may be one or more PLCs in which the routing parameters need to be rewritten a plurality of times. More specifically, after the routing parameters reflecting that the inter-controller network No. 1 has been changed to the inter-controller network No. 9 have been written into the PLC π, the routing parameter reflecting that the inter-controller network No. 3 has been changed to the inter-controller network No. 10 needs to be written into the PLC π again. In contrast, by using the method described above, it is possible to collectively write these routing parameters into the PLCs. Thus, it is possible to improve the efficiency of the operation to write, into the PLCs, the changes in the routing parameters related to the changes made to the network parameters.

According to the eighth embodiment, even in the situation where the network parameters of the two or more networks included in the control system have been changed offline, only the network parameters are changed first, sequentially in descending order of the distances of the connection paths of the networks from the originating PLC, and subsequently, the routing parameters are sequentially changed in ascending order of the distances of the connection paths from the originating PLC. Consequently, an advantageous effect is achieved where it is possible to collectively rewrite the network parameters.

In the first through the eighth embodiments described above, the examples of the control systems in which the programmable controllers are connected to the networks as control devices are explained. However, the present invention is not limited to those examples. For example, it is possible to apply the present invention in the same manner to a control system in which, instead of the programmable controllers, control devices such as numerical value control devices, motion controllers, or robot controllers, are connected to networks.

It is possible to realize any of the control system engineering methods described above by causing a computer (e.g., a personal computer or a work station) including a Central Processing Unit (CPU) to execute computer programs in which the processing procedures according to the methods are written. In this situation, the CPU (the controlling means) of the computer executes the processing steps in the program creation supporting method described above, according to the computer programs. These computer programs are recorded on a computer-readable recording medium such as a hard disk, a floppy (a registered trademark) disk, a Compact Disk Read-Only Memory (CD-ROM), a Magneto-Optical (MO) disk, a Digital Versatile Disk or a Digital Video Disk (DVD) and are executed when being read from the recording medium by the computer. It is also possible to distribute these computer programs via a network (a communication line) such as the Internet.

INDUSTRIAL APPLICABILITY

As described above, the control system engineering apparatus according to an aspect of the present invention is useful in understanding the system configuration and the connection paths included in a control system provided for, for example, a production facility.

The invention claimed is:
1. A control system engineering apparatus comprising:
a communicating means that connects to one of a plurality of control devices included in a control system in which the plurality of control devices are connected to one another via one or more networks;
an originating control device specifying means that specifies the one of the control devices connected to the communicating means as an originating control device;
an online network configuration information collecting means that collects, from the control devices included in the control system and via the communicating means, network configuration information including configurations of the control devices that the control devices have and networks to which the control devices are connected;
a displayed object coordinate calculator that causes objects to represent constituent elements of the control system and calculates coordinates that are required when the configurations of the control devices and connection relationships between the control devices and the networks obtained by the online network configuration information collecting means are displayed on a display means by using the objects; and
a system configuration display means that displays a system configuration of the control system on the display means, based on the objects and the coordinates calculated by the displayed object coordinate calculator, wherein
the displayed object coordinate calculator includes:
a network grid layout function that extracts the networks from the online network configuration information and lays out the extracted networks as rectangular network grids in an up-and-down direction according to a predetermined rule;
a control device grid layout function that creates a grid model by extracting the control devices from the online network configuration information, laying out each of rectangular control device grids so as to be positioned below a corresponding one of the network grids connected to a corresponding one of the control devices, and laying out each of rectangular wiring grids in an upward direction toward a corresponding one of the network grids having a connection relationship therewith so as to be positioned between a corresponding one of the control device grids and the corresponding one of the network grids;
a grid size calculating function that calculates grid sizes by calculating a size of each of the control device grids in the grid model based on information of the configurations of the control devices included in the online network configuration information and changing sizes of relevant ones of the wiring grids and the network grids according to the size of each of the control devices; and
a grid coordinate calculating function that calculates coordinates of each grid in the grid model by using the grid sizes, while using a predetermined position in the grid model as a point of reference, and wherein
the network grid layout function classifies the extracted networks according to types thereof, and performs a process of laying out the networks for each of the types of the classified networks; out of the control devices connected to a network, the larger a value indicating how many control devices or what percentage of the control devices are each also connected to one or more field networks is, the lower position the network is laid out in; the larger a value indicating how many control devices or what percentage of the control devices are each connected only to one or more other information-related networks is, the upper position the network is laid out in; and the larger a value indicating how many control devices or what percentage of the control devices are each also connected to one or more other inter-controller networks is, the upper position the network is laid out in, and the control device grid layout function lays out two or more of the control device grids that are connected to a mutually same network so as to be positioned closer to one another.

2. A control system engineering apparatus comprising:
a system configuration editing means that edits, while offline, offline network configuration information indicating configurations of a plurality of control devices and connection relationships between the control devices and networks in a control system in which the control devices are connected to one another via one or more networks;
a displayed object coordinate calculator that calculates coordinates that are required when the configurations of the control devices and the connection relationships between the control devices and the networks are displayed on a display means, based on the offline network configuration information, by using objects that represent constituent elements of the control system; and
a system configuration display means that displays a system configuration of the control system on the display means, based on the objects and the coordinates calculated by the displayed object coordinate calculator, wherein
the displayed object coordinate calculator includes:
a network grid layout function that extracts the networks from the offline network configuration information and lays out the extracted networks as rectangular network grids in an up-and-down direction according to a predetermined rule;
a control device grid layout function that creates a grid model by extracting the control devices from the offline network configuration information, laying out each of rectangular control device grids so as to be positioned below a corresponding one of the network grids connected to a corresponding one of the control devices, and laying out each of rectangular wiring grids in an upward direction toward a corresponding one of the network grids having a connection relationship therewith so as to be positioned between a corresponding one of the control device grids and the corresponding one of the network grids;
a grid size calculating function that calculates grid sizes by calculating a size of each of the control device grids in the grid model based on information of the configurations of the control devices included in the offline network configuration information and changing sizes of relevant ones of the wiring grids and the network grids according to the size of each of the control devices; and
a grid coordinate calculating function that calculates coordinates of each grid in the grid model by using the grid sizes, while using a predetermined position in the grid model as a point of reference, and wherein
the network grid layout function classifies the extracted networks according to types thereof, and performs a process of laying out the networks for each of the types of the classified networks; from the control devices connected to a network, the larger a value indicating how many control devices or what percentage of the control devices are each also connected to one or more field networks is, the lower position the network is laid out in; the larger a value indicating how many control devices or what percentage of the control devices are each connected only to one or more other information-related networks is, the upper position the network is laid out in; and the larger a value indicating how many control devices or what percentage of the control devices are each also connected to one or more other inter-controller networks is, the upper position the network is laid out in, and
the control device grid layout function lays out two or more of the control device grids that are connected to a mutually same network so as to be positioned closer to one another.

* * * * *